United States Patent
Skaaksrud et al.

(10) Patent No.: US 10,033,594 B2
(45) Date of Patent: *Jul. 24, 2018

(54) SYSTEMS, APPARATUS, AND METHODS OF CHECKPOINT SUMMARY BASED MONITORING FOR AN EVENT CANDIDATE RELATED TO AN ID NODE WITHIN A WIRELESS NODE NETWORK

(71) Applicant: FedEx Corporate Services, Inc., Collierville, TN (US)

(72) Inventors: Ole-Petter Skaaksrud, Germantown, TN (US); Terence Hollahan, Collierville, TN (US)

(73) Assignee: Fedex Corporate Services, Inc., Collierville, TN (US)

( * ) Notice: Subject to any disclaimer, the term of this patent is extended or adjusted under 35 U.S.C. 154(b) by 133 days.

This patent is subject to a terminal disclaimer.

(21) Appl. No.: 15/168,442

(22) Filed: May 31, 2016

(65) Prior Publication Data

US 2017/0013547 A1 Jan. 12, 2017

Related U.S. Application Data

(60) Provisional application No. 62/189,911, filed on Jul. 8, 2015.

(51) Int. Cl.
*H04H 20/71* (2008.01)
*H04L 12/24* (2006.01)
(Continued)

(52) U.S. Cl.
CPC .......... *H04L 41/12* (2013.01); *H04B 17/318* (2015.01); *H04L 41/0645* (2013.01); *H04W 4/80* (2018.02);
(Continued)

(58) Field of Classification Search
CPC ... H04L 41/12; H04L 41/0645; H04B 17/318; H04W 4/008
(Continued)

(56) References Cited

U.S. PATENT DOCUMENTS 4,750,197 A 6/1988 Denekamp et al.
5,154,228 A 10/1992 Gambertoglio et al.
(Continued)

FOREIGN PATENT DOCUMENTS

EP 0936794 8/1999
JP 2005343674 A 12/2005
(Continued)

OTHER PUBLICATIONS

M. Hachman, "Bluetooth 4.1 Prepares Headsets and More to Connect to the 'Net", online publication dated Dec. 4, 2013 (http://www.techhive.com/category/holiday/.
(Continued)

*Primary Examiner* — Thai Hoang
(74) *Attorney, Agent, or Firm* — Withers & Keys, LLC

(57) ABSTRACT

Systems, apparatus, and methods are described for checkpoint summary based monitoring for an event candidate within a wireless node network of ID nodes, a master node, and a server. Such a method, for example, may have the master node receiving a first set of advertising signals broadcast by an ID node and generating a first checkpoint summary representing the first set of received signals. The master node then receives a second set of advertising signals broadcast by the ID node (after the ID node broadcasts the first set) and generates a second checkpoint summary representing the second set of received signals. The method then identifies the event candidate based upon a comparison of an observed parameter for each of the first checkpoint summary and the second checkpoint summary; and reports
(Continued)

to the server a message about the event candidate relative to the ID node.

66 Claims, 63 Drawing Sheets

(51) Int. Cl.
*H04B 17/318* (2015.01)
*H04W 4/80* (2018.01)
*G06Q 10/08* (2012.01)
*H04W 48/16* (2009.01)
*H04W 84/20* (2009.01)

(52) U.S. Cl.
CPC ......... *G06Q 10/0833* (2013.01); *H04W 48/16* (2013.01); *H04W 84/20* (2013.01)

(58) Field of Classification Search
USPC ................ 370/230–231, 248, 254–258, 389, 370/395.3–395.32, 400–411, 419–423
See application file for complete search history.

(56) References Cited

U.S. PATENT DOCUMENTS

| | | | |
|---|---|---|---|
| 5,223,844 A | 6/1993 | Mansell et al. |
| 5,400,020 A | 3/1995 | Jones et al. |
| 5,400,246 A | 3/1995 | Wilson et al. |
| 5,414,432 A | 5/1995 | Penny, Jr. et al. |
| 5,430,730 A | 7/1995 | Sepulveda-Garese et al. |
| 5,515,419 A | 5/1996 | Sheffer |
| 5,673,304 A | 9/1997 | Connor et al. |
| 5,691,980 A | 11/1997 | Welles, III et al. |
| 5,799,252 A | 8/1998 | Nakagoshi et al. |
| 5,854,994 A | 12/1998 | Canada et al. |
| 5,884,216 A | 3/1999 | Shah |
| 5,917,632 A | 6/1999 | Lesesky |
| 5,946,612 A | 8/1999 | Johansson |
| 5,953,650 A | 9/1999 | Villevieille |
| 5,959,577 A | 9/1999 | Fan et al. |
| 5,969,673 A | 10/1999 | Bickley et al. |
| H1815 H | 11/1999 | Campbell et al. |
| 6,011,510 A | 1/2000 | Yee et al. |
| 6,052,597 A | 4/2000 | Ekstrom |
| 6,085,090 A | 7/2000 | Yee et al. |
| 6,240,365 B1 | 5/2001 | Bunn |
| 6,255,989 B1 | 7/2001 | Munson et al. |
| 6,311,069 B1 | 10/2001 | Havinis et al. |
| 6,334,047 B1 | 12/2001 | Andersson et al. |
| 6,360,102 B1 | 3/2002 | Havinis et al. |
| 6,466,788 B1 | 10/2002 | Carlsson |
| 6,483,433 B2 | 11/2002 | Moskowitz et al. |
| 6,505,048 B1 | 1/2003 | Moles et al. |
| 6,526,335 B1 | 2/2003 | Treyz et al. |
| 6,574,484 B1 | 6/2003 | Carley |
| 6,662,016 B1 | 12/2003 | Buckham et al. |
| 6,674,860 B1 | 1/2004 | Pirila |
| 6,711,399 B1 | 3/2004 | Granier |
| 6,748,318 B1 | 6/2004 | Jones |
| 6,748,320 B2 | 6/2004 | Jones |
| 6,853,911 B1 | 2/2005 | Sakarya |
| 6,859,831 B1 | 2/2005 | Gelvin et al. |
| 6,904,359 B2 | 6/2005 | Jones |
| 6,970,183 B1 | 11/2005 | Monroe |
| 6,985,750 B1 | 1/2006 | Vicknair et al. |
| 7,035,240 B1 | 4/2006 | Balakrishnan et al. |
| 7,085,629 B1 | 8/2006 | Gotou et al. |
| 7,165,102 B2 | 1/2007 | Shah et al. |
| 7,183,924 B1 | 2/2007 | Ku |
| 7,212,829 B1 | 5/2007 | Lau et al. |
| 7,221,668 B2 | 5/2007 | Twitchell, Jr. |
| 7,242,926 B1 | 7/2007 | Murakami et al. |
| 7,370,079 B2 | 5/2008 | Murata et al. |
| 7,529,597 B1 | 5/2009 | Hertz et al. |
| 7,539,622 B1 | 5/2009 | Harris et al. |
| 7,545,326 B2 | 6/2009 | Caliri et al. |
| 7,623,033 B2 | 11/2009 | Ainsworth et al. |
| 7,876,239 B2 | 1/2011 | Horstemeyer |
| 8,000,276 B2 | 8/2011 | Scherzer et al. |
| 8,207,816 B2 | 6/2012 | Crigger et al. |
| 8,239,169 B2 | 8/2012 | Gregory et al. |
| 8,253,557 B2 | 8/2012 | Ani et al. |
| 8,299,920 B2 | 10/2012 | Hamm et al. |
| 8,311,952 B1 | 11/2012 | Lundberg et al. |
| 8,392,275 B2 | 3/2013 | Scipioni |
| 8,447,882 B2 | 5/2013 | Twitchell, Jr. |
| 8,560,274 B2 | 10/2013 | Gregory et al. |
| 8,626,193 B1 | 1/2014 | Crossno et al. |
| 8,688,101 B1 | 4/2014 | Hayes et al. |
| 8,725,165 B2 | 5/2014 | Lau et al. |
| 8,755,823 B2 | 6/2014 | Proietti et al. |
| 8,766,797 B2 | 7/2014 | Hamm et al. |
| 8,989,053 B1 * | 3/2015 | Skaaksrud ............ H04W 12/06 370/255 |
| 8,994,514 B1 | 3/2015 | Juels et al. |
| 9,163,962 B2 | 10/2015 | Ainsworth et al. |
| 9,215,075 B1 | 12/2015 | Poltorak |
| 9,260,244 B1 | 2/2016 | Cohn |
| 9,524,648 B1 | 12/2016 | Gopalakrishnan et al. |
| 9,628,502 B2 | 4/2017 | Clark et al. |
| 9,633,327 B2 | 4/2017 | Hamm et al. |
| 9,652,990 B2 | 5/2017 | Rhee |
| 9,674,812 B2 | 6/2017 | Skaaksrud et al. |
| 2001/0022615 A1 | 9/2001 | Fernandez et al. |
| 2001/0056544 A1 | 12/2001 | Walker |
| 2002/0000916 A1 | 1/2002 | Richards |
| 2002/0087375 A1 | 7/2002 | Griffin et al. |
| 2002/0090063 A1 | 7/2002 | Bach |
| 2002/0103724 A1 | 8/2002 | Huxter |
| 2002/0113703 A1 | 8/2002 | Moskowitz et al. |
| 2002/0143670 A1 | 10/2002 | Cushing et al. |
| 2002/0163912 A1 | 11/2002 | Carlson |
| 2002/0178966 A1 | 12/2002 | Forbes |
| 2002/0184497 A1 | 12/2002 | Gage et al. |
| 2003/0052778 A1 | 3/2003 | Wong |
| 2003/0052786 A1 | 3/2003 | Dickinson |
| 2003/0144971 A1 | 7/2003 | Das et al. |
| 2003/0149599 A1 | 8/2003 | Goodall et al. |
| 2003/0149794 A1 | 8/2003 | Morris et al. |
| 2003/0184475 A1 | 10/2003 | Williams et al. |
| 2003/0220711 A1 | 11/2003 | Allen |
| 2003/0231112 A1 | 12/2003 | Raju |
| 2004/0002352 A1 | 1/2004 | Sendonariz |
| 2004/0049451 A1 | 3/2004 | Berardi et al. |
| 2004/0143654 A1 | 7/2004 | Poirot et al. |
| 2004/0174259 A1 | 9/2004 | Peel et al. |
| 2004/0215532 A1 | 10/2004 | Boman et al. |
| 2004/0233055 A1 | 11/2004 | Canich et al. |
| 2004/0253923 A1 | 12/2004 | Braley et al. |
| 2005/0006452 A1 | 1/2005 | Aupperle et al. |
| 2005/0043594 A1 | 2/2005 | Dinsmoor et al. |
| 2005/0049821 A1 | 3/2005 | Sahinoglu |
| 2005/0052290 A1 | 3/2005 | Naden et al. |
| 2005/0141465 A1 | 6/2005 | Kato et al. |
| 2005/0179545 A1 | 8/2005 | Bergman |
| 2005/0208959 A1 | 9/2005 | Chen et al. |
| 2005/0222853 A1 | 10/2005 | Black et al. |
| 2005/0285740 A1 | 12/2005 | Kubach et al. |
| 2006/0018274 A1 | 1/2006 | Twitchell, Jr. |
| 2006/0055508 A1 | 3/2006 | Kumar et al. |
| 2006/0168644 A1 | 7/2006 | Richter et al. |
| 2006/0173749 A1 | 8/2006 | Ward et al. |
| 2006/0192652 A1 | 8/2006 | Mandava et al. |
| 2006/0200560 A1 | 9/2006 | Waugh et al. |
| 2006/0206246 A1 | 9/2006 | Walker |
| 2006/0208899 A1 | 9/2006 | Suzuki et al. |
| 2006/0229895 A1 | 10/2006 | Kodger, Jr. |
| 2006/0244624 A1 | 11/2006 | Wang |
| 2006/0250249 A1 | 11/2006 | Cheng |
| 2006/0253590 A1 | 11/2006 | Nagy et al. |
| 2007/0021124 A1 | 1/2007 | Niu et al. |
| 2007/0030151 A1 | 2/2007 | Marrow |
| 2007/0050313 A1 | 3/2007 | Park et al. |

(56) References Cited

U.S. PATENT DOCUMENTS

| | | |
|---|---|---|
| 2007/0060212 A1 | 3/2007 | Shah |
| 2007/0075833 A1 | 4/2007 | Hunt et al. |
| 2007/0075861 A1 | 4/2007 | Cook et al. |
| 2007/0096881 A1 | 5/2007 | Pillai |
| 2007/0110010 A1 | 5/2007 | Kotola et al. |
| 2007/0130463 A1 | 6/2007 | Law et al. |
| 2007/0138268 A1 | 6/2007 | Tuchman et al. |
| 2007/0171997 A1 | 7/2007 | Weissman et al. |
| 2007/0174136 A1 | 7/2007 | Kwak |
| 2007/0178908 A1 | 8/2007 | Doyle |
| 2007/0238417 A1 | 10/2007 | Bennett |
| 2007/0279222 A1 | 12/2007 | Carrigan |
| 2008/0004994 A1 | 1/2008 | Ainsworth et al. |
| 2008/0015884 A1 | 1/2008 | Jamula |
| 2008/0040242 A1 | 2/2008 | Chang et al. |
| 2008/0040243 A1 | 2/2008 | Chang et al. |
| 2008/0040244 A1 | 2/2008 | Ricciuti et al. |
| 2008/0055068 A1 | 3/2008 | Van Wageningen et al. |
| 2008/0056162 A1 | 3/2008 | Lal |
| 2008/0061963 A1 | 3/2008 | Schnitz et al. |
| 2008/0061966 A1 | 3/2008 | Nelson |
| 2008/0112378 A1 | 5/2008 | Twitchell |
| 2008/0167897 A1 | 7/2008 | Arroyo et al. |
| 2008/0191877 A1 | 8/2008 | Ferguson et al. |
| 2008/0255863 A1 | 10/2008 | Mack et al. |
| 2008/0257656 A1 | 10/2008 | Skinner et al. |
| 2008/0267150 A1 | 10/2008 | Rofougaran |
| 2008/0300985 A1 | 12/2008 | Shamp et al. |
| 2009/0018768 A1 | 1/2009 | Jo et al. |
| 2009/0026263 A1 | 1/2009 | Schmid et al. |
| 2009/0034419 A1 | 2/2009 | Flammer, III et al. |
| 2009/0037196 A1 | 2/2009 | Chang et al. |
| 2009/0084836 A1 | 4/2009 | Dudley |
| 2009/0091144 A1 | 4/2009 | Debrody et al. |
| 2009/0123665 A1 | 5/2009 | Zaima |
| 2009/0157420 A1 | 6/2009 | Lou et al. |
| 2009/0201850 A1 | 8/2009 | Davis et al. |
| 2009/0252130 A1 | 10/2009 | Sheth et al. |
| 2009/0252134 A1 | 10/2009 | Schlicht et al. |
| 2009/0287827 A1 | 11/2009 | Horn et al. |
| 2009/0295537 A1 | 12/2009 | Lane et al. |
| 2009/0319078 A1 | 12/2009 | Jackson |
| 2009/0322510 A1 | 12/2009 | Berger et al. |
| 2009/0322890 A1 | 12/2009 | Bocking et al. |
| 2009/0327333 A1 | 12/2009 | Diener et al. |
| 2009/0327391 A1 | 12/2009 | Park et al. |
| 2010/0013635 A1 | 1/2010 | Berger et al. |
| 2010/0029232 A1 | 2/2010 | Kursawe et al. |
| 2010/0039284 A1 | 2/2010 | Hall et al. |
| 2010/0060452 A1 | 3/2010 | Schuster et al. |
| 2010/0063847 A1 | 3/2010 | Eisenberg et al. |
| 2010/0076902 A1 | 3/2010 | Kraft |
| 2010/0105406 A1 | 4/2010 | Luo et al. |
| 2010/0117820 A1 | 5/2010 | Mitschele |
| 2010/0135178 A1 | 6/2010 | Aggarwal et al. |
| 2010/0142448 A1 | 6/2010 | Schlicht et al. |
| 2010/0157838 A1 | 6/2010 | Vaswani et al. |
| 2010/0195507 A1 | 8/2010 | Marinier et al. |
| 2010/0223127 A1 | 9/2010 | Bettez et al. |
| 2010/0250460 A1 | 9/2010 | Twitchell, Jr. |
| 2010/0267375 A1 | 10/2010 | Lemmon et al. |
| 2010/0308967 A1 | 12/2010 | Lauronen |
| 2011/0022533 A1 | 1/2011 | Lau et al. |
| 2011/0050424 A1 | 3/2011 | Cova et al. |
| 2011/0077909 A1 | 3/2011 | Gregory et al. |
| 2011/0078089 A1 | 3/2011 | Hamm et al. |
| 2011/0078646 A1 | 3/2011 | Ushiyama et al. |
| 2011/0137775 A1 | 6/2011 | Killian et al. |
| 2011/0258058 A1 | 10/2011 | Carroll et al. |
| 2011/0273294 A1 | 11/2011 | Harwell |
| 2011/0273852 A1 | 11/2011 | Debrody et al. |
| 2011/0295411 A1 | 12/2011 | Rotella et al. |
| 2011/0316674 A1 | 12/2011 | Joy et al. |
| 2011/0316716 A1 | 12/2011 | MacKay et al. |
| 2012/0022907 A1 | 1/2012 | Fidler |
| 2012/0036198 A1 | 2/2012 | Marzencki et al. |
| 2012/0158606 A1 | 6/2012 | Moudy |
| 2012/0187916 A1 | 7/2012 | Duer et al. |
| 2012/0209730 A1 | 8/2012 | Garrett |
| 2012/0252488 A1 | 10/2012 | Hartmann et al. |
| 2012/0258669 A1 | 10/2012 | Honkanen et al. |
| 2012/0262277 A1 | 10/2012 | Oliveira |
| 2012/0299721 A1 | 11/2012 | Jones |
| 2012/0320790 A1 | 12/2012 | Shaffer et al. |
| 2013/0047233 A1 | 2/2013 | Fisk et al. |
| 2013/0085968 A1 | 4/2013 | Schultz et al. |
| 2013/0094346 A1 | 4/2013 | Beser |
| 2013/0106608 A1 | 5/2013 | Griesmann et al. |
| 2013/0106893 A1 | 5/2013 | Davis et al. |
| 2013/0165149 A1 | 6/2013 | Wilson et al. |
| 2013/0166246 A1 | 6/2013 | Rousu et al. |
| 2013/0201316 A1 | 8/2013 | Binder et al. |
| 2013/0225087 A1 | 8/2013 | Uhm |
| 2013/0241712 A1 | 9/2013 | Motley et al. |
| 2013/0245973 A1 | 9/2013 | Ross et al. |
| 2013/0271280 A1 | 10/2013 | Alnafisah |
| 2013/0273938 A1 | 10/2013 | Ng et al. |
| 2013/0324147 A1 | 12/2013 | Ong et al. |
| 2013/0324164 A1 | 12/2013 | Vulcano |
| 2014/0025746 A1 | 1/2014 | Rhee et al. |
| 2014/0026158 A1 | 1/2014 | Rowe et al. |
| 2014/0052832 A1 | 2/2014 | Dina et al. |
| 2014/0067609 A1 | 3/2014 | Heger |
| 2014/0112199 A1 | 4/2014 | Beser |
| 2014/0116569 A1 | 5/2014 | Clark et al. |
| 2014/0120910 A1 | 5/2014 | Batada et al. |
| 2014/0162702 A1 | 6/2014 | Crawford et al. |
| 2014/0180959 A1 | 6/2014 | Gillen et al. |
| 2014/0184386 A1 | 7/2014 | Regler et al. |
| 2014/0196140 A1 | 7/2014 | Gong |
| 2014/0211691 A1 | 7/2014 | Emadzadeh et al. |
| 2014/0222711 A1 | 8/2014 | Tibbs et al. |
| 2014/0244834 A1 | 8/2014 | Guedalia et al. |
| 2014/0258168 A1 | 9/2014 | Crawford |
| 2014/0279596 A1 | 9/2014 | Waris et al. |
| 2014/0279648 A1 | 9/2014 | Whitehouse |
| 2014/0294821 A1 | 10/2014 | Dumont et al. |
| 2014/0324527 A1 | 10/2014 | Kulkarni et al. |
| 2014/0341227 A1 | 11/2014 | Redi et al. |
| 2015/0012457 A1 | 1/2015 | Gonzalez et al. |
| 2015/0019391 A1 | 1/2015 | Kumar et al. |
| 2015/0039347 A1 | 2/2015 | Sharma |
| 2015/0057497 A1 | 2/2015 | Chiba et al. |
| 2015/0102903 A1 | 4/2015 | Wilkinson |
| 2015/0120045 A1 | 4/2015 | Tan et al. |
| 2015/0120601 A1 | 4/2015 | Fee |
| 2015/0131479 A1 | 5/2015 | Fukui |
| 2015/0139124 A1 | 5/2015 | Da et al. |
| 2015/0148140 A1 | 5/2015 | Morehouse et al. |
| 2015/0153175 A1 | 6/2015 | Skaaksrud |
| 2015/0222517 A1 | 8/2015 | McLaughlin et al. |
| 2015/0248801 A1 | 9/2015 | Froitzheim et al. |
| 2015/0325103 A1 | 11/2015 | Ngyuen et al. |
| 2015/0349917 A1 | 12/2015 | Saaksrud |
| 2015/0351109 A1 | 12/2015 | Naim et al. |
| 2016/0066012 A1 | 3/2016 | Friedlander et al. |
| 2016/0094940 A1 | 3/2016 | Vigier et al. |
| 2016/0224929 A1 | 8/2016 | Blanchard et al. |
| 2016/0241910 A1 | 8/2016 | Rowe |
| 2016/0327956 A1 | 11/2016 | Zhang et al. |
| 2017/0012719 A1* | 1/2017 | Skaaksrud ............... H04L 41/12 |
| 2017/0012720 A1* | 1/2017 | Skaaksrud ............... H04L 41/12 |
| 2017/0012812 A1 | 1/2017 | Gotoh et al. |
| 2017/0012813 A1* | 1/2017 | Skaaksrud ............... H04L 41/12 |
| 2017/0012829 A1* | 1/2017 | Skaaksrud ............... H04L 41/12 |
| 2017/0012830 A1* | 1/2017 | Skaaksrud ............... H04L 41/12 |
| 2017/0013487 A1* | 1/2017 | Skaaksrud ............... H04L 41/12 |
| 2017/0013547 A1 | 1/2017 | Skaaksrud et al. |
| 2017/0090794 A1 | 3/2017 | Huang |
| 2017/0164319 A1 | 6/2017 | Skaaksrud et al. |
| 2017/0278061 A1 | 9/2017 | Skaaksrud |
| 2017/0278374 A1 | 9/2017 | Skaaksrud |
| 2017/0279892 A1 | 9/2017 | Skaaksrud |

(56) References Cited

U.S. PATENT DOCUMENTS

2017/0280289 A1 9/2017 Skaaksrud
2017/0280347 A1 9/2017 Skaaksrud
2017/0318011 A1 11/2017 Yoo et al.

FOREIGN PATENT DOCUMENTS

| JP | 2011184150 A | 9/2011 |
|---|---|---|
| JP | 2012086945 A | 5/2012 |
| WO | 2001028274 | 4/2001 |
| WO | 2001046649 | 6/2001 |
| WO | 2001060038 | 8/2001 |
| WO | 2001063318 | 8/2001 |
| WO | 2005034425 A1 | 4/2005 |

OTHER PUBLICATIONS

M. Schuster, "The Biggest iPhone 5S Feature Nobody's Talking About", online publication dated Sep. 18, 2013 (http://www.minyanville.com/sectors/technology/articles/The-Biggest-iPhone-5S-Feature-Nobodys/9/18/2013/id/51810#ixzz2fHNaHphq).
E. Betters, "Apple's iBeacons Explained: What It Is and Why It Matters", online publication dated Sep. 18, 2013 (http://www.pocket-lint.com/news/123730-apple-s-ibeacons-explained-what-it-is-and-why-it-matters).
P. Pachal, "Bluetooth Devices Are About to Get a Lot Smarter", online publication dated Dec. 5, 2013 (http://mashable.com/2013/12/05/bluetooth-4-1/).
X. Luo et al., "Comparative Evaluation of Received Signal-Strength Index (RSSI) Based Indoor Localization Techniques for Construction Jobsites", Adv. Eng. Informat. (2010), doi: 10.1016/j.aei.2010.09.003.
B. Amutha et al., "Location Update Accuracy in Human Tracking System Using Zigbee Modules", International Journal of Computer Science and Information Security, vol. 6, No. 2, 2009.
"Bluetooth 4.1 Quick Reference Guide", Bluetooth SIG 2013, Nov. 2013.
"Intelligent Transportation System—Wikipedia, the free encyclopedia", online publication dated Oct. 21, 2013 (http://en.wikipedia.org/wiki/Intelligent_transportation_system).
J. Johnson et al., "Ultra-Wideband Aiding of GPS for Quick Deployment of Anchors in a GPS-denied Ad-hoc Sensor Tracking and Communication System", presented at ION GNSS (Portland, OR Sep. 10-23, 2011).
C. Liu et al, "Location Tracking by ZigBee", online publication undated (http://ir.csu.edu.tw/dspace/bitstream/987654321/1288/1/496.pdf).
R. Horblyuk et al., "Out of Control: Little-Used Clinical Assets Are Draining Healthcare Budgets", Healthcare Financial Management, Jul. 2012 issue, p. 68-72.
"P410 UWB OEM Modules for Ranging and Communications | Time Domain", online publication dated Apr. 24, 2014 (http://www.timedomain.com/p400.php).
J. Terry et al., "Patient Flow and Access. Unlocking the Capacity of Acute Care Hospitals and Our National Healthcare Infrastructure", undated publication from GE Healthcare.
D. Long et al., "Wasting Away: The Quality, Safety, and Financial Case for Clinical Asset Optimization", undated publication from GE Healthcare.
"Awarepoint Real-time Awareness Solutions", online publication dated Oct. 1, 2013 (http://www.awarepoint.com/solutions).

M. Gheza et al., "Real Time Location System—Case Study: ZigBee System-on-Chip Solution", online publication dated Aug. 22, 2013 (www.slideshare.net/mihaigheza/real-time-location-system-with-zigbee).
Product Brochure for Time Domain's PulsON 410 (P410) Ultra Wideband (UWB) Ranging and Communication Module, undated.
"AutonoNav Scalable Autonomous Navigation System", online publication dated Oct. 21, 2013 (www.torcrobotics.com/products/autononav).
"Locating ZigBee Nodes Using TI's CC2431 Location Engine and Daintree's SNA", Daintree Networks Application Note AN016, Copyright 2008 (http://www.daintree.net_downloads_appnotes_appnote_016_sna_ti_locationing.pdf).
"Wireless ZigBee Networks for Real-Time Location Systems", online publication undated (www.ccc.gatech.edu_academic_courses_ece4007_11spring_EDE4007L04_da2_ECE4007TRP_Sheng.pdf).
O. Hernandez et al., "Position Location Monitoring Using IEEE 802.15.4/ZigBee Technology", online publication undated (http://www.freescale.com_files_microcontrollers_doc_broachure_Position-LocationMonitoring.pdf).
"Estimote for Retail", online publication undated (http://www.estimote-for-retail.html).
Online Estimote App for Managing Estimote Beacons, online publication dated Aug. 18, 2014 (https://itunes.apple.com/us/app/estimote-virtual-beacon/id686915066).
"Environmental Cyberinfrastructure Needs for Disturbed Sensor Networks", A Report from a National Science Foundation Sponsored Workshop, Scripps Inst. Oceanography, Aug. 12-13, 2003, pp. 1-66.
"A Standard Smart Transducer Interface", IEEE 1451. Sensors Expo, Philadelphia, Oct. 2, 2011, pp. 1-27.
Wolfe, "Electronic Cargo Seals: Context, Technologies and Marketplace", http://ops.fhwa.dot.gov/freight/E-Seal%20WP%final%20Jul%2012.htm. Jul. 12, 2002, pp. 1-47.
Maestas et al., "Demonstration of the Radio Frequency Identification Transportation Security and Safety System", Applied Sci. Laboratory, Oct. 15, 2003. pp. 1-11.
Remote Sensing for Transportation: Report of a Conference. Washington D.C., Dec. 4-5, 2000, pp. 1-59.
Ho et al., "In-Situ Chemiresistor Sensor Package for Real-Time Detection of Volatile Organic Compounds in Soil and Groundwater", Sensors vol. 2, 2002, pp. 23-34.
"System Planning Corp. Helps Evaluate Seamless Container-Security System", Jrnl. Commerce, May 30, 2005.
Wiczer Ph.D., "Connectivity: Smart Sensors or Smart Interfaces". ISA 2001 Emerging Technologies Conference. Sep. 2001, pp. 1-9.
Natalia Marmasse, "comMotion: A Context-Aware Communication System" Item: Masters Thesis submitted to MIT Libraries, dated Oct. 1, 1999. http://dspace.mit.edu/bitstrea/handle/1721.1/61841/44869691.pdf?sequence=1.
Marmasse, et al., "Location-Aware Information Delivery with com-Motion", HUC 2000 Proceedings, pp. 1-15.
Katz, "E-Mail, Anywhere, in the Palm of Your Hand", Technology Cypertimes, http://partners.nytimes.com/week/091497email.html, Sep. 14, 1997.
White, Ron, "How Computers Work", Oct. 15, 2003, Que Publishing, 7th Ed., p. 4.
PCT/US16/034967 International Search Report and Written Opinion, dated Sep. 2, 2016.

\* cited by examiner

- Locations of Master Nodes M1, M2, and M3 are known
- Location of ID Nodes A and B are determined through triangulation across Master Nodes M1, M2 and M3

• Location of ID Node C determined through triangulation across ID Node B and Master Nodes M1 and M2

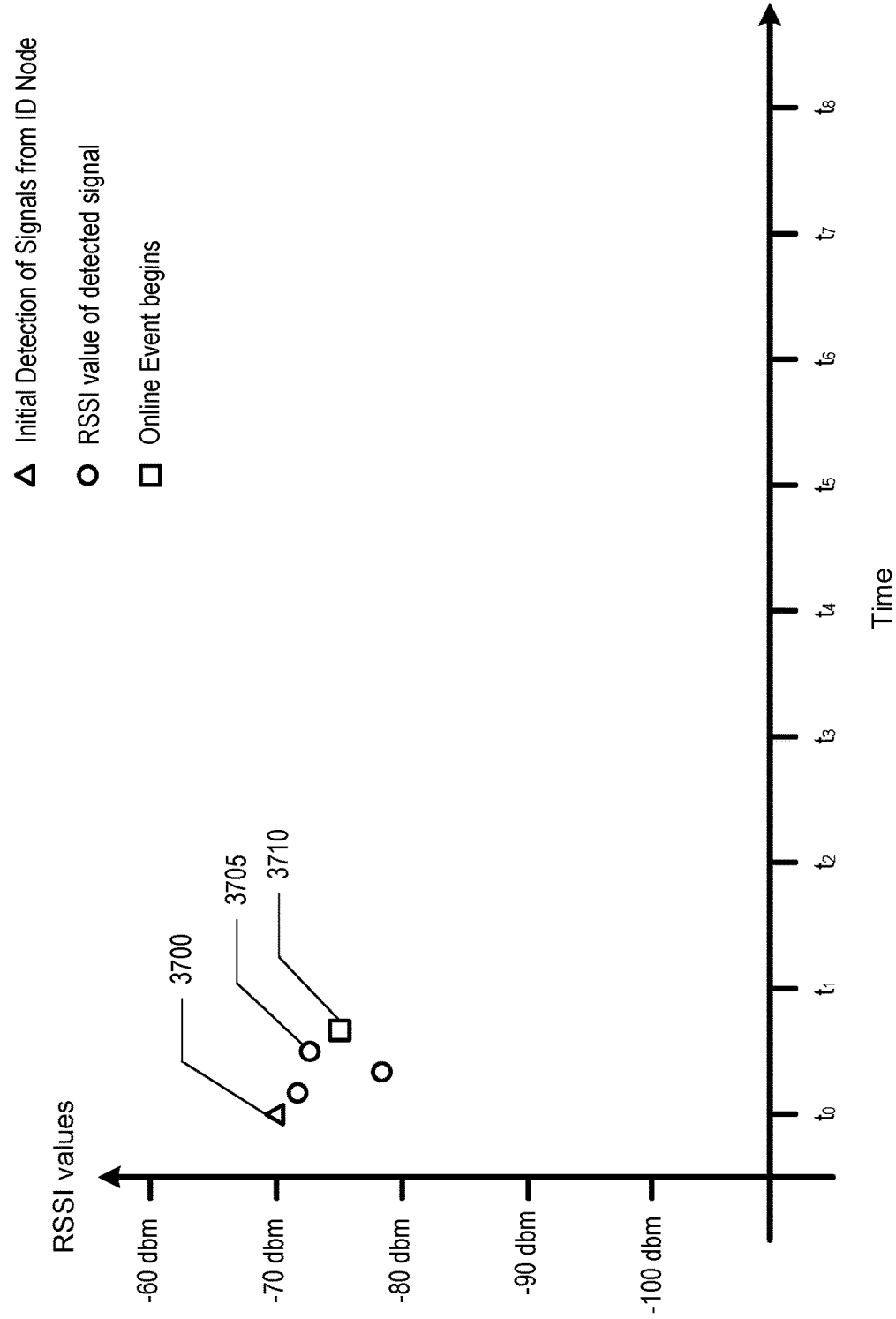

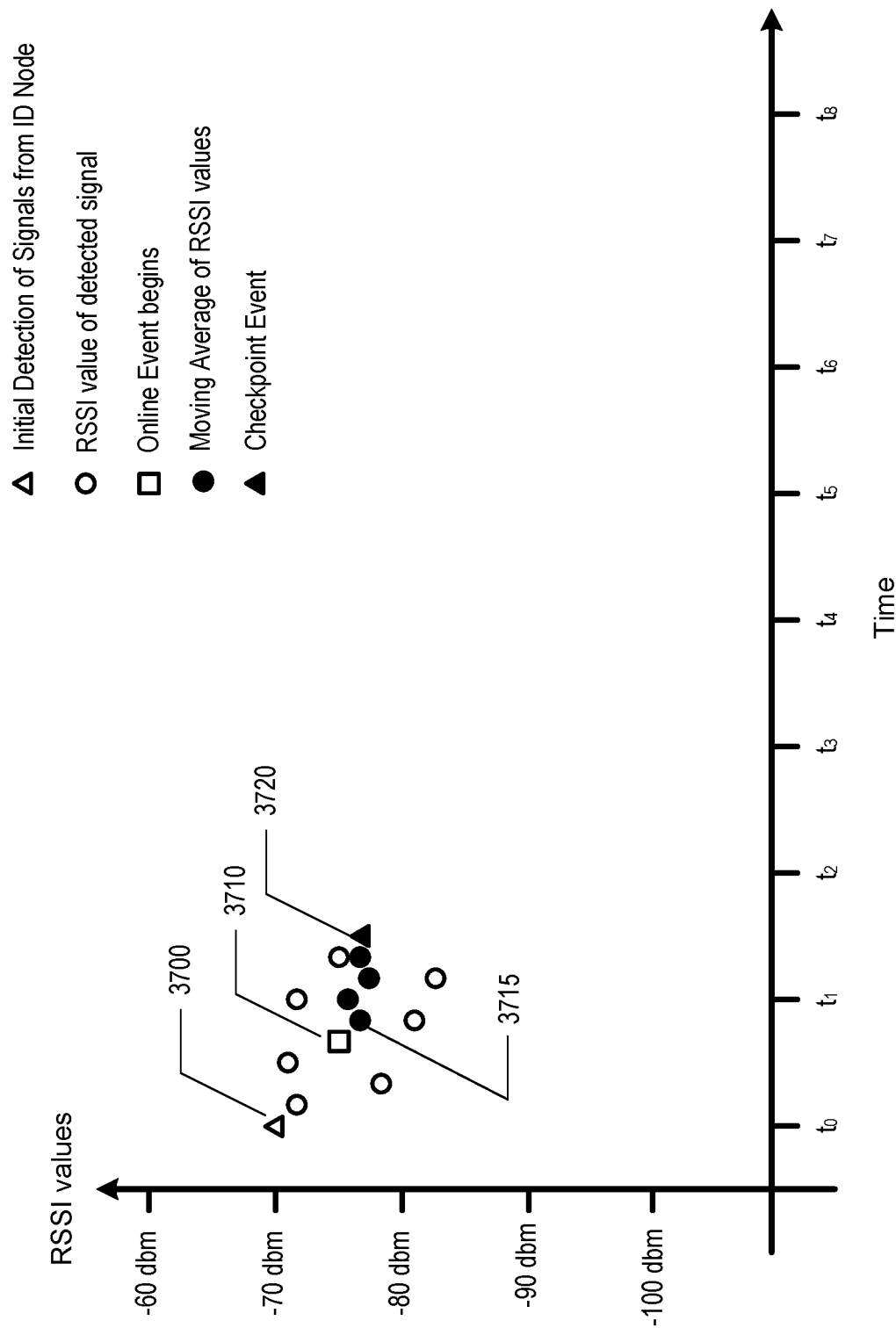

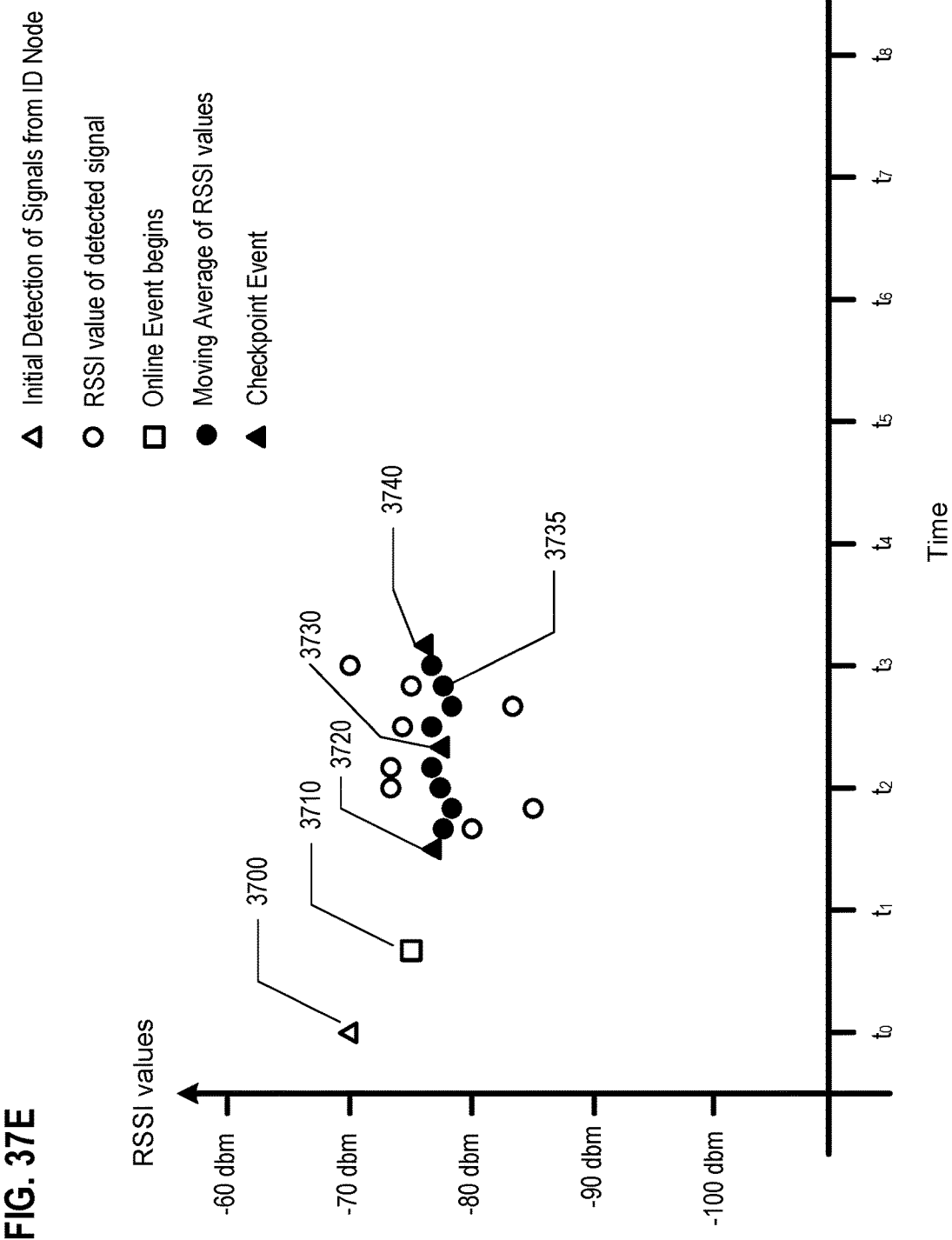

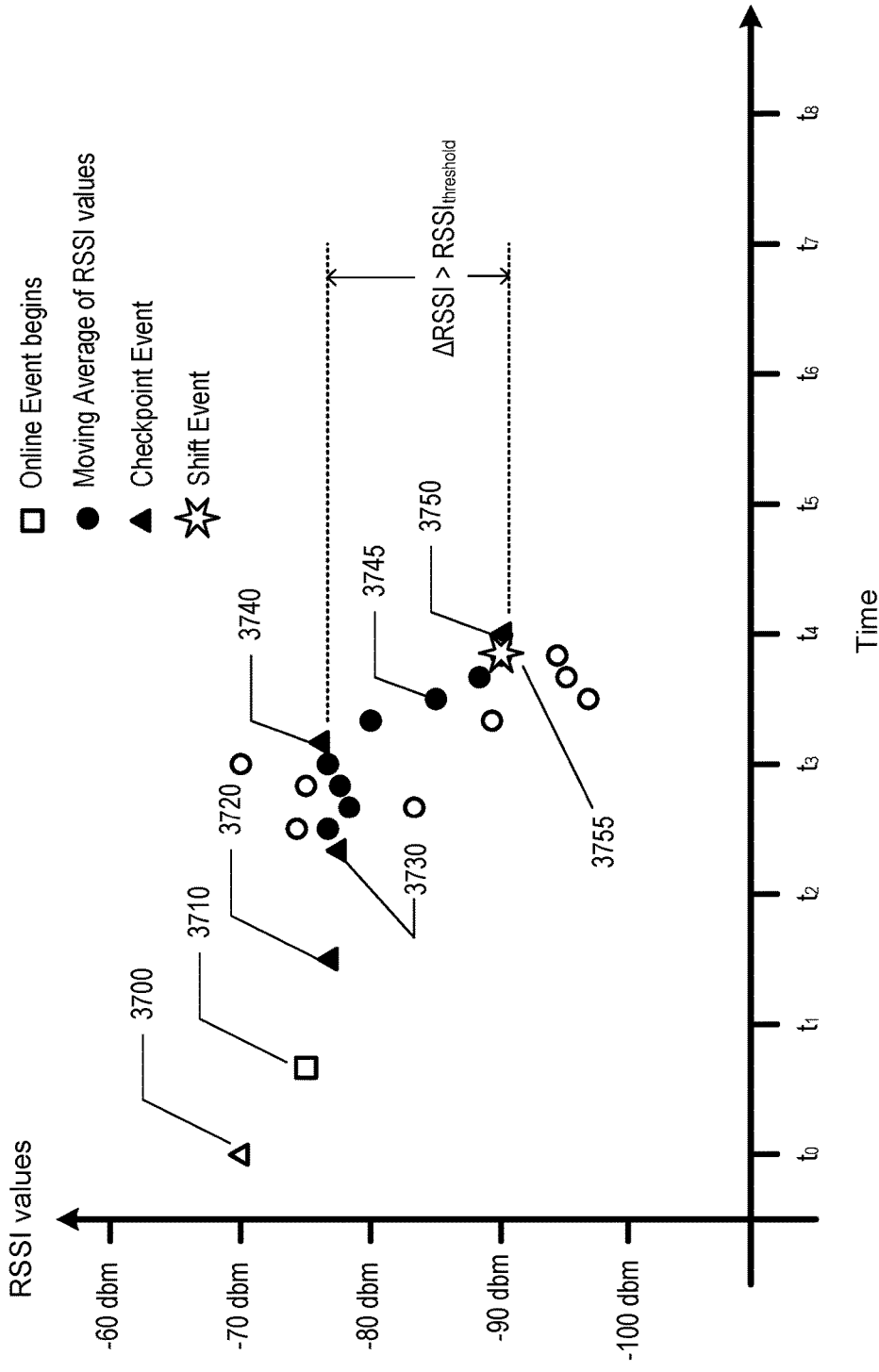

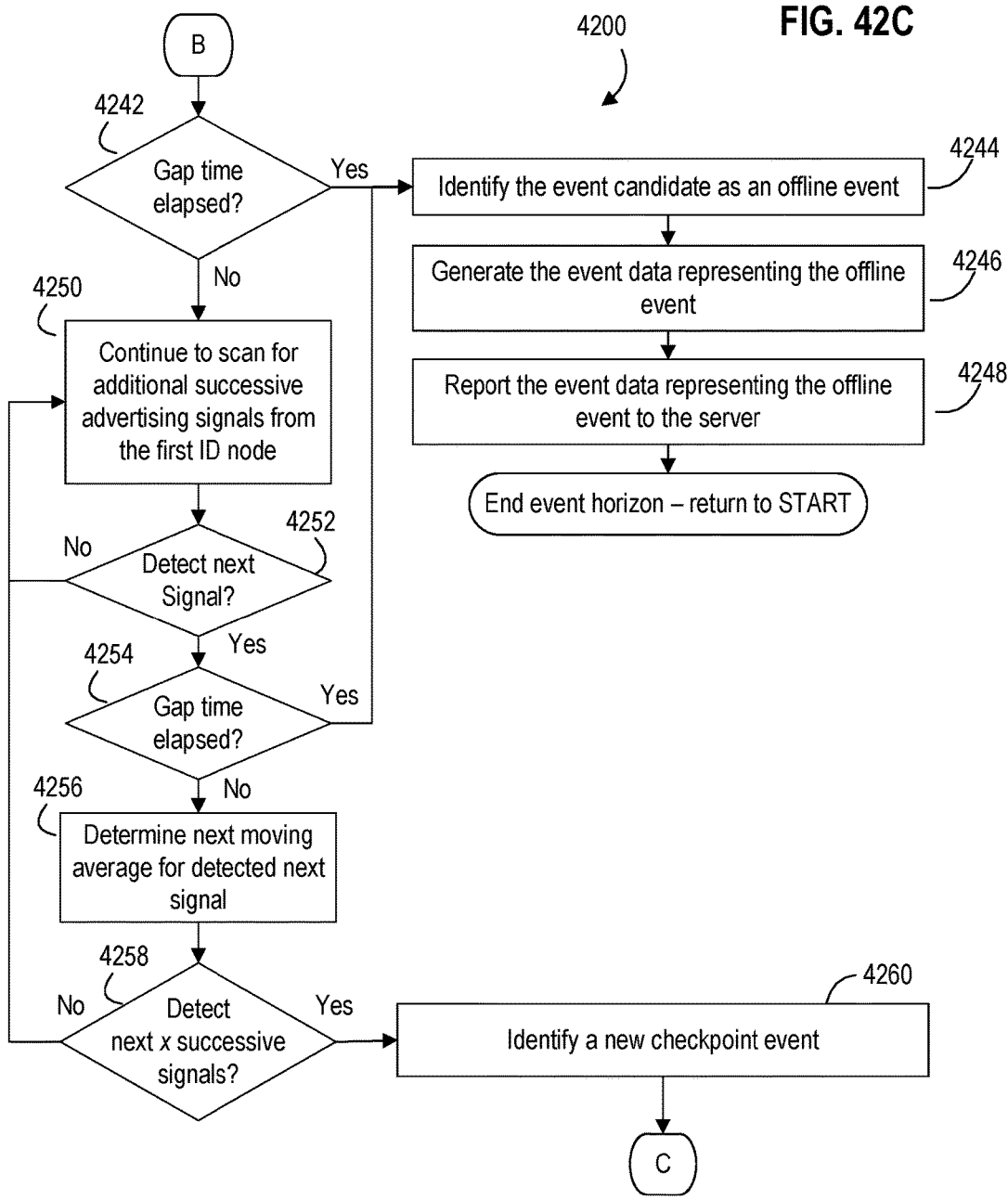

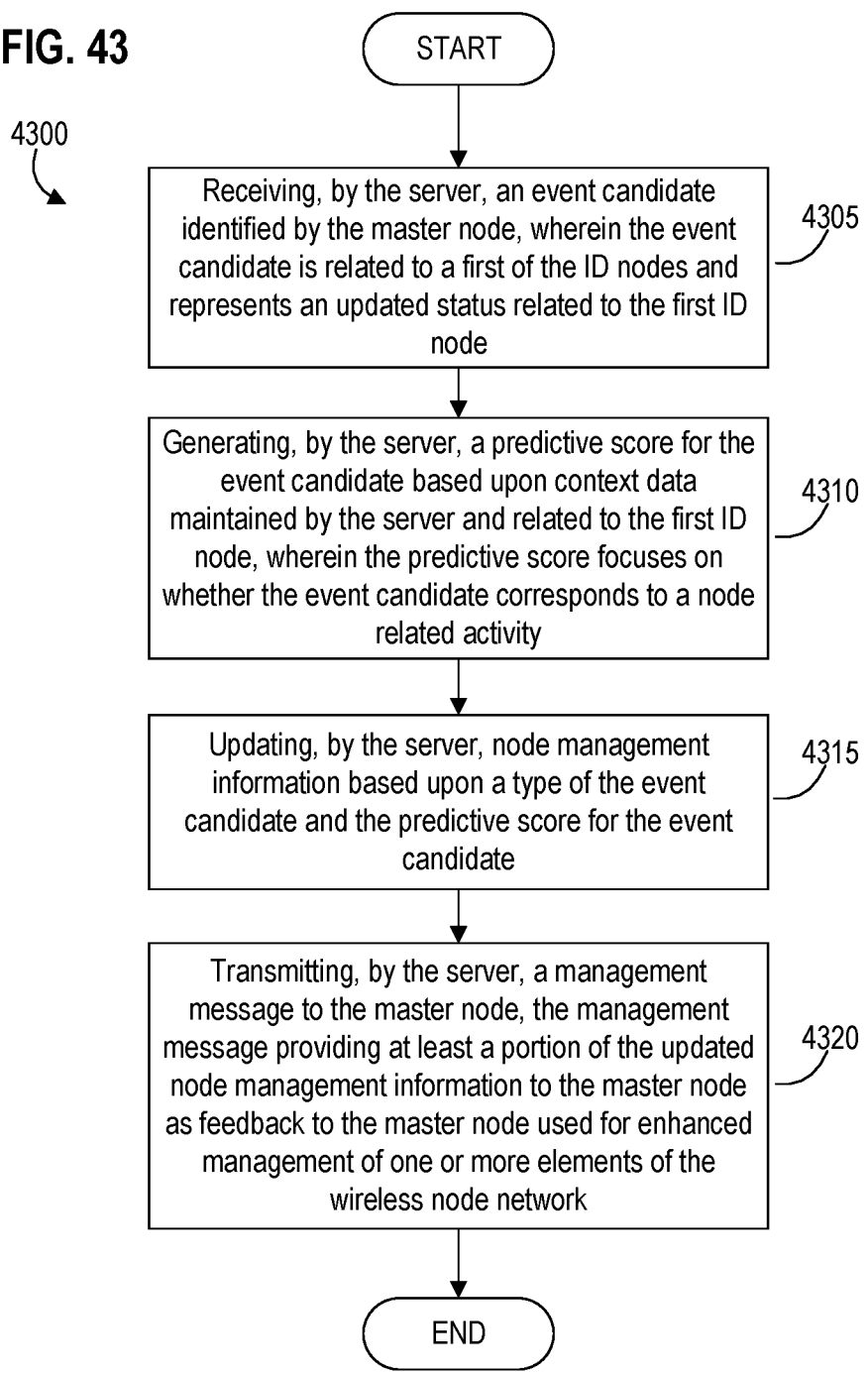

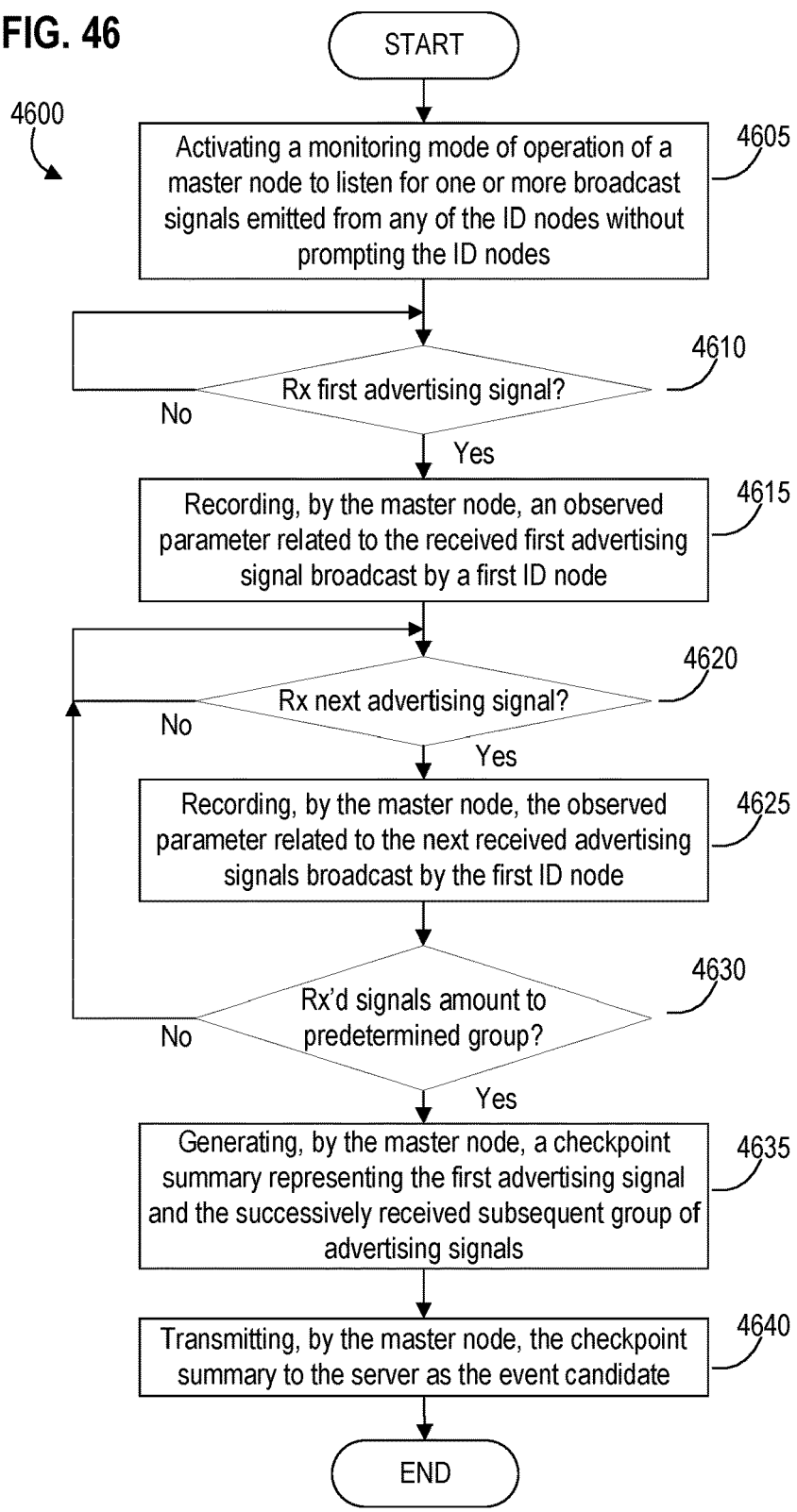

SYSTEMS, APPARATUS, AND METHODS OF CHECKPOINT SUMMARY BASED MONITORING FOR AN EVENT CANDIDATE RELATED TO AN ID NODE WITHIN A WIRELESS NODE NETWORK

PRIORITY AND RELATED APPLICATIONS

The present application hereby claims the benefit of priority to related Provisional Patent Application No. 62/189,911 and entitled "Methods and Systems for Enhanced Monitoring for an Event Candidate and Adaptive Management of a Wireless Node Network Based Upon the Event Candidate", which was filed on Jul. 8, 2015.

The present application is also related in subject matter to the following non-provisional patent applications where each also claims the benefit of priority to the same above-referenced provisional patent application: (1) Non-Provisional patent application Ser. No. 15/166,926 entitled "Systems, Apparatus, and Methods of Event Monitoring for an Event Candidate Related to an ID Node within a Wireless Node Network"; (2) Non-Provisional patent application Ser. No. 15/167,001 entitled "Systems, Apparatus, and Methods of Event Monitoring for an Event Candidate within a Wireless Node Network Based Upon Sighting Events, Sporadic Events, and Benchmark Checkpoint Events"; (3) Non-Provisional patent application Ser. No. 15/167,212 entitled "Systems, Apparatus, and Methods of Time Gap Related Monitoring for an Event Candidate Related to an ID Node within a Wireless Node Network"; (4) Non-Provisional patent application Ser. No. 15/167,429 entitled "Systems, Apparatus, and Methods of Enhanced Monitoring for an Event Candidate Associated with Cycling Power of an ID Node within a Wireless Node Network"; (5) Non-Provisional patent application Ser. No. 15/168,463 entitled "Systems, Apparatus, and Methods of Enhanced Checkpoint Summary Based Monitoring for an Event Candidate Related to an ID Node within a Wireless Node Network"; (6) Non-Provisional patent application Ser. No. 15/168,482 entitled "Systems, Apparatus, and Methods of Enhanced Management of a Wireless Node Network Based Upon an Event Candidate Related to Elements of the Wireless Node Network."

FIELD OF THE DISCLOSURE

The present disclosure generally relates to systems, apparatus and methods in the field of tracking items (e.g., an object, a package, a person, a piece of equipment) with elements of a wireless node network and, more particularly, to various aspects involving systems, apparatus and methods for enhanced monitoring for an event candidate related to a status of elements of a wireless node network and adaptive management of the wireless node network based upon the event candidate.

BACKGROUND

Asset management has always been an important part of commerce, and the ability to identify an item and locate its whereabouts may be considered core to companies that ship items from one location to another. For example, tracking packages is important to organizations of all kinds, whether it be a company keeping track of inventory to be sold in its stores, or a package delivery provider keeping track of packages being transported through its delivery network. To provide quality service, an organization typically creates and maintains a highly organized network for tracking its items—packages, people, objects, etc. Effective management of such networks allows lower cost, reduced delivery time, and enhanced customer service. And efficient deployment of the network helps manage costs.

In addition to tracking packages, parties that ship and receive packages may also need information regarding the conditions of the packages, such as the temperature and humidity of the package. For example, a customer that has ordered a box of wine may want to monitor the temperature of the contents of the box to determine if the temperature and/or humidity goes above or below a set range. Likewise, the party that ships the package may also want to monitor the conditions of the package to ensure that the content arrives in the proper condition.

Conventionally, this tracking function may be provided by a variety of known mechanisms and systems. Machine-readable barcodes are one way organizations keep track of items. A retailer, for example, may use bar codes on items in its inventory. For example, items to be sold in a retailer's store may each be labeled with a different machine-readable bar code. In order to keep track of inventory, the retailer typically scans or otherwise captures an image of the bar code on each item so that a back-end part of the retailer's operation can keep track of what is coming in and leaving their possession from suppliers. In addition, when an item is sold to a consumer, the bar code for that item is scanned or captured to track sales and inventory levels.

Similarly, a package delivery provider may utilize machine-readable bar codes by associating a bar code with packages to be delivered to a recipient. For example, a package may have a bar code corresponding to a tracking number for that package. Each time the package goes through a transit checkpoint (e.g., the courier taking initial control of the package, the package being temporarily placed in a storage facility while being moved from a pickup point to a delivery location, and the package being delivered to the recipient, etc.), the package's bar code may be scanned. Bar codes, however, have the disadvantage that personnel must manually scan each bar code on each item in order to effectively track the items.

Radio-frequency identification (RFID) tags are another known mechanism for tracking items. In contrast to barcodes, RFID tags do not usually require manual scanning. For example, in a retail context, an RFID tag on an inventory item may be able to communicate with an electronic reader that detects items in a shopping cart and adds the cost of each item to a bill for the consumer. The RFID tag usually transfers a coded number when queried or prompted by the reader. RFID tags have also been used to track items such as livestock, railroad cars, trucks, and even airline baggage. These tags typically only allow for basic tracking, but do not provide a way to improve asset management using information about the environment in which the items are tracked.

Sensor-based tracking systems are also known which can provide more information than RFID systems. Shippers, carriers, recipients, and other parties often wish to know the location, condition, and integrity of shipments before, during, and after transport to satisfy quality control goals, meet regulatory requirements, and optimize business processes. However, such systems are typically expensive given the complexity of the sensors, and may provide extraneous and redundant item information.

An additional challenge faced for tracking systems may be how to monitor and keep abreast of what is going on at a low level of the network without overloading or unduly stressing communications with a backend server that operates to manage elements of the networked system. Monitoring of nodes in a network of wireless nodes may generate a relatively large amount of data—e.g., time series scanning data on what is detected as being broadcast by particular nodes. The status of nodes typically changes over time, and thus the data generated when monitoring nodes will be dynamic and change over time to reflect such node behavior and changing status. As a result, monitoring systems are usually faced with a challenge on how to efficiently identify, report, and respond to relevant changes with respect to nodes amidst such vast amounts of data. Additionally, conventional tracking systems do not typically monitor the status of individual elements to collectively learn from what is being monitored so that it can identify that what is going on may be tied to known, anticipated, or new node relevant activity.

To address one of more of such challenges, a wireless node-based system is needed that may monitor data regarding objects (such as shipped items, personnel, or equipment) and efficiently extend visibility of such objects. There remains a need for an improved system that may provide more extensive and robust identification, tracking, and management of objects via different types of wireless nodes and managing backend servers and do so in a cost effective manner. In particular, there remains a need for systems, apparatus and methods for enhanced monitoring for an event candidate related to elements of a wireless node network and adaptive management of the wireless node network based upon the event candidate.

SUMMARY

In the following description, certain aspects and embodiments are generally directed to providing a technical solution for an enhanced logistics monitoring operation that monitors for an event candidate related to elements of a wireless node network having low-level ID nodes, a master node at a mid-level of the network in communication with the ID nodes, and a server at a higher level of the network in communication with the master node. It should be understood that the aspects and embodiments, in their broadest sense, could be practiced without having one or more features of these aspects and embodiments. It should be understood that these aspects and embodiments are merely exemplary.

For example, one aspect of the disclosure focuses on an improved monitoring system that identifies an event candidate within a wireless node network based upon checkpoint summaries. The system generally includes a server disposed at a top level of the wireless node network; an ID node disposed at a low level of the wireless node network; and a master node disposed at a middle level of the wireless node network. The master node is an enhanced monitoring intermediary element of the wireless node network that improves overall performance of the network by reducing the need for ID node status related transmissions to the server when attempting to keep the server informed of what is happening within the wireless node network. In particular, the system's master node has at least a master node processing unit (e.g., a processor or processor based controller), a memory storage, and two different communication interfaces. Each of the memory storage and communication interfaces is coupled to the master node processing unit. A first of the communication interfaces is operative to communicate directly the ID node over a first communication path (e.g., a Bluetooth® formatted short range path) while a second of the communication interfaces is operative to communicate directly with the server over a second communication path (e.g., a Wi-Fi or cellular path) that is different from the first communication path.

Furthermore, the master node's memory storage maintains event detection engine code for execution by the master node processing unit. As such and when executing this event detection engine code, the master node processing unit is programmatically transformed to become unconventionally operative, as part of the system, to use the first communication interface to detect a first set of advertising signals broadcast by a first of the ID nodes over the first communication path; generate a first checkpoint summary representing the detected first set of advertising signals; use the first communication interface to detect a second set of advertising signals broadcast by the first ID node over the first communication path after the first ID node broadcasts the first set of advertising signals; and generate a second checkpoint summary representing the detected second set of advertising signals detected by the first communication interface. The master node processing unit is then further operative to compare an observed parameter for each of the first checkpoint summary and the second checkpoint summary, identify the event candidate based upon the comparison of the observed parameter for each of the first checkpoint summary and the second checkpoint summary, and cause the second communication interface to report the identified event candidate to the server over the second communication path. The system's server is then responsively operative to receive the identified event candidate from the master node and transmit a responsive adjustment response to the master node based upon the identified event candidate. Such a responsive adjustment response comprises at least one of an adjusted profile for the master node, an adjusted profile for the ID node, and/or updated context data reflecting the identified event candidate.

In another aspect of the disclosure, a master node apparatus (similar to the system's master node element) is described for enhanced checkpoint summary based monitoring for an event candidate within a wireless node network having multiple ID nodes and a server. The master node generally has a node processing unit (such as a processor or processor-based controller), a memory storage, and two different communication interfaces. Each of the memory storage and the communication interfaces are coupled to the node processing unit. A first of the communication interfaces is configured and operative to communicate with at least one of the ID nodes over a first communication path where the second communication interface is configured and operative to communicate with the server over a second communication path, which is different from the first communication path. Thus, the master node apparatus' communication interfaces provide separate access to distinct and different communication paths to different elements of the wireless node network (e.g., the server and the ID nodes).

Furthermore, the memory storage maintains event detection engine code for execution by the node processing unit of the master node apparatus. As such and when executing this event detection engine code, the apparatus' node processing unit is programmatically transformed to become unconventionally operative and configured to detect (via the first communication interface) a first set of advertising signals broadcast by a first of the ID nodes and generate a first checkpoint summary representing the detected first set of advertising signals; detect (via the first communication interface) a second set of advertising signals broadcast by the first ID node after the first ID node broadcasts the first set of advertising signals and then generate a second checkpoint summary representing the detected second set of advertising signals; compare an observed parameter for each of the first checkpoint summary and the second checkpoint summary; identify the event candidate based upon the comparison of the observed parameter for each of the first checkpoint summary and the second checkpoint summary; and cause the second communication interface to report the identified event candidate to the server over the second communication path.

In still another aspect of the disclosure, a master node-implemented method is described for enhanced monitoring for an event candidate within a wireless node network having a plurality of ID nodes, a master node in communication with the ID nodes, and a server in communication with the master node. In general, the method begins with the master node receiving a first set of advertising signals broadcast by a first of the ID nodes and generating a first checkpoint summary representing the received first set of advertising signals. The method continues with the master node receiving a second set of advertising signals broadcast by the first ID node after the first ID node broadcasts the first set of advertising signals and then generating a second checkpoint summary representing the received second set of advertising signals. The method proceeds with the master node identifying the event candidate based upon a comparison of an observed parameter for each of the first checkpoint summary and the second checkpoint summary, and then reporting, by the master node to the server, the event candidate relative to the first ID node.

Each of these aspects respectively effect improvements to the technology of server-managed networks of wireless nodes that may, for example, be deployed in logistics applications where nodes are intermediately monitored and tracked by various elements of a wireless node network (such as a master node) such that the intermediate element can more quickly and efficiently operate while monitoring and reporting significant node-related events up to the managing server for the wireless node network. Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIGS. 37A-37M are a series of graph illustrations that show an exemplary timeline of detected signals and identified different types of exemplary event candidates over time in accordance with an embodiment of the invention;

FIGS. 42A-D are detailed flow diagrams illustrating parts of an exemplary method for enhanced monitoring for an event candidate within a wireless node network in accordance with an embodiment of the invention;

FIG. 43 is a flow diagram illustrating an exemplary method for enhanced management of a wireless node network based upon receipt of and processing of an event candidate in accordance with an embodiment of the invention;

FIG. 46 is a flow diagram illustrating another exemplary method for enhanced monitoring for an event candidate within a wireless node network based upon a checkpoint summary in accordance with an embodiment of the invention.

DESCRIPTION OF THE EMBODIMENTS

Figure 1:
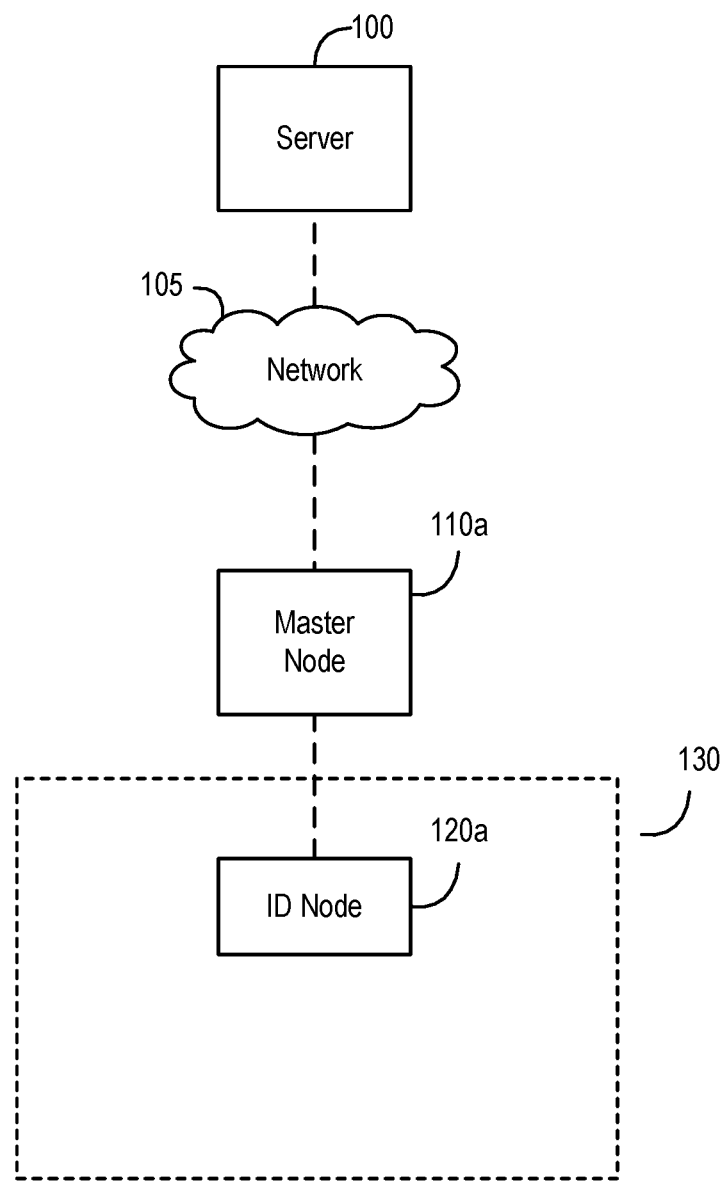
FIG. 1 is a diagram of an exemplary wireless node network in accordance with an embodiment of the invention.

Reference will now be made in detail to exemplary embodiments. Wherever possible, the same reference numbers are used in the drawings and the description to refer to the same or like parts.

In general, the following describes various embodiments of a contextually aware hierarchical wireless node network that may be managed, operated, and applied by principles as set forth herein. In general, embodiments of the wireless node network may include one or more lower level devices or nodes (e.g., an ID node) that rely on shorter-range communication with a higher level device or node (e.g., a master node), which is operative to communicate with a server over a different communication path while the lower level node is unable to communicate directly with the server. Those skilled in the art will appreciate that such a hierarchy of different functional communicating network components (generally referred to as network devices) may be characterized as a network of nodes. Those skilled in the art will appreciate that in some embodiments, the wireless node network may include the server as well as different wireless nodes despite the fact that the server may not be a dedicated wireless component. In other embodiments, the network may include similar types of wireless nodes or different types of wireless nodes.

Further, those skilled in the art will appreciate that each embodiment described herein effects improvements to particular technologies, such as monitoring and node management technologies using an adaptive, context-aware wireless node network of node elements. Each embodiment describes a specific technological application of one or more nodes that operate in such a wireless node network where the specific technological application improves or otherwise enhances such technical fields as explained and supported by the disclosure that follows.

Those skilled in the art will understand through the following detailed description that the nodes may be associated with items (e.g., an object, a package, a person, a piece of equipment) and may be used to identify and locate the items while being dynamically programmed during operation of the network and while the items move along an anticipated path (e.g., a transit path from an origin point to a destination point). The following further describes various embodiments of a wireless node network, exemplary ways to manage components of a wireless node network, exemplary ways to better determine the location of components of a wireless node network, and applications of a wireless node network to enhance logistics operations that rely upon a wireless node network. In particular, FIGS. 1-33 provide diagrams and flowcharts on basic operations of various types of network elements deployed within an embodiment of the wireless node network while FIGS. 34-44 provide more details regarding embodiments of systems, apparatus and methods for enhanced monitoring for an event candidate related to elements of a wireless node network and adaptive management of the wireless node network based upon the event candidate.

Wireless Node Networks

FIG. 1 illustrates a basic diagram of an exemplary wireless node network in accordance with an embodiment of the invention. The exemplary network shown in FIG. 1 comprises a server 100 connected to a network 105, which is also operatively connected to different network components, such as a master node 110a and indirectly to an ID node 120a through master node 110a. Master node 110a is typically connected to an ID node 120a via short-range wireless communications (e.g., Bluetooth® formatted communications). Master node 110a is typically connected to server 100 through network 105 via longer-range wireless communication (e.g., cellular) and/or medium range wireless communication (e.g., wireless local area data networks or Wi-Fi). ID node 120a is typically a low cost device that may be easily placed into a package, be integrated as part of packaging, or otherwise associated with an item to be tracked and located, such as package 130, a person, or object (e.g., vehicle, etc.). Generally, an ID node is capable of communicating directly with a master node but incapable of communicating directly with the server, while a master node is capable of communicating directly with the server and separately and directly communicating with other nodes (such as an ID node or another master node). The ability to deploy a hierarchy of nodes within an exemplary wireless node network to distribute tasks and functions at the different levels in an efficient and economical manner helps to facilitate a wide variety of adaptive locating, tracking, managing, and reporting applications using such a network of nodes as discussed in more detail below.

In general, the lower cost, lower complexity ID node 120a is managed by the higher complexity master node 110a and server 100 as part of keeping track of the location of ID node 120a (and the associated item), thereby providing intelligent, robust, and broad visibility about the location and status of ID node 120a. In a typical embodiment, ID node 120a is first associated with an item (e.g., package 130, a person, or object). As ID node 120a moves with the item, the ID node 120a becomes associated with the master node 110a, and the server 100 is updated with such information. Further movement of the ID node 120a and item may cause the ID node 120a to disassociate with master node 110a and be handed off to become associated another master node (not shown), after which the server 100 is again updated. As such, the server 100 generally operates to coordinate and manage information related to the ID node 120a as the item physically moves from one location to another. Further details of the architecture and functionality of an embodiment of an exemplary ID node and master node as described below in more detail with respect to FIGS. 3 and 4, while exemplary server 100 is described below in more detail with respect to FIG. 5.

While server 100 is shown connecting through network 105, those skilled in the art will appreciate that server 100 may have a more direct or dedicated connections to other components illustrated in FIG. 1, such as master node 110a, depending upon implementation details and desired communication paths. Furthermore, those skilled in the art will appreciate that an exemplary server may contain a collection of information in a database (not shown in FIG. 1), while multiple databases maintained on multiple server platforms or network storage servers may be used in other embodiments to maintain such a collection of information. Furthermore, those skilled in the art will appreciate that a database may be implemented with cloud technology that essentially provides networked storage of collections of information that may be directly accessible to devices, such as master node 110a.

Network 105 may be a general data communication network involving a variety of communication networks or paths. Those skilled in the art will appreciate that such exemplary networks or paths may be implemented with hard wired structures (e.g., LAN, WAN, telecommunication lines, telecommunication support structures and telecommunication processing equipment, etc.), wireless structures (e.g., antennas, receivers, modems, routers, repeaters, etc.) and/or a combination of both depending upon the desired implementation of a network that interconnects server 100 and other components shown in FIG. 1 in an embodiment of the present invention.

Master node 110a and ID node 120a are types of nodes. A node is generally an apparatus or device used to perform one or more tasks as part of a network of components. An embodiment of a node may have a unique identifier, such as a Media Access Control (MAC) address or an address assigned to a hardware radio like an Internet Protocol 6 (IPv6) identifier. In some embodiments, the node's unique identifier may be correlated to a shipment identifier (e.g., a shipment tracking number in one example), or may itself be a shipment's tracking reference.

An ID node, such as ID node 120a, is generally a low cost active wireless device. In one embodiment, an exemplary ID node is a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. For example, the physical implementation of an exemplary ID node may be small, and, thus, amenable to integration into a package, label, container, or other type of object. In some implementations of an ID node, the node is rechargeable while other implementations do not permit recharging the power source for the ID node. In other implementations, the ID node is environmentally self-contained or sealed so as to enable robust and reliable operations in a variety of environmentally harsh conditions.

A master node, such as master node 110a, generally serves as an intelligent bridge between the ID node 120a and the server 100. Accordingly, a master node is generally more sophisticated than an ID node. In one example embodiment, an exemplary master node is a device having a processing or logic unit, a short-range radio (with may have variable RF characteristics) used for communicating with other nodes (ID nodes and other master nodes), a medium and/or long-range radio for communication with the server 100, memory accessible by the processing unit, a timer operatively coupled to the processing unit, and a power source (e.g., a battery or a wired power supply connection) that provides power for the circuitry of the master node. The exemplary master node, such as master node 110a, may be positioned in a known fixed location or, alternatively, be a mobile unit having dedicated location positioning circuitry (e.g., GPS circuitry) to allow the master node to determine its location by itself.

While the embodiment illustrated in FIG. 1 shows only a single master node and a single ID node, those skilled in the art will appreciate that a wireless network consistent with an embodiment of the invention may include a wide array of similar or different master nodes that each communicate with the server 100 and/or other master nodes, and a wide variety of similar or different ID nodes. Thus, the exemplary network shown in FIG. 1 is a basic embodiment, while the exemplary network shown in FIG. 2 is a more detailed exemplary wireless node network in accordance with another embodiment of the invention.

Figure 2:
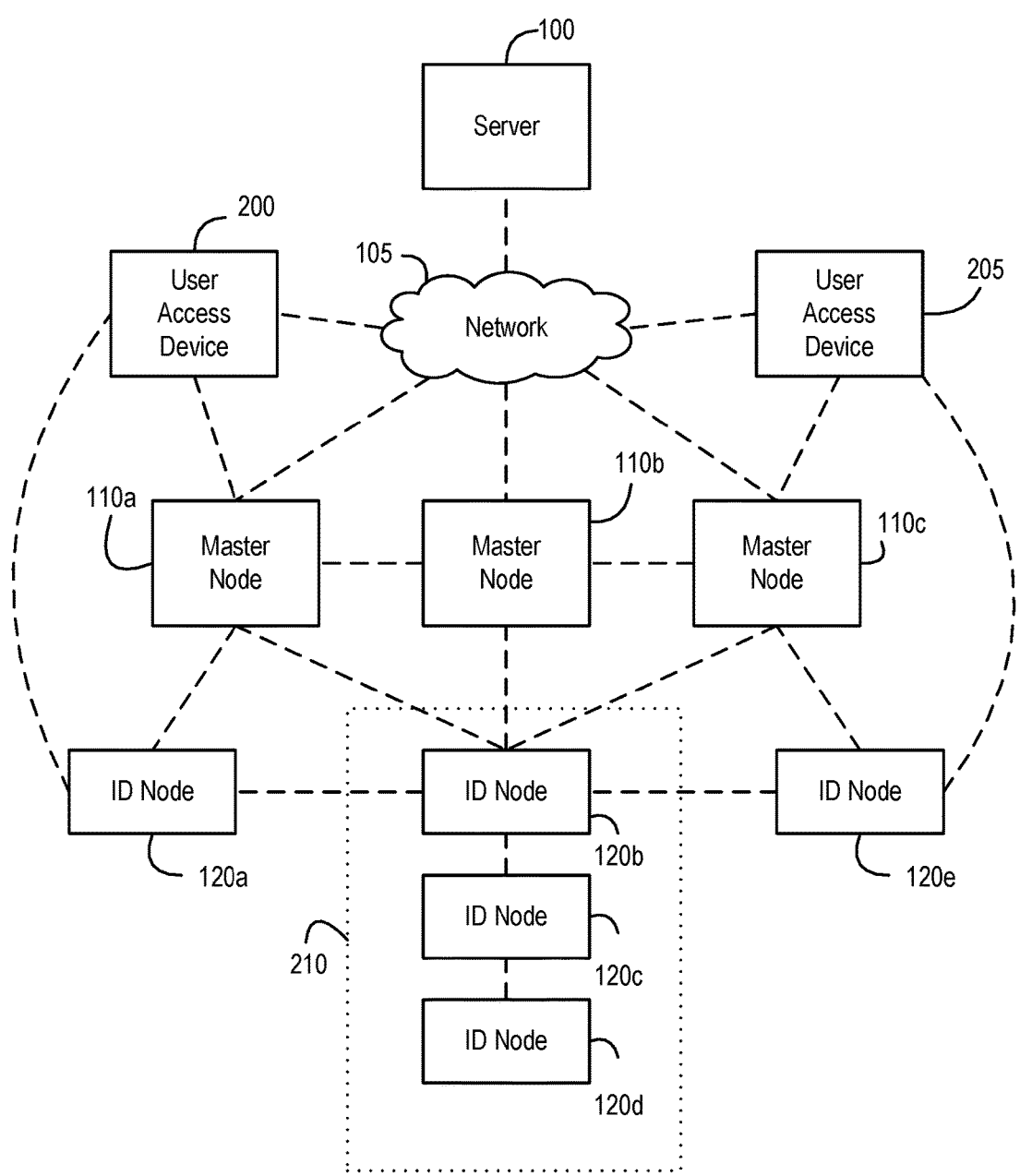
FIG. 2 is a more detailed diagram of an exemplary wireless node network in accordance with an embodiment of the invention.

Referring now to FIG. 2, another exemplary wireless node network is shown including server 100 and network 105. Here, master nodes 110a, 110b, 110c are deployed and connected to network 105 (and by virtue of those respective connections, to server 100) as well as to each other. ID nodes 120a, 120b, 120e are shown as connectable or operative to communicate via different paths to various master nodes. However, ID nodes 120c and 120d are shown in FIG. 2 connected to ID node 120b but not to any of the master nodes. This may be the case if, for example, ID nodes 120b, 120c, 120d are associated with different items (e.g., packages) within a larger container 210 (or grouped together on a pallet). In such an example, only ID node 120b may remain within the wireless communication range of any master node. This may, for example, be because of the positions of the different ID nodes within the container relative to the closest master node, adverse RF shielding caused by the container, adverse RF shielding caused by packaging of the item, or adverse RF shielding caused by other proximate material that interferes with radio transmissions (e.g., several packages of metal items between the ID node and any master node outside the container). Thus, in the illustrated configuration of the exemplary network shown in FIG. 2, ID nodes 120c and 120d may be out of range from the master nodes, yet still have an operative communication path to a master node through ID node 120b.

Indeed, in one example, prior to placement within container 210, ID node 120b may actually be a master node but the changed RF environment when placing it in container 210 may interfere with the master node's ability to locate itself via location signals (e.g., GPS signals) and cause the master node to temporarily operate as an ID node while still providing communications and data sharing with other ID nodes in container 210.

User access devices 200, 205 are also illustrated in FIG. 2 as being able to connect to network 105, master nodes, and ID nodes. Generally, user access devices 200 and 205 allow a user to interact with one or more components of the exemplary wireless node network. In various embodiments, user access devices 200, 205, may be implemented using a desktop computer, a laptop computer, a tablet (such as an Apple iPad® touchscreen tablet), a personal area network device (such as a Bluetooth® device), a smartphone (such as an Apple iPhone®), a smart wearable device (such as a Samsung Galaxy Gear™ smartwatch device, or a Google Glass™ wearable smart optics) or other such devices capable of communicating over network 105 with server 100, over a wired or wireless communication path to master node and ID nodes. Thus, an exemplary user access device may be a mobile type of device intended to be easily moved (such as a tablet or smartphone), and may be a non-mobile type of device intended to be operated from a fixed location (such as a desktop computer).

As shown in FIG. 2, user access devices 200, 205 are coupled and in communication with network 105, but each of them may also be in communication with each other or other network components in a more direct manner (e.g., via near field communication (NFC), over a Bluetooth® wireless connection, over a Wi-Fi network, dedicated wired connection, or other communication path).

In one example, a user access device, such as device 200 or 205, may facilitate associating an ID node (such as ID node 120a) with the tracking number of a package at the start of a shipment process, coordinating with the server 100 to check on the status and/or location of the package and associated ID node during transit, and possibly retrieving data from a master node or ID node related to the shipped package. Thus, those skilled in the art will appreciate that a user access device, such as devices 200, 205, are essentially interactive communication platforms by which a user may initiate shipment of an item, track an item, determine the status and location of an item, and retrieve information about an item.

An exemplary user access device, such as device 200 or 205, may include sufficient hardware and code (e.g., an app or other program code section or sections) to operate as a master node or an ID node in various embodiments as discussed in more detail below. For example, device 200 may be implemented as a mobile smartphone and functionally may operate as an exemplary ID node that broadcasts advertising packet messages to other ID nodes or master nodes for association and sharing data with such nodes. In another example, device 200 is implemented as a mobile smartphone and may operate as an exemplary master node that communicates and associates with ID nodes and other master nodes, as described herein, and communicates with the server 100. Thus, those skilled in the art will appreciate an exemplary ID node in FIG. 3 and an exemplary master node in FIG. 4, and their respective parts, code and program modules, may be implemented with an appropriately programmed user access device, such as device 200 or 205. Thus, the following description of an exemplary ID node in FIG. 3 and an exemplary master node in FIG. 4 will be applicable to a user access device operating as an ID node or a master node, respectively.

ID Node

Figure 3:
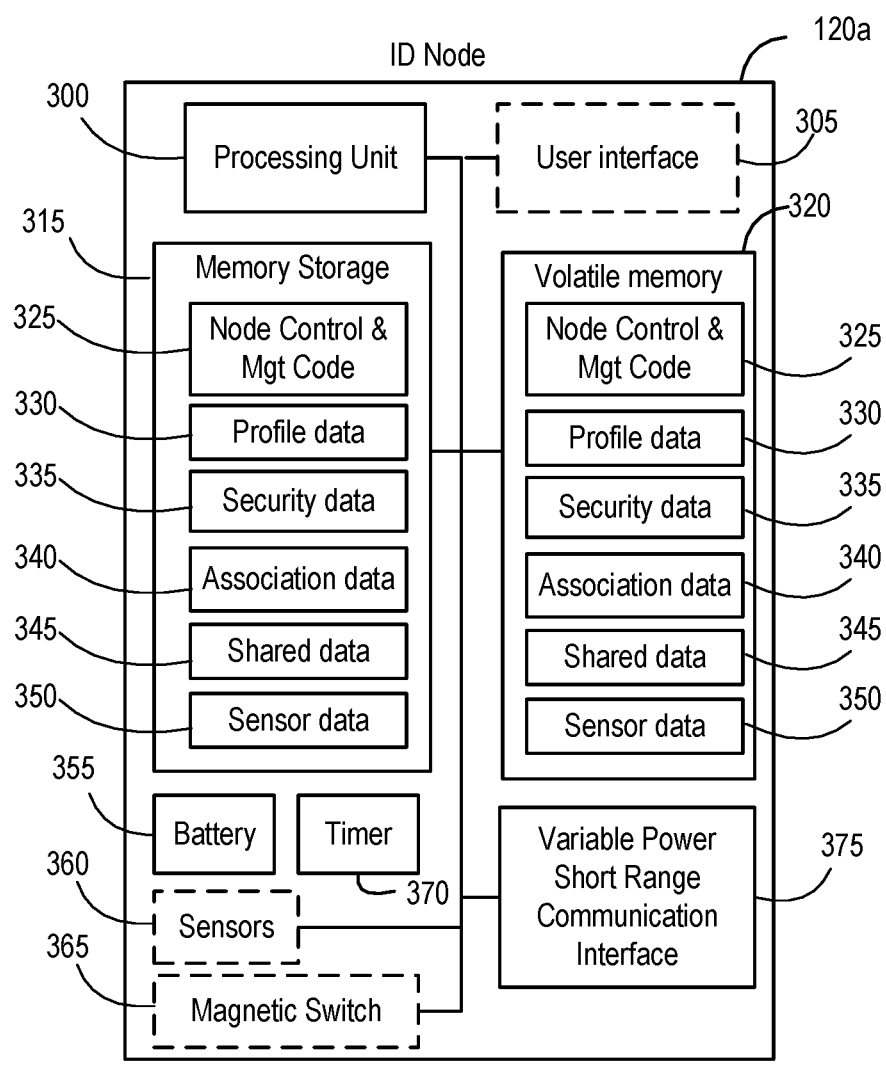
FIG. 3 is a more detailed diagram of an exemplary ID node device in accordance with an embodiment of the invention.

FIG. 3 is a more detailed diagram of an exemplary ID node device in accordance with an embodiment of the invention. As previously described, one embodiment of an ID node includes a transceiver-based processing or logic unit having a short-range radio with variable RF characteristics (e.g., programmable RF output power range, programmable receiver sensitivity), memory accessible by the processing unit, a timer operatively coupled to the processing unit, and a power source (e.g., a battery) that provides power for the circuitry of the ID node. Referring now to the more detailed embodiment of FIG. 3, exemplary ID node 120a is shown to comprise a processing or logic unit 300 coupled to a variable power short-range communication interface 375, memory storage 315, volatile memory 320, timer 370, and battery 355. Those skilled in the art will appreciate that processing unit 300 is logic, such as a low power consumption microcontroller, that generally performs computations on data and executes operational and application program code and other program modules or sections thereof within the ID node 120a. As such, exemplary processing unit 300 operates as a transceiver-based processing core of ID node 120a.

Those skilled in the art will also appreciate that exemplary ID node 120a is a hardware-based component that may be implemented with a single processor or logic unit, such as unit 300. In one embodiment, processing unit 300 may be implemented with an Intel® 8051 CPU Core and associated peripheral circuitry as dictated by the needs of the particular application. Less complex microcontrollers or discrete circuitry may be used to implement processing unit 300 as well as more complex and sophisticated microprocessors. Additionally, exemplary processing unit 300 may be integrated into a single chip transceiver used as a core of ID node 120a.

The variable power short-range communication interface 375 of ID node 120a is generally a programmable radio and an omni-directional antenna coupled to the processing unit 300. In other embodiments, interface 375 may use an antenna with a different antenna profile when directionality may be desired. Examples of variable power short-range communication interface 375 may include other interfacing hardware (not shown) for operatively coupling the device to a specific short-range communication path (e.g., a Bluetooth® Low Energy (BLE) connection path communicating at 2.4 GHz).

In one embodiment, various RF characteristics of the radio's transceiver, such as the RF output power and/or the RF receiver sensitivity may be dynamically and programmatically varied under control of processing unit 300. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal depending upon a desired implementation and anticipated use of ID node 120a. As will be explained in more detail below, some embodiments may use Broadcast Profile having parameters that may be programmatically altered or adjusted. In other words, embodiments of ID node 120a (or any other ID node) may have programmatically adjustable RF characteristics (such as an adjustable RF output signal power, an adjustable RF receiver sensitivity, the ability to switch to a different frequency or frequency band, etc.).

The battery 355 for ID node 120a is a type of power source that generally powers the circuitry implementing ID node 120a. In one embodiment, battery 355 may be a rechargeable power source. In other embodiments, battery 355 may be a non-rechargeable power source intended to be disposed of after use. In some embodiments of an ID node, the power source may involve alternative energy generation, such as a solar cell.

The timer 370 for ID node 120a generally provides one or more timing circuits used in, for example, time delay, pulse generation, and oscillator applications. In an embodiment where ID node 120a conserves power by entering a sleep or dormant state for a predetermined time period as part of overall power conservation techniques, timer 370 assists processing unit 300 in managing timing operations. Additionally, an embodiment may allow an ID node to share data to synchronize different nodes with respect to timer 370 and a common timing reference between nodes and the server.

An embodiment may implement ID node 120a to optionally include a basic user interface (UI) 305 indicating status and allowing basic interaction like start/stop. In one embodiment, the UI 305 may be implemented with status lights, such as multi-mode LEDs. Different colors of the lights may indicate a different status or mode for the ID node 120a (e.g., an advertising mode (broadcasting), a scanning mode (listening), a current power status, a battery level status, an association status, an error, as sensed condition (e.g., exceeding a temperature threshold, exceeding a moisture threshold, and the like)). Other embodiments of an ID node may implement U! 305 in a more sophisticated manner with a graphics display or the like where such status or mode information may be displayed as well as one or more prompts.

In a further embodiment, an exemplary status light used as part of the UI 305 of an ID node may also indicate a shipment state. In more detail, an exemplary shipment state may include a status of the shipped item or a status of the item's current shipment journey from an origin to a destination.

An embodiment may also implement ID node 120a to optionally include one or more sensors 360. In some embodiments, an ID node implemented with one or more sensors 360 may be referred to as a Sensor node. Examples of sensor 360 may include one or more environmental sensors (e.g., pressure, movement, light, temperature, humidity, magnetic field, altitude, attitude, orientation, acceleration, etc.) and dedicated location sensors (e.g., GPS sensor, IR sensor, proximity sensor, etc.). Those skilled in the art will understand that additional types of sensors that measure other characteristics are contemplated for use as sensor 360. Additionally, those skilled in the art will understand that a Sensor node may include additional program features to manage the collection, storage, sharing, and publication of the captured sensor data.

An embodiment may further implement ID node 120a to optionally include one or more magnetic switches 365. A magnetic switch 365, such as a reed switch, generally operates to close or open an electrical path or connection in response to an applied magnetic field. In other words, magnetic switch 365 is actuated by the presence of a magnetic field or the removal of a magnetic field. Various applications, as discussed in embodiments described in more detail below, may involve the operation of ID node 120a having magnetic switch 365.

Consistent with the embodiment shown in FIG. 3, exemplary ID node 120a may be implemented based upon a Texas Instruments CC2540 Bluetooth® Low Energy (BLE) System-on-Chip, which includes various peripherals (e.g., timer circuitry, USB, USART, general-purpose I/O pins, IR interface circuitry, DMA circuitry) to operate as an ID node and, if necessary, to interface with different possible sensors and other circuitry (e.g., additional logic chips, relays, magnetic switches) that make up the ID node.

In additional embodiments, one skilled in the art will appreciate that similar functionality in an ID node may be implemented in other types of hardware. For example, ID node 110a may be implemented with specially optimized hardware (e.g., a particular application specific integrated circuit (ASIC) having the same operational control and functionality as node control and management code, as described below, discrete logic, or a combination of hardware and firmware depending upon requirements of the ID node, such as power, processing speed, level of adjustability for the RF characteristics, number of memory storage units coupled to the processor(s), cost, space, etc.

As noted above, ID node 120a includes memory accessible by the processing unit 300. Memory storage 315 and volatile memory 320 are each operatively coupled to processing unit 300. Both memory components provide programming and data elements used by processing unit 300. In the embodiment shown in FIG. 3, memory storage 315 maintains a variety of program code (e.g., node control and management code 325) and other data elements (e.g., profile data 330, security data 335, association data 340, shared data 345, sensor data 350, and the like). Memory storage 315 is a tangible, non-transient computer readable medium on which information (e.g., executable code/modules, node data, sensor measurements, etc.) may be kept in a non-volatile and non-transitory manner. Examples of such memory storage 315 may include a hard disk drive, ROM, flash memory, or other media structure that allows long term, non-volatile storage of information. In contrast, volatile memory 320 is typically a random access memory (RAM) structure used by processing unit 300 during operation of the ID node 120a. Upon power up of ID node 120a, volatile memory 320 may be populated with an operational program (such as node control and management code 325) or specific program modules that help facilitate particular operations of ID node 120a. And during operation of ID node 120a, volatile memory 320 may also include certain data (e.g., profile data 330, security data 335, association data 340, shared data 345, sensor data 350, and the like) generated as the ID node 120a executes instructions as programmed or loaded from memory storage 315. However, those skilled in the art will appreciate that not all data elements illustrated in FIG. 3 must appear in memory storage 315 and volatile memory 320 at the same time.

Node Control & Management Code

Generally, an embodiment of node control and management code 325 is a collection of software features implemented as programmatic functions or program modules that generally control the behavior of a node, such as ID node 120a. In an embodiment, the functionality of code 325 may be generally similar as implemented in different types of nodes, such as a master node, an ID node, and a sensor node. However, those skilled in the art will appreciate that while some principles of operation are similar between such nodes, other embodiments may implement the functionality with some degree of specialization or in a different manner depending on the desired application and use of the node.

In a general embodiment, exemplary node control and management code 325 may generally comprise several programmatic functions or program modules including (1) a node advertise and query (scan) logic manager (also referred to herein as a node communications manager), which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; and (4) an association manager focusing on how the node associates with other nodes. What follows is description of various embodiments of these basic program modules used by nodes.

Node Communications Manager—Advertising & Scanning

In an exemplary embodiment, the node advertise and query (scan) logic manager governs how and when a node should advertise (transmit) its address or query (scan) for the address of neighboring nodes. Advertising is generally done with a message, which may have different information in various parts (e.g., headers, fields, flags, etc.). The message may be a single or multiple packets.

In the exemplary embodiment, the "advertise" mode (as opposed to "query" or "scan" mode) is a default mode for an ID Node and has the node broadcasting or transmitting a message with its address and related metadata regarding the node. For example, in one embodiment, exemplary metadata may include information such as the RF output power level, a reference number, a status flag, a battery level, and a manufacturer name for the node.

Figure 6:
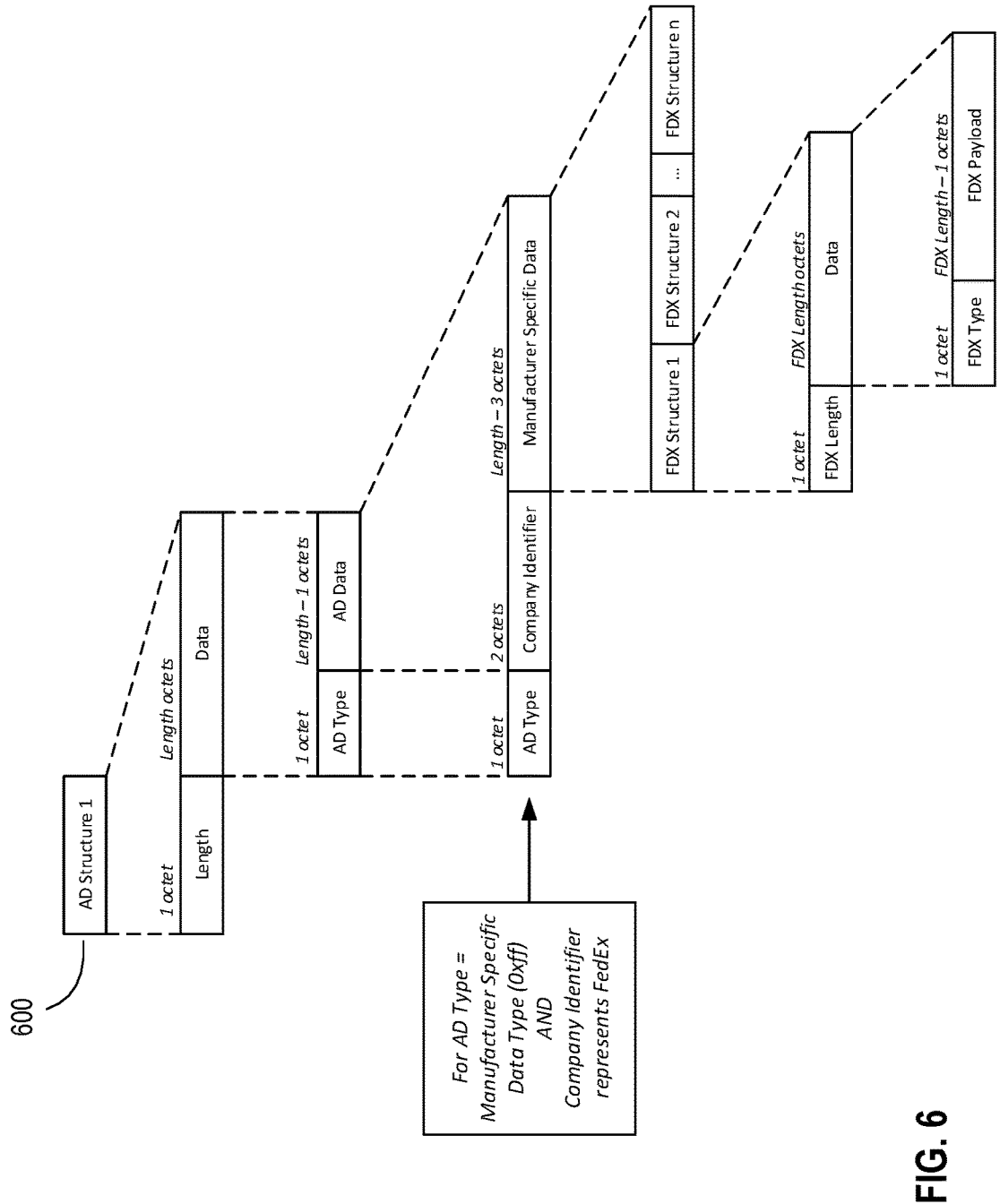
FIG. 6 is a diagram illustrating the structure or format of an exemplary advertisement data packet in accordance with an embodiment of the invention.

FIG. 6 is a diagram illustrating the structure or format of an exemplary advertisement data packet in accordance with a general embodiment of the invention. Referring now to FIG. 6, the structure of an exemplary advertisement data packet 600 broadcast as a signal or message from an ID node, such as ID node 120a, is shown. Packet 600 appears with an increasing level of detail showing exemplary metadata and a format that separately maintains distinct types of metadata in different parts of the packet. Different embodiments may include different types of metadata depending on the deployed application of the ID node.

Figure 7:
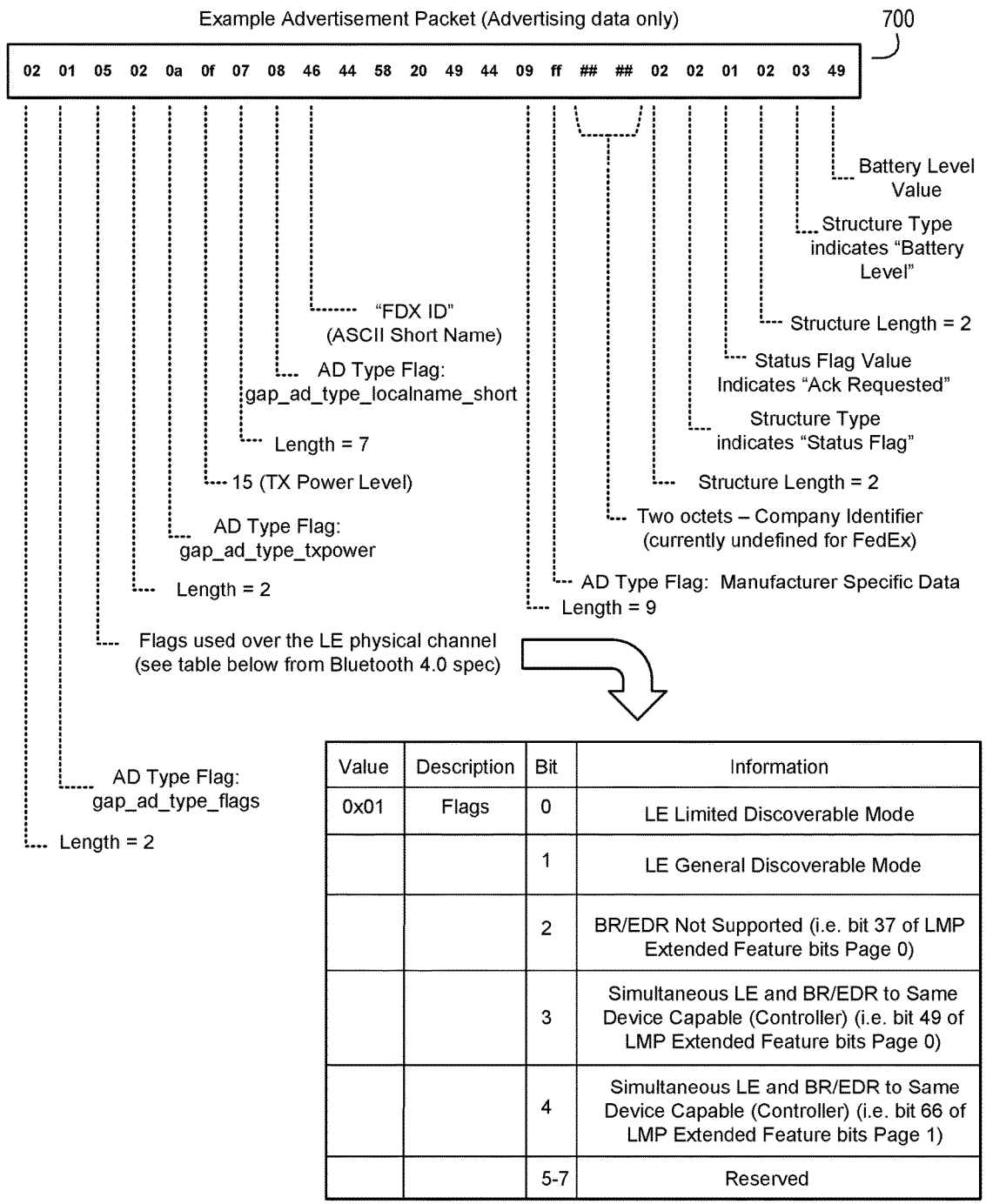
FIG. 7 is a diagram illustrating sample content for an exemplary advertisement data packet in accordance with an embodiment of the invention.

FIG. 7 is a diagram illustrating sample content for an exemplary advertisement data packet in accordance with an embodiment of the invention. Referring now to FIG. 7, an exemplary advertisement data packet 700 is illustrated with exemplary metadata including showing sample information such as the RF Output Power level (e.g., "TX Power Level"), a reference number (e.g., "'FDX ID' (ASCII Short Name)", a status flag (e.g., "Status Flag Value (indicates 'Ack Requested')"), a battery level (e.g., "Battery Level Value (Indicates 73% charge)", and a manufacturer name for the node (e.g., "Company Identifier (currently undefined for FedEx)"). In one embodiment, those skilled in the art will appreciate that the reference number may be omitted or obfuscated for security purposes.

In one embodiment, an exemplary advertising data packet may include the RF Output power level, as noted above in FIG. 7, to enable one way to help identify the type of node doing the broadcasting and the location of the broadcasting node. However, if the broadcast RF output power level is fixed and known by the node type, only the node type need be identifiable from an exemplary advertising data packet, such as packet 700.

Regarding how a node communicates, an exemplary node may be in one of several different communication modes. A node in an advertising (or transmit or broadcast) mode is visible to any other node set in a query (or scan or listen) mode. In an embodiment, the frequency and length of advertising may be application and power dependent. For example, in normal operations, an exemplary node will generally advertise in a periodic manner and expect to make an active connection to another node at certain intervals, which may be dictated by conditions set by server 100. In an embodiment, such conditions may be set individually for a node by the server or a higher level node in the network.

If an exemplary node has not received acknowledgement for an advertising packet within a particular period, it may enter one or more alert stages. For example, if an exemplary node has not received acknowledgement from another node for an advertising packet broadcast by the exemplary node within a particular time period (also generally referred to as an Alert Interval), the exemplary node will enter an Alert Stage 1 status. This prompts the exemplary node to issue a follow-up advertising packet having one or more parts of it altered to indicate the Alert Stage 1 status. In more detail, this exemplary follow-up advertising packet may have a different advertising alert header instructing nearby nodes to send a SCAN_REQ message upon receiving an advertisement packet.

If an exemplary node has not received acknowledgement from a master node for an advertising packet broadcast by the exemplary node within another time period (e.g., a request from the master node to actively connect and a success connection made), it will enter another alert stage, such as an Alert Stage 2 status. This prompts the exemplary node to issue a follow-up advertising packet having one or more parts of it altered to indicate the Alert Stage 2 status. In more detail, this exemplary follow-up advertising packet may have a different advertising alert header instructing nearby master nodes to send a SCAN_REQ message upon receiving an advertisement packet.

If an exemplary node has data to upload to the backend, it may also enter another type of alert stage. In one embodiment, for example, if an exemplary node has sensor data collected by the exemplary node (or received from one or more other nodes that have communicated with the exemplary node), and the data needs to be uploaded to server 100, the exemplary node may enter an update alert stage, such as an Alert Stage 3. This prompts the exemplary node to issue a follow-up advertising packet having one or more parts of it altered to indicate the Alert Stage 3 status. In more detail, this exemplary follow-up advertising packet may have a different advertising alert header instructing nearby master nodes to make a connection with the exemplary node so that the data (e.g., sensor data 350) may be transmitted from the exemplary node (e.g., ID node 120a) to a nearby master node (e.g., master node 110a). The transmitted data may then be stored by the nearby master node as sensor data 450 in either or both of the master node's volatile memory 420 and memory storage 415. Subsequent to that storage operation, the nearby master node will transfer the data (e.g., sensor data 450) to server 100.

As illustrated in FIG. 7 and explained in the above description of alert level stages, a status flag in a header of an exemplary advertising data packet is a field used in the association logic in one or more embodiments. For example, in one embodiment, the existence of a status flag in the advertising data packet allows a first node to communicate its status to a second node, and for the second node to report that status to the backend server, such as server 100, without an active direct connection from the first node to the server. In other words, the status flag helps facilitate passive interactions between nodes (such as passive associations).

In a more detailed embodiment, several exemplary status types are established with respect to communications with other nodes. For example, the exemplary status types may comprise the following:

Alert Level 0—no issue, operating normal;
Alert Level 1—The advertising node is requesting that any available node acknowledge the receipt of its advertisement packet;
Alert Level 2—The advertising node is requesting that any available master node acknowledge the receipt of its advertisement packet;
Alert Level 3—Data for Upload—node has captured data available for upload through a master node; and Synchronize—The advertising node requests to connect with a device or sensor that can synchronize data (such as timer or location information).

By broadcasting the status via, for example, a portion of a header in an advertising data packet, one or more nodes within range of the broadcasting node can determine the node's status and initiate active connections if requested in the status message.

A request for more information from the advertising node may, in some embodiments, come in the form of a SCAN_REQ message. In general, an exemplary SCAN_REQ is a message sent from a scanning (listening) master node to an advertising node requesting additional information from the advertising node. In this example, the alert status bit may indicate to the scanning master node, for example, at an application layer, whether the advertising node is in a mode that will or will not accept a SCAN_REQ. In one embodiment, the non-connectable and discoverable modes of node advertising are in compliance with Bluetooth® Low Energy (BLE) standards.

In another embodiment, a node may have further different modes of operation while scanning or listening for other nodes. For example, a node's query or scanning mode may be active or passive. When a node is scanning while passive, the node will receive advertising data packets, but will not acknowledge and send SCAN_REQ. However, when a node is scanning while active, the node will receive advertising data packets, and will acknowledge receipt by sending a SCAN_REQ. A more detailed embodiment may provide the passive and active modes of scanning or inquiry in compliance with Bluetooth® Low Energy (BLE) standards.

In an embodiment, an exemplary node is scanning as it listens for other wireless nodes broadcasting on the short-range radio. An exemplary scanning node may capture, for example, a MAC address of the advertising node, a signal strength of the RF output signal transmitted from the advertising node, and any other metadata published by the advertising node (e.g., other information in the advertising data packet). Those skilled in the art will appreciate that the scope of "listening" when a node is scanning may vary. For example, the query may be limited. In other words, the scope of what a node is particularly interested in and for which it is listening may be focused or otherwise limited. In such a case, for example, the information collected may be limited to particular information from a targeted population of short-range wireless nodes advertising; but the information collection may be considered "open" where information from any advertising device is collected.

When nodes are advertising or scanning, an embodiment may make further use of status flags and additional modes when advertising or scanning as part of how nodes communicate and may be managed. In one example, when a scanning (listening) node receives an advertising data packet with the status flag indicating an Alert Level 1 or 2 status, and the scanning node is in "Passive" scanning mode, the node will switch to "Active" scanning mode for some interval. However, when the scanning node in this situation is already in an "Active" scanning mode, the node will send the SCAN_REQ message and receive a SCAN_RSP from the advertising node (e.g., a message providing the additional information requested from the advertising node). The scanning node will then switch back to a "Passive" scanning mode.

In another example, when an advertising (broadcasting) node receives a SCAN_REQ from a scanning node, the advertising node will consider that its advertising data packet has been acknowledged. Further, the advertising node will reset its "Alert" status flag back to an Alert Level 0 status. This allows the advertising node to effectively receive an acknowledgement to its advertisement without ever making a connection to the scanning node, which advantageously and significantly saves on power consumption.

In yet another example, when a scanning node receives an advertising data packet with an Alert Level 3 status flag set, the scanning node will attempt to make a connection with the advertising device. Once the connection is made, the advertising device will attempt to upload its data to the connected device Thus, an embodiment of the node advertise and query (scan) logic manager of code 325 may rely upon one or more status flags, advertising modes, scanning modes, as nodes communicate with each other in various advantageous manners.

Node Information Control & Exchange Manager

In an exemplary embodiment, the information control and exchange manager part of node control and management code 325 determines whether and how information may be exchanged between nodes. In the exemplary embodiment, the information control and exchange manager establishes different node operational states where information may be changed according to a desired paradigm for the state. In more detail, an embodiment of information control and exchange manager may establish different levels of information exchange between nodes with a "non-connectable advertising" state or mode of operation, a "discoverable advertising" state or mode, and a "general advertising" state or mode operation. When a node is in the "non-connectable advertising" mode, the node information exchange is limited. For example, the advertising node may broadcast information that is captured by one or more querying (scanning) nodes, but no two-way exchange of information happens.

When a node is in the "discoverable advertising" mode and a scanning node is in "Active" mode, the node information exchange in enabled both ways. For example, the advertising node sends the advertising packet, and in response the scanning node sends the SCAN_REQ packet. After the advertising node receives the SCAN_REQ requesting additional information, the advertising node sends the SCAN_RSP with the requested information. Thus, in the "discoverable advertising" mode there is a two-way exchange of information, but no active connection is made between the two nodes exchanging information.

Finally, for advanced two-way information exchange, an active connection may be used between nodes and information may be exchanged both ways to and from different nodes. In a more detailed embodiment, at this level of two-way information exchange, nodes are first identified and then authenticated as part of establishing the active connection. Once authenticated and thereafter actively connected to each other, the nodes may securely share information back and forth. In one example, a sensor node uploading previously captured environmental information to a master node may be in this mode or state. In another example, an ID node uploading the stored results of a node scanning operation to a master node may be in this mode or state. In yet another example, a master node sharing a timer and/or location information with corresponding nodes may be in this mode or state.

Node Power Manager

In an exemplary embodiment, the node power manager part of node control and management code 325 focuses on managing power consumption and the advantageous use of power (e.g., an adjustable level of RF output signal power) in a node. In general, nodes are either powered by a battery (such as battery 355 in an ID node), or by an interface (such as battery/power interface 470 in a master node) to an external power source. Examples of an external power source may include, in some embodiments, power supplied from an outlet or power connection within a facility, or power generated onboard a conveyance (e.g., automobile, truck, train, aircraft, ship, etc.). Those skilled in the art will appreciate that an interface to an external power source will be generally referred to as a "wired" power connection, and that node power manager may be informed whether a node is wired or powered off a battery, such as battery 355. Further embodiments may implement an interface to an external power source with wireless power transmission, such as via inductive coils.

In one embodiment, a node may manage power used when performing tasks. For example, a node may manage power when determining which node should perform a particular task. In more detail, the collective power consumption of a group of devices may be managed by electing to employ wired nodes, when feasible or desired, to accomplish a particular task, and saving the battery-powered nodes for other less energy burdensome or taxing tasks. In another embodiment, historic data may inform the system of the power needed to accomplish a particular task, and the system may make a determination of which node should accomplish the particular task based upon such historic data. In other embodiments, profile data may also be used to inform the system of the power needed to accomplish a particular task (e.g., a sensor profile that describes power requirements for operation of a sensor node that gathers sensor data over a certain period of time and under certain conditions). The system may also make a determination of which node should accomplish the particular task based upon such profile data.

In another example, the exemplary node power manager may manage power when determining how to best to use and adjust power to more accurately accomplish a particular task. In one embodiment, an RF signal output from a node (such as a short-range RF output signal from an ID node) may periodically move through a range of output power or simply switch between two or more settings that differ in a detectable manner. As disclosed in more detail below, the variability and dynamic adjustment of RF output signal power may allow other nodes (such as one or more master nodes) to see each node at the upper range of the RF output signal power, and only see nodes physically close to the advertising node at the lower range of signal power.

In another example, the exemplary node power manager may cause a change to a characteristic of its RF output signal power when the node has been associated to a physical place or another node by virtue of context data (such as context data 560 and association logic that utilizes that type of information). In one embodiment, the node may be instructed to change how often the node communicates and/or a characteristic of its RF output power to preserve power.

In yet another example, all advertising nodes may have their respective node power managers periodically cause each respective node to broadcast at a maximum RF output signal power level to ensure they still are within range of a scanning ID Node or Master Node. Doing so may increase the chance of being in communication range and allows the individual nodes to be properly located and managed within the network. The broadcast duration may be set or dynamically changed to allow pairing to occur if needed.

Rather than adjust the RF output signal power level, the exemplary node power manager may, in some embodiments, adjust the RF receiver sensitivity of a node. This allows for an adjustable range of reception (as opposed to merely an adjustable range of broadcast), which may similarly be used to manage power and enhance location determinations as discussed herein.

In yet another embodiment, a combination approach may be used in which the node power manager may concurrently and independently adjust more than one RF characteristic of a node. For example, an exemplary node power manager may adjust an RF output signal power level and also adjust the RF receiver sensitivity of a node as the node is located and associated with other nodes. Those skilled in the art will realize that this may be especially useful in an area with an unusually dense concentration of nodes, and a combination of changing RF output signal power levels An embodiment of the exemplary node manager may refer to a power profile (e.g., an exemplary type of profile data 330, 430) when adjusting a node's power characteristics (e.g., consumption of power, use of power, output signal frequency, duty cycle of the output put signal, timing, power levels, etc.).

Node Association Manager

In an exemplary embodiment, the node association manager part of node control and management code 325 focuses on how the nodes associate with other nodes in conjunction and consistent with the server-side association manager in code 525, as discussed in more detail below. Thus, exemplary node association manager, when executing in a node, directs how the node associates (e.g., enters an active connection mode) with one or more other nodes with input from the server.

The exemplary node association manager for a node may indicate through a Status Flag if the node requires an acknowledgement or connection, or if it has information available for upload to the backend. Thus, while a node may not be associated or actively connected yet to another node, a status of the node may be inferred from, for example, the status information in the node's broadcast header.

Regarding connections between nodes, there are generally secure connections and unsecure connections. While an embodiment may allow unsecure connections between one or more sets of nodes, other embodiments rely upon secure connections or authenticate pairings of nodes. In one embodiment, for a node to pair with another node, the exemplary node association manager first identifies the nodes to be associated and transmits an association request to the server. The request may include a specific request to pair the nodes and ask for the corresponding pairing credentials from the server, such as server 100. The server 100 may have staged pairing credentials on particular nodes based on information indicating the nodes would be within wireless proximity and future pairing may occur. Visibility to the node relationship may have been determined through scan-advertising, or $3^{rd}$ party data such as barcode scan information indicating the nodes to be within proximity currently or at a future state.

When connecting or not connecting to exchange information under the exemplary node information exchange modes described above, nodes generally operate in a number of states, which make up an exemplary advertise cycle for an exemplary ID node. Such an exemplary advertise cycle for a node is further explained below with reference to FIG. 8 and in conjunction and consistent with the server-side association manager in code 525, as discussed in more detail below.

Airborne Mode Program Module

In one embodiment, node control and management code 325 may also include an airborne mode program module (not shown). In another embodiment, the airborne mode program module may be implemented as a part of the node power manager program module of code 325. An exemplary airborne mode program module generally operates to manage the output power of the ID node's variable power short-range communication interface 375 when the ID node is operating in an aircraft. Operating a wireless device within an aircraft may, in some circumstances, have an unintentional impact on other electronic systems on the aircraft. In more detail, an embodiment of the airborne mode program module may operate to transition the ID node from different states or modes depending upon particular operations and/or operational conditions of the aircraft. For example, an exemplary airborne mode program module may operate to transition the ID node from one state or mode (e.g., a normal mode prior to takeoff, a disabled mode during takeoff, an airborne mode while aloft, a disabled mode during descent, and a normal mode after landing) based upon detected environmental conditions (e.g., pressure, altitude) and/or flight detail information associated with the aircraft. In this way, an ID node may be allowed to normally operate when onboard an aircraft, be disabled from operating at all in some circumstances, and be able to operate in an airplane mode that allows sensing and sensor data capture, but that may limit transmission of an RF output signal to avoid interference with the aircraft's onboard electronics. Further information related to a method of managing a wireless device (such as an ID node) in an aircraft is disclosed in greater detail in U.S. patent application Ser. No. 12/761,963 entitled "System and Method for Management of Wireless Devices Aboard an Aircraft," which is hereby incorporated by reference.

Node Data

As previously noted, volatile memory 320 may also include certain data (e.g., profile data 330, security data 335, association data 340, shared data 345, sensor data, and the like) generated as the ID node 120a executes instructions as programmed or loaded from memory storage 315. In general, data used on a node, such as an ID node, may be received from other nodes or generated by the node during operations.

In one embodiment, profile data 330 is a type of data that defines a general type of behavior for an ID node, such as a Broadcast Profile (discussed in more detail below). In another embodiment where ID node 120a is a BLE device, profile data 330 may include a Bluetooth® compatible profile related to battery service (exposing the state of a battery within a device), proximity between BLE devices, or messaging between BLE devices. Thus, exemplary profile data 330 may exist in volatile memory 320 and/or memory storage 315 as a type of data that defines parameters of node behavior.

In one embodiment, it may be desired to allow secured pairings of nodes. As will be explained in more detail below, as part of secure pairing of nodes, a request for pairing credentials is generated and sent to server 100. Thus, exemplary security data 335 (e.g., PIN data, security certificates, keys, etc.) may exist in volatile memory 320 and/or memory storage 315 as a type of data associated with providing secured relationships between nodes, such as the requested security credentials.

Association data, such as association data 340, generally identifies a connected relationship between nodes. For example, ID node 120a may become associated with the master node 110*a* as the ID node 120*a* moves within range of the master node 110*a* and after the server directs the two nodes to associate (with authorization). As a result, information identifying the relationship between ID node 120*a* and master node 110*a* may be provided to server 100 and may be provided, as some point, to each of ID node 120*a* and master node 110*a*. Thus, exemplary association data 340 may exist in volatile memory 320 and/or memory storage 315 as a type of data identifying associations between nodes.

Shared data 345 may exist in volatile memory 320 and/or memory storage 315 as a type of data exchanged between nodes. For example, context data (such as environmental data) may be a type of shared data 345.

Sensor data 350 may also exist in volatile memory 320 and/or memory storage 315 as a type of data recorded and collected from an onboard sensor or from another node. For example, sensor data 350 may include temperature readings from a temperature sensor onboard an ID node and/or humidity readings from a humidity sensor in another ID node (e.g., from another of the ID nodes within container 210 as shown in FIG. 2).

Thus, an ID node (such as node 120*a* shown in FIG. 3) is a lower cost wireless node that communicates with other ID nodes and master nodes via a short-range radio with variable RF characteristics, can be associated with other nodes, can broadcast to and scan for other nodes, associated with other nodes, and store/exchange information with other nodes.

Master Node

Figure 4:
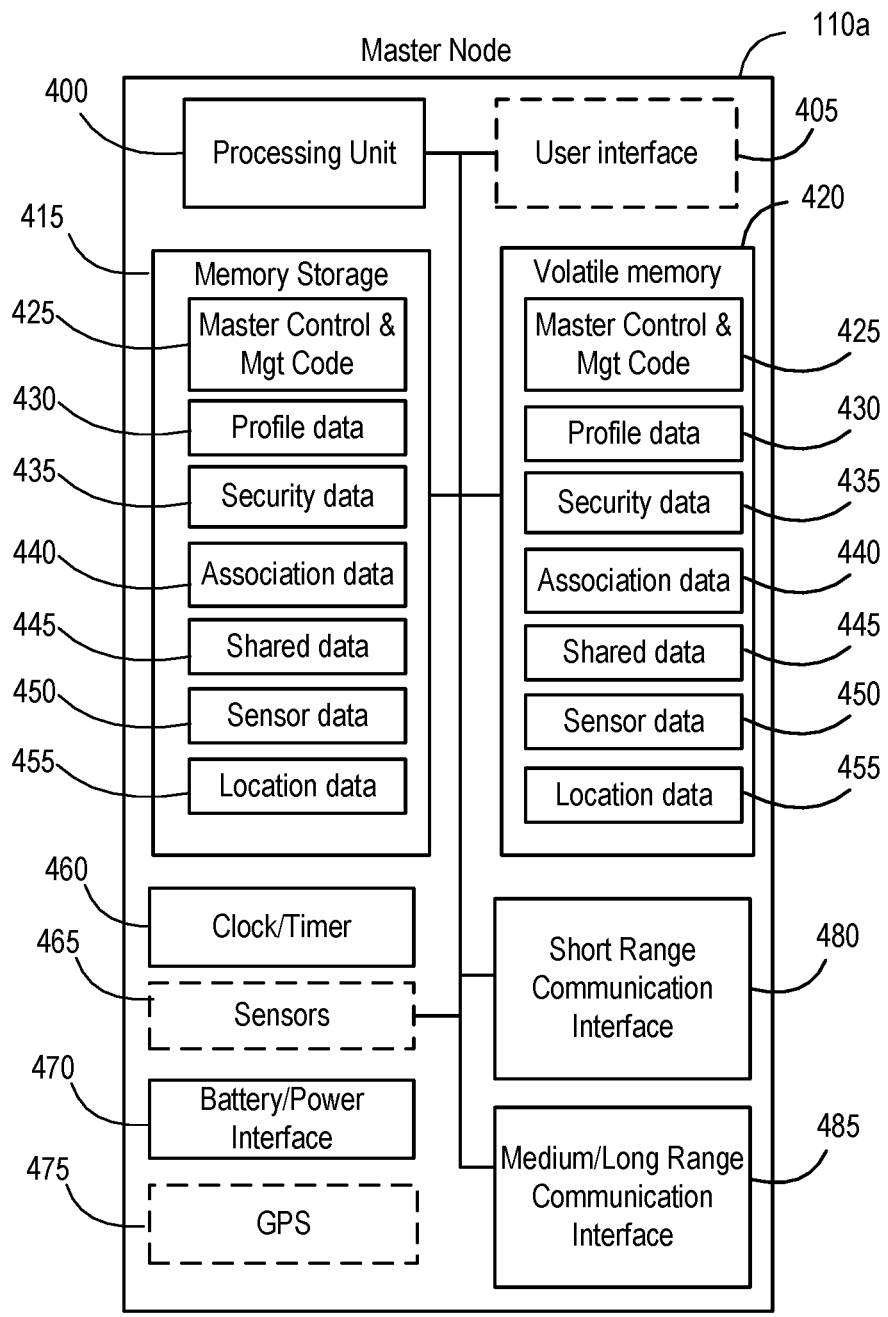
FIG. 4 is a more detailed diagram of an exemplary master node device in accordance with an embodiment of the invention.

A master node, such as master node 110*a* shown in more detail in FIG. 4, shares many ID node features but generally expands upon them in order to function as a bridge to the server 100. In general, while an ID node is a type of lower level node in an exemplary wireless node network, a master node is a type of higher level node. An exemplary master node may be in a fixed location or otherwise stationary, while other example master nodes may be implemented as movable and mobile devices.

Referring now to FIG. 4, exemplary master node 110*a* comprises a processing or logic unit 400 coupled to a short-range communication interface 480, memory storage 415, volatile memory 420, clock/timer 460, and battery/power interface 470. In some embodiments, the short-range communication interface 480 may have variable power characteristics, such as receiver sensitivity and RF output power level. Those skilled in the art will appreciate that processing unit 400 is logic, such as a microprocessor or microcontroller, which generally performs computations on data and executes operational and application program code and other program modules within the master node 110*a*.

In general, those skilled in the art will appreciate that the description of hardware with respect to ID node 110*a* in FIG. 4 applies to the similar hardware and software features appearing in each type of node, including a master node. Those skilled in the art will appreciate that exemplary master node 110*a* is a hardware-based component that may implement processor 400 with a single processor or logic unit, a more powerful multi-core processor, or multiple processors depending upon the desired implementation. In one embodiment, processing unit 400 may be implemented with a low power microprocessor and associated peripheral circuitry. Less complex microcontrollers or discrete circuitry may be used to implement processing unit 400 as well as more complex and sophisticated general purpose or dedicated purpose processors.

In yet another embodiment, exemplary processing unit 400 may be implemented by a low power ARM1176JZ-F application processor used as part of a single-board computer, such as the Raspberry Pi Computer Model B-Rev-2. The ARM application processor is embedded within a Broadcom® BCM2835 system-on-chip (SoC) deployed in the Raspberry Pi Computer. In this embodiment, the Raspberry Pi Computer device operates as a core of exemplary master node 110*a* and includes a Secure Digital memory card slot and flash memory card operating as memory storage 415, a 512 Mbyte RAM memory storage operating as volatile memory 420, an operating system (such as Linux) stored on memory storage 415 and running in volatile memory 420, and peripherals that implement clock/timer 460, and a power supply operating as a power interface 470.

Like short-range interface 375 in ID node 120*a*, exemplary master node 110*a* includes a short-range communication interface 480 as a programmable radio and an omni-directional antenna coupled to the processing unit 400. In some embodiments, the short-range communication interface 480 may have variable RF power characteristics, such as receiver sensitivity and/or RF output signal power level. In some embodiments, interface 480 may use an antenna with a different antenna profile when directionality may be desired. Examples of short-range communication interface 480 may include other hardware (not shown) for operatively coupling the device to a specific short-range communication path (e.g., a Bluetooth® Low Energy (BLE) connection path communicating at 2.4 GHz). While BLE is used in one embodiment to enable a short-range communication protocol, variable power short-range interface 480 may be implemented with other low power, short-range communication protocols, such as ultra-low power communication protocols used with ultra-wideband impulse radio communications, ZigBee protocols, IEEE 802.15.4 standard communication protocols, and the like.

In one embodiment, various RF characteristics of the radio's transceiver, such as the RF output power and the RF receiver sensitivity may be dynamically and programmatically varied under control of processing unit 400. In other embodiments, further RF characteristics of the radio's transceiver may be programmatically varied, such as frequency, duty cycle, timing, modulation schemes, spread spectrum frequency hopping aspects, etc., as needed to flexibly adjust the RF output signal as needed depending upon a desired implementation and anticipated use of exemplary master node 110*a*. In other words, embodiments of master node 110*a* (or any other master node) may have programmatically adjustable RF characteristics (such as an adjustable RF output signal power, an adjustable RF receiver sensitivity, the ability to switch to a different frequency or frequency band, etc.).

In addition to the short-range communication interface 480, exemplary master node 110*a* includes a medium and/or long-range communication interface 485 to provide a communication path to server 100 via network 105. Those skilled in the art will appreciate that in some embodiments, an exemplary communication interface deployed may be considered to embody a short-range communication interface (such as interface 480) or a medium/long range communication interface (such as interface 485). However, in more general embodiments, reference to a communication interface may include an interface that collectively implements a plurality of different exemplary data communication interfaces while still being generally referenced as "a communication interface" or "wireless communication interface."

In one embodiment, communication interface 485 may be implemented with a medium range radio in the form of an IEEE 802.11g compliant Wi-Fi transceiver. In another embodiment, communication interface 485 may be implemented with a longer range radio in the form of a cellular radio. In yet another embodiment, both a Wi-Fi transceiver and a cellular radio may be used when best available or according to a priority (e.g., first attempt to use the Wi-Fi transceiver if available due to possible lower costs; and if not, then rely on the cellular radio). In other words, an embodiment may rely upon the longer range cellular radio part of interface 485 as an alternative to the medium range Wi-Fi transceiver radio, or when the medium range radio is out of reach from a connecting infrastructure radio within network 105. Thus, in these embodiments, medium and/or long-range communication interface 485 may be used to communicate captured node information (e.g., profile data 430, association data 440, shared data 445, sensor data 450, and location data 455) to server 100.

The battery/power interface 470 for master node 110a generally powers the circuitry implementing master node 110a. In one embodiment, battery/power interface 470 may be a rechargeable power source. For example, a master node may have a rechargeable power source along with a solar panel that charges the power source in order to help facilitate deployment of the master in a remote location. In another embodiment, battery/power interface 470 may be a non-rechargeable power source intended to be disposed of after use. In yet another embodiment, battery/power interface 470 may be a power interface connector (such as a power cord and internal power supply on master node 110a). Thus, when an exemplary master node is in a fixed or stationary configuration, it may be powered by a power cord connected to an electrical outlet, which is coupled to an external power source. However, other mobile master nodes may use an internal power source, such as a battery.

The clock/timer 460 for master node 110a generally provides one or more timing or counting circuits used in, for example, counter, time delay, pulse generation, and oscillator applications. In an embodiment where master node 110a conserves power by entering a sleep or dormant state for a predetermined time period as part of overall power conservation techniques, clock/timer 460 assists processing unit 400 in managing timing or counting operations.

Optionally, an embodiment may also implement master node 110a as including one or more sensors 465 (similar to sensors deployed on ID node based Sensor nodes and described above with respect to FIG. 3). Additionally, an embodiment of master node 110a may also provide a user interface 405 to indicate status and allow basic interaction for review of captured node data and interaction with nodes and server 100. In one embodiment, user interface 405 may provide a display, interactive buttons or soft keys, and a pointing device to facilitate interaction with the display. In a further embodiment, a data entry device may also be used as part of the user interface 405. In other embodiments, user interface 405 may take the form of one or more lights (e.g., status lights), audible input and output devices (e.g., a microphone and speaker), or touchscreen.

As previously noted, an exemplary master node, such as master node 110a, may be positioned in a known fixed location or, alternatively, includes dedicated location positioning circuitry 475 (e.g., GPS circuitry) to allow the master node self-determine its location or to determine its location by itself. In other embodiments, alternative circuitry and techniques may be relied upon for location circuitry 475 (rather than GPS), such as location circuitry compatible with other satellite-based systems (e.g., the European Galileo system, the Russian GLONASS system, the Chinese Compass system), terrestrial radio-based positioning systems (e.g., cell phone tower-based or Wi-Fi-based systems), infrared positioning systems, visible light based positioning systems, and ultrasound-based positioning systems).

Regarding memory storage 415 and volatile memory 420, both are operatively coupled to processing unit 400 in exemplary master node 110a. Both memory components provide program elements used by processing unit 400 and maintain and store data elements accessible to processing unit 400 (similar to the possible data elements stored in memory storage 315 and volatile memory 320 for exemplary ID node 120a).

In the embodiment shown in FIG. 4, memory storage 415 maintains a variety of executable program code (e.g., master control and management code 425), data similar to that kept in an ID node's memory storage 315 (e.g., profile data 430, security data 435, association data 440, shared data 445, sensor data 450, and the like) as well as other data more specific to the operation of master node 110a (e.g., location data 455 that is related to the location of a particular node). Like memory storage 315, memory storage 415 is a tangible, non-transient computer readable medium on which information (e.g., executable code/modules, node data, sensor measurements, etc.) may be kept in a non-volatile and non-transitory manner.

Like volatile memory 320 in ID node 120a, volatile memory 420 is typically a random access memory (RAM) structure used by processing unit 400 during operation of the master node 110a. Upon power up of master node 110a, volatile memory 120 may be populated with an operational program (such as master control and management code 425) or specific program modules that help facilitate particular operations of master node 110a. And during operation of master 110a, volatile memory 420 may also include certain data (e.g., profile data 430, security data 435, association data 440, shared data 445, sensor data 450, and the like) generated as the master node 110a executes instructions as programmed or loaded from memory storage 415.

Master Control & Management Code

Generally, an embodiment of master control and management code 425 is a collection of software features implemented as programmatic functions or program modules that generally control the behavior of a master node, such as master node 110a. In one embodiment, master control and management code 425 generally comprises several programmatic functions or program modules including (1) a node advertise and query (scan) logic manager, which manages how and when a node communicates; (2) an information control and exchange manager, which manages whether and how information may be exchanged between nodes; (3) a node power manager, which manages power consumption and aspects of RF output signal power and/or receiver sensitivity for variable short-range communications; (4) an association manager focusing on how the node associates with other nodes; and (5) a location aware/capture module to determine node location.

Master Node Program Modules and ID Node Modules

In an exemplary embodiment, program modules (1)-(4) of master node control and management code 425 generally align with the functionality of similarly named program modules (1)-(4) of node control and management code 325 as described above with respect to FIG. 3. Additionally, as node control and management code 325 may also comprise an airborne mode program module, those skilled in the art will appreciate and understand that master node control and management code 425 may also comprise a similar functionality airborne mode program module in order to allow advantageous operations of a master node while airborne.

However, and consistent with examples set forth below, such modules may have some differences when in a master node compared with those controlling an ID node.

Location Aware/Capture Module

In addition to exemplary program modules (1)-(4) of code 425, an exemplary embodiment of master node control and management code 425 will further comprise an exemplary location aware/capture module related to node location (more generally referred to as a location manager module for a master node). In general, the exemplary location aware/capture module deployed in an exemplary master node may determine its own location and, in some embodiments, the location of a connected node. Embodiments of the exemplary location aware/capture module may work in conjunction with location manager program code residing and operating in a server (e.g., as part of server control and management code 525) when determining node locations of other nodes, as discussed in more detail herein.

In one embodiment, a master node may be positioned in a known, fixed location. In such an embodiment, the exemplary location aware/capture module may be aware that the master node location is a known, fixed location, which may be defined in a fixed, preset, or preprogrammed part of memory storage 415 (e.g., information in the location data 455 maintained in memory storage 415). Examples of such location information may include conventional location coordinates or other descriptive specifics that identify the location of the master node. In another embodiment where the master node may not be inherently known or a fixed location at all times (e.g., for a mobile master node), the exemplary location aware/capture module may communicate with location circuitry, such as GPS circuitry 475 on a master node, to determine the current location of the master node.

In an embodiment, the location of the master node may be communicated to the server, which may use this location information as part of managing and tracking nodes in the wireless node network. For example, if an exemplary master node is mobile and has determined a new current location using location circuitry 475, the master node may provide that new current location for the master node to the server. Additionally, when the master node's exemplary location aware/capture module determines the location of a node associated with the master node, the master node may also provide the location of that node associated with the master node to the server.

Server

Figure 5:
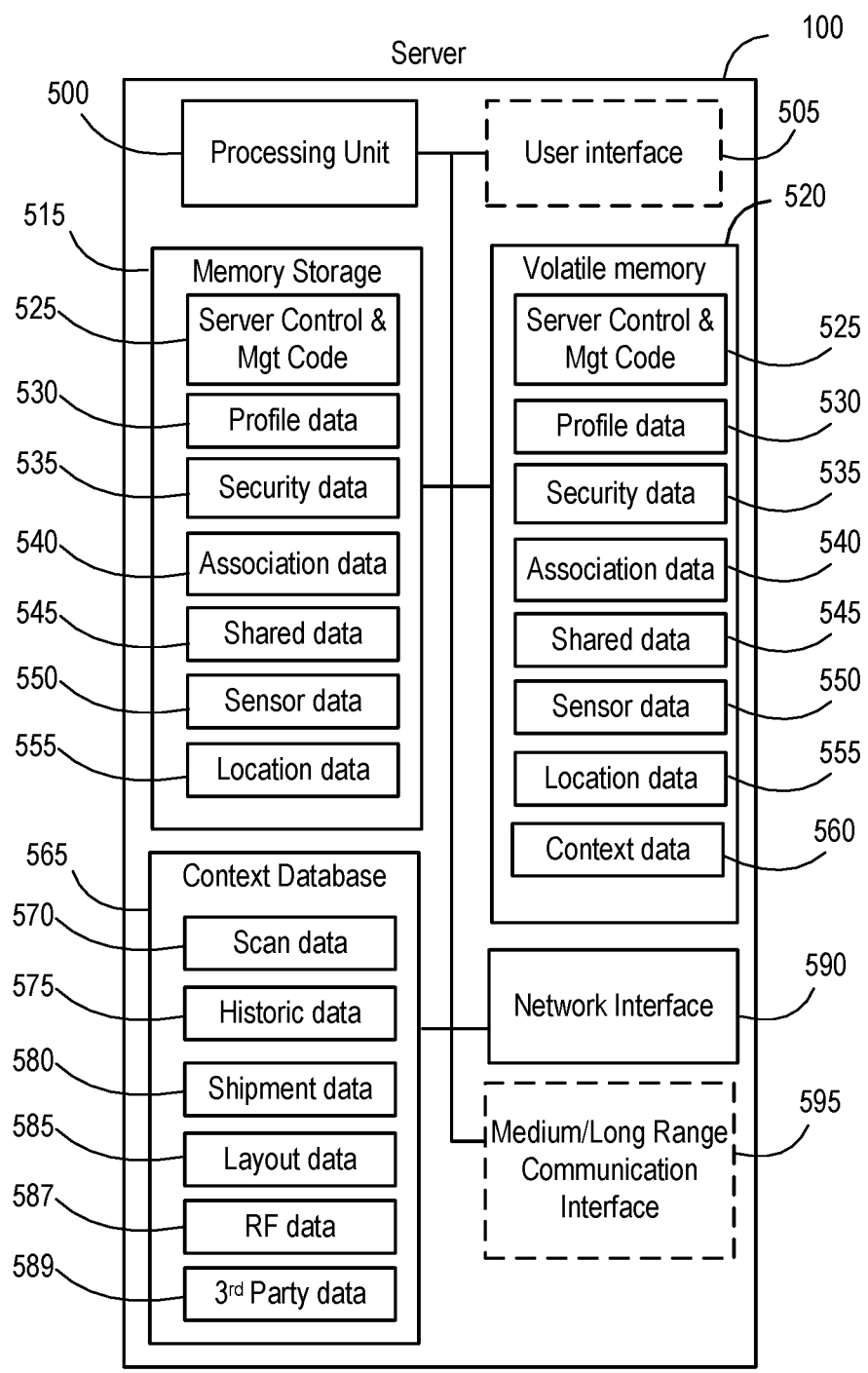
FIG. 5 is a more detailed diagram of an exemplary server in accordance with an embodiment of the invention.

While FIGS. 3 and 4 illustrate details of hardware and software aspects of an exemplary ID node and exemplary master node, respectively, FIG. 5 provides a more detailed diagram of an exemplary server that may operate as part of an exemplary wireless node network in accordance with an embodiment of the invention. In an exemplary embodiment, server 100 may be referred to as an Association and Data Management Server (ADMS) that manages the nodes, collects information from the nodes, stores the collected information from the nodes, maintains or has access to context data related to the environment in which the nodes are operating, and may provide information about the nodes (e.g., status, sensor information, etc.) to requesting entities. Further details on various embodiments that take advantage of this functionality are explained below. Those skilled in the art will appreciate that node density, geographic installation characterization, and network connectively are all types of examples of factors that may impact a final architecture desired for an embodiment of a wireless node network.

Referring now to FIG. 5, exemplary server 100 is shown as a networked computing platform capable of connecting to and interacting with at least the wireless master nodes. In other embodiments, exemplary server 100 is also capable of connecting to and interacting with one or more user access devices. Those skilled in the art will appreciate that exemplary server 100 is a hardware-based component that may be implemented in a wide variety of ways. For example, server 100 may use a single processor or may be implemented as one or more part of a multi-processor component that communicates with devices (such as user access devices 200, 205) and wireless nodes (such as master node 110a).

In general, those skilled in the art will further appreciate that server 100 may be implemented as a single computing system, a distributed server (e.g., separate servers for separate server related tasks), a hierarchical server (e.g., a server implemented with multiple levels where information may be maintained at different levels and tasks performed at different levels depending on implementation), or a server farm that logically allows multiple distinct components to function as one server computing platform device from the perspective of a client device (e.g., devices 200, 205 or master node 110a). In some regional deployments, an exemplary server may include servers dedicated for specific geographic regions as information collected within different regions may include and be subject to different regulatory controls and requirements implemented on respective regional servers.

Likewise, while the embodiment shown in FIG. 5 illustrates a single memory storage 515, exemplary server 100 may deploy more than one memory storage media. And memory storage media may be in differing non-transitory forms (e.g., conventional hard disk drives, solid state memory such as flash memory, optical drives, RAID systems, cloud storage configured memory, network storage appliances, etc.).

At its core, exemplary server 100 shown in FIG. 5 comprises a processing or logic unit 500 coupled to a network interface 590, which facilitates and enables operative connections and communications through network 105 with one or more master nodes as well as, in some embodiments, user access devices, such as devices 200, 205. In one embodiment, server 100 may include a medium and/or long-range communication interface 595 with which to more directly communicate with one or more master nodes. Using these communication paths as well as program code or program modules (such as server control and management code 525), the server 100 generally operates to coordinate and manage information related to an ID node as an item associated with the ID node physically moves from one location to another.

As a computing platform, the processing unit 500 of exemplary server 100 is operatively coupled to memory storage 515 and volatile memory 520, which collectively store and provide a variety of executable program code (e.g., server control and management code 525), data similar to that kept in a master or ID node's respective memory storage (e.g., profile data 530, security data 535, association data 540, shared data 545, sensor data 550, location data 555) and context data 560 related to the environment in which the nodes are operating (e.g., information generated from within the wireless node network and information created external to the wireless node network).

Like memory storage 315 and storage 415, memory storage 515 is a tangible, non-transient computer readable medium on which information (e.g., executable code/modules (e.g., server control and management code 525), node-related data (e.g., profile data 530, security data 535, association data 540, location data 555, etc.), measurement information (e.g., a type of shared data 545, sensor data 550, etc.), and information on the contextual environment for the nodes (e.g., context data 560) may be kept in a non-volatile and non-transitory manner.

Those skilled in the art will appreciate that the above identification of particular program code and data are not exhaustive and that embodiments may include further executable program code or modules as well as other data relevant to operations of a processing-based device, such as an ID node, a master node, and a server.

Context Data

As noted above, server 100 may access context data 560 as part of managing nodes in the wireless node network. The exemplary server 100 may contain a collection of such context data 560 in a context database 565 according to an embodiment. As illustrated in FIG. 5, exemplary context database 565 is a single database accessible by processing unit 500 internal to server 100. Those skilled in the art will readily understand that other configurations that provide an accessible collection of context data 560 are possible and contemplated within the scope and principles of embodiments of the invention. For example, context database 565 may be an externally accessible database (or multiple databases), such as an accessible storage maintained outside the server 100 via a dedicated interface or a network storage device (or network attached storage (NAS) unit). In yet another embodiment, the context database may be separately maintained by an external database server (not shown) that is distinct from server 100, but accessible through a communication path from server 100 to a separate database server (e.g., via network 105). Furthermore, those skilled in the art will appreciate that context database 565 may be implemented with cloud technology that essentially provides a distributed networked storage of collections of information (such as context data 560, sensor data 550, shared data 545, etc.) accessible to server 100.

Within context database 565, an exemplary embodiment of the collection of context data 560 may be maintained that generally relates to an environment in which the nodes are operating or anticipated to be operating. In more detail, the context data 560 may generally relate to what a similar node has experienced in a similar environment to what a given node is presently experiencing or is anticipated to experience as the given node moves.

Figure 22A:
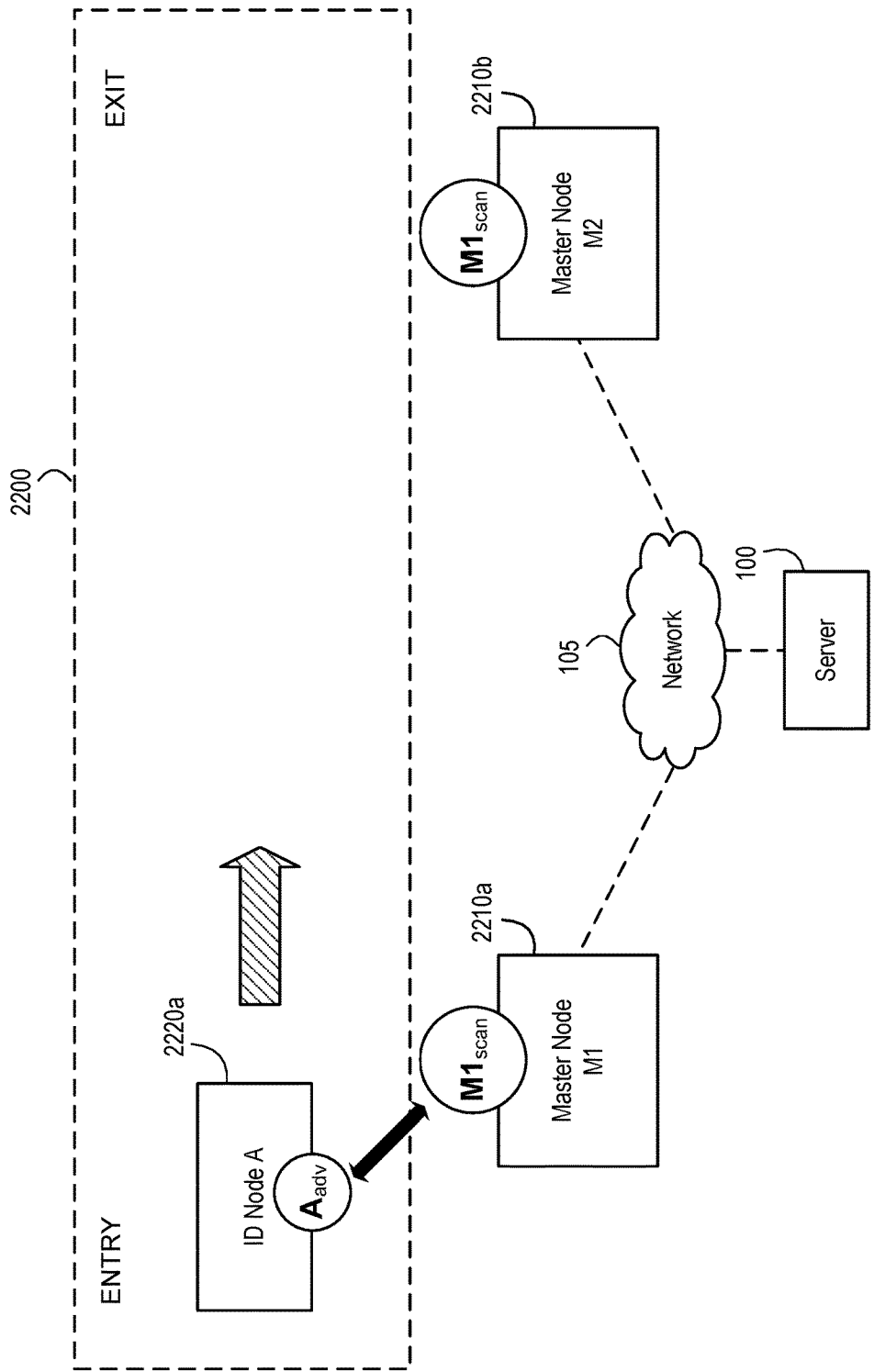
FIGS. 22A-22C are diagrams illustrating exemplary stages of an ID node moving through part of an exemplary transit path while associating with different master nodes in accordance with an embodiment of the invention.

In a general example, an environment in which a node may be actually or anticipated to be operating may include different types of environments—for example, an electronic communication environment (e.g., an RF environment that may be cluttered with signals or include materials or structure that may impede or otherwise shield RF communications), a physical environment of an anticipated path along with the identified node moves (e.g., temperature, humidity, security, and other physical characteristics), a conveyance environment related to how a node may move or be anticipated to be moving (e.g., speed and other parameters of a truck, airplane, conveyor system), and a density environment related to the density of nodes within an area near a particular node (e.g., how many nodes are anticipated to occupy a corridor, such as structure 2200 shown in FIG. 22A, or a storage facility through which a particular ID node is anticipated to transit on its shipping path).

In light of these different aspects of a node's operating environment, exemplary context data 560 may provide information related to different structures and conditions related to movement of an item (e.g., a particular type of courier device, vehicle, facility, transportation container, etc.). Such information may be generated by an entity operating the wireless node network, such as a shipping company. Additionally, exemplary context data 560 may include third party data generated external to the wireless node network. Thus, context data, such as data 560, may include a wide variety of data that generally relates to the environment in which the nodes are operating and may be used to advantageously provide enhanced node management capabilities in accordance with embodiments of the present invention.

In general, FIG. 5 illustrates exemplary types of context data 560 being maintained in database 565 and in volatile memory 520. Those skilled in the art will appreciate that context data 560 may also be maintained in other data structures, in addition to or instead of maintaining such information in a database. As illustrated in FIG. 5, exemplary types of context data 560 may include but are not limited to scan data 570, historic data 575, shipment data 580, layout data 585, RF data 587, and $3^{rd}$ party data.

Scan data 570 is generally data collected for a particular item related to an event. For example, when an item is placed in a package (such as package 130), a label may be generated and placed on the exterior of the package. The label may include a visual identifier that, when scanned by an appropriate scanning device capable of capturing, identifies the package. The information generated in response to scanning the identifier (a type of event), may be considered a type of scan data. Other scan data 570 may include, for example, general inventory data generated upon manual entry of information related to the package; captured package custodial control data; and bar code scan data.

Historic data 575 is generally data previously collected and/or analyzed related to a common characteristic. Historic data 575 embodies operational knowledge and know-how for a particular characteristic relevant to operations of the wireless node network. For example, the common characteristic may be a particular event (e.g., movement of an item from an open air environment to within a particular closed environment, such as a building), a type of item (e.g., a type of package, a type of content being shipped, a location, a shipment path, etc.), a success rate with a particular item (e.g., successful shipment), and the like. Another example of historic data 575 may include processing information associated with how an item has been historically processed as it is moved from one location to another (e.g., when moving within a particular facility, processing information may indicate the item is on a particular conveyor and may include information about the conveyor (such as speed and how long it is anticipated the item will be on the conveyor)).

Shipment data 580 is generally data related to an item being moved from one location to another location. In one embodiment, shipment data 580 may comprise a tracking number, content information for an item being shipped, address information related to an origin and destination locations, and other characteristics of the item being moved.

Layout data 585 is generally data related to the physical area of one or more parts of an anticipated path. For example, an embodiment of layout data 585 may include building schematics and physical dimensions of portions of a building in which a node may be transiting. An embodiment may further include density information associated with physical areas to be transited and anticipated numbers of potential nodes in those areas as types of layout data. In another example, an embodiment of layout data may include a configuration of how a group of packages may be assembled on a pallet, placed into a shipping container (e.g., a unit load device (ULD)) that helps move a collection of items on various forms with single mode or intermodal transport.

RF data 587 is generally signal degradation information about a signal path environment for a particular type of node and may relate to particular adverse RF conditions that may cause signal fluctuations, interference, or other degradation from the otherwise optimal signal path environment for that type of node. For example, RF data may include shielding effects when using a particular packaging or location, shielding effects when the package is within a particular type of container or assembled as part of a palletized shipment, shielding effects when particular content is shipped, and other physical and electronic interference factors.

Third party data 589 is an additional type of context data 560 that generally includes data generated outside the network. For example, third party data may include weather information associated with particular areas to be transited as the item is moved along an anticipated path from one location to another. Those skilled in the art will appreciate other types of third party data that relate to physical and environmental conditions to be faced by an item being moved from one location to another may also be considered context data 560.

The use of context data, such as context data 560 described above, advantageously helps server 100 better manage movement of items, provide better location determination, enhance intelligent operation and management of different levels of the wireless node network, and provide enhanced visibility to the current location and status of the item during operation of the wireless node network. In one embodiment, server control and management code 525 may provide such functionality that enables the wireless node network to be contextually aware and responsive.

Server Control & Management Code

Generally, server control and management code 525 controls operations of exemplary server 100. In an embodiment, server control and management code 525 is a collection of software features implemented as programmatic functions in code or separate program modules that generally control the behavior of server 100. Thus, exemplary server control and management code 525 may be implemented with several programmatic functions or program modules including, but not limited to, (1) a server-side association manager, which provides a framework for more robust and intelligent management of nodes in the wireless node network; (2) a context-based node manager, which enhances management of nodes in the wireless node network based upon context data; (3) a security manager, which manages secure pairing aspects of node management; (4) a node update manager, which provides updated or different programming for a particular node and shares information with nodes; (5) a location manager for determining and tracking the location of nodes in the network; and (6) an information update manager, which services requests for information related to the current status of a node or generally providing information about a node or collected from a node.

Server-Side Association Manager

The server-side association manager (also referred to as a server-side association management function) is generally a program module in exemplary code 525 that is responsible for intelligently managing the nodes in the wireless node network using a secure information framework. In an embodiment, this framework may be implemented to be a context-driven, learning sensor platform. The framework may also enable a way for information (such as RF scan, location, date/time, and sensor data) to be securely shared across nodes, a way to change the behavior of a node, and for a node to know it is considered "missing." The framework established during operation of the server-side association manager allows the network of nodes to be managed as a system with enhanced and optimized accuracy of determining the physical location of each ID Node. Further information regarding particular embodiments of such an association management framework and methods are explained below in more detail.

Context-Based Association Manager

The context-based node manager is generally a program module in exemplary code 525 that is responsible for incorporating context data as part of management operations to provide an enhanced data foundation upon which visibility of the nodes may be provided. In some embodiments, the context-based node manager may be implemented as part of the server-side association manager while other embodiments may implement the context-based node manager as a separate program module.

In one embodiment, the enhanced data foundation relies upon context data, such as context data 560 (e.g., scan data 570, historic data 575, shipment data 580, layout data 585, and other third party contextual data providing information regarding the conditions and environment surrounding an item and ID node moving from one location to another. Such context data (e.g., the network know-how, building layouts, and operational knowledge of nodes and shipping paths used with the wireless node network) may provide the enhanced building blocks that allow the server 100 to manage tracking and locating of nodes in a robustly enriched contextual environment. In an embodiment, context-based management provides visibility to the system through data analysis for when and how associations should be expected as the nodes travel through the wireless node network. In other embodiments, it may provide the foundation for better understanding RF signal degradation, which can be caused by the operating environment, packaging, package content, and/or other packages related to an item and its ID node.

Security Manager

The security manager module, which may be implemented separately or as part of the association manager module in exemplary server control and management code 525, helps with associating two nodes in the wireless node network by managing aspects of secure pairing of the nodes. In one embodiment, security manager module provides the appropriate pairing credentials to allow a node to securely connect to another node. Thus, when a node desires to connect to another node, an embodiment requires appropriate pairing credentials be generated by the server, provided to the nodes, and observed within the nodes to allow for a successful connection or association of nodes.

In operation, a node (such as master node 110a) identifies the address of the node (such as ID node 120a) to whom it desires to connect. With this address, the node prepares a pairing request and sends the request to the server 110. The server 100 operates under the control of the security manager module of the association manager, and determines whether the requesting node should be connected or otherwise associated with the other node. If not, the server does not issue the requested security credentials. If so and in accordance with the desired association management paradigm set by the association manager of code 525, server provides the requested credentials necessary for a successful wireless pairing and the establishment of secure communications between the associated nodes.

Node Update Manager

The exemplary server control and management code 525 may include a node update manager module that provides updated programming information to nodes within the wireless node network and collects information from such nodes (e.g., shared data 545, sensor data 550). The node update module may be implemented separately or as part of the association manager module in exemplary server control and management code 525.

Providing an update to a node's programming may facilitate and enable distribution of node functions to save power and better manage the nodes as a system. For example, one embodiment may alter the functional responsibility of different nodes depending on the context or association situation by temporarily offloading responsibility for a particular function from one node to another node. Typically, the server directs other nodes to change functional responsibility. However, in some embodiments, a master node may direct other nodes to alter functional responsibility.

Sharing information between nodes and with server (e.g., via an exemplary node update manager) facilitates collecting information from a node and sharing information with other nodes as part of an association management function of server 100. For example, one embodiment may collect and share RF scan data (a type of shared data 545), information about a node's location (a type of location data 555), system information about date/time (another type of shared data 545), and sensor measurements collected from sensor nodes (a type of sensor data 550).

Location Manager

The exemplary server control and management code 525 may include a location manager module that helps determine and track node locations. In a general embodiment, the location of a node may be determined by the node itself (e.g., a master node's ability to determine its own location via location circuitry 475), by a node associated with that node (e.g., where a master node may determine the location of an ID node), by the server itself (e.g., using location information determined by one or more techniques implemented as part of code 525), and by a combined effort of a master node and the server.

In general, an exemplary ID node may be directly or indirectly dependent on a master node to determine its actual physical location. Embodiments may use one or more methodologies to determine node location. For example and as more specifically described below, possible methods for determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. Further information and examples of how an exemplary location manager module may determine a node's location in accordance with such exemplary techniques are provided in more detail below.

Additionally, those skilled in the art will appreciate that it may also be possible to determine what constitutes an actionable location versus actual location based upon contextual information about the item being tracked. For example, a larger item may require relatively less location accuracy than a small item such that operational decisions and status updates may be easier implemented with knowledge of context. If the size of the item is known, the location accuracy can be tuned accordingly. Thus, if a larger item is to be tracked, or if the system's contextual awareness of it is such that lower location accuracy can be used, a stronger signal and thus wider area of scanning may be employed, which may help in situations where RF interference or shielding is an issue.

Information Update Manager

The exemplary server control and management code 525 may include an information update manager module that provides information related to operations of the wireless node network and status of nodes. Such information may be provided in response to a request from a device outside the wireless node network (such as user access device 200). For example, someone shipping an item may inquire about the current status of the item via their laptop or smartphone (types of user access devices), which would connect to server 100 and request such information. In response, the information update manager module may service such a request by determining which node is associated with the item, gathering status information related to the item (e.g., location data, etc.), and provide the requested information in a form that is targeted, timely, and useful to the inquiring entity.

In another example, a user access device may connect to server 100 and request particular sensor data from a particular node. In response, information update manager may coordinate with node update manager, and provide the gathered sensor data 545 as requested to the user access device.

Node Filtering Manager

An embodiment of exemplary server control and management code 525 may optionally comprise a node filtering manager, which helps manage the traffic of nodes with a multi-level filtering mechanism. The filtering essentially sets up rules that limit potential associations and communications. An example of such a node filtering management may define different levels or modes of filtering for a master node (e.g., which ID nodes can be managed by a master node as a way of limiting the communication and management burdens on a master node).

In one example, a "local" mode may be defined where the ID node only communicates and is managed by the assigned master node at the location where the last wireless node contact back to server 100 and/or where third party data indicates the assigned master node and ID node are in physical and wireless proximity. Thus, for the "local" mode of traffic filtering, only the assigned master node communicates and processes information from a proximately close and assigned ID node.

Moving up to a less restrictive filtering mode, a "regional" mode of filtering may be defined where the ID node may communicate and be managed by any master node at the location last reported back to server 100 and/or where third party data indicates the ID node is located. Thus, for the "regional" mode of traffic filtering, any master node near the ID node may communicate and process information from that ID node. This may be useful, for example, when desiring to implement a limit on associations and pairings to within a particular facility.

At the least restrictive filtering mode, a "global" mode of filtering may be defined as essentially system-wide communication where the ID node may be allowed to communicate and be managed by any master node. In other words, the "global" mode of traffic filtering allows any ID node within the wireless node network to communicate information through a particular master node near the ID node may communicate and process information from that ID node.

Thus, with such exemplary filtering modes, an ID node in a certain condition (e.g., distress, adverse environmental conditions, adverse conditions of the node, etc.) may signal the need to bypass any filtering mechanism in place that helps manage communications and association by using the "Alert" Status Flag. In such an example, this would operate to override any filtering rules set at the Master Node level in order to allow an ID node to be "found" and connect to another node.

Thus, exemplary server 100 is operative, when executing code 525 and having access to the types of data described above, to manage the nodes, collect information from the nodes, store the collected information from the nodes, maintain or have access to context data related to the environment in which the nodes are operating, and provide information about the nodes (e.g., status, sensor information, etc.) to a requesting entity.

Node Communication & Association Examples

Figure 22B:
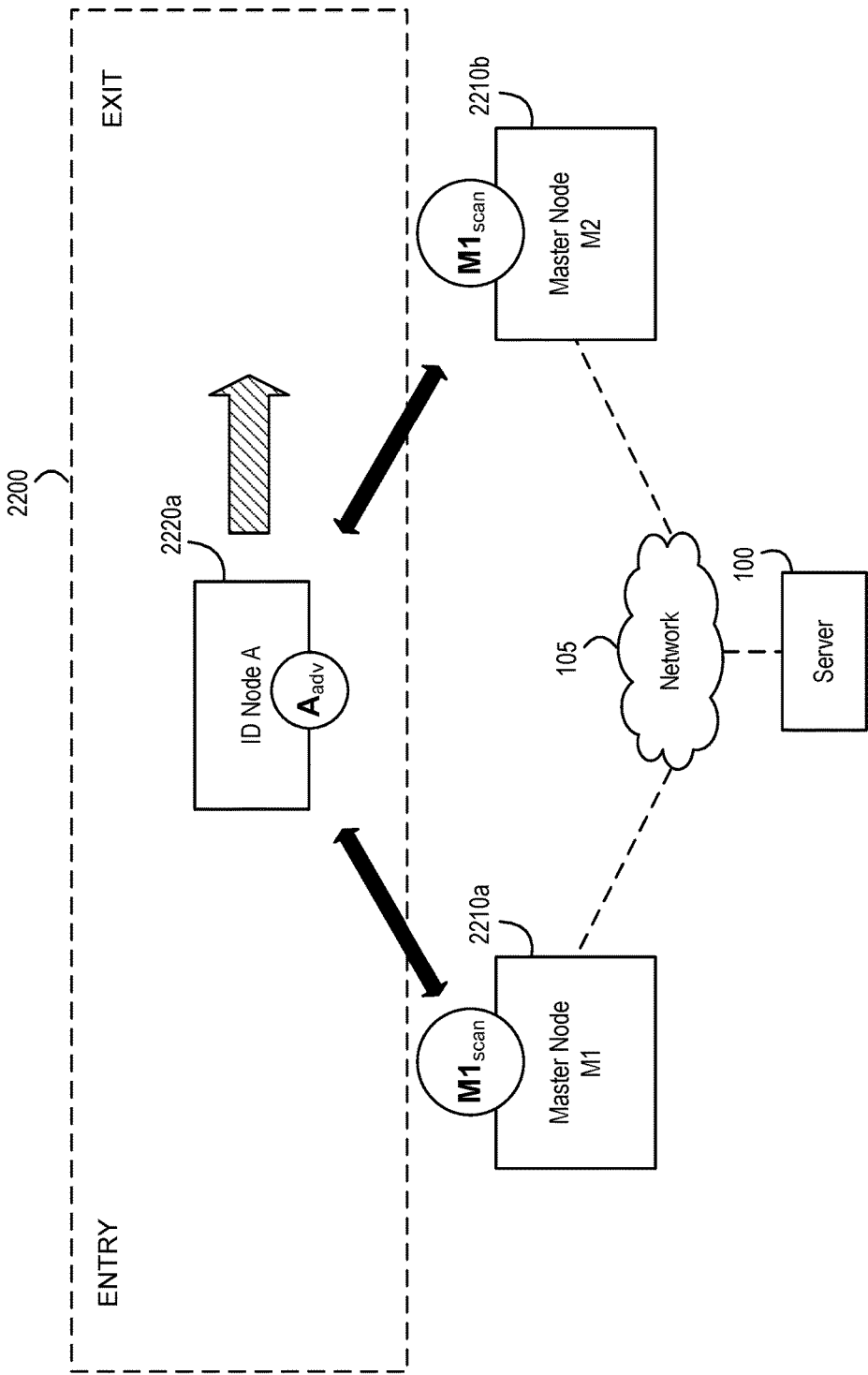
Figure 22C:
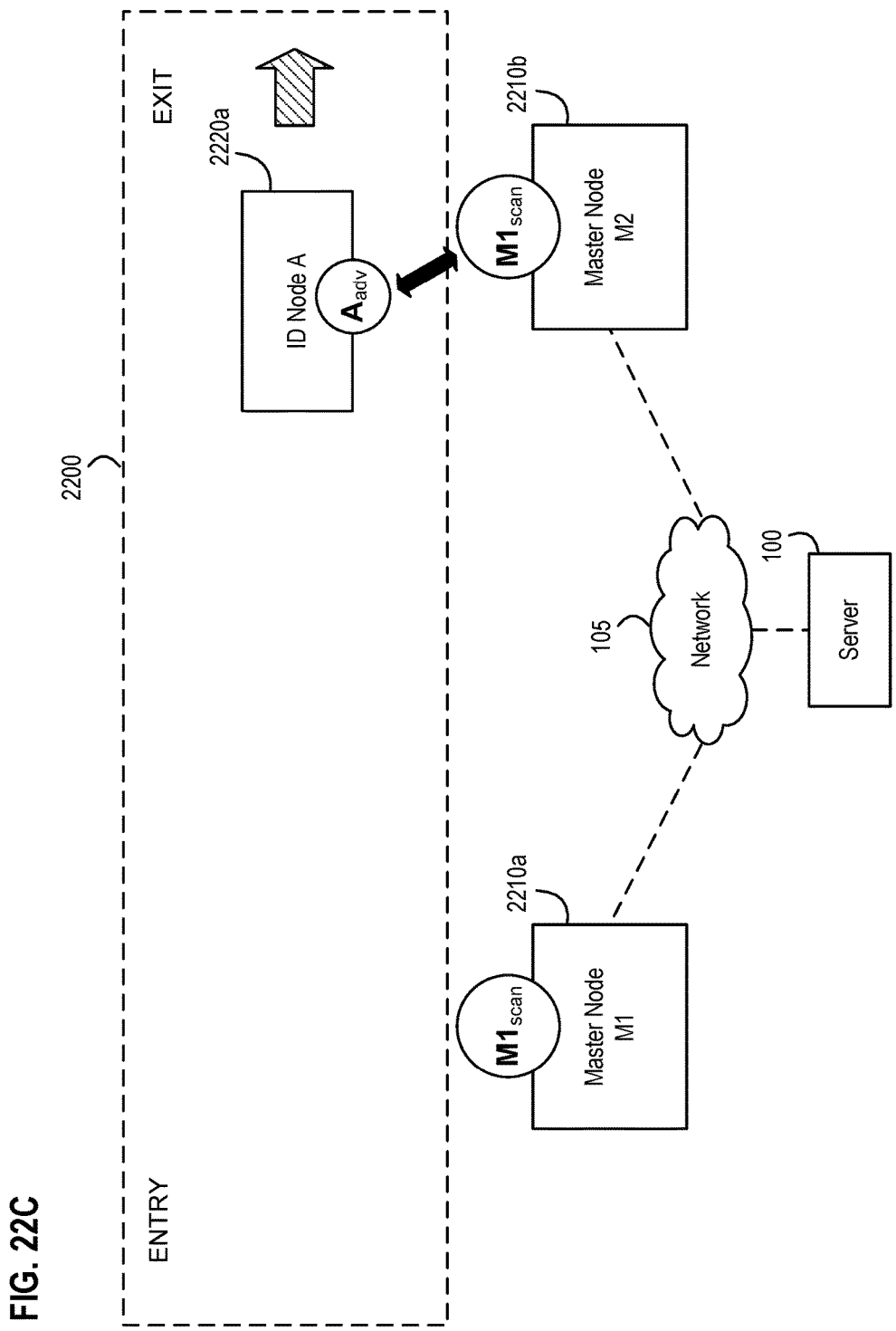

To better illustrate how exemplary management and communication principles may be implemented within an exemplary wireless node network, FIGS. 8-12 provide several examples of how exemplary components of the wireless node network may generally communicate (advertising & scanning), associate, and exchange information during different types of operations in various embodiments. FIGS. 22A-C also provide a more detailed application of such exemplary association and communication activities when an exemplary ID node moves along a transit path (e.g., through a corridor) and is tracked and managed by different master nodes and a server in an embodiment.

Node Advertising Cycle Example

As generally explained above, a node may have several different types of advertising states in which the node may be connectable with other nodes and may communicate with other nodes. And as a node moves within a wireless node network, the node's state of advertising and connection may change as the node disassociates with a previously connected node, associates with a new node, or finds itself not associated with other nodes. In some situations, a node may be fine and in normal operation not be connected or associated with another node. However, in other situations, a node may raise an issue with potentially being lost if it has not connected with any other node in a very long period of time. As such, a node may go through different types of advertising states in these different operational situations.

Generally, a node may be in a state where it is not connectable with other nodes for a certain period of time (also referred to as a non-connectable interval). But later, in another state, the node may want to be connected and advertises as such for a defined connectable period (also referred to as a connectable interval). As the node advertises to be connected, the node may expect to be connected at some point. In other words, there may be a selectable time period within which a node expects to be connected to another node. However, if the node is not connected to another node within that period of time (referred to as an Alert Interval), the node may need to take specific or urgent action depending upon the circumstances. For example, if a node has not been connected to another node for 30 minutes (e.g., an example alert interval), the node may change operation internally to look "harder" for other nodes with which to connect. More specifically, the node may change its status flag from an Alert Level 0 (no issue, operating normal) to Alert Level 2 in order to request that any available master node acknowledge receipt of the advertisement packet broadcasted by the node seeking a connection.

Figure 8:
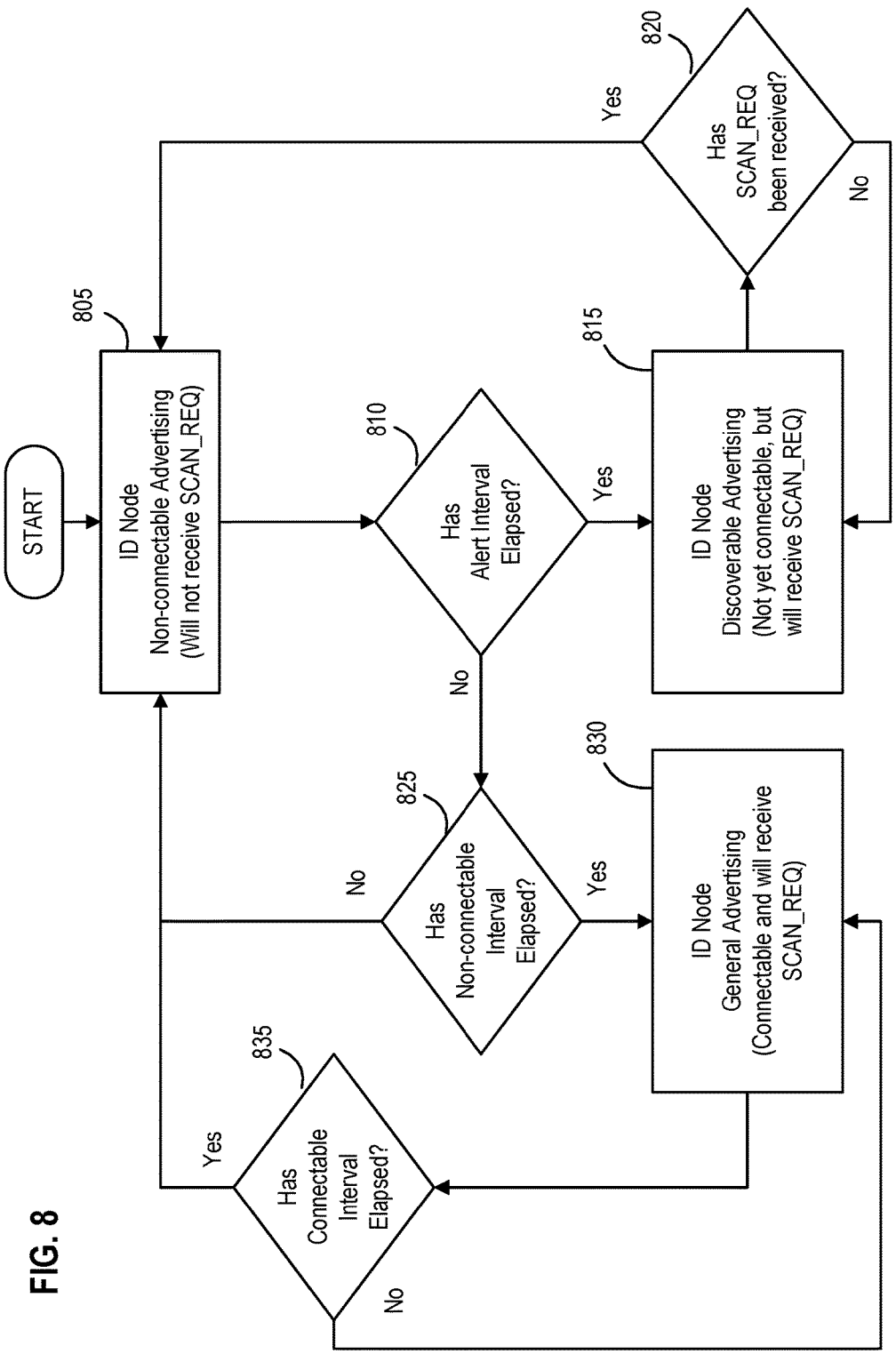
FIG. 8 is a state diagram illustrating exemplary states and transitions between the states as part of operations by an exemplary node in a wireless node network in accordance with an embodiment of the invention.

FIG. 8 is a diagram illustrating exemplary advertising states (or information exchange and node connectability states) and factors involved in transitions between the states by an exemplary ID node in a wireless node network in accordance with an embodiment of the invention. Referring now to FIG. 8, three exemplary states for a node are illustrated as part of an exemplary advertising cycle for the node—namely, an ID Node Non-Connectable Advertising state 805, an ID Node Discoverable Advertising state 815, and an ID Node General Advertising state 830. Transitions between these states will depend on factors related to expirations of the types of intervals described above. In an embodiment, the duration of each of these intervals will depend upon the system implementation and the contextual environment within which the ID node is operating. Such time intervals may, for example, be set by server 100 as part of data (e.g., profile data, association data, context data) provided to the node when updating the node and managing operations of the node.

Referring to the example illustrated in FIG. 8, an exemplary ID node may have an alert interval set at, for example, 30 minutes, and be in ID Node Non-Connectable Advertising state 805 with a non-connectable interval set at 5 minutes. In state 805, the ID node may broadcast or advertise, but is not connectable and will not receive a SCAN_REQ message (a type of request for more information sent to the advertising node from another node). Thus, the ID node in state 805 in this example may advertise in a non-connectable manner for at least 5 minutes but expects to be connected within 30 minutes.

If the alert interval has not yet elapsed (factor 810) and the non-connectable interval is still running (factor 825), the ID node simply stays in state 805. However, if the alert interval has not elapsed (factor 810) and the non-connectable interval elapses (factor 825), the ID node will enter a mode where it wants to try to connect to another node for a period of time (e.g., a 1 minute connectable interval) and will move to the ID Node General Advertising state 830 in the exemplary advertising cycle of FIG. 8. In state 830, as long as the connectable interval is running, the ID node will stay in this state where it is connectable to another node and will receive SCAN_REQ types of requests from other nodes in response to the advertising packets the ID node is broadcasting. However, when the connectable interval (e.g., the 1 min period) elapses or expires (factor 835), the ID node returns back to the Non-connectable Advertising state 805 for either the next time the non-connectable interval elapses (and the ID node again tries to connect in state 830) or the alert interval finally elapses (and the ID node finds itself in a situation where it has not connected to another node despite its efforts to connect in state 830).

When the alert interval finally elapses (factor 810), the ID node moves to the ID Node Discoverable Advertising state 815. Here, the ID node is not yet connectable but will receive a SCAN_REQ type of request from other nodes in response to advertising packets the ID node is broadcasting. In this state 815, the exemplary ID node may alter its status flag to indicate and reflect that its alert interval has expired and that the node is now no longer in normal operation. In other words, the ID node may change the status flag to a type of alert status being broadcasted to indicate the ID node urgently needs to connect with another node. For example, the status flag of the advertising packet broadcast by the ID node may be changed to one of the higher Alert Levels depending on whether the node needs to upload data (e.g., Alert Level 3 status) or synchronize timer or other data with another node (e.g., Synchronize status). With this change in status flag, and the ID node in state 815 broadcasting, the ID node awaits to receive a request from another node that has received the broadcast and requested more information via a SCAN_REQ message (factor 820) sent to the ID node from that other node. Once a SCAN_REQ message has been received by the ID node (factor 820), the ID node that went into the alert mode because it had not connected with another node within the alert interval can connect with that other node, upload or share data as needed, and then shift back to state 805 and restart the alert interval and non-connectable intervals.

Master Node to ID Node Association Example

Advertising (broadcasting) and scanning (listening) are ways nodes may communicate during association operations. FIGS. 9-12 provide examples of how network elements of a wireless node network (e.g., ID nodes, master nodes, and a server) may communicate and operate when connecting and associating as part of several exemplary wireless node network operations.

Figure 9:
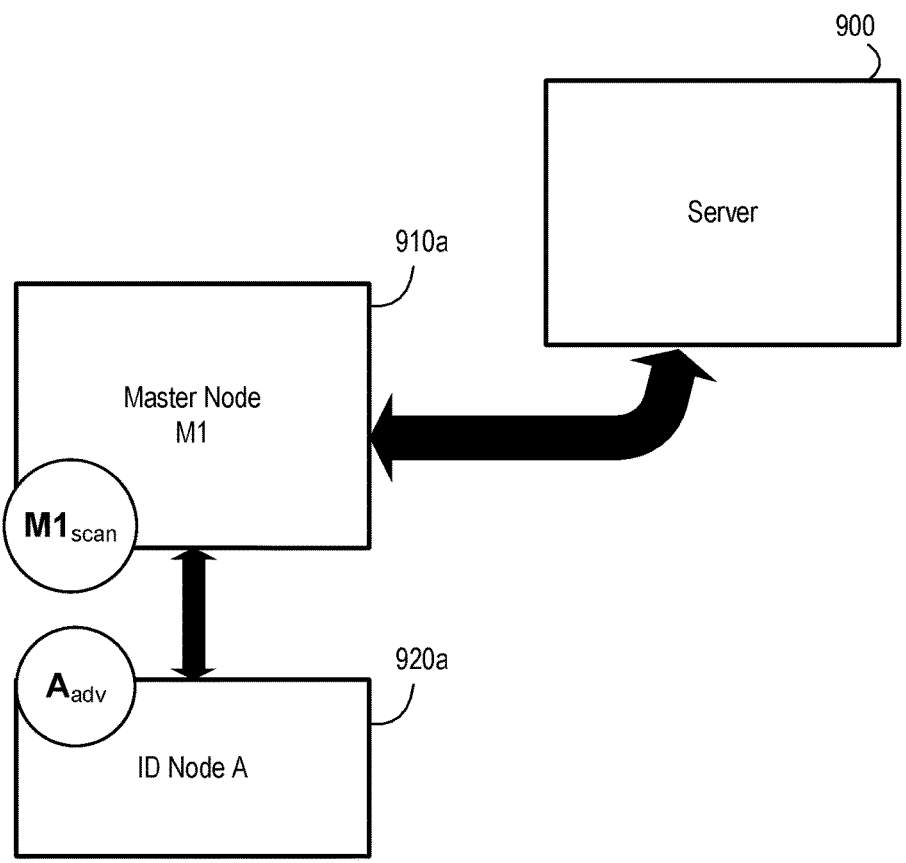
FIG. 9 is a diagram illustrating exemplary components of a wireless node network during an exemplary master-to-ID node association in accordance with an embodiment of the invention.

FIG. 9 is a diagram illustrating exemplary components of a wireless node network during an exemplary master-to-ID node association in accordance with an embodiment. Referring now to FIG. 9, exemplary master node M1 910a is illustrated within communication range of exemplary ID node A 920a. Master node M1 910a also has a communication path back to server 900. As shown, master node M1 910a is in a scanning or listening mode (e.g., indicated by the "M1$_{scan}$" label) while ID node A 920a is in an advertising or broadcasting mode (e.g., indicated by the "A$_{adv}$" label). In this example, M1 master node 910a has captured the address of ID node A 920a through A's advertising of at least one advertising data packet, and has reported it to the server 900. In this manner, the capturing and reporting operations effectively create a "passive" association between the nodes and proximity-based custodial control. Such an association may be recorded in the server, such as server 900, as part of association data, such as association data 540.

In another embodiment, passive association between a master node and ID node may be extended to an "active" association or connection. For example, with reference to the embodiment shown in FIG. 9, server 900 may instruct master node M1 910a to associate, connect, or otherwise pair with ID node A 920a, and forwards the required security information (e.g., PIN credentials, security certificates, keys) to master node M1 910a. Depending on the advertising state of ID node A 920a, ID node A 910a may only be visible (discoverable) but not connectable. In such a situation, the master node M1 910a must wait until ID node A 920a is in a connectable state (e.g., the ID Node General Advertising state) and can be paired. As discussed above with reference to FIG. 8, each ID node has a certain time window during each time period where it can be paired or connected.

In this example, when the ID node A 920a is successfully paired with master node M1 910a, ID node A 920a may no longer advertise its address. By default, only an unassociated device will advertise its address. A paired or associated node will only advertise its address if instructed to do so.

ID Node to ID Node Association Example

Figure 10:
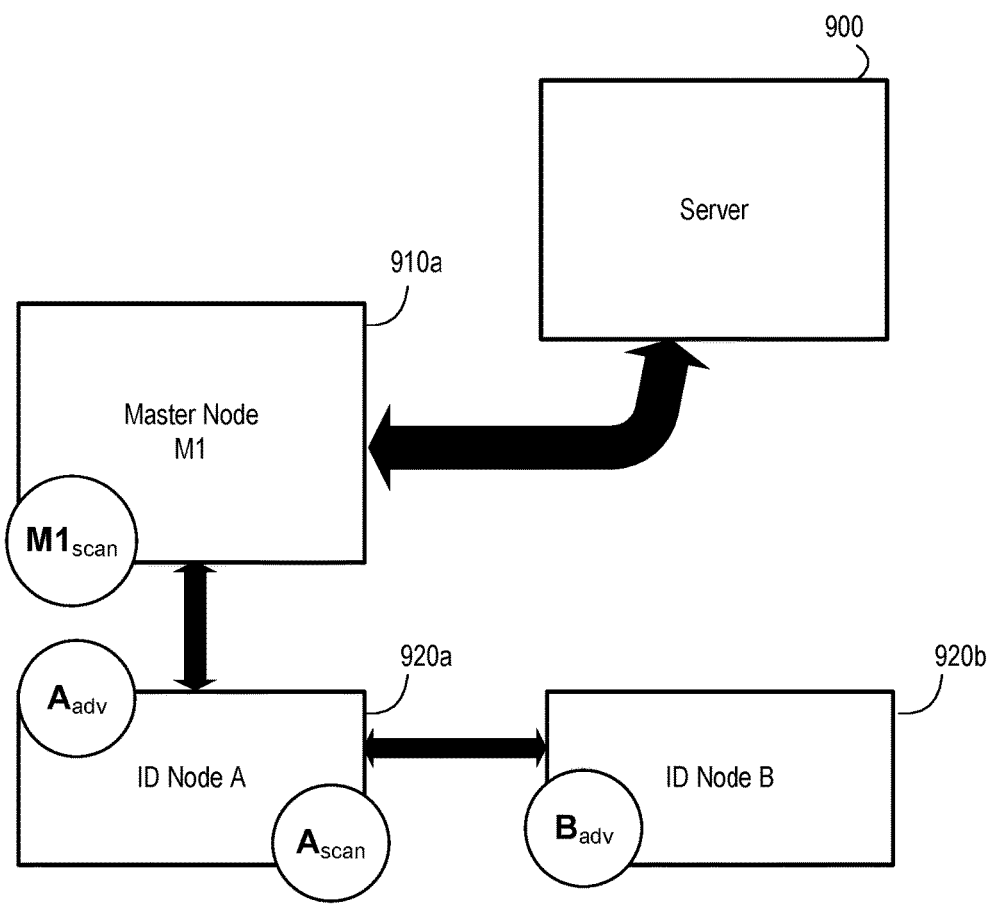
FIG. 10 is a diagram illustrating exemplary components of a wireless node network during an exemplary ID-to-ID node association in accordance with an embodiment of the invention.

In various embodiments, an ID node may associate with or connect to other ID nodes. FIG. 10 is a diagram illustrating exemplary components of a wireless node network during an exemplary ID-to-ID node association in accordance with an embodiment of the invention. Referring now to FIG. 10, exemplary master node M1 910a, ID node A 920a, and server 900 are similarly disposed as shown in FIG. 9, but with the addition of ID node B 920b, which is within communication range of ID node A 920a. In this example, ID node A 920a is running in query (scan) mode (e.g., A$_{scan}$) listening for ID node B 920b. When ID node A 910a detects ID node B 920b advertising (e.g., B$_{adv}$) with one or more advertising data packets as part of an advertised message from ID node B 920b, ID node A 920a identifies a status flag from the message indicating ID node B 920b has, for example, data (e.g., sensor data 350) for upload. As a result, ID node A 920a logs the scan result (e.g., as a type of association data 340) and, when next connected to master node M1 910a, ID node A 920a uploads the captured scan log information to the server 900. In this manner, the ID node scanning, capturing, and reporting operations effectively create a "passive" association between the different ID nodes. Such a passive association may be recorded in the server 900 as part of association data 540.

In another embodiment, passive association between two ID nodes may be extended to an "active" association or connection. For example, with reference to the embodiment shown in FIG. 10, based upon the captured status flag and uploaded information about ID node B 920b under that mode, the server 900 may issue a request to ID node A 920a through master node M1 910a to actively connect or pair with ID node B 920b for the purpose of downloading information from ID node B 920b. In one example, security credentials that authorize the active connection between ID node A 920a and ID node B 920b are downloaded to ID node A 920a from master node M1 910a, which received them from server 900. In another example, the requisite security credentials may have been pre-staged at ID node A 920a. And rather than rely upon an ID node to ID node connection, master node M1 may have connected directly with ID node B 920b if M1 was within communication range of ID node B 920b.

Information Query ID Node to Master Node Example

Figure 11:
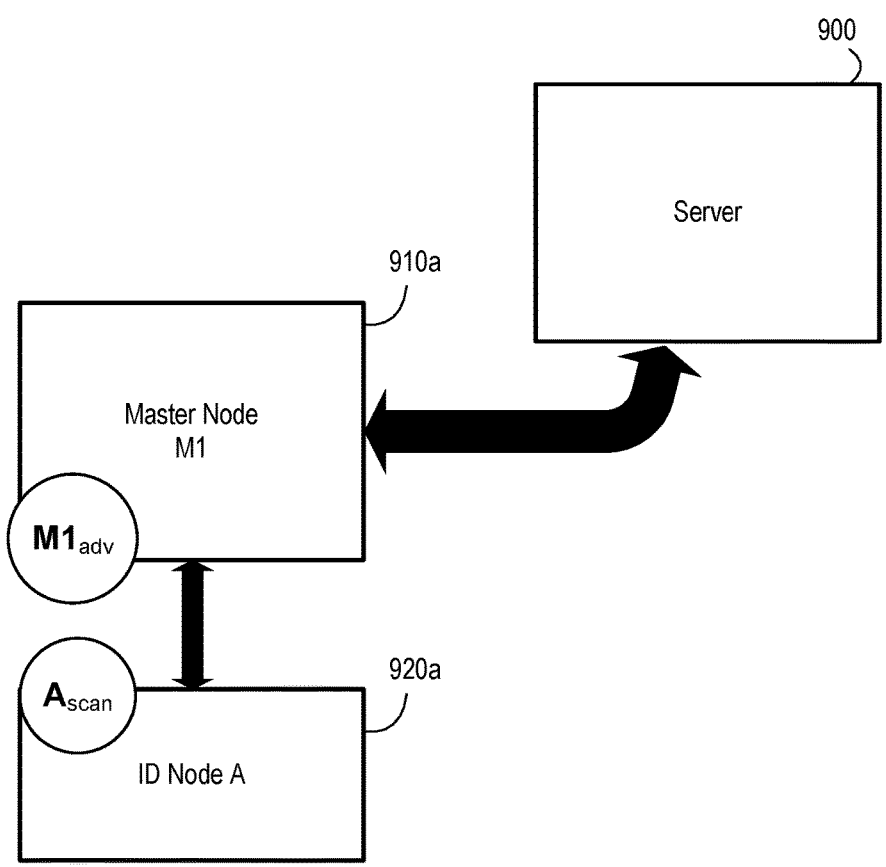
FIG. 11 is a diagram illustrating exemplary components of a wireless node network during an exemplary ID-to-master node query in accordance with an embodiment of the invention.

An exemplary ID Node may also issue queries to other nodes, both master nodes and ID nodes. FIG. 11 is a diagram illustrating exemplary components of a wireless node network during an exemplary ID-to-master node query in accordance with an embodiment of the invention. Referring now to FIG. 11, a similar group of nodes as shown in FIG. 9 appears, except that exemplary master node M1 910a is in an advertising or broadcasting mode (e.g., M1$_{adv}$) while ID node A 920a is in a scanning mode (e.g., A$_{scan}$). In this configuration, ID node A 920a may query master node M1 910a for information. In one embodiment, the query may be initiated through the ID node setting its status flag. The requested information may be information to be shared, such as a current time, location, or environmental information held by the master node M1 910a.

In a passive association example, ID node A 920a in A$_{scan}$ mode may have captured the address of master node M1 910a. However, since an ID node cannot directly connect to the server 900 to request pairing security credentials (e.g., security pin information that authorizes an active connection between ID node A 920a and master node M1 910a), a passive association and corresponding pairing will have been initiated from the master node. In another example, it may be possible for ID node A 920a to have the pairing credentials stored as security data 335 from a previous connection. This would allow ID node A 920a then to initiate the active association with master node M1 910a after a passive association.

Alert Level Advertising Example

Figure 12:
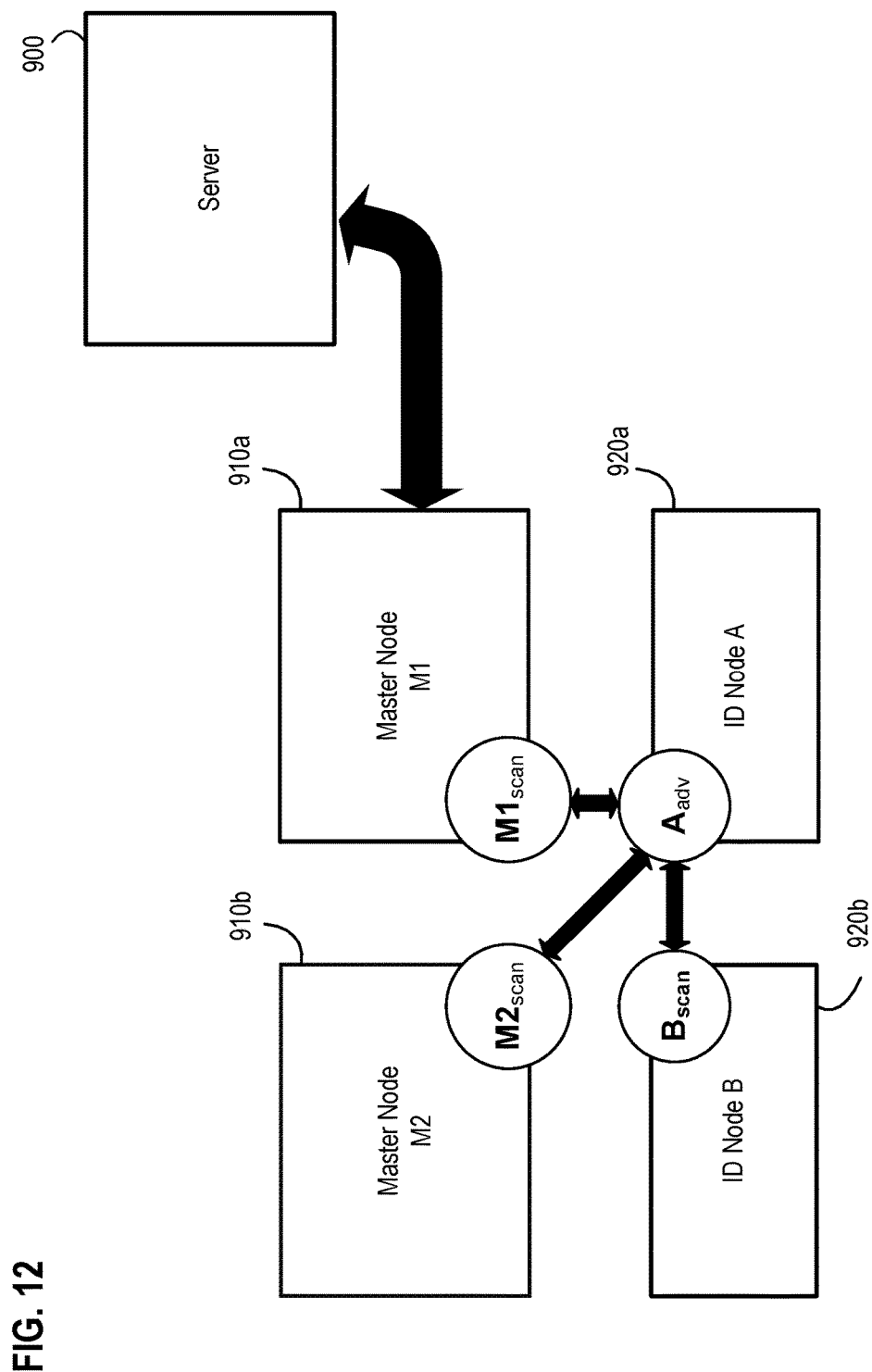
FIG. 12 is a diagram illustrating exemplary components of a wireless node network during an exemplary alert advertising mode in accordance with an embodiment of the invention.

As previously noted, a node may enter an alert stage or level in one or more embodiments. For example, if a node has not received an acknowledgement from a master node for an advertising packet within a set period (e.g., an Alert Interval as described in some embodiments), the node will enter a particular alert stage for more specialized advertising so that it may be "found" or pass along information. FIG. 12 is a diagram illustrating exemplary components of a wireless node network during an exemplary alert advertising mode in accordance with an embodiment of the invention. Referring now to FIG. 12, a similar group of nodes as shown in FIG. 9 appears, with the addition of another master node (master node M2 910b) and another ID node (ID node B 920b). Exemplary ID node A 920a is in an advertising or broadcasting mode (e.g., $A_{adv}$) while nodes M1, M2, and B are each in scanning mode (e.g., $M1_{scan}$, $M2_{scan}$, and $B_{scan}$). In this example and configuration as shown in FIG. 12, the status flag in an advertising message from ID node A 920a has been set to a particular alert level (e.g., Alert Level 2) in the header of the message, requesting any nearby master node to acknowledge it. In one example, this mode may be entered if ID node A 920a has not connected with another node for a set period or time. In another example, ID node A 920a may enter this specialized advertising mode upon received instructions (e.g., from server 900 or another nearby node) or a triggered condition (other than time), such as when a sensor input (such as light) is detected or otherwise registered and the node issues continuous updates of its address as a security feature. The ID node A 920a set at this alert level and in this specialized advertising mode is thus set in an active pairing mode, waiting for pairing credentials.

From a passive association perspective, any node in scanning mode can passively associate with such an advertising node (e.g., ID node A 920a in this alert mode). Thus, in an embodiment, the Alert Level 2 status flag in the advertising header broadcast by ID node A 920a indicates that urgent and active intervention is requested, rather than merely passively associate without an active connection.

From an active association perspective, any node that uploads the special advertising header of ID node A 920a may be forwarded the security credentials from the server 900. This would allow for the node receiving such credentials to actively associate or pair with ID node A 920a.

While FIG. 8 provides examples of how a node may advertise, and FIGS. 9-12 provide examples of how different exemplary devices (e.g., ID nodes, master nodes, and a server) may advertise and associate in different ways, FIGS. 22A-C provide a progressive set of illustrations that expand upon how associating and disassociating may be applied within an exemplary wireless node network. More specifically, FIGS. 22A-C show how associations and disassociations may occur when an exemplary ID node is tracked and managed by a server and different master nodes as the ID node moves through an exemplary transit path in accordance with an exemplary embodiment of the invention.

Referring now to FIG. 22A, a structure 2200 is shown having an entry and exit point. In one example, the structure 2200 may be a corridor or another part of a building or facility. In another example, structure 2200 may be a conveyor system that transports an item and its ID node from the entry point to the exit point. Master node M1 2210a is located near the entry point of structure 2200 while master node M2 2210b is located near the exit point. Those skilled in the art will appreciate that other master nodes may be disposed at additional points in structure 2200, but are not shown for sake of convenience and to simplify the association hand-off explanation that follows. Server 100 is operatively connected to each of master node M1 2210a and master node M2 2210b via network 105.

In one embodiment, server 100 has access to context data 560 related to the structure 2200, such as layout data 585 on dimensions and materials making up structure 2200. Context data 560 may include historic data 575 on how an ID node has operated and successfully been tracked as it traverses structure 2200 from the entry point to the exist point. For example, server 100 may have context data indicating structure 2200 is a conveyor that can transport an item and its ID node from the entry point to the exit point over a distance of 800 feet. The context data may further indicate typical items are moved at a certain speed on the conveyor of structure 2200 and a nominal time from the entry point to the exit point may be about 5 minutes. Thus, the server 100 has access to context data about the environment within with an ID node is operating and may leverage this to better and more accurately manage the ID node.

In FIG. 22A, ID node A 2220a is shown entering the structure 2200 at the entry point. Here, ID node A 2220a may be advertising in hopes of connecting with a master node as it enters structure 2200 with, for example, a non-connectable interval of 10 seconds with a connectable interval of 5 seconds. In this example, the server 100 knows that ID node A 2220a is located near the entry point and anticipates that ID node A 2220a should be coming near to master node M1 2210a at the entry point. Thus, server 100 may set the connectable and non-connectable intervals accordingly so as to provide a sufficient opportunity for ID node A 2220a to connect to the next master node along the predicted path of the ID node and in accordance with the speed of travel.

Additionally, server 100 may set the alert interval to 1 minute in this context. Here, if ID node A 2220a is not connected to another node within 1 minute, ID node A 2220a may broadcast or advertise with a message having a changed status flag that indicates an alert status so that ID node A 2220a can connect to a broader range of other nodes that see it is urgent for ID node A 2220a to connect and, essentially, be found. Depending on the context (e.g., the type of conveyor, the speed of the conveyor, the density of nodes near the entry point, etc.), those skilled in the art will appreciate that the server 100 can adjust the advertising cycle intervals to better accommodate the ID node's current environment.

When master node M1 2210a is scanning (listening), it may initially detect an advertising packet from ID node A 2220a during node A's non-connectable interval. But when ID node A 2220a changes advertising states and broadcasts as a connectable node in the general advertising state (i.e., during the connectable interval), master node M1 2210a may respond with a SCAN_REQ that acknowledge receipt of the broadcasted message and asks for further information from ID node A 2220a. Master node M1 2210a receives the requested information from ID node A 2220a, and then communicates with the server 100 to notify the server of its passive association with ID node A 2220a. Server 100 determines if active association is desired, and may authorize the active association between master node M1 2210a and ID node A 2220a by sending security credentials to master node M1 2210a, which allow the nodes to securely connect and share information. And master node M1 2210a may determine the location of ID node A 2220a (or server 100 may do so by directing master node M1 and/or ID node A), and provide the location of ID node A 2220a to server 100. Thus, server 100 is able to manage and track the location of ID node A 2220a as it enters structure 2220 via at least association.

In FIG. 22B, ID node A 2220a has traversed down part of the transit path through structure 2200 while remaining associated with master node M1 2210a. However, at some point master node M1 2210*a* and ID node A 2220*a* are disassociated at the direction of server 100 (or when they can no longer communicate). In one example where ID node A 2220*a* is on the conveyor within structure 2200, server 100 may instruct ID node A 2220*a* to go to a low power mode for a particular period of time in order to, for example, conserve ID node power. In another example, the low power mode may also provide better location accuracy. As the server 100 has access to the context data, the server 100 may know that ID node A 2220*a* was associated with master node M1 2210*a* near the entry point at a given time, and determine that ID node A 2220*a* will not be near the exit point until the end of the particular period of time. With the ID node A 2220*a* programmed this way, once the particular period elapses, the ID node A 2220*a* should be near the exit point and may again be placed into a normal operation mode so that it can seek to connect with master node M2 2210*b*.

Similar to the association process discussed with respect to ID node A and master node M1, ID node A 2220*a* and master node M2 2210*b* may be associated as ID node A 2220*a* approaches master node M2 2210*b* near the exit point. Once connected, the node locations and association data are updated on the server 100. And as ID node A 2220*a* continues to move through structure 2200, ID node A 2200*a* may arrive at the exit point as shown in FIG. 22C, where the node locations and association data are updated once again on the server 100.

Those skilled in the art will appreciate how such principles may be applied to further movements of an ID node as it is handed off (e.g., via active/passive associations and disassociations) between other master nodes and keeping track of these associations and node locations on the server 100. Additionally, as server 100 tracks and monitors associations, disassociations, and contextual environmental operations, server 100 essentially learns how to better use context information better track nodes, manage power used by ID nodes, and enhance accuracy for locations.

Those skilled in the art will also appreciate the general tradeoff with a level of RF power level and accuracy of location. If a node's RF power level is set high, it may advertise and connect with other nodes a longer distance away. But at such a high power level setting, the ability for the system to discriminate between and locate different nodes may be a challenge.

Association Management within a Wireless Node Network

As explained above in general, management of nodes may rely upon associations created and tracked between nodes. In some embodiments, the association relied upon may be an active association where the server expressly authorizes an active connection between nodes. In other embodiments, the association relied upon may be a passive association where the master node (a type of managing node) is associated with the other node, but not actively connected to the other node. By virtue of the passive association, the server may be able to keep track of and manage the other node without requiring an active association. Thus, those skilled in the art will appreciate that in still other embodiments, associations relied upon by the server for managing a wireless node network may include both active and passive associations and may be generally authenticated or, more specially, authorize a secure connection that has a degree of protection for the connection and communications using that connection.

Figure 23:
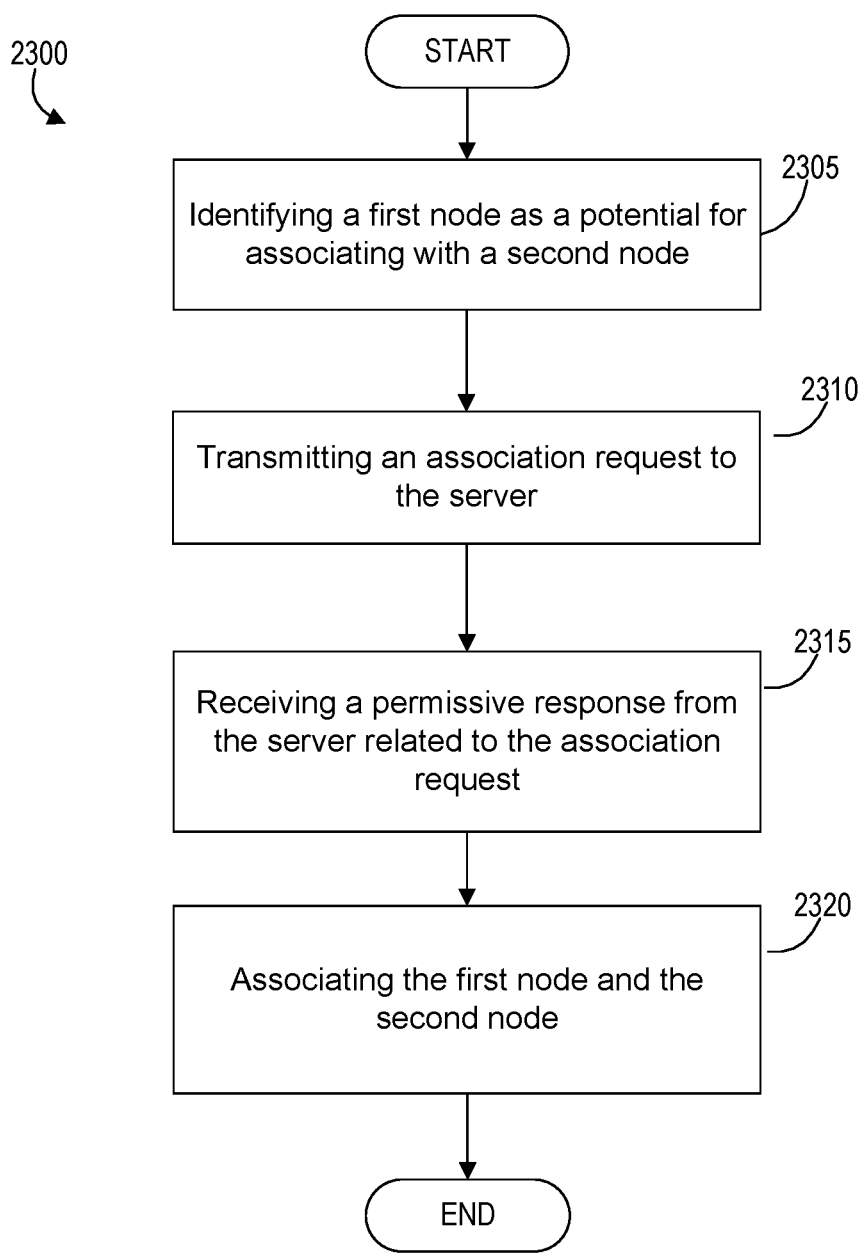
FIG. 23 is a flow diagram illustrating an example method for association management of a wireless node network in accordance with an embodiment of the invention.
Figure 24:
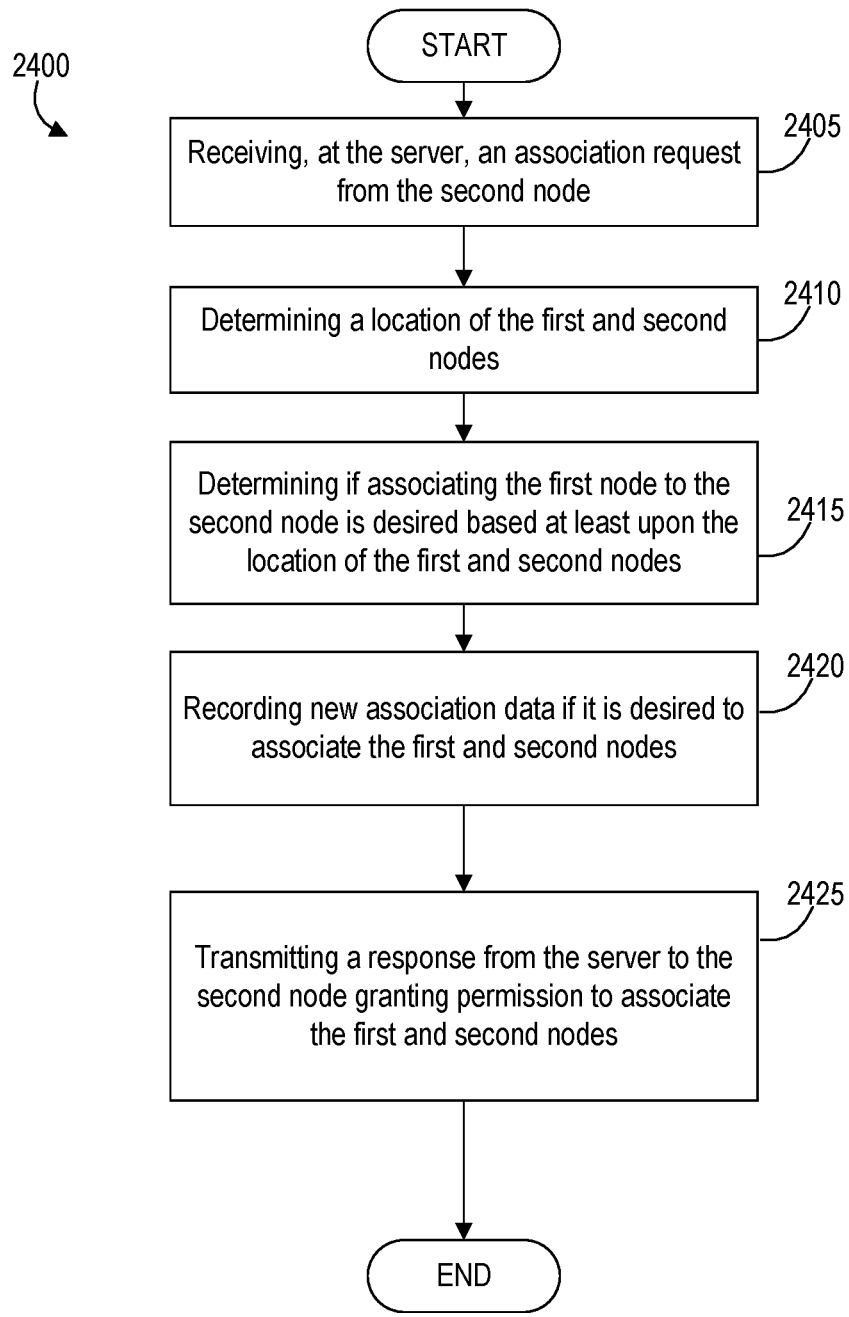
FIG. 24 is a flow diagram illustrating another example method for association management of a wireless node network in accordance with an embodiment of the invention.
Figure 25:
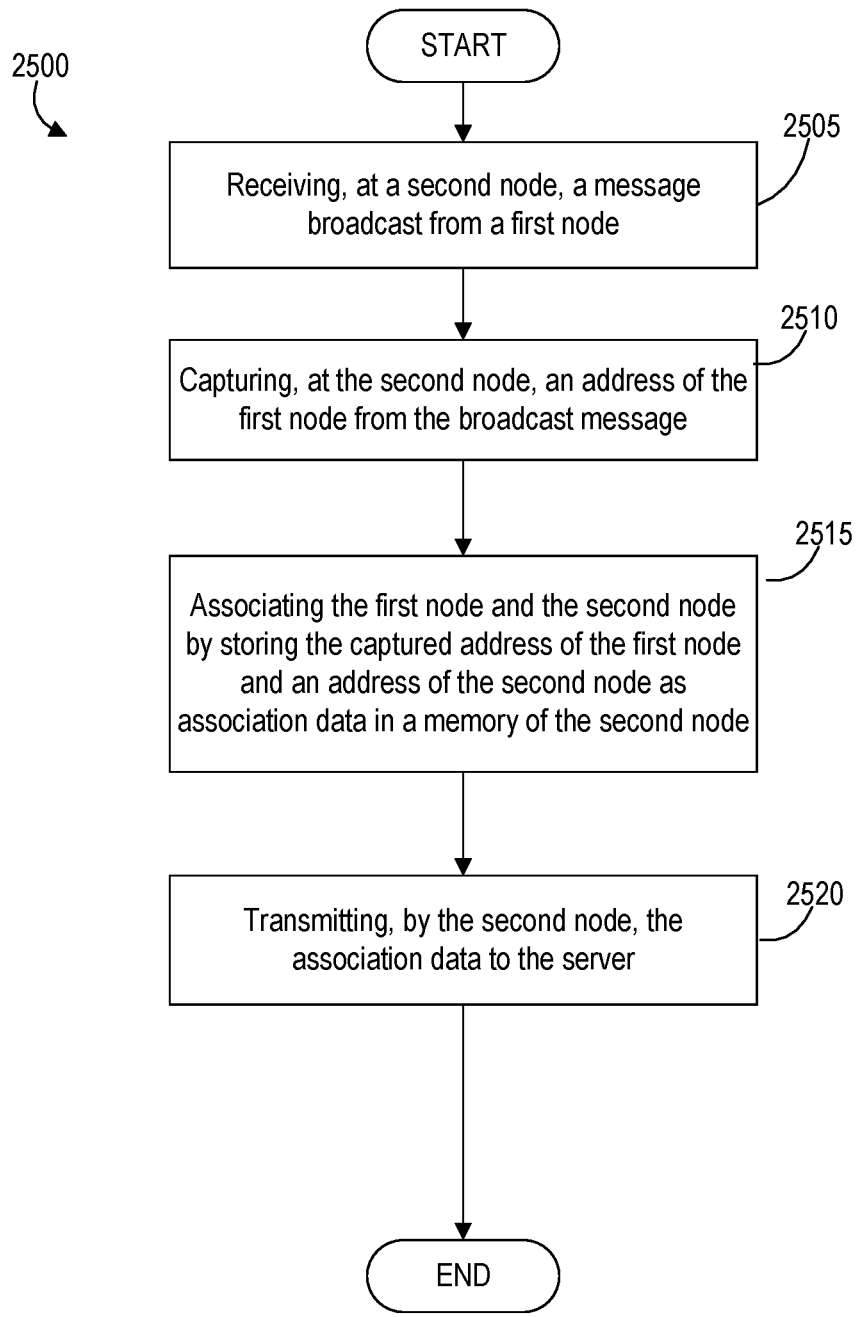
FIG. 25 is a flow diagram illustrating yet another example method for association management of a wireless node network in accordance with an embodiment of the invention.

FIGS. 23-25 provide flow diagrams of exemplary methods for association management of a wireless node network having at least a plurality of nodes and a server in accordance with different embodiments of the present invention involving active and passive association examples. Those skilled in the art will appreciate that each of these exemplary methods for association management of a wireless node network may be implemented by instructions stored on a non-transitory computer-readable medium, which when executed perform the steps of the respective methods described below (e.g., methods 2300, 2400, and 2500) and the described variations of those methods.

Referring now to FIG. 23, method 2300 begins by identifying a first node as a potential for actively associating with a second node at step 2305. In one example, identifying the nodes for association may involve reviewing a message sent by the first node to determine status information related to the first node, and analyzing the status information to determine whether the first node should be associated with the second node. In a further example, the status information may comprise one of a plurality of different status levels indicating whether the first node is requesting a connection to the second node when at that particular status level.

Next, an association request is transmitted to the server in step 2310. In one example, the association request may identify the first node and second node to be associated and may request transmission of one or more appropriate security credentials (e.g., PIN credentials, security certificates, keys, and the like) that may be used by the nodes to enable the first and second node to securely connect and share data as part of associating. An embodiment may request only one credential as an authorization credential from the server. Other embodiments may use two credentials where one may be later uses as a credential with which to reply to challenges. For example, if an ID node is challenged, the ID node may send a reply authorization credential so that the master node can confirm the response and supply the ID node with the appropriate security credential for the authorized association. In some cases, an ID node may have been supplied with such a reply authorization credential (also generally referred to as a key) by the server.

At step 2315, the second node receives a permissive response from the server related to the association request. In an example, the permissive response may include receiving a first authorization credential and a second authorization credential from the server (which may be stored on the nodes). As such, the first authorization credential and the second authorization credential may be created by the server as a type of security data, and may be provided to authorize connecting the first node and the second node and securely sharing information between the first node and the second node.

With this authorization from the server, the first node and second node may be associated at step 2320. In one example, the method 2300 may associate the nodes by establishing an authorized connection from the second node to the first node based upon the authorization credential. And the method 2300 may securely provide shared data between the first node and the second node according to a profile established by the server after the first and second nodes are associated.

In an embodiment, the method 2300 may also comprise having the second node gaining responsibility for a task after the second node is associated with the first node when responsibility for the task was previously with the first node. For example, when the second node is powered by an external power source and the first node is powered by a battery, this may advantageously shift the responsibility to a node that is better suited to perform the task (e.g., has more power available or has a power source that does not need recharging or replacing).

FIG. 24 is a flow diagram illustrating another example method for association management of a wireless node network in accordance with an embodiment of the invention from the perspective of the server. Referring now to FIG. 24, method 2400 begins with the server receiving an association request sent from a second of the nodes at step 2405. The association request asks for permission to associate a first of the nodes to the second node.

At step 2410, the server determines a location (actual or relative) of the first node and second node. In one embodiment, the server may receive location data for the second node. For example, when the second node is a master node, the location data for the second node may be GPS coordinates for the current location of the master node, which provides this to the server. And in an embodiment, the server may determine a location of the first node using at least one of a plurality of location methods available to the server for locating the first node, such as those discussed in detail above (or a combination of such methods so that a more refined location of the first node is determined).

At step 2415, the server determines if associating the first node to the second node is desired based at least upon the location of the first node and the location of the second node. In one embodiment, it may be determined if associating is desired by determining if associating the first node to the second node is anticipated based upon context data. In another embodiment, it may be determined if associating is desired by identifying a current mode of filtering that limits potential nodes to be associated, and granting the permission to associate the first node to the second node only if the current mode of filtering allows the first node to be associated with the second node. For example, this may involve granting the permission only if the current mode of filtering defines that the second node is within a locational range of the first node consistent with the current mode of filtering. This may be defined by a particular filtering mode, such as a local, regional, or global filtering mode that operates to restrict nodes that may associate with other nodes. As such, the method may alter the current mode of filtering to another mode of filtering that allows the first node to be associated with the second node as a sort of override of the current filtering mode (e.g., depending upon an alert status of the first node).

At step 2420, the server records new association data if it is desired to associate the first node with the second node at step 2420. At step 2425, the server transmits a response to the second node granting the permission to associate the first node to the second node. In an embodiment, the server may first generate an authorization credential that authorizes connecting the first node and the second node and sharing information between the first node and the second node. This may be by looking up the credential information or by going through a process to create specific an authorization credential that allows the two nodes to actively pair and share data. With the authorization credential, the server may transmit them as the response.

In another example, the server may have pre-staged an authorization credential related to the second node and a third node if the server anticipates the second node will disassociate with the first node and later request to associate with the third node. For example, this may be done if the context indicates the second node (e.g., a master node) may be placed in a container and need to connect with the third node in the future when the second node may lose its connection to the server.

Method 2400 may also include the server receiving shared data from the second node. The shared data may originate from the first node or may have parts that originate from both the first and second nodes. For example, the second node may have received the permission to associate, and actively paired with the first node in a secure manner. The first node may have indicated it has data to upload (e.g., sensor data), and the second node may receive the data from the first node. Subsequent to that sharing, the second node may upload the shared sensor data from the first node by transmitting it to the server.

The method may further comprise instructing the second node to take over responsibility for a task previously performed by the first node after the second node is associated with the first node. For example, when the second node is powered by an external power source and the first node is powered by a battery, the responsibility for certain tasks may be taken over by the node with a more robust power supply (e.g., the node powered by an external power source).

In more detail, the responsibility for certain tasks may be established, tracked and changed with a programmable profile. For example, in one embodiment, the server may establish a profile for how long the task responsibility would change. In some cases, the profile may define a period of time for how long a node having this profile would have responsibility for a certain task before it would revert back to a default node. In another example, a node (such as a master node) may have a default condition trigger (like a low power situation or when it cannot communicate with the server) that can override such a profile so that it does not take on more responsibilities under particular conditions.

Furthermore, an embodiment may have the master node deciding what other node may take on responsibility for certain tasks. This may be helpful in situations where access to the server may be limited (e.g., an airborne environment). However, managing such a profile may be more easily accomplished in other embodiments with easier access to more types of context data on the server level.

In an embodiment that implements association management as a system, such an exemplary system for association management of a wireless node network may comprise a first node, a second node, and a server. The second node includes a node processing unit, a node volatile memory coupled to the node processing unit, a first communication interface coupled to the node processing unit, and a second communication interface coupled to the node processing unit. The first communication interface provides a short-range communication path between the first node and the second node and the second communication interface provides a longer range communication path between the second node and the server.

The server includes a server processing unit, a server volatile memory coupled to the processing unit, and a third communication interface that provides a longer range communication path between the server and the second communication interface of the second node.

The node volatile memory maintains at least a first program code section (e.g., master control and management code 425 or parts thereof) while the server volatile memory maintains at least a second program code section (e.g., server control and management code 525 or parts thereof).

When executing the first program code section resident in the node volatile memory, the node processing unit of the second node is operative to identify the first node as a potential for associating with the second node, transmit an association request over the second communication interface to the server, receive an association response (having at least authorization information generated by the server) over the second communication interface from the server, provide the authorization information to the first node, and associate the first node and the second node.

In one example, the node processing unit may be further operative to review status information related to the first node to determine whether the first node desires association with the second node. In another example, the node processing unit may be further operative to securely provide shared data between the first and second node after the first and second node are associated and in accordance with a sharing profile provided by the server. The sharing profile may define types of information to be securely shared between particular nodes.

When executing the second program code section resident in the server volatile memory, the server processing unit is operative to determine a location of the first node and second node, determine if associating the first node to the second node is desired based at least upon the location of the first node and the location of the second node, store new association data in the server volatile memory if it is desired to associate the first node with the second node, and transmit the authorization response to the second node granting the permission to associate the first node to the second node.

In one embodiment, the second node in the system may take over responsibility of a task previously handled by the first node after the second node is successfully associated with the first node. For example, when the second node is powered by an external power source and the first node is powered by a battery, the system may be more effectively and efficiently managed by reassigning a task (especially a task that involves a significant expenditure of power, a series of operations over a significant period of time, or both) to another node, such as the second node, which has more power available than the first node.

In another embodiment, the server processing unit may be further operative to set a current mode of filtering that limits potential nodes to be associated, and grant the permission to associate the first node to the second node only if the current mode of filtering allows the first node to be associated with the second node. In a further embodiment, the server processing unit may be further operative to alter (e.g., override) the current mode of filtering to a different mode of filtering. In this way, the server may adapt how nodes are managed and allow the first node to be associated with the second node if it is desired, such as then the first node is in an alert status level and urgently is requesting connection to a larger group of nodes than permitted under the current mode of filtering.

While the exemplary methods illustrated in FIGS. 23 and 24 focus on active associations, FIG. 25 is a flow diagram illustrating an example method for association management of a wireless node network having at least a plurality of nodes and a server in accordance with an embodiment, but from the perspective of a node that is to be passively associated with another node. Referring now to FIG. 25, method 2500 begins with a second of the nodes receiving a message broadcasted from a first of the nodes at step 2505. At step 2510, the second node captures an address of the first node from the message. At step 2515, the first node and the second node are associated by storing the captured address of the first node and an address of the second node as association data in a memory of the second node. At step 2520, the second node transmits the association data to the server.

At some point, the server may be updated by the second node with updated association data when the second node does not receive an additional message broadcast from the first node. For example, the second node and the first node may stay associated and securely connected for a period of time, but eventually the first node may move such that the connection is no longer viable or the first node may move closer to another node along the anticipated path it is traveling (e.g., an anticipated shipping path along a conveyor within a structure from an entry point of the structure but now closer to an exit point of the structure). As the first node travels on the conveyor, it may get closer to another node near the exit point and is better managed by an association with that other node near the exit point. Thus, the updated association data reflects that the first node is disassociated from the second node.

Method 2500 may further include having the second node determining a location of the first node, and updating the server with a current location of the second node and the determined location of the first node. Additionally, method 2500 may include receiving location information from the server that defines a refined location of the first node.

In an embodiment that implements passive association management as a managing node (e.g., a master node) in a wireless node having at least another node and a server, such an exemplary managing node comprises a processing unit, a first and second communication interface each coupled to the processing unit, a volatile memory coupled to the processing unit, and a memory storage coupled to the processing unit. The first communication interface provides a first communication path to the other node, can receive a message broadcast from the other node, and provide the message to the processing unit. The second communication interface providing a second communication path to the server.

The memory storage may maintain at least a node association manager module as program code to be executed by the processing unit. When the processing unit loads the module into volatile memory and executes instructions of the module, the processing unit is operative to receive the message from the first communication interface, capture an address of the another node from the message, store the captured address of the another node and an address of the managing node as part of association data in the memory storage, and transmit the association data to the server through the second communication interface.

In one example, the memory storage also maintains a location manager module and, when the processing unit also loads the location manager module into volatile memory and executes instructions of that module, the processing unit is operative to determine a location of the other node, determine a current location of the managing node (e.g., via GPS location signals), and update the server with the current location of the managing node and the determined location of the other node.

The managing node may be further operative to update the server with updated association data when the first communication interface does not receive an additional message broadcast from the other node. The updated association data may reflect that the other node is disassociated from the managing node.

Context Management within a Wireless Node Network

As explained above in general, management of nodes may rely upon the contextual environment of the nodes. As shown in FIG. 5, server 100 has access to a wide variety of different context data 560. Context data, such as data 560, may include a wide variety of data that generally relates to the environment in which the nodes are operating and may be used to advantageously provide enhanced node management capabilities in accordance with embodiments of the present invention. As such, the use of such context data provides a data foundation in an embodiment so that the server may better and more efficiently implement management tasks related to nodes in the network, and adjust such tasks to account for relevant context data as nodes move within the network (e.g., as an ID node moves with an item being shipped along an anticipated or predicted transit path from an origin to a destination). For example, the server take advantage of its ability to rely upon relevant context data to advantageously alter how it instructs a node operate, how it associates a node with the another node, how it can better locate a node, and how it can more efficiently track and respond to requests to report the location of the node.

Figure 26:
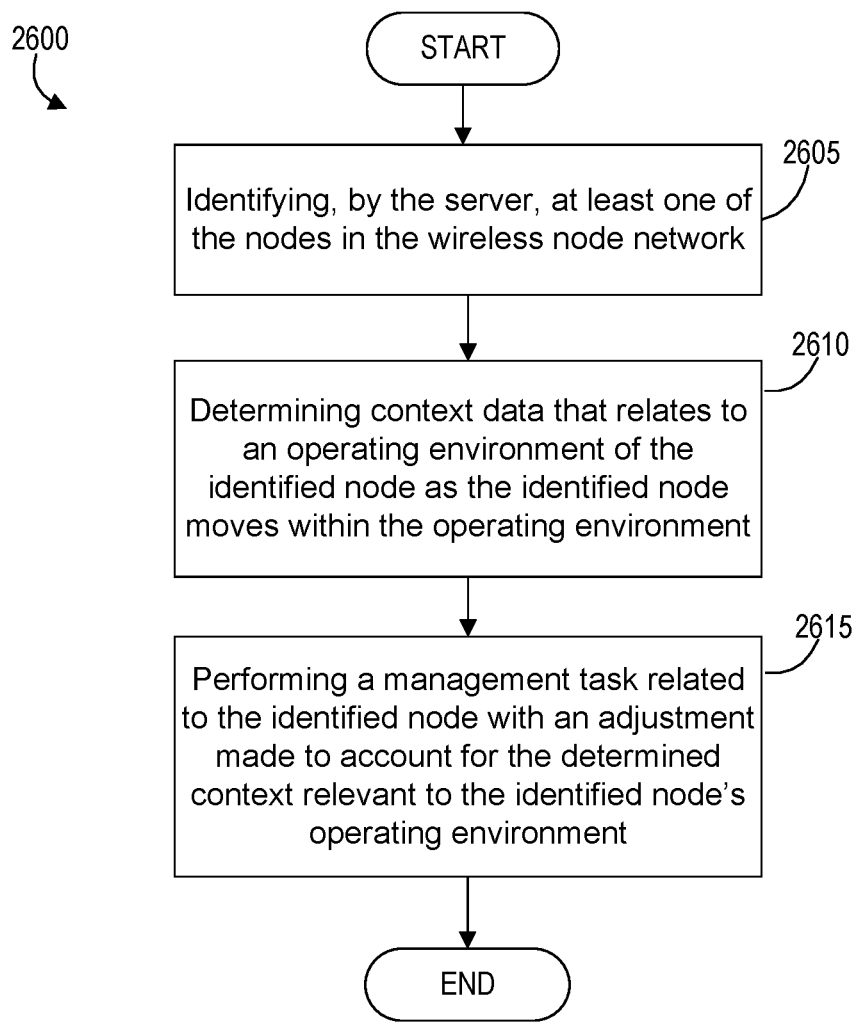
FIG. 26 is a flow diagram illustrating an exemplary method for context management of a wireless node network in accordance with an embodiment of the invention.

FIG. 26 is a flow diagram illustrating an exemplary method for context management of a wireless node network in accordance with an embodiment of the invention. Referring now to FIG. 26, method 2600 begins at step 2605 by identifying, by the server, at least one of the nodes. In one example, such as that shown in FIG. 22a, server 100 may identify ID node A 2220a as part of communications received from master node M1 2210a. At step 2610, the server determines context data that relates to an operating environment of the identified node as the identified node moves within the operating environment.

In one embodiment, the context data may include one or more types of data, such as scan data, historic data, shipment data, RF data, and layout data. For the example shown in FIG. 22a, server 100 may access context data 560 (which may be kept in context database 565) to determine parts of the context data 560 that relate to the operating environment of ID node A 2220a. Such context data 560 may include, in this example, shipment data that relates the item being shipped that is connected to ID node A 2220a, scan data for when the item connected to ID node A 2220a was scanned upon entering structure 2200, historic data for how long it takes a node to traverse the conveyor located within structure 2200, and layout data on dimensions of structure 220. Those skilled in the art will appreciate that context data may include operational environment information created within the wireless node network or created by a third party (e.g., weather information related to the operating environment of ID node A 2220a).

While the server determines context data that relates to an operating environment of the identified node in one embodiment, such a current or anticipated operating environment for a node in a more detailed embodiment may include one or more types of environments. For example, the current or anticipated operating environment for a node may include an electronic communication environment, a physical environment of an anticipated path along with a node moves, a conveyance environment related to how a node moves, and a density environment related to the density of nodes within an area near a particular node identified by the server.

Back at step 2610, the determining step may involve determining the context data that relates to an anticipated operating environment of the identified node as the identified node moves in a predicted path towards a location of another node. In another example, the determining step may involve determining the context data that relates to the anticipated operating environment of the identified node and an anticipated operating environment of the another node as the identified node moves in the predicted path towards the another node for an expected association with the another node At step 2615, the server performs a management task related to the identified node with an adjustment made to account for the determined context data. When the determined context data (such as RF signal degradation information) indicates that no adjustment is actually needed when performing the task, no adjustment is made given the determined context data. Thus, those skilled in the art will appreciate that an adjustment may be made when needed contextually and is not required at all times.

In one embodiment, performing the management task may comprise generally instructing the identified node to alter its operation based upon the determined context data. For example, server 100 may perform the management task of instructing ID node A 2220a to change its connectable and non-connectable intervals as it approaches master node M1 (which server 100 knows from context data, such as scan data generated when node A entered structure 2200). Thus, in this example, server 100 is able to leverage enhanced visibility of ID node A 2220a based upon context data and advantageously alter the operation of node A to increase the node's chance of successfully associating with master node M1 2210a.

In other embodiment, performing the management task may comprise associating the identified node with another node with the adjustment made to alter an associating parameter based upon the determined context data. In other words, context data may be helpful as part of associating nodes. In one example, the associating parameter may include at least one altered timing interval related to associating the identified node with the other node, such as an alert interval or connectable interval. These intervals are parameters that may be altered as part of adjustments made when a server associates two nodes and, for example, sets the intervals to more appropriate time durations in order to enhance the chance and opportunity the nodes have to actively pair and securely share data as needed.

In yet another embodiment, performing the management task may comprise locating the identified node with an adjustment made to a power setting based upon the determined context data. In one example, the power setting adjustment is done to a master node in direct communication with the server. In another example, the power setting adjustment may be done to an ID node, which is passed this operational adjustment information from another node. In one embodiment, the power setting itself may comprise an output power level adjusted to account for an adverse condition in the operating environment of the identified node (e.g., a master node with an adjusted RF output signal level). The adverse condition may be, for example, an adverse RF communication environment where structure attenuates or otherwise impedes normal RF communications. In another example, the adverse condition may be a highly dense population of nodes close to the identified node.

In more detail, the output power level may be adjusted to account for a shielding condition in the operating environment of the first node. Such a shielding condition may be caused, for example, by one or more of packaging, package contents, proximate package, proximate package contents, and physical infrastructure in the operating environment of the first node. For example, if the identified node is located near a metal container, it is operating in an adverse RF communications environment where it may have its output power level increased based on this context data in order to better deal with the adverse shielding condition.

In still another embodiment, performing the management task may comprise providing the location of the identified node in response to a request received by the server related to a status of the identified node. For example, if server 100 receives a request from user access device 205 about the status of ID node A 2220a, server 100 is able to provide the location of node A as being within structure 2200, but refined as being close to the entry of the structure given the adjustment to account for contextual data, such as scan data related to the item being shipped with node A 2220*a*.

Those skilled in the art will appreciate that method 2600 as disclosed and explained above in various embodiments may be implemented on a server, such as server 100 illustrated in FIGS. 5 and 22A, running one or more parts of server control and management code 525 (e.g., the context based node manager). Such code may be stored on a non-transitory computer-readable medium such as memory storage 515 on server 100. Thus, when executing code 525, the server's processing unit 500 may be operative to perform algorithmic operations or steps from the exemplary methods disclosed above, including method 2600 and variations of that method.

Node Location Determination Methodologies

As part of managing and operating a wireless node network in accordance with one or more embodiments of the invention, such as tracking ID node A 2220*a* in FIGS. 22A-C, determining a node's location is performed. As explained above, an exemplary ID node may be directly or indirectly dependent on a master node to determine its location. In the embodiments discussed and described herein, a location of a node may generally encompass a current or past location. For example, an embodiment that determines a node's location may be a current location if the node is not moving, but may necessarily determine the location as a past location should the node be in a state of motion.

Likewise, the term location alone may include a position with varying degrees of precision. For example, a location may encompass an actual position with defined coordinates in three-dimensional space, but use of the term location may also include merely a relative position. Thus, the term location is intended to have a general meaning unless otherwise expressly limited to a more specific type of location.

Determining node location may done by a master node alone, the server alone, or the master node working together with the server. And on such devices, embodiments may use one or more methodologies to determine a node's location and further refine the location. Such example methodologies may include, but are not limited to, determining node location may relate to controlling an RF characteristic of a node (e.g., an RF output signal level and/or RF receiver sensitivity level), determining relative proximity, considering association information, considering location adjustments for context information and an RF environment, chaining triangulation, as well as hierarchical and adaptive methods that combine various location methodologies. A more detailed description of these exemplary node location determination techniques is provided below.

Location through Proximity

In one embodiment, a signal strength measurement between two or more nodes may be used to determine the proximity of the nodes. If neither node's actual location is known, one embodiment may infer a location relationship of the two nodes through proximity.

Proximity when Varying Power Characteristics

For example, an exemplary method of determining a node's location in a wireless node network of nodes may involve varying a node's power characteristic, such as the output power of one of the nodes. Generally and as explained with reference to FIG. 13, the power characteristic may be varied to identify closer ones of the nodes to the node broadcasting. The node broadcasting may transmit one or a series of signals while other nodes may report receiving one or more of the signals. Those other nodes that receive at least one signal broadcast from the transmitting node may be deemed part of a close group of nodes. And as the power characteristic is varied (increased or decreased or both), a closest group of nodes (or single node) may be identified as the smallest group of nodes of those that receive at least one signal from the broadcasting node. Accordingly, while not absolute, a type of location for the broadcasting node may be determined based on the closest one or group of nodes. This may be repeated for neighboring nodes to yield a set of closest node information for each of the nodes. In more detail, an exemplary set of closest node information for each of the nodes may include which nodes are closest (via the lowest power characteristic) and more robustly supplement this information with which other nodes are incrementally further away (via increasingly larger power characteristics). Thus, the set of closest node information provides the basis for a determination of how close the nodes in the network are to each other, which provides a type of location determination for each node.

Additionally, context data may be referenced in certain embodiments to further enhance determining how close the nodes are to each other. For example, combining the set of closest node information with context data, such as scan information that registers when an item changes custodial control in a delivery system, may further refine how to determine the location of the nodes. Scan and other context information will help determine if one or more of the nodes, for example, are known to be in the same container, vehicle or moving on a belt together. Thus, this type of context data may be integrated into a further step of refining how close the nodes are to each other based upon the context data.

Figure 28:
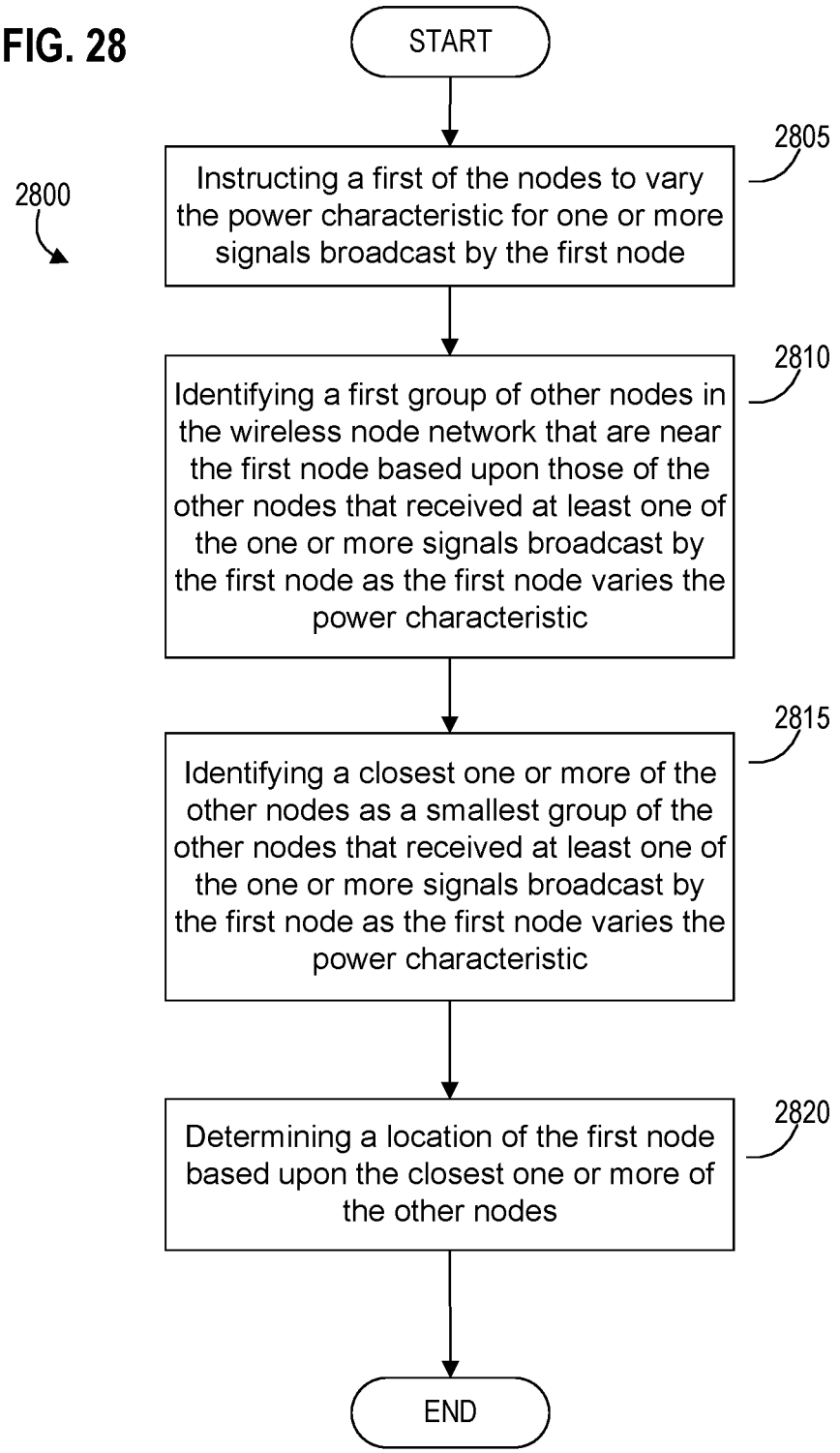
FIG. 28 is a flow diagram illustrating an exemplary method for location determination by varying a power characteristic of nodes in a wireless node network in accordance with an embodiment of the invention.

In general, a location of a node based upon proximity may be determined when a power characteristic of nodes is changed or varied in a wireless node network. FIG. 28 is a flow diagram illustrating an exemplary method for location determination by varying a power characteristic of nodes in a wireless node network in accordance with an embodiment of the invention. Referring now to FIG. 28, method 2800 begins by at step 2805 by instructing a first of the nodes to vary the power characteristic for one or more signals broadcast by the first node. In a more detailed embodiment, such an instruction may cause the first node, for example, to incrementally decrease or incrementally increase the power characteristic (such as an output power level) between values.

At step 2810, method 2800 continues by identifying a first group of other nodes in the wireless node network that are near the first node based upon those of the other nodes that received at least one of the signals broadcast by the first node as the first node varies the power characteristic. In a further embodiment, step 2810 may incrementally identifying which of the first group of other nodes are receiving at least one of the broadcast signals as the first node incrementally varies the output power level of the signals broadcast. The incrementally identified nodes may be deemed a set of increasingly close nodes to the first node.

At step 2815, method 2800 continues by identifying a closest one or more of the other nodes as a smallest group of the other nodes that received at least one of the one or more signals broadcast by the first node as the first node varies the power characteristic.

At step 2820, method 2800 concludes by determining a location of the first node based upon the closest one or more of the other nodes. Thus, as the power characteristic is varied, the group of nodes that have received at least one of the signals broadcast by the first node may change and the smallest such group being a closest group of nodes (even if just one node) to the first node. In a more detailed embodiment, step 2820 may comprise determining the location of the first node based upon the closest one or more of the other nodes and the set of increasingly close nodes to the first node as the set of increasingly close nodes provides more detailed proximity information for a refined location determination.

Figure 14:
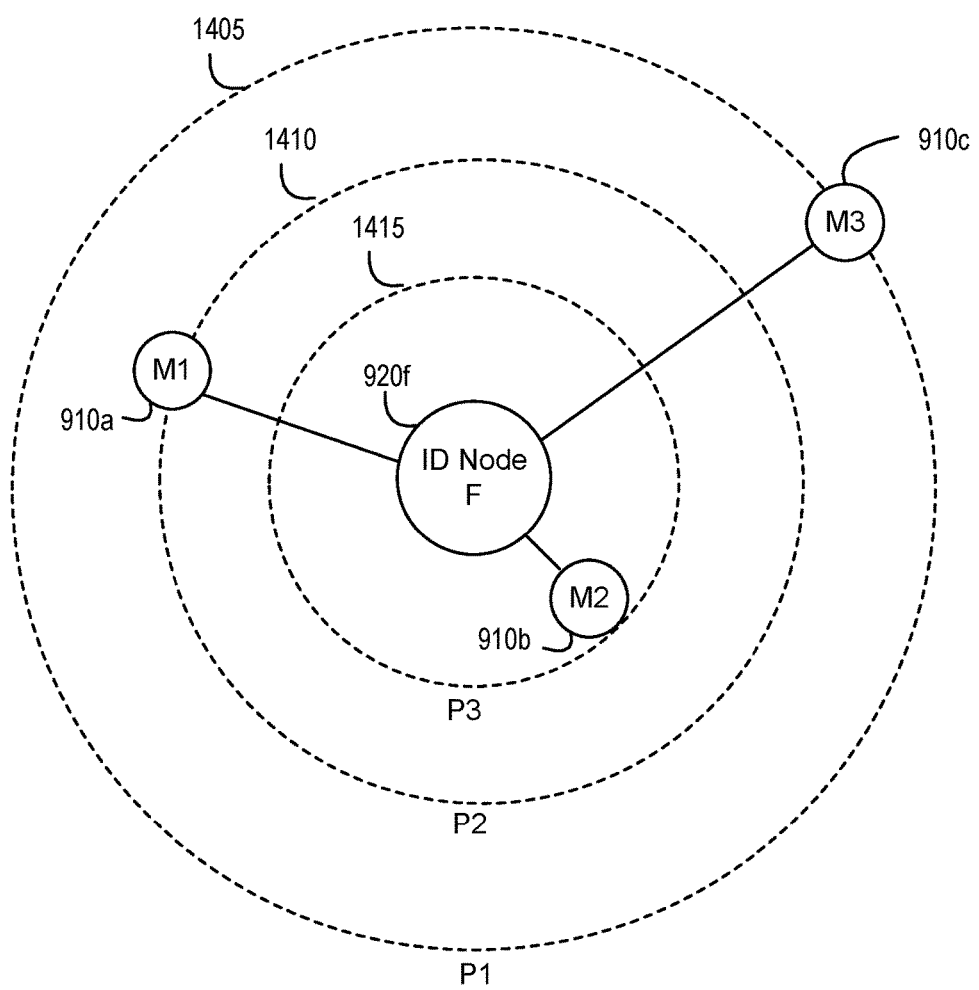
FIG. 14 is a diagram illustrating an exemplary location determination using ID node advertise in accordance with an embodiment of the invention.

For example, referring to FIG. 14, the set of increasingly close nodes to the ID node F 920*f* may include node M3 as being farthest away and M1 being closer than M3. When the power characteristic of ID node F incrementally decreases, and its output power level changes from P1 to P2, M3 can no longer receive the signal, but M1 and M2 still do. And as the power characteristic of ID node F continues to incrementally decrease, and its output power level is changed from P2 to P3, M1 can no longer receive the signal, but only M2 does as the last of the nodes closest to ID node F. Thus, in this example, determining the location of ID node F may be based upon the fact that M2 is the closest node and the set of increasingly close nodes include M1 and M3 with M1 being closer than M3.

In another embodiment, one or more further refinements to the first nodes location may be performed. In one example, steps 2805-2820 may be repeated where a second of the nodes is instructed to vary the power characteristic for one or more signals broadcast by the second node, and then method 2800 may further refine the location of the first node based upon a location of the second node. In a more detailed example, steps 2805-2820 may be repeated where a second of the nodes is instructed to vary the power characteristic for one or more signals broadcast by the second node, and then method 2800 may further the location of the first node based upon a location of the second node and a set of increasingly close nodes to the second node. With this increasingly cross-related information on what nodes are closer to other nodes and to what degree, which may be further repeated for additional nodes, embodiments may further refine the location of the first node within the network.

Method 2800 may further include determining context data related to the first node, and refining the location of the first node based upon the context data. In an embodiment where the power characteristic is output power level, the incremental changes in the output power level of the broadcast signal in steps 2805-2815 may be set according to the context data.

Method 2800 may also determine the context data to be related to the closest node to the first node, and refine the location of the first node based upon the context data. In still another example, method 2800 may determine the context data to be related to the incrementally identified nodes in the set of increasingly close nodes to the first node, and refining the location of the first node based upon the context data. For example, the closest node and the set of increasingly close nodes may have scan data that indicate they are within the same container. This exemplary context data may be used to further refine the location of the node being located, which may help efficiently determine that node is near the container. As such, those skilled in the will appreciate that context data for the node being located as well as nodes identified to be close to that node may provide relevant input to advantageously help further refine the location of the node.

Those skilled in the art will appreciate that method 2800 as disclosed and explained above in various embodiments may be implemented on a server apparatus, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be operative to perform algorithmic operations or steps from the exemplary methods disclosed above, including method 2800 and variations of that method.

An embodiment of such a server apparatus may include a server (such as server 100) operative to communicate with a plurality of nodes in the wireless node network. As explained with respect to FIG. 5, the server generally includes a server processing unit, a server volatile memory, a server memory storage, and at least one communication interface. In this embodiment, the volatile memory, memory storage, and communication interface are each coupled to the processing unit. The memory storage maintains at least a program code section and location data related to a location of one or more of the nodes. The communication interface provides a communication path operatively coupling the server with the nodes.

The server processing unit, as mentioned above, is operative when running the program code section, to perform the steps and operations as described above relative to method 2800 and variations of that method described above.

Proximity when Observing Signal Patterns and Strengths Over a Time Period

In another embodiment, an improved method for determining a node's location through proximity may include analyzing the signal patterns and strengths between an advertising node and a listening node. In one embodiment, a threshold may be set for association based on an observed message count and/or recorded signal strength within a specific time period may improve the ability to locate a node (e.g., an ID node) to that of another node (e.g., a master node). In some embodiments, the observed message count may be implemented as an averaged count over a repeated time periods. Further still, other embodiments may filter outlying observations in the observation data set to help improve the quality of data relied upon for setting a threshold for association and, as a result, determine a node's location.

In a more detailed example, an improved method for determining a node's location through proximity may show captured advertising message counts as a component for a node's location and determining a node's direction of travel. In this example, two exemplary master nodes (e.g., master node M1 910*a* and M2 910*b*) may capture advertising messages from one ID node (e.g., ID node A 920*a*). Master node M1 may observe and capture (e.g., record information related to the observation) 60 messages from ID node A within a 2 minute period, while master node M2 only observes and captures 7 advertising messages from ID node A within that same period. Based upon the difference in how often messages are observed from ID node A by master node M1 compared to those observed by master node M2, the system is able to determine that ID node A would more proximate to master node M1, and it's known location.

In a further embodiment, comparing the average time stamp of the captured records may allow the system can make a more accurate determination of location. For example, if the average captured message found on master node M2 is increasingly growing larger (e.g., taking longer for messages to go from ID node A to master node M2), this indicates ID node A is moving away from master node M2. If the average captured message found on master node M2 is growing increasingly larger while the average captured message found on master node M1 is increasingly growing smaller, this indicates ID node A is moving away from master node M2 and toward master node M1. Thus, over a number of observed time periods, the change in message timing (transmission to reception) may also be relied upon to enhance or refine a node's location.

In yet another embodiment, the observed signal strength may be a component in location determination and estimating direction of travel and may allow the system can make a more accurate determination of location. For example, two master nodes (M1 910a and M2 920b) may be capturing advertising messages from a node (ID node A 920a). M1 captures 60 messages from ID node A within 2 minutes, while M2 captures only 7 messages. The average signal strength observed for signals from ID node A by master node M1 is higher compared to the average signal strength observed by master node M2. Based upon this observed signal strength information, the system would determine that ID node A to be at M1, but a predicted path may indicate ID node A is heading towards M2. As the master nodes M1 and M2 continue to capture records, the system (e.g., management code 524 operating on server 900, which is in communication with M1 and M2) processes the continued feed of capture records from M1 and M2. With this observed signal strength information, the server 900 would expect that the count and average signal strength of messages from ID node A over the time period observed (2 minutes) to increase for observations at M2 and to decrease for observations at M1 when ID node A is physically moving closer to M2 and away from M1. Thus, the change in observed powers levels and in how often messages are observed may indicate actual node movement in an embodiment.

Basing node proximity location and node directional determinations on observed signal patterns and characteristic strengths over a period of time has the advantage of reducing the likelihood of unwanted and spurious signal anomalies causing an ID node's location to be incorrectly determined. And the above exemplary methods for determining movement characteristics of a node (e.g., moving closer to one node, moving closer to one but away from another, etc.) as part of refining the node location may be applied in combination with the various embodiments for determining node location described herein.

Figure 27:
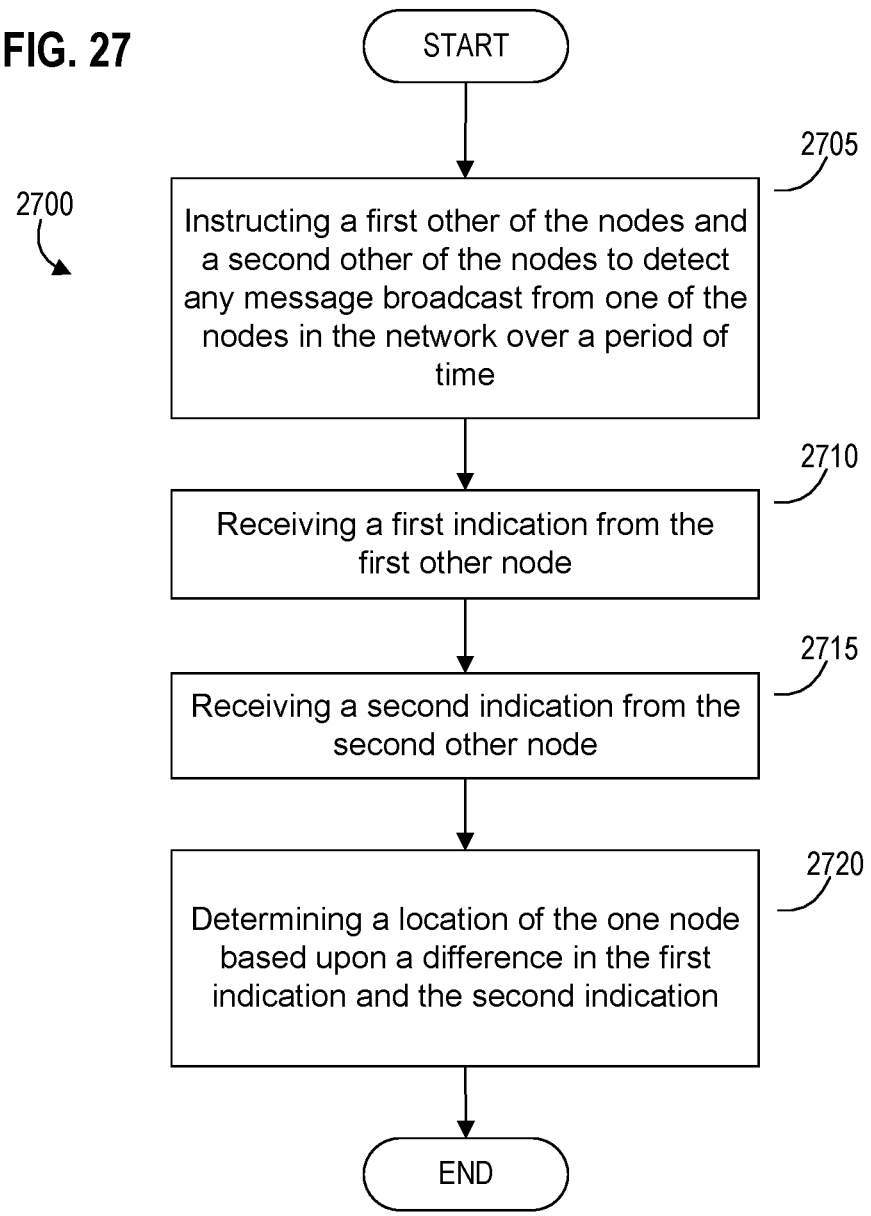
FIG. 27 is a flow diagram illustrating an exemplary method for locating a node in a wireless node network based upon observed signal patterns and characteristic indications over a period of time in accordance with an embodiment of the invention.

FIG. 27 is a flow diagram illustrating an exemplary method for proximity locating a node in a wireless node network based upon observed signal patterns and characteristic indications over a period of time in accordance with an embodiment of the invention. Referring now to FIG. 27, method 2700 begins at step 2705 by instructing a first and a second other nodes to detect any message broadcast from the one node over a period of time. The period of time may be set based upon a variety of factors, such as context data. In more detail, the period of time may be dynamically changed based upon context data as the one node moves into different contextual environments.

Method 2700 has the server receiving a first indication from the first other node at step 2710 and receiving a second indication from the second other node at step 2715. Finally, the method 2700 determines a location of the one node based upon a difference in the first indication and the second indication at step 2720.

The first indication is related to a characteristic of messages broadcast from the one node that are detected by the first other node during the period of time. Likewise, the second indication is related to the characteristic of messages broadcast from the one node that are detected by the second other node during the period of time. These indications may include, for example, a count of messages received by the respective other nodes, a transit time factor (e.g., an average transit time for a message to be detected after broadcast), and an average signal strength.

In one embodiment, the first indication may be a first count of messages broadcast from the one node that are detected by the first other node during the period of time, and the second indication may be a second count of messages broadcast from the one node that are detected by the second other node during the period of time. As such, determining the location of the one node may be the location that is closer to the first other node than the second other node when the first count is greater than the second count. Additionally, the method 2700 may further include determining an actual node movement direction for the one node based upon comparing the first count and the second count over a plurality of time periods. For example, the method 2700 may repeat observations over several of these time periods and track the first count and second count over time to determine which is increasing, which is decreasing, and determine movement of the one node based upon these measurements over time.

In another detailed embodiment, the first indication may be a first time factor of messages broadcast from the one node that are detected by the first other node during the predetermined time period, and the second indication may be a second time factor of messages broadcast from the one node that are detected by the second other node during the period of time. And an actual node movement direction for the one node may be based upon comparing the first time factor and the second time factor. In a more detailed embodiment, the first time factor may be an average transit time for a message detected at the first other node to go from the one node to the first other node, and the second time factor is an average transit time for a message detected at the second other node to go from the one node to the second other node. As such, determining the location of the one node may be that the location is closer to the first other node than the second other node when the first time factor is less than the second time factor.

In yet another embodiment, the first indication may be a first average signal strength of messages broadcast from the one node that are detected by the first other node during the period of time, and the second indication may be a second average signal strength of messages broadcast from the one node that are detected by the second other node during the period of time. As such, determining the location of the one node may be that the location is closer to the first other node than the second other node when the first average signal strength is greater than the second average signal strength.

The method 2700 may also include, in an embodiment, observing a degree of change in the first average signal strength and a degree of change in the second average signal strength over repeated time periods, and determining an actual node movement direction for the one node based upon comparing the degree of change in the first average signal strength and the degree of change in the second average signal strength.

In another embodiment, the method 2700 may also refine the determined location of the one node. In this embodiment, the method 2700 may further comprise refining the location of the one node based upon at least one of a first updated location received from the first other node and a second updated location received from the second other node. For example, when first other node is a mobile master node and it is the closer of the two nodes to the one node being located, the embodiment can take advantage of the location signaling onboard the first other node that provides the current location of the first other node. That current location data may be transmitted by the first other node to the server to update the server in its calculation of the location for the one node.

In still another embodiment, the method 2700 may layer context data with the determined location to refine the location of the node. Context data related to the one node may be determined by the server, and so the location of the one node may be refined based upon that context data. In another example, context data related to the closer of the first other node and the second other node when compared to the location of the one node. For example, the server may be aware that a particular master node is closer to the one node compared to a second master node, and that the particular master node is within a container. With this additional context data related to the particular master node, the server may refine the location of the one node based upon the context data. Other exemplary types of relevant context data may be relied upon when refining the location of the one node, such as context data of a particular shielding associated with the environment near the particular master node (e.g., a particular type of ULD having known RF shielding characteristics, etc.)

Additionally, the method 2700 may involve looking to see if the one node is behaving as expected. More specifically, a further embodiment of the method 2700 may further compare the location of the one node to a predicted path of the one node to determine if the one node is located outside the predicted path. This may allow the server to use learned, historic data when creating a predicted path, and keep track of the one node relative to being within an acceptable range associated with this predicted path. The method may also generate a notification if the one node is outside the predicted path. In this manner, actionable tasks can then be taken to locate the one node—e.g., changing filter mode options for nodes in that general area, etc.

Those skilled in the art will appreciate that method 2700 as disclosed and explained above in various embodiments may be implemented on a server, such as server 100 illustrated in FIGS. 5 and 22A, running one or more parts of server control and management code 525 (e.g., the location manager). Such code may be stored on a non-transitory computer-readable medium such as memory storage 515 on server 100. Thus, when executing code 525, the server's processing unit 500 may be operative to perform algorithmic operations or steps from the exemplary methods disclosed above, including method 2700 and variations of that method.

Association Driven Locating with Variable RF Characteristics

As noted above, a signal strength measurement between two or more nodes may be used to determine relative distance between nodes. If one of the nodes has a known location (such as master node M1 910a), a relative location of one or more nodes within a range of the known location node is generally a function of how accurate the system may determine a distance between the node with known location and associated nodes. In other words, an embodiment may identify a relative location of an item and its related node by relying upon association-driven variable low-power RF output signals to determine a distance the node is from a known location.

Location Determination through Master Node Advertise

Figure 13:
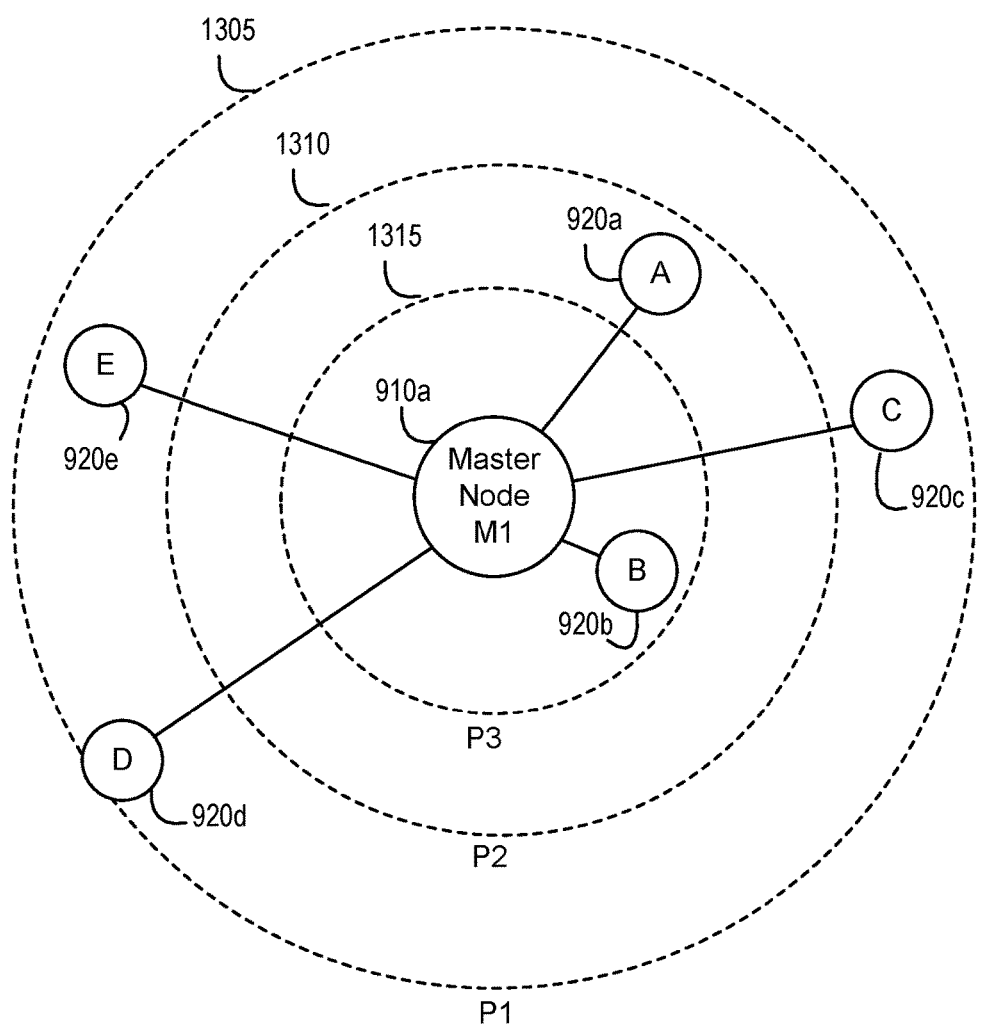
FIG. 13 is a diagram illustrating an exemplary location determination using master node advertise in accordance with an embodiment of the invention.

As generally mentioned above, determining node location may relate to controlling an RF characteristic of a node (e.g., an RF output signal level and/or RF receiver sensitivity level) and, more specifically, may involve aspects of controlling master node advertising. FIG. 13 is a diagram illustrating an exemplary location determination using master node advertise in accordance with an embodiment of the invention. In the illustrated embodiment shown in FIG. 13, a master node, such as master node M1 910a, with a known location is broadcasting an advertising message at varying RF output power levels. FIG. 13 illustrates the exemplary different RF output power levels as concentric ranges 1305-1315 about master node M1 910a. Thus, master node M1 910a may broadcast at a maximum power P1, related to range 1305, but may control the RF output power level and dynamically change the RF output power level to P2 and broadcast at a smaller range 1310, or to P3 and broadcast to an even smaller range 1315.

In the illustrated embodiment, receiving ID nodes A-E 920a-920e are in query (scan) mode and can each use the received signal at different levels to determine how far away from the transmitting M1 they are located. Those skilled in the art will appreciate that while the illustrated embodiment shown in FIG. 13 has the receiving nodes all as ID nodes, other embodiments may have receiving nodes be either master or ID nodes or a mixture.

In the exemplary embodiment of FIG. 13, the location for nodes A-E may be determined based upon the known location of master node M1 910a. That location, plus a range measurement when each of respective receiving nodes A-E last receives a signal from node M1, and factoring in a confidence factor of the range measurement, provides a location determination for the nodes according to variable RF signal power. Depending on a quality of the range measurement, the individual receiving nodes may or may not have an individually calculated location. In yet another embodiment, if third party or context data, such as scan information, is available, a refined location may be determined using such data as an additional confidence factor. As the communication range of M1 is limited from P1 to P3, the accuracy of location by association goes up.

In the illustrated example of FIG. 13, an exemplary method of determining a node's location may be described that uses master node advertising. First, when the master node M1's variable power short range communication interface 480 is set to P1, its maximum output, master node M1 910a is seen by each of ID nodes A-E 920a-920e. Based upon analytics or historic measurements, the open air performance (optimal range) of the radio in M1's variable power short range communication interface 480 at P1 power level may have been previously been found to be approximately 30 feet. Thus, without the need to examine RSSI levels from the individual ID nodes A-E 920a-920e and without the need for active calibration phases, the system may know that ID nodes A-E are within 30 feet of master node M1 910a.

Next, when the master node M1's variable power short range communication interface 480 is set to P2, a medium output level in this example, master node M1 is seen by nodes A and B. From previous analytics or historic measurements, it was determined the open air performance (optimal range) of the master node M1's variable power short range communication interface 480 running at P2 power level is approximately 15 feet. Thus, without the need to examine RSSI levels from the individual nodes, we know ID nodes A 920a and B 920b are within 15 feet of master node M1. Furthermore, we know the ID nodes no longer receiving the broadcasted RF signal from master node M1 910a (e.g., ID nodes C 920c, D 920d, and E 920e) are somewhere within 30 feet of master node M1 910a, but probably more than 15 feet away from M1.

And when the master node M1's variable power short range communication interface 480 is set to P3, its minimum output level in this example, it is seen by ID node B 920*b*. From previous analytics or historic measurements, it was determined the open air performance (optimal range) of the master node M1's variable power short range communication interface 480 running at P3 power level is approximately 5 feet. Thus, without the need to examine RSSI levels from the individual ID nodes, we know the location of ID node B 920*b* is within 5 feet of the known location of master node M1 910*a*.

The ranging steps, as discussed in the example above, may then be repeated for any of the identified nodes in order to build a more accurate picture of the relative location of each node. The granularity of RF characteristic settings (e.g., the RF output signal power level setting) will provide more granularity of location differentiation when performing the ranging steps. In one embodiment, the ranging steps may be performed over a set of gross RF characteristics settings (e.g., few settings over a wide range), and similar steps may then be performed over more select ranges for the RF characteristics settings.

Figure 29:
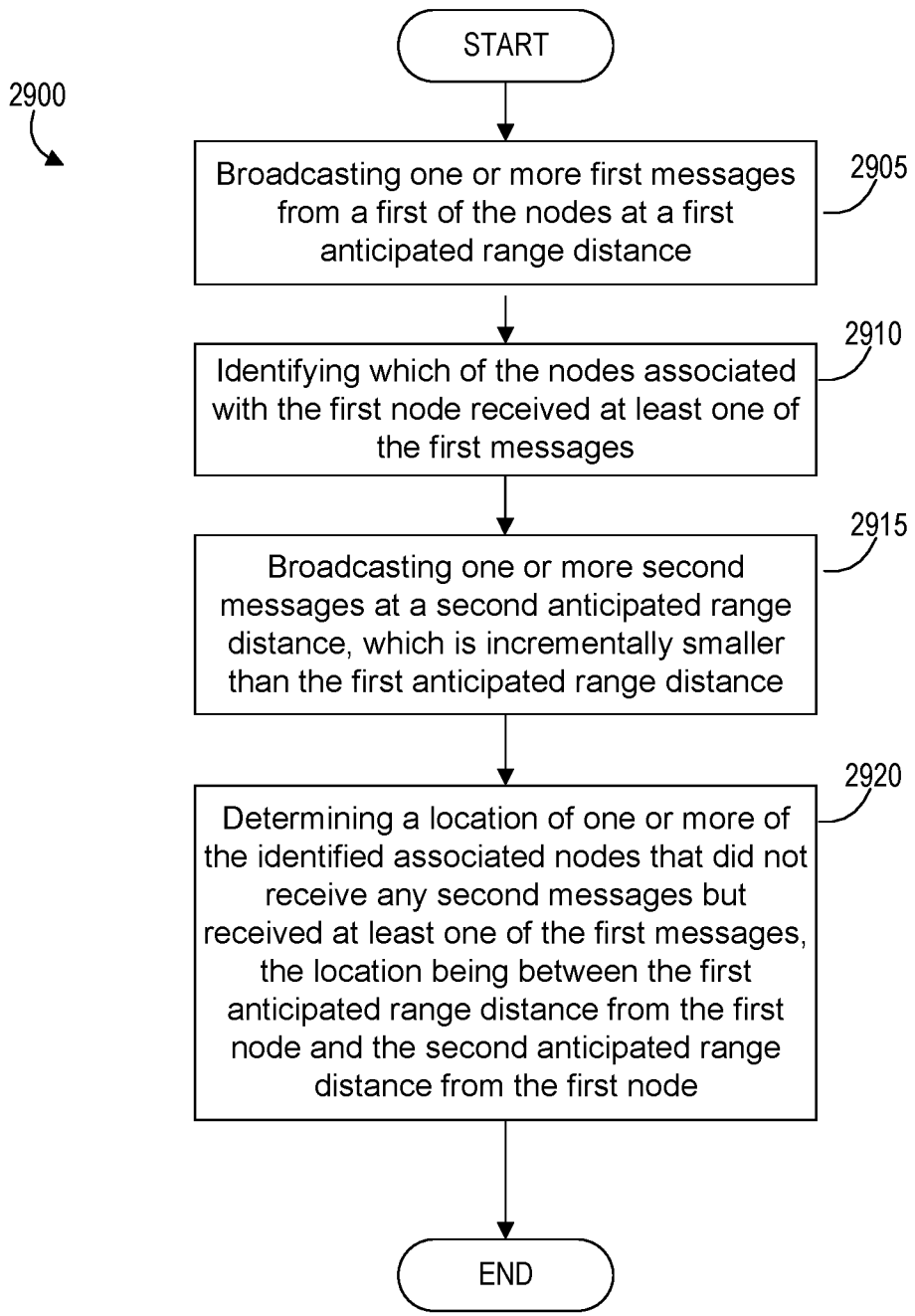
FIG. 29 is a flow diagram illustrating an exemplary method for location determination using one or more associations of nodes in a wireless node network in accordance with an embodiment of the invention.

FIG. 29 is a flow diagram illustrating an exemplary method for location determination using one or more associations of nodes in a wireless node network in accordance with an embodiment of the invention. Referring now to FIG. 29, method 2900 begins at step 2905 where a first of the nodes broadcasts one or more first messages at a first anticipated or predicted range distance. In one embodiment, the first anticipated range distance is an optimal range for the first node. For example, the first node's radio in its communication interface may have a maximum setting to allow the node to broadcast at maximized range assuming a clear environment. Such a setting provides a known anticipated range distance. In the example of FIG. 13, master node M1 910*a* may be broadcasting at a maximum power level P1 that reaches a first range distance from node M1. However, if node M1 is known to be within an adverse RF shielding environment, the first anticipated range distance may be a distance adjusted to account for the contextual environment of such shielding (e.g., a type of context data). Anticipated range distances may be adjusted depending upon one or more types of relevant context (e.g., one or more types of context data related to how an RF output signal from the node may be impeded).

At step 2910, method 2900 identifies which of the nodes associated with the first node received at least one of the first messages. In one embodiment, the first node may be able to access and review association data in its onboard memory storage as part of identifying which are the nodes associated with it. In one example, the associations with the first node may be passive associations (e.g., not actively paired and securely connected) or active associations (e.g., actively paired and able to securely connect and share data), or a combination of both types of associations.

Next, at step 2915, the first node broadcasts one or more second messages at a second anticipated range distance, which is incrementally smaller than the first anticipated range distance. In the example of FIG. 13, master node M1 910*a* may be the first node and now is broadcasting at a medium power level P2 that reaches a second anticipated range distance from M1. By incrementally changing the RF power level in this manner, master node M1 910*a* now no longer can reach nodes C-E as shown in FIG. 13.

At step 2920, method 2900 concludes by determining a location of one or more of the identified associated nodes that did not receive any of the second messages but received at least one of the first messages, where the location is between the first and second anticipated range distances from the first node. Again, in the example of FIG. 13, master node M1 910*a* may determine the location of nodes C-E (given they did not receive the message sent out the second anticipated range distance at RF power level P2) to between the first anticipated range distance (when master node M1 was broadcasting at power level P1) and the second anticipated range distance (when master node M1 was broadcasting at power level P2) from the known location of master node M1.

In one embodiment, the method 2900 may also have the first node broadcasting one or more third messages at a third anticipated range distance (incrementally smaller range than the second anticipated range distance), and determining a location of one or more of the identified associated nodes that did not receive any of the third messages but received at least one of the second messages, where the location is approximately near the second anticipated range distance from the first node. Again, in the example of FIG. 13, by incrementally changing the power level down to P1 and broadcasting a third message at an anticipated range distance for that P1 level, the master node M1 can determine the location of node A (as node A received the second message but did not receive the third message) to be approximately near the anticipated range distance for P2 from the location of master node M1.

Additional embodiments of method 2900 may also refine such determined locations by updating the location of the first node. In one embodiment, the first node may be a mobile node. As such, refining may involve determining a current mobile location of the first node, and refining the location of the one or more of the identified associated nodes that did not receive any of the second messages but received at least one of the first messages based upon the current mobile location of the first node. Thus, as the first node moves and updates its own location (e.g., via GPS signals received by location circuitry 475 on a master node), the first node is able to leverage its own updated location and advantageously refine the location of nodes associated with it.

And, in some embodiments, the refined location of associated nodes may be transmitted to a server. This provides an update to the server, and aids in tracking and managing the location of nodes in the network. Again, referring back to the example of FIG. 13, master node M1 910*a* may take advantage of such a method for locating associated nodes, such as the locations of ID nodes A-E 920*a*-920*e*, and update server 100 with this new location data related to the current location of node M1 and any of the nodes associated with node M1.

Those skilled in the art will appreciate that method 2900 as disclosed and explained above in various embodiments may be implemented on a node (e.g., master node 110*a* in FIG. 4, master node M1 910*a* in FIG. 13, or master node M1 2210*a* in FIG. 22A) running one or more parts of master control and management code 425 (e.g., the location aware/capture module). Such code may be stored on a non-transitory computer-readable medium, such as memory storage 415 on master node 110*a*. Thus, when executing code 425, the master node's processing unit 400 may be operative to perform algorithmic operations or steps from the exemplary methods disclosed above, including method 2900 and variations of that method.

In another embodiment, a node apparatus is described in a wireless node network that uses location determination by association as described with reference to the steps related to method 2900. As mentioned above, such as node apparatus may be implemented with a master node having a node processing unit, a node volatile memory, a node memory storage, and a first and second communication interface. Each of the memories and communication interfaces are coupled to the node processing unit. Further, the node memory storage maintains at least a program code section, association data, and location data and, at times, shipping information. The first communication interface provides a first communication path operatively coupling the node with a plurality of other nodes in the network, while the second communication interface provides a second communication path operatively and separately coupling the node with a server in the network.

In this embodiment, the node processing unit is operative to transmit one or more first messages via the first communication interface at a first anticipated range distance, and identify which of the others nodes that are associated with the first node received at least one of the first messages. In one embodiment, the node processing unit may be operative to access the association data in the node memory storage when identifying which of the nodes associated (e.g., passive, active, or both types of associations) with the first node received at least one of the first messages.

The first anticipated range distance may be an optimal transmission range for the first communication interface and, in a more detailed example, may be adjusted based upon context data (e.g., RF shielding inherent from the surrounding environment of the node). In yet another embodiment, the first anticipated range distance and the second anticipated range distance may be adjusted based upon one or more types of context data related to how an RF output signal transmit from the first communication interface may be impeded by an environment of the node.

The node processing unit is also operative to transmit one or more second messages via the first communication interface at a second anticipate range distance (incrementally smaller than the first anticipated range distance) and determine a location of one or more of the identified associated nodes that did not receive any of the second messages but received at least one of the first messages. That location is between the first anticipate range distance from a known location of the node and the second anticipated range distance from the known location of the node. In a further example, the node processing unit may be operative to store the determined location in the node memory storage as part of the location data.

The node processing unit may also be operative to transmit one or more third messages via the first communication interface at a third anticipated range distance (incrementally smaller range than the second anticipated range distance) and determine a location of one or more of the identified associated nodes that did not receive any of the third messages but received at least one of the second messages, where the location is between the second anticipated range distance from the known location of the node and the third anticipated range distance from the known location of the node.

In another embodiment, the node may be mobile and the node processing unit may be further operative to refine the location of the one or more of the identified associated nodes that did not receive the second message but received the first message by updating a location of the first node. In more detail, the node processing unit may be operative to determine a current mobile location of the first node (e.g., check with location circuitry onboard the node for valid GPS signals and a location lock based on such signals), and refine the location of the one or more of the identified associated nodes that did not receive any of the second messages but received at least one of the first messages based upon the current mobile location of the first node. The node processing unit may also be operative to transmit the refined location to the server over the second communication interface.

Location Determination through ID Node Advertise

While FIG. 13 provides an example of location determination through master node advertising, FIG. 14 focuses on location determination through ID node advertising. In particular, FIG. 14 is a diagram illustrating an exemplary location determination using ID node advertise in accordance with an embodiment of the invention. In the illustrated embodiment shown in FIG. 14, exemplary ID node F 920*f* is in an advertising mode but is without a known location. As with FIG. 13, FIG. 14 illustrates the exemplary different RF output power levels from ID node F 920*f* as concentric ranges 1405-1415 about ID node F 920*f*. Thus, ID node F 920*f* may broadcast at a maximum power P1, related to range 1405, but may control the RF output power level and dynamically change the RF output power level to P2 and broadcast at a smaller range 1410, or to P3 and broadcast to an even smaller range 1415. Master nodes M1-M3 910*a*-910*c* are disposed in various known locations relatively near ID node F 920*f*, which has an unknown location. As such, ID node F 920*f* may take advantage of the ability to adjust an RF characteristic, such as RF output signal power level, of its own short-range communication interface as part of how the system may determine location of ID node F through ID node advertising.

In the illustrated embodiment, an RF output signal power level of ID node F 920*f* may be varied or dynamically adjusted via programmable settings (such as profile settings or parameters) related to operations of variable power short range communication interface 375. Additionally, while an actual communication range may vary with the surrounding environment, a maximum anticipated communication range of the ID node's transmitter at each power level is known assuming an optimal operating environment or no substantial RF shielding or interference. Thus, a particular power level setting for a broadcasting node is inherently associated with a corresponding anticipated range distance.

In an exemplary method of determining a nodes location using ID node advertising, the RF output signal power level may be varied across multiple power levels to improve location through master node association. In more detail, when the ID node F's variable power short range communication interface 375 is set to P1, its maximum output, ID node F 920*f* is seen by each of master nodes M1-3 910*a*-910*c*. The anticipated open air performance or range distance (optimal range, or range based upon analytics or historic measurements) of the radio in ID node F's variable power short range communication interface 375 at P1 power level may have been previously been found to be approximately 30 feet. Thus, without any examination of RSSI levels from the individual master nodes, the system knows ID Node F is within 30 feet of master nodes M1-M3.

Next, when the ID node F's variable power short range communication interface 375 is set to P2, a medium output level in this example, ID node F 920*f* is seen by master nodes M1 910*a* and M2 910*b*. The anticipated open air performance or range distance (optimal range, or range based upon analytics or historic measurements) of the radio in ID node F's variable power short range communication interface 375 at running at P2 power level is approximately 15 feet. Thus, without any examination of RSSI levels from the individual nodes, we know master nodes M1 910*a* and M2 910*b* are within 15 feet of ID node F 920*f* in this example. Furthermore, we know the master node no longer receiving the broadcasted RF signal from ID node F 920*f* (e.g., master node M3 910*c*) is somewhere within 30 feet of ID node F 920*f*, but probably more than 15 feet away from node F in this example.

And when ID node F's variable power short range communication interface 375 is set to P3, its minimum output level in this example, ID node F 920*f* is seen by only master node M2 910*b*. The anticipated open air performance or range distance (optimal range, or range based upon analytics or historic measurements) of the radio in ID node F's variable power short range communication interface 375 at P3 power level is approximately 5 feet. Thus, without any examination of RSSI levels from the master nodes, we know the location of ID node F 920*f* is within 5 feet of the known location of master node M2 910*b* in this example.

The ranging steps with respect to the changed RF characteristics of an advertising ID node, as discussed in the example above, may then be repeated for any of the identified nodes in order to building a more complete picture of the relative location of each node.

Furthermore, the timing between such ranging steps may vary dynamically depending upon whether the node is moving. Those skilled in the art will appreciate that when moving, a quicker flow through such ranging steps will help to provide better accuracy given the movement of nodes. Thus, the time interval between instructing a node to broadcast one or more messages at a particular power level and then instructing that node to broadcast one or more messages at a different power level may be desired to be shorter when the node is moving, which can be determined based upon context data. For example, the context data may indicate the node is within a node package an on a moving conveyor system. As such, the node is moving relative to fixed master nodes that may be positioned along the conveyor system. Thus, server may have the first node perform the ranging steps where power is varied in relative quick succession compared to a situation where the context data indicates the node is not moving or is substantially stationary.

Figure 30:
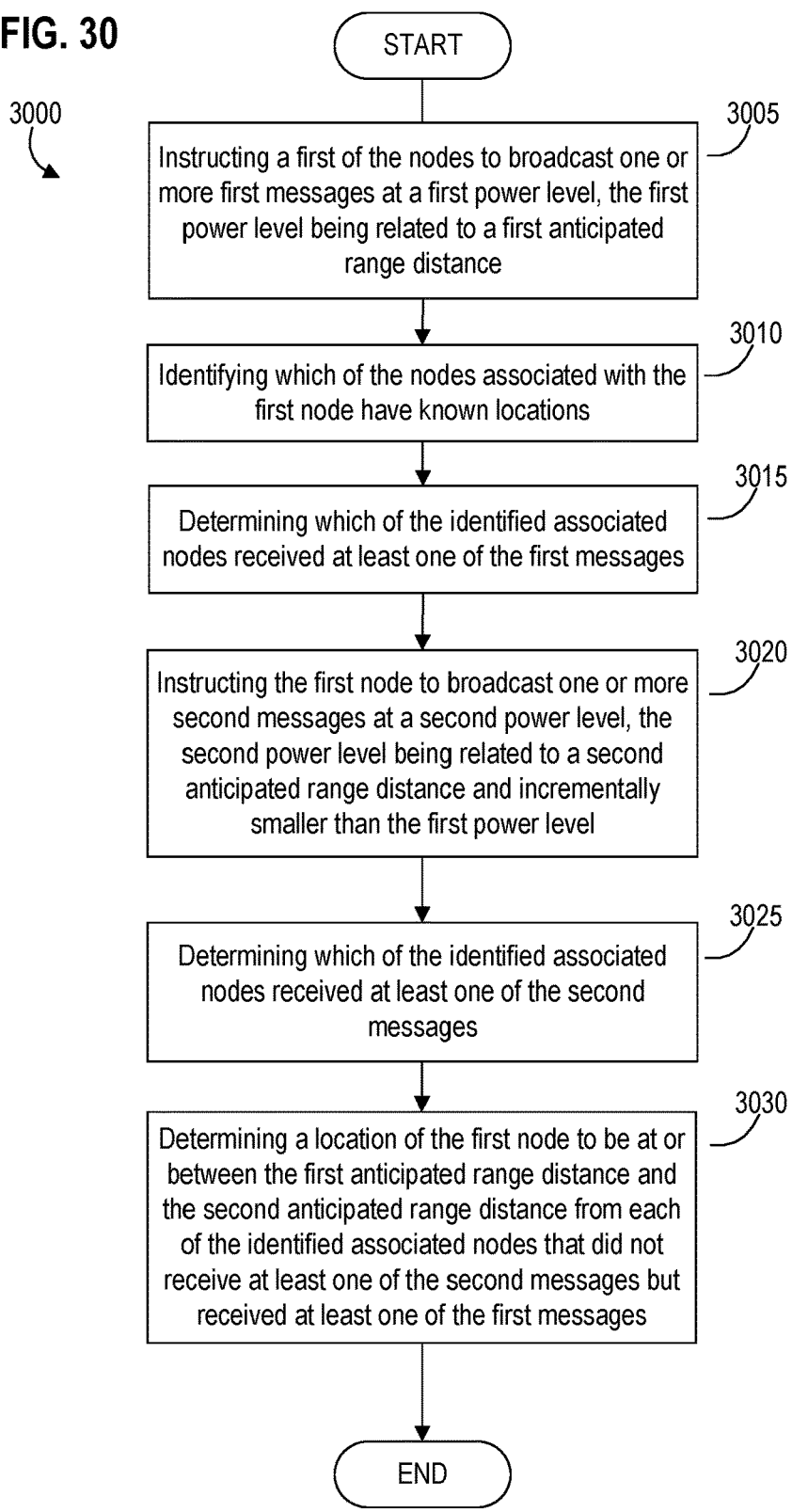
FIG. 30 is a flow diagram illustrating another exemplary method for location determination using one or more associations of nodes in a wireless node network in accordance with an embodiment of the invention.

FIG. 30 is a flow diagram illustrating another exemplary method for location determination using one or more associations of nodes in a wireless node network in accordance with an embodiment of the invention. Referring to FIG. 30 and how it explains a particular way to locate a node using associations and master node one or more master node advertising techniques, method 3000 begins at step 3005 by instructing a first of the nodes to broadcast one or more first messages at a first power level, the first power level being related to a first anticipated range distance. In one example, the first anticipated range distance may be an optimal range for the first of the nodes (e.g., a transmission range that assumes there are no obstructions and a clear signal path between nodes). In another example, the first anticipated range distance may be an optimal range for the first node adjusted based upon context data (e.g., data related to the surrounding RF environment of the first node).

At step 3010, the method 3000 identifies which of the nodes associated with the first node have known locations at step 3010. For example, this type of identification may be accomplished by reviewing association data that indicates which of the nodes are associated with the first node (e.g., via passive association, via active association, or via a combination of both), determining which of the nodes are associated with the first node based upon the reviewed association data, and identifying which of those associated nodes have known locations.

The method 3000 continues at step 3015 by determining which of the identified associated nodes received at least one of the first messages. Next, the method 3000 instructs the first node at step 3020 to broadcast one or more second messages at a second power level, where the second power level is related to a second anticipated range distance and the second power level incrementally smaller than the first power level. In a further example, the first anticipated range distance and the second anticipated range distance may be adjusted based upon one or more types of context data related to how an RF output signal from the first node may be impeded.

At step 3025, method 3000 determines which of the identified associated nodes received at least one of the second messages. Method 3000 concludes at step 3030 where the method determines a location of the first node to be at or between the first anticipated range distance and the second anticipated range distance from each of the identified associated nodes that did not receive at least one of the second messages but received at least one of the first messages.

As mentioned above, determining the node's location may be improved when accounting for movement. As such, an embodiment of method 3000 may instruct the first node to broadcast the one or more second messages within a time interval after instructing the first node to broadcast the one or more first messages. The time interval may be predetermined in some implementations, but also may be a dynamically set parameter in other implementations based upon context data related to the first node. In more detail, the time interval may be reduced from a prior value when the context data related to the first node indicates the first node is moving, but may be increased from a prior value when the context data related to the first node indicates the first node is substantially stationary.

In another embodiment, method 3000 may further include instructing the first node to broadcast one or more third messages at a third power level. Such a third power level is related to a third anticipated range distance and incrementally smaller range than the second anticipated range distance. Thereafter, the method may determining the location of the first node to be at or between the second anticipated range distance and the third anticipated range distance from each of the identified associated nodes that did not receive any of the third messages but received at least one of the second messages.

In another embodiment, method 3000 may comprise refining the location of the first node with an updated location of one or more of the identified associated nodes that did not receive at least one of the second messages but received at least one of the first messages. For example, if the first node is associated with a mobile master node, the location of the first node may be refined with an updated location of the mobile master node (which may be closer to the first node than previously determined).

In a further embodiment, the first node in the operation of method 3000 may not be self-aware of its own location. In another embodiment, the first node in the operation of method 3000 may have been previously self-aware of the location of the first node but may no longer be self-aware of the location of the first node prior to broadcasting the one or more first messages. In more detail, the first node may no longer be self-aware of the location of the first node prior to broadcasting the first message because of a change in the environment surrounding the first node. Such a change in the environment may be, for example, when the first node has moved inside a structure (e.g., building, vehicle, aircraft, container, etc.) that blocks location signals from being received by the first node.

Those skilled in the art will appreciate that method 3000 as disclosed and explained above in various embodiments may be implemented on a node (e.g., master node 110*a* in FIG. 4) running one or more parts of master control and management code 425 (e.g., the location aware/capture module) to control operations of an ID node (such as ID node F in FIG. 14) as part of location determination via ID node advertising. Such code may be stored on a non-transitory computer-readable medium, such as memory storage 415 on master node 110*a*. Thus, when executing code 425, the master node's processing unit 400 may be operative to perform algorithmic operations or steps from the exemplary methods disclosed above, including method 3000 and variations of that method.

From an apparatus perspective, an exemplary node apparatus in a wireless node network that uses location determination by association may comprises a node processing unit, node memory coupled to and used by the node processing unit (e.g., a node volatile memory and a node memory storage). The node memory storage maintains at least a program code section, association data, and location data. The node apparatus further includes a first communication interface that provides a first communication path coupled to the node processing unit and operatively coupling the node with a plurality of other nodes in the network. For example, the master node 110 illustrated in FIG. 4 includes such types of operational structure.

The node processing unit (e.g., processing unit 400 of master node 110*a*), when executing at least the program code section resident in the node volatile memory, is operative to perform specific functions or steps. In particular, the node processing unit is operative to communicate an instruction to a first of the other nodes (e.g., an ID node or master node temporarily operating as an ID node) via the first communication interface to cause the first other node to broadcast one or more first messages at a first power level, where the first power level is related to a first anticipated range distance.

The first anticipated range distance may be an optimal range for the first of the nodes and, in more detail, an optimal range for the first of the nodes adjusted based upon context data. In even more detail, the first anticipated range distance and the second anticipated range distance may be adjusted based upon one or more types of context data related to how an RF output signal broadcast from the first node may be impeded.

The node processing unit is also operative to identify which of the nodes associated with the first node have known locations. To do this, the node processing unit may access and review association data stored on the node memory storage (e.g., data indicating what nodes are passively or actively associated with the first other node), may determine which of the remaining other nodes are associated with the first other node based upon the reviewed association data, and may identify which of the remaining other nodes determined to be associated with the first other node have known locations.

The node processing unit is also operative to determine which of the identified associated nodes received at least one of the first messages, and to communicate another instruction via the first communication interface to the first node to cause the first node to broadcast one or more second messages at a second power level, where the second power level being is to a second anticipated range distance and incrementally smaller than the first power level.

Finally, the node processing unit is operative to determine which of the identified associated nodes received at least one of the second messages, and then determine a location of the first node to be at or between the first anticipated range distance and the second anticipated range distance from each of the identified associated nodes that did not receive at least one of the second messages but received at least one of the first messages.

In a further embodiment, the node processing unit may be operative to communicate a third instruction via the first communication interface to the first node to cause the first node to broadcast one or more third messages at a third power level. The third power level is related to a third anticipated range distance and incrementally smaller range than the second anticipated range distance. Additionally, the node processing unit may then be operative to determine the location of the first node to be at or between the second anticipated range distance and the third anticipated range distance from each of the identified associated nodes that did not receive any of the third messages but received at least one of the second messages.

In still another embodiment, the node processing unit is able to account for movement of the first node with a time interval between instructions sent to the first node. In particular, the node processing unit may be further operative to communicate another instruction via the first communication interface to the first node to broadcast the second messages within a time interval after instructing the first node to broadcast the first messages. In a more detailed example, the time interval may be dynamically set based upon context data related to the first node. In even more detail, the time interval may be programmatically reduced from a prior value when the context data related to the first node indicates the first node is moving (e.g., the first node is on a moving conveyor system) and/or the time value of the interval may be increased from a prior value when the context data related to the first node indicates the first node is substantially stationary (e.g., the node is within a node package recently placed in a storage area).

The node processing unit, in a further embodiment, may be operative to refine the location of the first other node with an updated location of one or more of the identified associated nodes that did not receive at least one of the second messages but received at least one of the first messages, and cause a second communication interface (e.g., medium/long range communication interface 485 coupled to processing unit 400) to transmit the refined location to the server.

Figure 31:
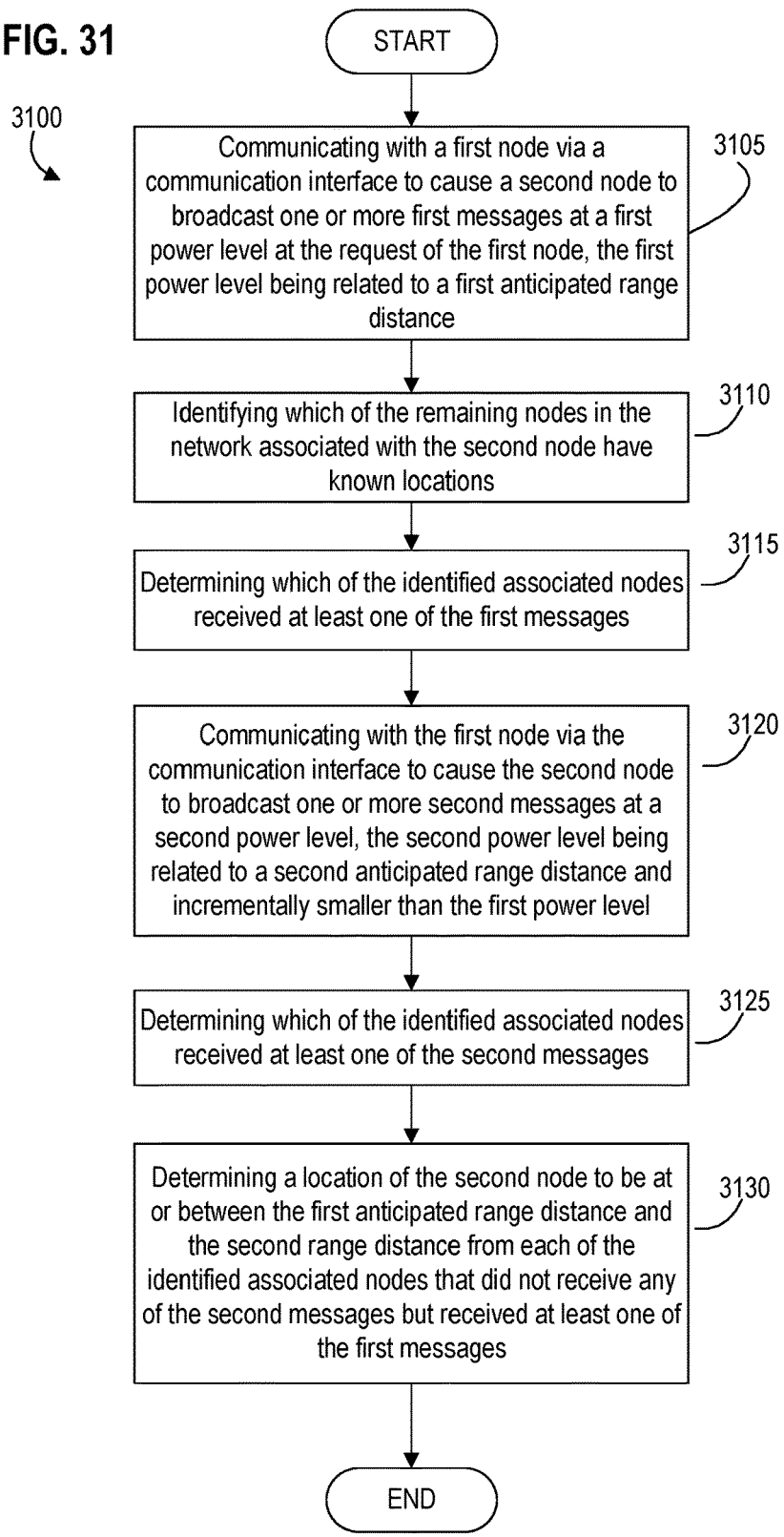
FIG. 31 is a flow diagram illustrating yet another exemplary method for location determination using one or more associations of nodes in a wireless node network in accordance with an embodiment of the invention.

From a server perspective, FIG. 31 is a flow diagram (similar to FIG. 30) illustrating yet another exemplary method for location determination using one or more associations of nodes in a wireless node network in accordance with an embodiment of the invention. Those skilled in the art will appreciate that while a server may operate to implement the steps as laid out in method 3000 and discussed above, FIG. 31 provides more details as to how a server processing unit (such as processing unit 500 running server code 525) may implement such a method at that level of the network via method 3100. In this more detailed embodiment, the server is communicating directly with a master node (e.g., a first node) to direct and control how the master node interacts with and causes operations to be undertaken on the ID node (e.g., a second node). Thus, step 3105 is similar to step 3005 but more precisely calls for communicating with a first node via a communication interface to cause a second node in the network to broadcast one or more first messages at a first power level at the request of the first node, where the first power level is related to and corresponds with a first anticipated range distance. Likewise, step 3120 is similar to step 3020 but more precisely calls for communicating with the first node via the communication interface to cause the second node to broadcast one or more second messages at a second power level at the request of the first node, the second power level being related to a second anticipated range distance and incrementally smaller than the first power level. The other steps of method 3100 are similar to those illustrated and explained above relative to method 3000, and that the similar principles will apply to method 3100.

Those skilled in the art will appreciate that method 3100 as disclosed and explained above in various embodiments may be implemented on a server (e.g., server 100 in FIG. 5) running one or more parts of server control and management code 525 to direct a master node to control operations of an ID node (such as ID node F in FIG. 14) as part of location determination via ID node advertising. Such code may be stored on a non-transitory computer-readable medium, such as memory storage 515 on server 100. Thus, when executing code 525, the server's processing unit 500 may be operative to perform algorithmic operations or steps from the exemplary methods disclosed above, including method 3100 and variations of that method.

And similar to the node apparatus described above, one embodiment includes an exemplary server apparatus in a wireless node network that uses location determination by association. The exemplary server apparatus generally comprises a server processing unit, server memory coupled to and used by the server processing unit (e.g., a server volatile memory and a server memory storage). The server memory storage maintains at least a program code section, association data, and location data. The server apparatus further includes a communication interface coupled to the server processing unit and that provides access to a communication path operatively coupling the server with at least a first node in the network.

The exemplary server processing unit, when executing at least the program code section resident in the server volatile memory, is operative to perform specific functions or steps. In particular, the server processing unit is operative to communicate with the first node via the communication interface to cause a second node in the network to broadcast one or more first messages at a first power level at the request of the first node, where the first power level is related to a first anticipated range distance; identify which of the remaining nodes in the network associated with the second node have known locations; determine which of the identified associated nodes received at least one of the first messages; communicate with the first node via the communication interface to cause the second node to broadcast one or more second messages at a second power level at the request of the first node, where the second power level is related to a second anticipated range distance and incrementally smaller than the first power level; determine which of the identified associated nodes received at least one of the second messages; and determine a location of the second node to be at or between the first anticipated range distance and the second anticipated range distance from each of the identified associated nodes that did not receive any of the second messages but received at least one of the first messages. And in a further embodiment, the server apparatus' processing unit may be further operative to store the determined location in the server memory storage as part of the location data.

In another embodiment, the server apparatus' processing unit may be operative to communicate with the first node via the communication interface to cause the second node to broadcast the one or more second messages within a time interval after communicating with the first node to cause the second node to broadcast the one or more first messages. As previously mentioned, this type of time interval may dynamically set based upon context data related to the second node. Context data may also be used as set forth above with respect to the node apparatus but applied here to the second node—such was where the first anticipated range distance is the optimal range for the second node adjusted based upon context data.

Master Node Location Determination through Advertise

In another embodiment, a master node may no longer know its location. For example, such a situation may occur when a master node determines it's current location via GPS location circuitry 475, but the master node finds itself without access to an adequate number of GPS signals (e.g., it cannot determine a location due to the lack of a sufficient number of GPS signals from diverse GPS satellites). Such a situation may happen when the master node moves indoors is proximate to a structure that interferes with the location signals.

In an exemplary embodiment where a master node attempts to determine its own location via advertising techniques, the master node may detect a loss of location confidence (e.g., upon a loss of detected GPS signals; upon detecting a separate signal to processing unit 400 indicating the master node's location is unknown; when processing unit 400 senses movement (e.g., via accelerometers (not shown) or the like) but cannot confirm that the location circuitry 475 is providing updated location information for the node, etc.). In other words, the master node becomes aware that it no longer has a known location.

Next, the master node responds by beginning to broadcast one or more advertising messages in a similar way as ID node F 920*f* is described as doing with respect to FIG. 14. This is done so that the master node having an unknown location can advantageously leverage off the known locations of nearby other nodes. As such, an embodiment may allow a type of leveraged chaining effect whereby known locations of particular types of nodes may be used to extend location information to other nodes that do not know their locations (e.g., ID nodes) or nodes that have detected a loss of location confidence (e.g., master nodes). Thus, such an embodiment may be used to determine an indoor location of a master node (including equipment equipped with master node functionality) in cases where signals for the conventional onboard location circuitry 475 are not available.

Referring back to the exemplary method 3000 and FIG. 30, method 3000 may be such that the first node is not self-aware of the location of the first node. This may happen when the first node (e.g., an ID node) is actually a master node that was previously self-aware of its own location (e.g., via received GPS signals) but is no longer self-aware of its location (e.g., when the GPS signals can no longer be received), which has the master node changing operation to operate as an ID node prior to broadcasting the first message. In other words, the master node may no longer be self-aware of its location and begin operating as an ID node for purposes of location determination prior to broadcasting the first message because of a change in the environment surrounding the master node, such as when the master node has moved inside a structure that blocks location signals from being received by the master node. Thus, an embodiment may advantageously allow a node to adaptively alter operations when moving from a clear outdoor environment to an indoor environment. And a server may interact with such a master node while that master node is operating, for location purposes, as an ID node, temporarily.

Location with Improved RSSI Measurements

In another embodiment, a signal strength measurement between two or more nodes may be used to determine the proximity of the nodes by using one or more improvements to conventional RSSI measurements. In conventional RSSI measurements, such as with Bluetooth 4.0, those skilled in the art will appreciate that adaptive frequency hopping as part of spread spectrum techniques may cause undesirably cause the signal strength to fluctuate. In other words, the advantage of using frequency hopping and spread spectrum for security and avoidance of interference may have a negative impact on using such signals for stable proximity-based location determinations. Thus, it may be desired to emphasize stability of a signal and limits to fluctuation for purposes of location determination.

In one embodiment, a type of improvement for RSSI measurements may include reducing the number of channels and/or a corresponding frequency range in use during advertising from nodes. For example, a node may have processing unit 300/400 adaptively control variable power short range communication interface 375/480 to reduce the number of channels and/or the frequency range used during node advertising. Such a dynamic change may be implemented, in some embodiments, by altering the content of a particular type of profile data 330/430, such as an RF profile data that effectively defines RF characteristics of a node (e.g., frequency, power level, duty cycle, channel numbers, channel spacing, alternative fluctuation modes, etc.). In one further embodiment, a first fluctuation mode may be defined that provides a default or more standard communication protocol, such as the conventional frequency hopping, spread spectrum, and channel allocations for Bluetooth® communications. Other alternative modes (one or more) may be defined that alter one or more RF characteristics to provide increasingly more stable and less fluctuations of the RF output signal from a node. Thus, a node may be dynamically placed into one or more modes regarding such RF characteristics that increasingly emphasize stability of the node's RF output signal and limits fluctuation for purposes of enhanced location determination using RSSI measurements.

In another embodiment, a type of improvement for RSSI measurements may include ensuring visibility to and advantageously managing automatic gain control (AGC) circuitry (not shown) that may cause the RF output signal to vary for a node. For example, a node may include a type of AGC circuitry as part of variable power short range communication interface 375/480. This type of AGC circuitry may allow node processing unit 300/400 or other logic circuitry that is part of variable power short range communication interface 375/480 to limit fluctuations under certain conditions (e.g., when attempting to use RSSI location determination techniques). In this example, different AGC circuitry settings may be defined in exemplary RF profile data that effectively defines RF characteristics of a node (e.g., frequency, power level, duty cycle, channel numbers, channel spacing, alternative fluctuation modes, etc.). This is yet another example of how a node may be dynamically placed into one or more modes regarding such RF characteristics (including AGC circuitry settings) that increasingly emphasize stability of the node's RF output signal and limits fluctuation for purposes of enhanced location determination using RSSI measurements.

Location with Adjustments for Environmental Factors in RF Signal Quality

In general, those skilled in the art will appreciate that environmental factors may cause a communication signal, such as an RF signal, to fluctuate or be transmitted and received in a manner that undesirably varies depending upon a signal path environment. Passive physical interference factors (e.g., forms of electronic signal shielding) may be substantially close and cause drops in signal strength across the output ranges of the nodes. Additionally, active radio interference factors may vary across the RF output ranges of the nodes depending upon other active devices in the reception vicinity. Thus, the proximate environment of a node may have a multitude of adverse factors that impact communications and, as a result, the ability to locate the node.

In one embodiment, making location determinations may be enhanced by a data analytics type of approach that may adjust and account for different RF environmental factors for a similar type of node in a similar type of situation. For example, the quality of the RF output signal of a particular type of node and the corresponding physical range of that signal to a receiver of known sensitivity may be determined for a given environment. In this example, the system defines a maximum range of that signal based on a predetermined condition, such as open-air connectivity. This may assume an environment with no signal degradation due to interference or physical shielding. However, both interference and physical shielding may diminish the range of the RF output signal of a node. In a dynamically adaptive and learning manner, the system may collect information on how a particular type of node may operate in a particular environment under certain settings (e.g., reported signal strengths and corresponding settings for RF output signal power levels). This analysis of a similar environment may be repeated. In other words, through such data analytics of an anticipated environment to be faced by a similar node, signal loss information can be generated and applied as a type of context data (i.e., RF data) for a node in a similar environment to refine location determination. Thus, an exemplary embodiment may refine location determinations with adaptive signal loss characteristics based on a contextual appreciation of an anticipated environment (e.g., physical shielding such as packaging, package contents, proximate package, proximate package contents, and physical infrastructure causing signal variance) without requiring a calibration phase.

And advantageously combining those data points with $3^{rd}$ party data describing the physical environment, in which the node was located in at that time, may refine location even further. Such information may be used as RF data (a type of context data) in future efforts to manage and locate a similar type of node anticipated to be in a similar environment.

In more detail, in an embodiment that refines a location determination based upon context and data analytics to adjust for known RF impediments, the maximum physical range of a node's RF output signal relative to a receiver of known RF sensitivity is determined. In one example, this first range value may be referred to as a theoretical or nominal open-air range of a similar type transmitter-receiver node pair in a similar environment but with substantially no physical shielding or signal interference negatively impacting the signal range. A second range value, which may be considered an actual RF range value, may be the observed range of the signal in a similar environment but where there are contextual factors reducing the communication range, including physical shielding due to factors like packaging, package contents, proximate package, proximate package contents, physical infrastructure, interference from other radio sources, or shipper specific information such as vehicle or facility layout information. Through access to prior data analysis of the differing range values and with knowledge of the operational environment of the transmitting node was in (e.g., a similar environment to the proximate environment of the node), a refined location may be determined using an approximation of an actual RF output range that intelligently adjusts what may be anticipated to be the RF environment of the node. In other words, by knowing the appropriate contextual environment related to a node (such as signal degradation information on how a similar node operates in a similar environment), an improved location determination may be made to make intelligent yet efficient adjustments (such as communication distance adjustments) that provide a refined location of the node.

In one example, such as the example shown in FIG. 2, master node 110b is outside of a container (such as a Uniform Load Device (ULD) container 210 known to be used for transporting groups of items on aircraft) that has an ID node inside the container. A first or theoretical range value between master node 110b and ID node 120b may be determined to be 10 feet at a specific RF output power level when the package (and related ID node) may be known to be less than 10 feet away from the scanning node (e.g., master node 110b). A second range value at similar distances with similar types of nodes, but with incident RF signal loss as a result of communicating through the wall of the container 210, may be between 4 and 5 feet. If context data, such as $3^{rd}$ party information or scan data, indicates the transmitting node is within the ULD container 210, the system would expect the transmission range to be limited according to the data analytics associated with this known RF impediment (e.g., characteristics for transmitting through ULD container 210), thus reducing the possible scanning nodes that may see the broadcasting node within the ULD container, or require the transmitting node to increase its RF output power to be heard.

Figure 32:
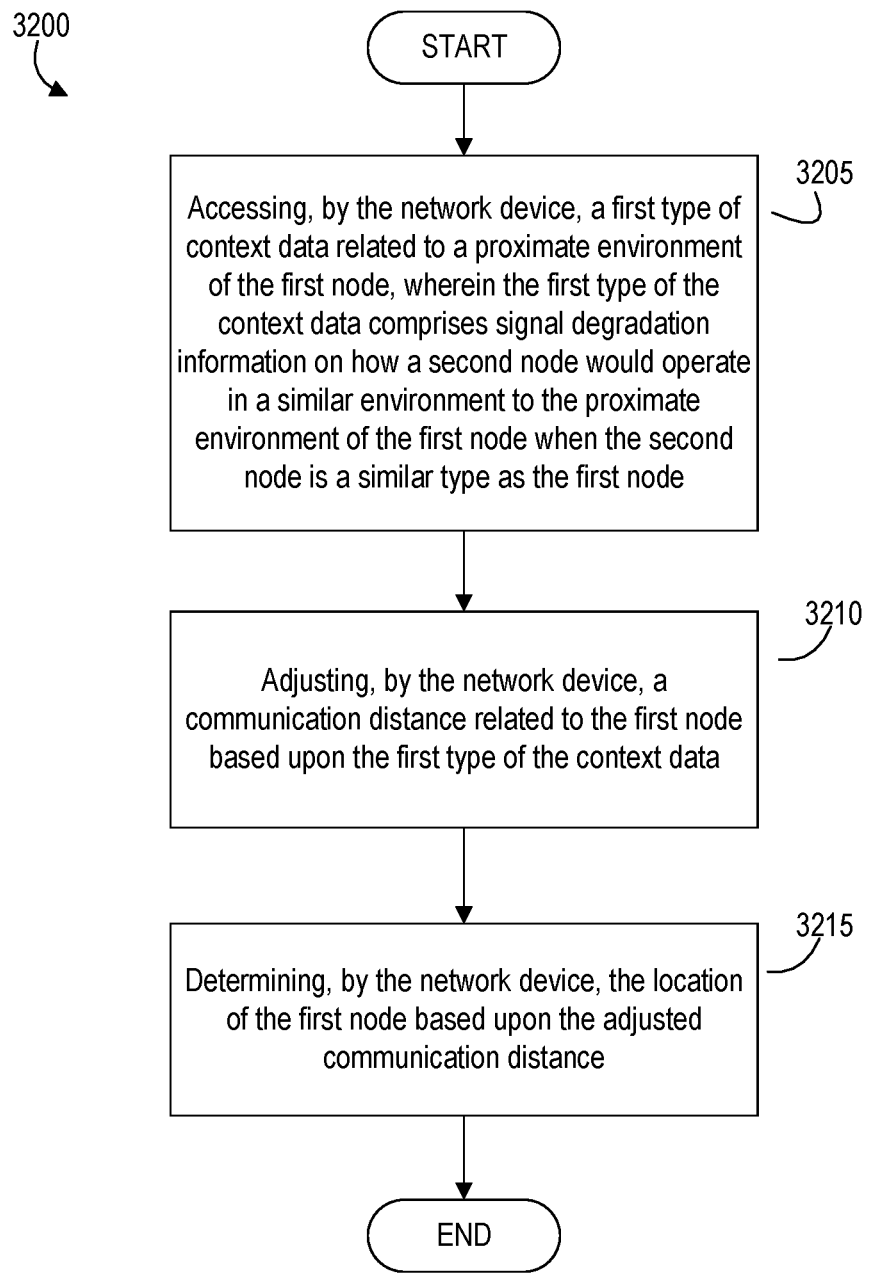
FIG. 32 is a flow diagram illustrating an exemplary method for location determination of a first node in a wireless node network based on context data in accordance with an embodiment of the invention.

FIG. 32 is a flow diagram illustrating an exemplary method for location determination of a first node in a wireless node network based on context data in accordance with an embodiment of the invention. Referring now to FIG. 32, method 3200 begins at step 3205 with a network device (such as a master node or server) accessing a first type of the context data related to a proximate environment of the first node.

The first type of context data comprises signal degradation information on how a second node would operate in a similar environment to the proximate environment of the first node when the second node is a similar type as the first node. Thus, rather than calibrating with an actual measurement relative to the current proximate environment of the first node, the signal degradation information provides compensation information on what may be generally anticipated in a more general proximate environment based on how a similar type of node may operate in a similar environment. As the similar environment of the similar node is generally an approximation for what is anticipated to be the proximate environment of the first node, this advantageously avoids the need for an actual calibration of the proximate environment. In one embodiment, the signal degradation information may be based upon a difference in how the second node communicates when exposed to an adverse communication environment (such as a similar environment to the proximate environment of the first node) compared to how the second node would communicates when exposed to a nominal communication environment (such as an environment that is unencumbered by shielding and interference factors). Those skilled in the art will appreciate that a nominal communication environment need not be perfectly clear of all influences that shield or interfere with communications.

The types and aspects of signal degradation information may vary depending on a wide variety of factors. In one embodiment, the signal degradation information may be related to at least one of shielding and interference. Thus, signal degradation information may include both passive and active factors that impact the communication environment.

In another embodiment, the signal degradation environment may be based upon a degraded operation of the second node when the similar environment is an adverse communication environment. In more detail, the signal degradation information may be based upon a difference in how the second node communicates when exposed to the adverse communication environment compared to how the second node communicates when exposed to a substantially normal communication environment, such as an open air environment.

In still another embodiment, signal degradation information may relate to at least shipment data for one or more items being shipped (e.g., currently shipped or shipped in the past) and located in the proximate environment of the first node. For instance, a package near the first node may include metallic materials that may impede or block RF signals and the signal degradation information may relate to such information about close packages being shipped near the first node. In another example, the signal degradation information may relate to at least layout data for one or more physical structures in the proximate environment of the first node. In more detail, the layout data may be for one or more physical structures (e.g., walls, machinery, enclosures, and conveyances) in the proximate environment of the node near a predicted path for the first node. In yet another example, the signal degradation information relates to at least historic data on one or more analyzed prior operations of the second node.

At step 3210, the network device, such as a master node or server, may adjust an anticipated communication distance related to the first node based upon on the first type of the context data. In one example, the anticipated communication distance may be a theoretical broadcast distance based upon parameters of the device's radio. Such an anticipated communication distance is known as it is an estimate of the radio's range. In one example, the adjusted communication distance comprises an anticipated reduced range distance for a transmission from the first node. In another example, the adjusted communication distance comprises an anticipated reduced receiver sensitivity distance for the first node.

In yet another example, adjusting the communication distance may be accomplished by adaptively adjusting, by the network device, the communication distance based upon the signal degradation information and a second type of the context data. In other words, the communication distance may be adjusted based upon signal degradation information considered along with other types of context data, such as how the first node is being moved (such as an anticipated movement of the first node along a predicted transit path for the first node) or a density of other nodes near the first node.

At step 3215, the network device determines the location of the first node based upon the adjusted communication distance. In a further embodiment, the method may also update the adjusted communication distance by the network device based upon movement of the first node, and may refine the location of the first node with an updated adjusted communication distance. This may happen with the first node is a mobile master node capable of self-determining its own location.

Those skilled in the art will appreciate that method 3200 as disclosed and explained above in various embodiments may be implemented on a network device (e.g., exemplary master node 110*a* in FIG. 4 or server 100 in FIG. 5) running one or more parts of their respective control and management code to perform steps of method 3200 as described above. Such code may be stored on a non-transitory computer-readable medium, such as memory storage 415 on master node 110*a* or memory storage 515 on server 100. Thus, when executing such code, the respective network device's processing unit may be operative to perform algorithmic operations or steps from the exemplary methods disclosed above, including method 3200 and variations of that method.

In more detail, an exemplary network device apparatus for determining a location of a first node in a wireless node network based on context data, the exemplary network device may include a processing unit, a volatile memory coupled to the processing unit, and a memory storage coupled to the processing unit. The exemplary network device further includes a communication interface coupled to the processing unit and that provides a communication path operatively coupling the network device with the first node in the network.

The memory storage for the device maintains at least a program code section and context data having at least signal degradation information. Such signal degradation information, as a type of context data, is information on how a second node would operate in a similar environment to a proximate environment of the first node when the second node is a similar type as the first node. Examples of signal degradation information may include those discussed above relative to step 3205 of method 3200.

When executing at least the program code section when resident in the volatile memory, the processing unit of the network device is operative to perform the steps noted and described above with respect to method 3200. In more detail, the processing unit is operative to at least connect with the memory storage to access the signal degradation information, adjust a communication distance (if needed) related to the first node based upon the signal degradation information, determine the location of the first node based upon the adjusted communication distance, and store the determined location of the first node as location data on the memory storage.

Adjusting the communication distance by the processing unit may be accomplished as described above with regard to step 3210 of method 3200. And as mentioned above, the processing unit may be further operative to adaptively adjust the communication distance where other types of context data are also considered, such as movement and anticipated node movement as detailed out above.

In a further embodiment, the network device may be a mobile master node that includes location circuitry (such as GPS circuitry 475 of exemplary master node 110*a* shown in FIG. 4). In this embodiment, the processing of the network device may be further operative to determine a location of the network device based upon an output signal from the location circuitry received by the processing unit, and determine the location of the first node based upon the adjusted communication distance and the location of the network device. As such, the first type of the context data related to the proximate environment of the first node is based upon the determined location of the first node.

Those skilled in the art will also appreciate that in some operational environments, the signal degradation information may not require any adjustment to the communication distance in an embodiment. However, in other environments (e.g., adverse RF environments), the signal degradation information may provide a basis for adjusting the communication distance in the embodiment, even if not performed every time. Thus, an adjustment to the communication distance may not be needed in all proximate environments of the first node but may be performed, if needed, based on the proximate environment of the first node. It is the ability of an embodiment to adjust this communication distance when needed and if needed that advantageously allows for locating the first node with more accuracy.

Location through Triangulation

Figure 15:
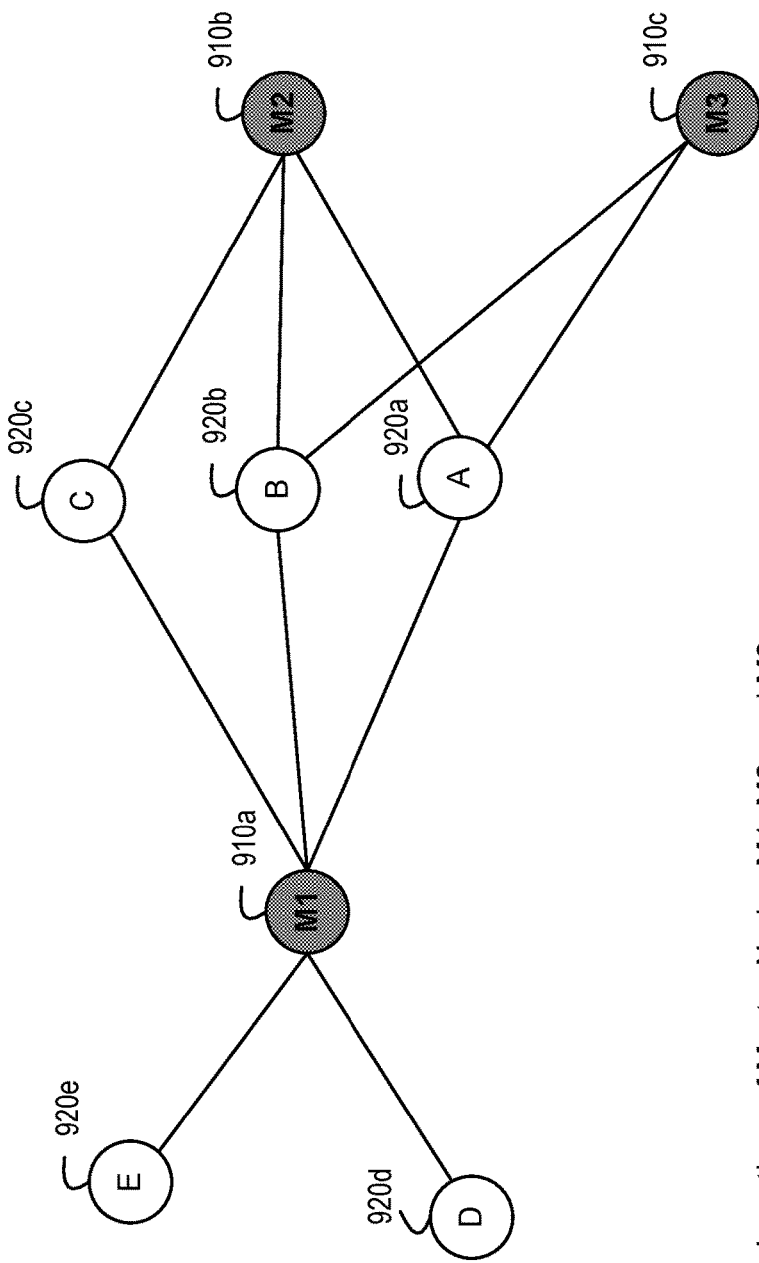
FIG. 15 is a diagram illustrating an exemplary location determination through triangulation in accordance with an embodiment of the invention.

In some embodiments, various methods for determining a node's location may rely upon, at least in part, triangulation techniques. In other words, as the wireless node network collects data on receiver-transmitter pairs, other methods for determining location of the individual nodes that utilize triangulation, at least in part, may become possible. FIG. 15 is a diagram illustrating an exemplary location determination through triangulation within a wireless node network in accordance with an embodiment of the invention. Referring now to the illustrated embodiment of FIG. 15, three exemplary master nodes M1-M3 910*a*-910*c* are shown with each master node having a known location. Exemplary ID nodes A-E 920*a*-920*e* are also shown where they are at least in communication range of one or more of exemplary master nodes MA-M3 910*a*-910*c*.

In this illustrated example, the master nodes M1-M3 may detect and collect advertising messages from ID nodes A-E at varying and known power levels. The captured information is forwarded by the master nodes M1-M3 to the backend server 100, where location determinations may be made. For example, factors like RSSI and visibility of each node at each power level may be used to determine, with a higher degree of accuracy, the location of nodes where sufficient information is available.

For an exemplary system to triangulate a node, three nodes with known locations must have seen the broadcasting node. In this example, two advertising ID nodes, A 920*a* and B 920*b*, were seen by the three nodes having known locations (master nodes M1-M3 910*a*-910*c*). Based upon the captured information, the locations of ID node A 920*a* and ID node B 920*b* are calculated.

Chaining Triangulation

Figure 16:
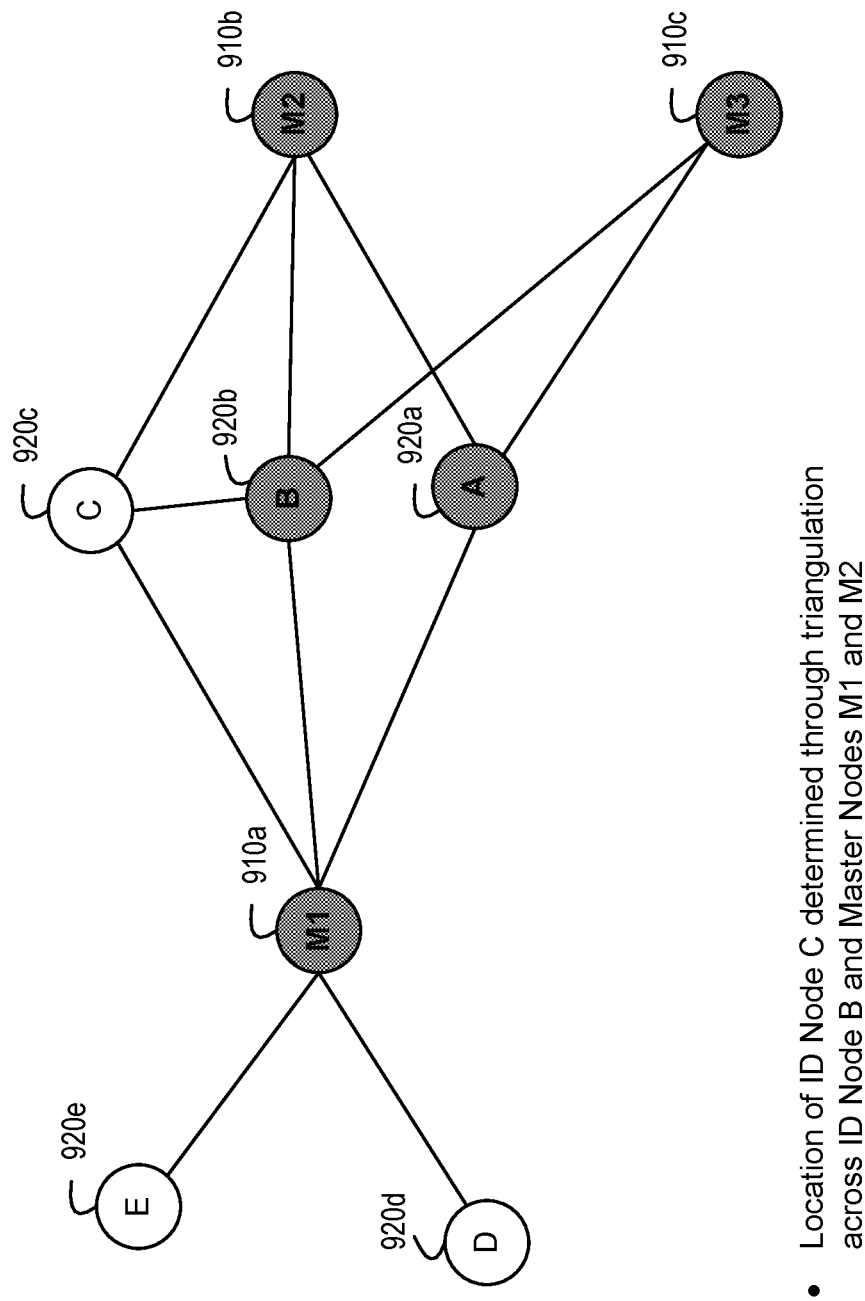
FIG. 16 is a diagram illustrating an exemplary location determination through chaining triangulation in accordance with an embodiment of the invention.

In another embodiment, a node with an inferred location may be used with triangulation techniques to determine a location of another node in a wireless node network. FIG. 16 is a diagram illustrating an exemplary location determination through chaining triangulation in accordance with an embodiment of the invention. The locations of ID nodes A 920*a* and B 920*c* have been determined by triangulating across master nodes M1-M3, as illustrated in the exemplary embodiment shown in FIG. 15. However, as illustrated in FIG. 16, the location of ID node C 920*c* may also be determined according to an embodiment.

For example, an exemplary method of determining a node's location through chaining triangulation begins with determining the calculated location of ID node B 920*b* (as explained with reference to FIG. 15). Next, a node closer to ID node B 920*b* may be used to get the missing third signal point needed for triangulation. This may be accomplished by placing ID node B 920*b* in a query (scan) mode such that it listens for a message from ID node C 902*c*. ID node C is instructed to advertise, thus providing a signal that may be captured by ID node B. After capturing the signal profile of C, ID node B may communicate or share the captured information and forward it along to the backend server 100 through either of the master nodes M1 or M2. The resulting location determination of ID node C 920c may have a higher level of position error due to it being partially based on a calculated reference (e.g., the location of ID node B), but the leveraged location determination of ID node C 920c may be sufficiently accurate (or be an actionable location) that useful information may be gleaned about ID node C 920c. For example, a leveraged or chained location determination of ID node C may indicate, with the help of context data, that nodes M1, M2, and ID node B are all close enough to ID node C that ID node C is determined to be within the same container nodes M1, M2, and ID node B.

Location through Proximity to Triangulation (LP2T)

In an embodiment where chaining triangulation may determine location through proximity to triangulation (LP2T), a starting point may be determining the relative location of an ID node to a master node based on the proximity method, as explained above. However, when the relative location of the ID node has been determined, a more accurate or refined location of the ID node may be determined based upon the location of all master nodes that can capture the RF output signal broadcast from the ID node, and then triangulating based on observed signal strength of the ID node. In this example, the proximity-based location is used as an input in the triangulation calculation to estimate likely signal deterioration historically observed between a node at the proximity-determined location and scanning master nodes. In a further embodiment, by taking into account historic data on patterns of signal deterioration, a more accurate triangulation may be possible, leading to a more accurate location determination.

Figure 33:
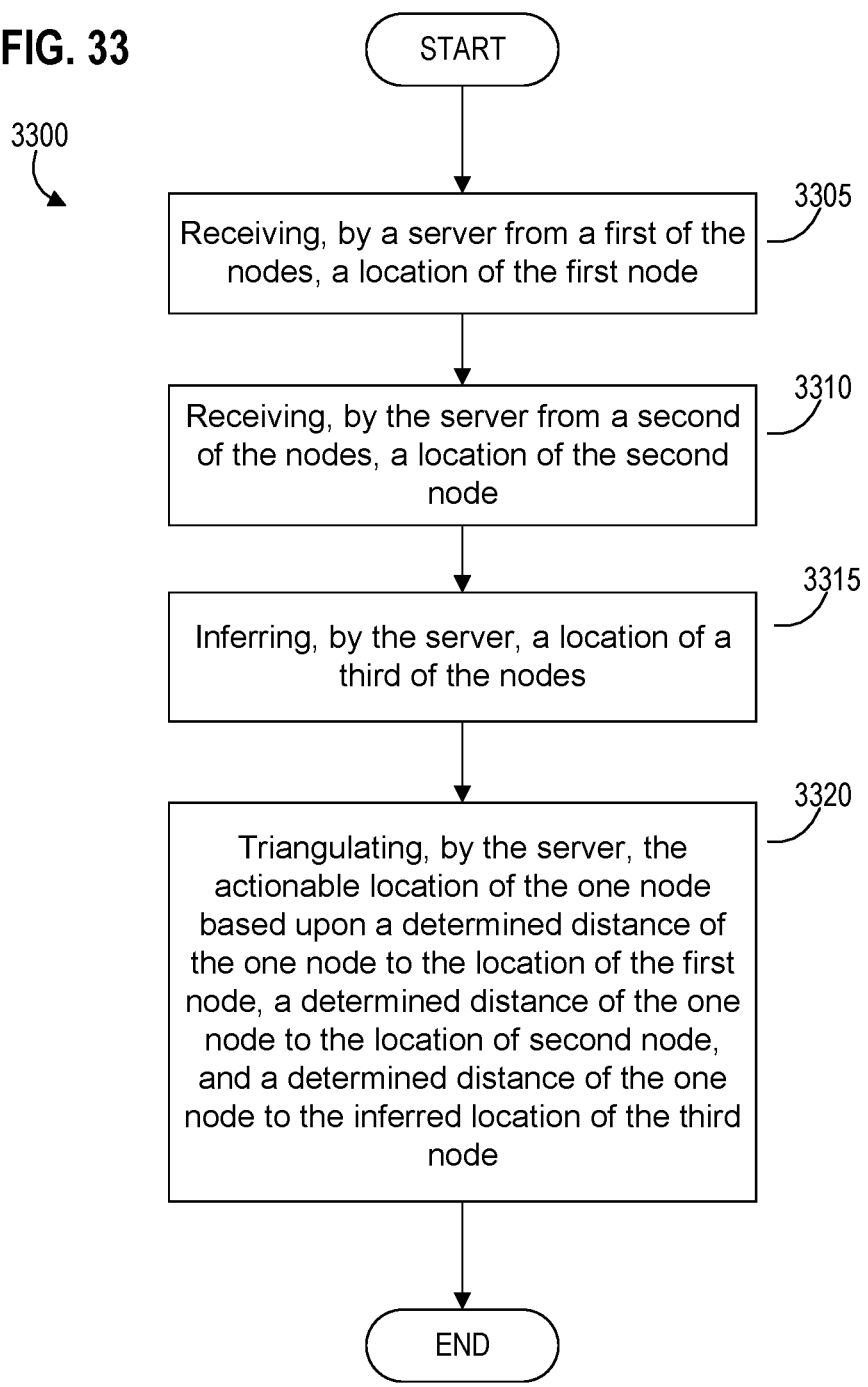
FIG. 33 is a flow diagram illustrating an exemplary method for determining a location using chaining triangulation for one of a plurality of nodes in a wireless node network having a server in accordance with an embodiment of the invention.

FIG. 33 is a flow diagram illustrating an exemplary method for determining a node location using chaining triangulation for one of a plurality of nodes in a wireless node network having a server in accordance with an embodiment of the invention. Such an exemplary node location need not be precise or exacting, but can be sufficiently accurate without absolutes.

Referring now to FIG. 33, method 3300 begins at step 3305 with the server receiving a location of a first of the nodes from the first node. Next, at step 3310, the server receives a location of a second of the nodes from the second node. For example, with reference to the example shown in FIG. 16, master nodes M1 910a and M2 910b may transmit their respective location coordinates from their respective onboard location circuitry to the server so that the server has the current locations of these two master nodes.

At step 3315, the server infers a location of a third of the nodes. For instance, in the example illustrated in FIG. 16, the server may infer the location of ID node B 920b. In one embodiment, inferring may comprise having the server determine a proximate-based location of the third node relative to another of the nodes having a known location, such that the proximate-based location operates as the inferred location of the third node.

In another embodiment, inferring the location of the third node may comprise having the server determine a relative location of the third node to the first node (as the node having a known location) or to the second node (as another node having a known location). Method 3300 may also, in another embodiment, include having the server adjust the inferred location of the third node to determine a refined location of the third node based upon third node context data related to the inferred location of the third node At step 3320, method 3300 concludes with the server triangulating the location of the one node based upon determined distances to each of the first and second nodes, and a determined distance of the one node to the inferred location of the third nodes.

In a more detailed embodiment, method 3300 may triangulate the location of the one node by accessing first node context data related to a contextual environment near the first node and second node context data related a contextual environment near the second node. Such contextual environments may include an environment of being on a conveyor system, or within a particular facility, or next to materials that may degrade or shield signals being received by the one node. Next, the more detailed triangulating may have the server adjust the determined distance of the one node to the location of the first node based upon the first node context data to provide a refined distance of the one node to the location of the of the first node. Then, the server may triangulate the location of the one node based upon the adjusted determined distance of the one node to the location of the first node, the adjusted determined distance of the one node to the location of second node, and a determined distance of the one node to the refined location of the third node.

In a further embodiment, method 3300 may also have the server transmitting an instruction so as to cause the server to transmit an instruction to cause the one node to broadcast a plurality of advertising signals over a period of time. In such an embodiment, the determined distance of the one node to the location of the first node may be based upon captured signals from the one node by the first node over the period of time and reported to the server by the first node. In another embodiment, the determined distance of the one node to the location of the second node may be based upon captured signals from the one node by the second node and reported to the server by the second node.

In still another embodiment, the server may transmit an instruction to cause the one node to broadcast a plurality of advertising signals at different power levels. In such an embodiment, the determined distance of the one node to the location of the first node may be based upon captured signals from the one node by the first node and reported to the server by the first node. In another embodiment, the determined distance of the one node to the location of the second node may be based upon captured signals from the one node by the second node and reported to the server by the second node.

In yet another embodiment, method 3300 may also have the server transmitting the location information out to a requesting entity (e.g., another node, a user access device, etc.) upon receipt of a request for a location of the one node from that entity.

Those skilled in the art will appreciate that method 3300 as disclosed and explained above in various embodiments may be implemented on a server (such as exemplary server 100 as illustrated in FIG. 5) running one or more parts of a control and management code (such as an code 525) to implement any of the above described functionality. Such code may be stored on a non-transitory computer-readable medium (such as memory storage 515 in an exemplary server). Thus, when executing such code, a processing unit of the server (such as unit 500) may be operative to perform algorithmic operations or steps from the exemplary methods disclosed above, including method 3300 and variations of that method.

A server apparatus is also described in an embodiment for determining a location using chaining triangulation for one of a plurality of nodes in a wireless node network. The server apparatus generally comprises a server processing unit, a server volatile memory, a server memory storage, and a communication interface. The server volatile memory, server memory storage, and communication interface are each configured in the apparatus as coupled to the server processing unit. The server memory storage maintains at least a program code section and location data related to nodes in the network. In some embodiments, the server memory storage may also maintain context data, such as first node context data and second node context data. The communication interface provides a communication path operatively coupling the server with nodes in the network, such as a first and second node.

The server processing unit, when executing at least the program code section resident in the server volatile memory, is operative to perform various functions, such as the functions described in the steps above related to method 3300. In particular, the server processing unit is operative to receive a request over the communication interface for the location of the one node. Based on the request, the server processing unit is then operative to receive the respective locations of the first and second nodes, and store the locations as part of the location data kept on the server memory storage. The server processing unit is further operative to infer a location of a third of the nodes, and store the inferred location of the third node as part of the location data kept on the server memory storage. The server processing unit then is operative to triangulate the location of the one node based upon a determined distance of the one node to the location of the first node, a determined distance of the one node to the location of second node, and a determined distance of the one node to the inferred location of the third node. And finally, the server processing unit is operative to transmit the location information to the requesting entity over the communication interface in response to the request.

In one embodiment, the server processing unit may be further operative to infer the location of the third of the nodes by being operative to determine a proximate-based location of the third node relative to another of the nodes having a known location, where the proximate-based location operates as the inferred location of the third node.

In another embodiment, the server processing unit may be further operative to transmit an instruction over the communication interface to cause the one node to broadcast a plurality of advertising signals over a period of time. In this embodiment, the determined distance of the one node to the location of the first node may be based upon captured signals from the one node by the first node over the period of time and reported to the server by the first node. Alternatively, the determined distance of the one node to the location of the second node may be based upon captured signals from the one node by the second node and reported to the server by the second node.

In another embodiment, the server processing unit may be further operative to transmit an instruction over the communication interface to cause the one node to broadcast a plurality of advertising signals at different power levels. In such an embodiment, the determined distance of the one node to the location of the first node may be based upon captured signals from the one node by the first node and reported to the server by the first node. Alternatively, the determined distance of the one node to the location of the second node may be based upon captured signals from the one node by the second node and reported to the server by the second node.

In yet another embodiment, the server processing unit may be further operative to infer the location of the third node by being operative to determine a relative location of the third node to the first node or, alternatively, to the second node.

In still another embodiment, context data may be relied upon to refine locations. More specifically, the server processing unit may be further operative to adjust the inferred location of the third node to determine a refined location of the third node based upon third node context data related to the inferred location of the third node.

In a more detailed embodiment, the server memory storage may further maintains context data, and the server processing unit may be further operative to triangulate by being operative to access first node context data as part of the context data maintained on the server memory storage, where the first node context data is related to a contextual environment near the first node. Likewise, the server processing unit may be further operative to access second node context data as part of the context data maintained on the server memory storage, where the second node context data is related a contextual environment near the second node. The server processing unit may then be operative to adjust the determined distance of the one node to the location of the first node based upon the first node context data to provide a refined distance of the one node to the location of the of the first node. As such, the server processing unit may be operative to triangulate the location of the one node based upon the adjusted determined distance of the one node to the location of the first node, the adjusted determined distance of the one node to the location of second node, and a determined distance of the one node to the refined location of the third node.

Combined Methods for Determining Node Location

In light of the examples explained above for locating a node, one skilled in the art will appreciate that a further embodiment expressly contemplates using more than one of the above-described location determination techniques when determining a refined location of a node in a wireless node network. For example, such combination embodiments may apply an ordered or prioritized approach whereby a first location technique is applied to generate first location information regarding the location of a node in the wireless network. Thereafter, a second location technique may be selected from a hierarchy or prioritized set of techniques (some of which may work better in certain circumstances and be chosen or dynamically prioritized based upon the contextual environment), and applied to generate second location information regarding the location of the node or refining the location of the node. Other embodiments may apply additional location techniques to generate further refined location information.

In an embodiment, the information in the exemplary hierarchy generally identifies which technique may be preferred to be used initially as well as a ranked grouping or listing of when to apply other location techniques. Such information in the exemplary hierarchy may be fixed (based upon successful historic data and experience) or be dynamically altered over time as nodes may move relative to each other and, for example, based upon context data that provides more information relative to the a current or anticipated contextual environment.

Applying Node Location Determination in a Vehicular Environment

The various exemplary methods and techniques described above for determining the location of a node provide an advantageous way to locate a node. However, further embodiments may advantageously apply such methods and techniques in a vehicular environment when dealing with logistics operations where a node is to be located in a vehicle, moved within a vehicle, or removed for delivery from a vehicle.

Essentially, embodiments may use a package enabled with a node (generally referred to as a node package or node-enabled package) to ship one or more items and such a node package may be advantageously placed, located, moved, or removed for delivery in a vehicle/transportation/shipping/logistics environment. As explained throughout this description, a node package is generally a package to be shipped that is related to a particular node. The node and the related package travel together as part of the shipping process. In a general embodiment, the node may simply be within the package. In another embodiment, the node may be attached to the package (e.g., adhered to an interior portion of the package, fixed to a part of the package where one or more status indicators of the node may be visible through the package, etc.). In another embodiment, the node of the node package may be part of the package or the packaging materials used to comprise an exterior, interior, or separating/cushioning material within the node package. In more detail, the node may be integrated as part of the package or packaging materials (e.g., integrated as part of a pallet, a ULD container, a corrugated fiberboard box, and the like). In still another detailed embodiment, the node of the node package may be fully or partially embedded within the package or packaging materials used to help form a general container, which maintains an item to be shipped along with the node.

Figure 20:
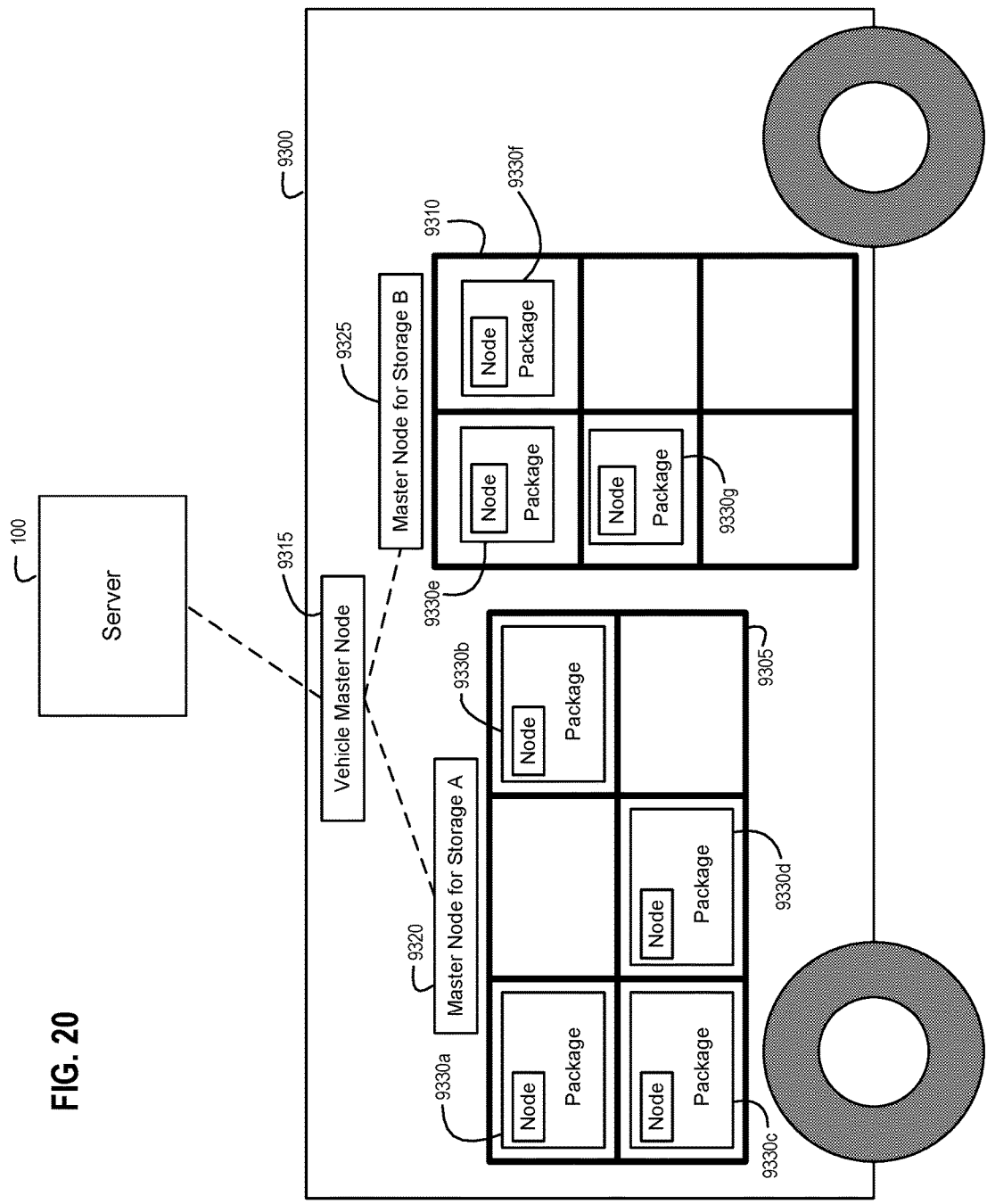
FIG. 20 is a diagram illustrating exemplary node packages located in an exemplary vehicle environment in accordance with an embodiment of the invention.

FIG. 20 is a diagram illustrating exemplary node packages located in an exemplary vehicle environment in accordance with an embodiment of the invention. Referring now to FIG. 20, exemplary vehicle 9300 is illustrated as an example of a general mobile logistics transport or conveyance carrying packages being shipped. Those skilled in the art will appreciate that vehicle 9300 may be implemented as various types of logistics conveyances (e.g., automobile, delivery van, autonomous vehicle, truck, trailer, train, aircraft, marine vessel (ship), etc.). Within exemplary vehicle 9300, packages may be placed, stored, and organized within different storage devices or units, such as storage unit A 9305 or storage unit B 9310. In general, a storage device or unit helps to maintain one or more packages in a configuration that helps to assure save shipment, minimize damage to the packages, and provide a way to organize what is being stored. Different embodiments of a storage unit may store a single package or may storage a wide variety of different types of packages that use different types of packaging materials (e.g., corrugated fiberboard boxes, wooden and non-wooden pallets, containers, etc.) and in large numbers.

Vehicle 9300 includes a vehicle master node 9315—an exemplary implementation of a master node, such as master node 110a shown and described with respect to FIG. 4. Vehicle master node 9315 is shown operative to communicate with server 100 over a longer-range communication interfaces (such as interface 485 on exemplary master node 110a) and operative to communicate with other nodes, such as master node 9320 associated with storage unit A 9305, master node 9325 associated with storage unit B 9310, and other nodes associated with parts of such storage units and node packages stored within the storage units. In more detail, each storage unit may include, in some embodiments, built-in nodes associated with particular shelves, lockers, receptacles, or other parts of the particular storage unit.

Thus, an exemplary storage unit (such as storage unit A 9305) may be a node-enabled storage unit used within a logistics vehicle to safely and intelligently transport node packages. As such, the exemplary storage unit may itself have a hierarchy of nodes (e.g., a master node, and one or more other nodes (ID nodes or other master nodes) assigned to different parts of the unit) and be operative to detect the location of particular node packages via the various location determination methods discussed herein as the node package is placed in a storage location within the unit, moved between storage locations of the unit or between different units, or simply removed from the storage location within the unit.

As shown in FIG. 20, various node packages 9330a-9330d may be kept in different storage locations of storage unit A 9305 within vehicle 9300. Similarly, other node packages 9330e-9330g are kept in portions of storage unit B 9310. Such node packages may be placed into particular storage locations according to shipping information related to the node packages. For example, the node packages may be placed into particular storage locations according to weights of the particular node packages, a planned loading scheme (such as according to an anticipated delivery schedule), to storage capacity of the particular different locations within the storage unit, or according to a storage type for the particular different locations (e.g., one location for storing envelope types of packages, another location for storing boxed container type of packages, another location for storing containerized packages (e.g., ULDs), etc.).

Figure 21:
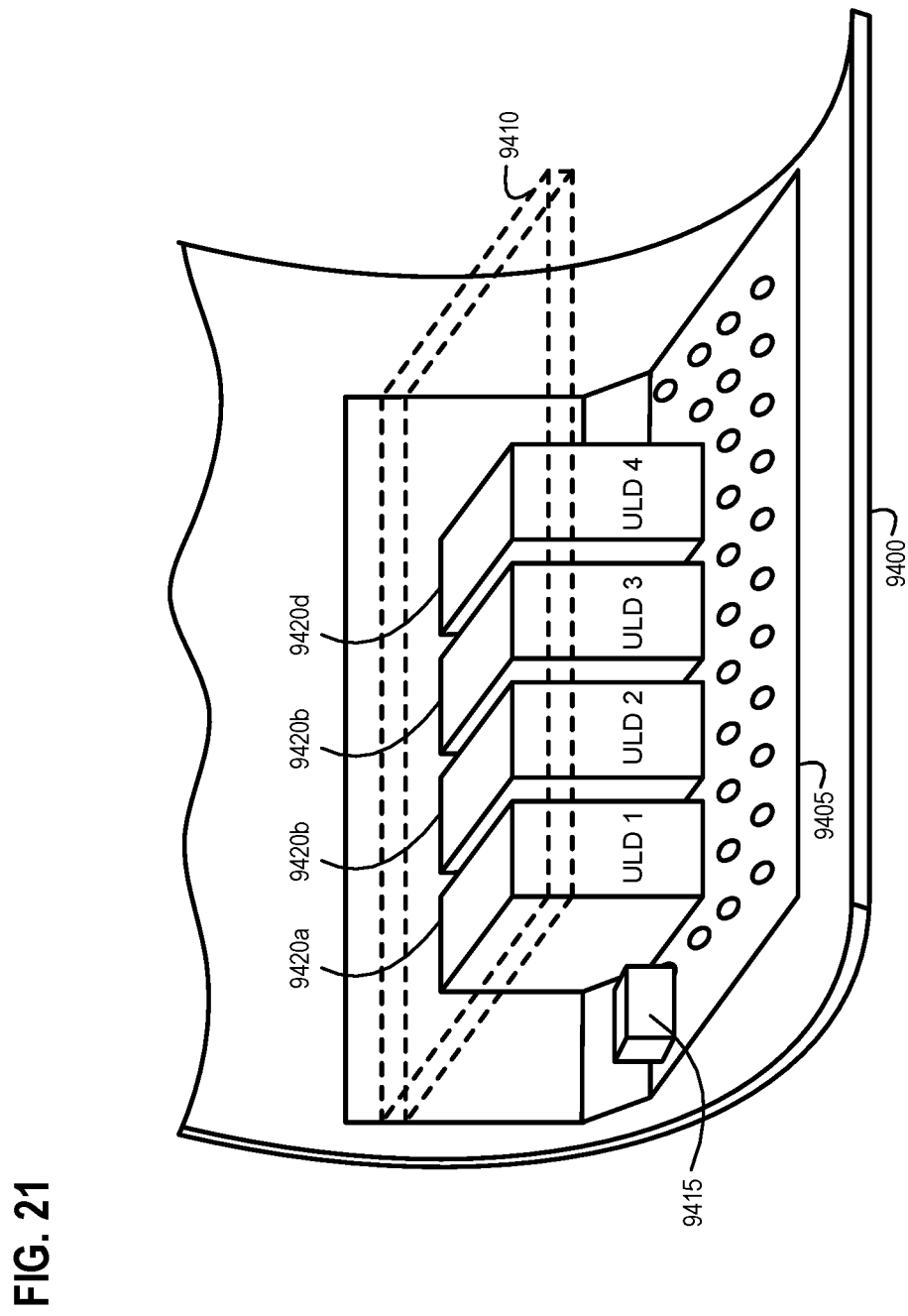
FIG. 21 is a diagram illustrating exemplary mobile storage units, such as ULDs, used as containers that help ship node packages in an exemplary airborne environment in accordance with an embodiment of the invention.

Shipping of containerized groups of packages (e.g., ULD types of containers made to optimize airborne logistics handling of packages) is an example of where a mobile storage unit (such as a movable unit load device (ULD)) may be deployed when shipping node packages in an airborne environment. FIG. 21 is a diagram illustrating exemplary mobile storage units, such as ULDs, used as containers that help ship node packages in an exemplary airborne environment in accordance with an embodiment of the invention. Referring now to FIG. 21, a cut-away perspective view of an exemplary aircraft fuselage 9400 is illustrated. In particular, an exemplary floor 9405 of a cargo storage area within fuselage 9400 is shown having multiple roller elements that help facilitate movement of cargo within the cargo area. Additionally, while not shown in FIG. 21, the cargo storage area and floor 9405 typically include structure and fastening points to help hold any cargo loaded within fuselage 9400. The cargo storage area within exemplary fuselage 9400 may be split into an upper area and a lower area by an additional floor 9410.

The cut-away perspective example illustrated in FIG. 21 shows a lower cargo area where various ULD containers 9420a-9420d are shown along with an airborne master node 9415, which is (depending on the aircraft's location and communication mode and status) operative to communicate with server 100—much like vehicle master node 9315 does as shown in FIG. 20. In general, the illustrated configuration of ULD containers 9420a-d is used similar to the storage units illustrated and described in FIG. 20. For example, each ULD container 9420a-d may have different storage locations within it and one or more master nodes (not shown) dedicated and attached internally so that they may track, monitor, and communicate with different node packages loaded within the ULD as well as other nodes and a server—much like the master node 9320 for storage unit A 9305 can track, monitor, and communicate with different node packages loaded within the storage unit as well as other nodes and server 100. Node packages within each ULD may communicate with nodes in the ULD and may communicate directly with airborne master node 9415 directly (or indirectly through other master nodes within the ULD). And as such, shipping information may be used when the node packages are placed into particular storage locations within a particular ULD according to weights of the particular node packages, a planned loading scheme for the ULDs (such as according to an anticipated delivery schedule), to storage capacity of the particular different locations within the ULD, or according to a storage type for the particular different locations.

Those skilled in the art will appreciate that each of the embodiments described above related to methods for locating a node may be further enhanced when applied to an exemplary vehicular environment. For example, in one embodiment, determining a node's location may further comprise determining a location of the node-enabled package within a vehicle to be the location of the node. In a more detailed embodiment, the method that determines a node location may further generate a location message regarding where the node-enabled package is located within the vehicle based upon the determined location of the node. Such a message may be displayed to a user (e.g., logistics personnel that handle packages being shipped) on a user interface of a node or user access device operating as a node (e.g., smartphone or smart wearable device). For example, such a displayed message may be a type of an informed prompt ("Pickup Package X at Storage Location 01 in Storage Unit A") or strategic instruction ("Place Package X in Storage Location 01 in Storage Unit A") or ("Move Package X at Storage Location 01 in Storage Unit A to Storage Location 03 in Storage Unit B"). In some embodiments, the network device or node that determines the node's location may also provide such a display to the user, but in other embodiments, the location message may be transmitted to another node for display to the user.

In another embodiment, an exemplary method that determines a node's location may also access shipping information related to the node-enabled package and generate a relocation message regarding where the node-enabled package may be relocated within the vehicle based upon the determined location of the node and the accessed shipping information. Such a message may be displayed to a user similar to the location message described above—namely, that such a relocation message may be displayed to a user (e.g., logistics personnel that handle packages being shipped) on a user interface of a node or user access device operating as a node (e.g., smartphone or smart wearable device) and that in some embodiments, the network device or node that determines the node's location may provide such a display to the user, but in other embodiments, the relocation message may be transmitted to another node for display to the user.

In more detail, the shipping information may comprise weight information on the node-enabled package that is used in determining where to relocate or initially place the node-enabled package.

In another embodiment, such shipping information may be used to create a loading scheme to help organize where to locate or relocate the node-enabled packages. Thus, the location or relocation of the node-enabled package within the vehicle may be determined according to a loading scheme. In more detail, such a loading scheme may be related to an anticipated delivery schedule, where the node-enabled package may be placed within or removed from the vehicle according to the anticipated delivery schedule.

Logistics Applications of a Wireless Node Network

Figure 17:
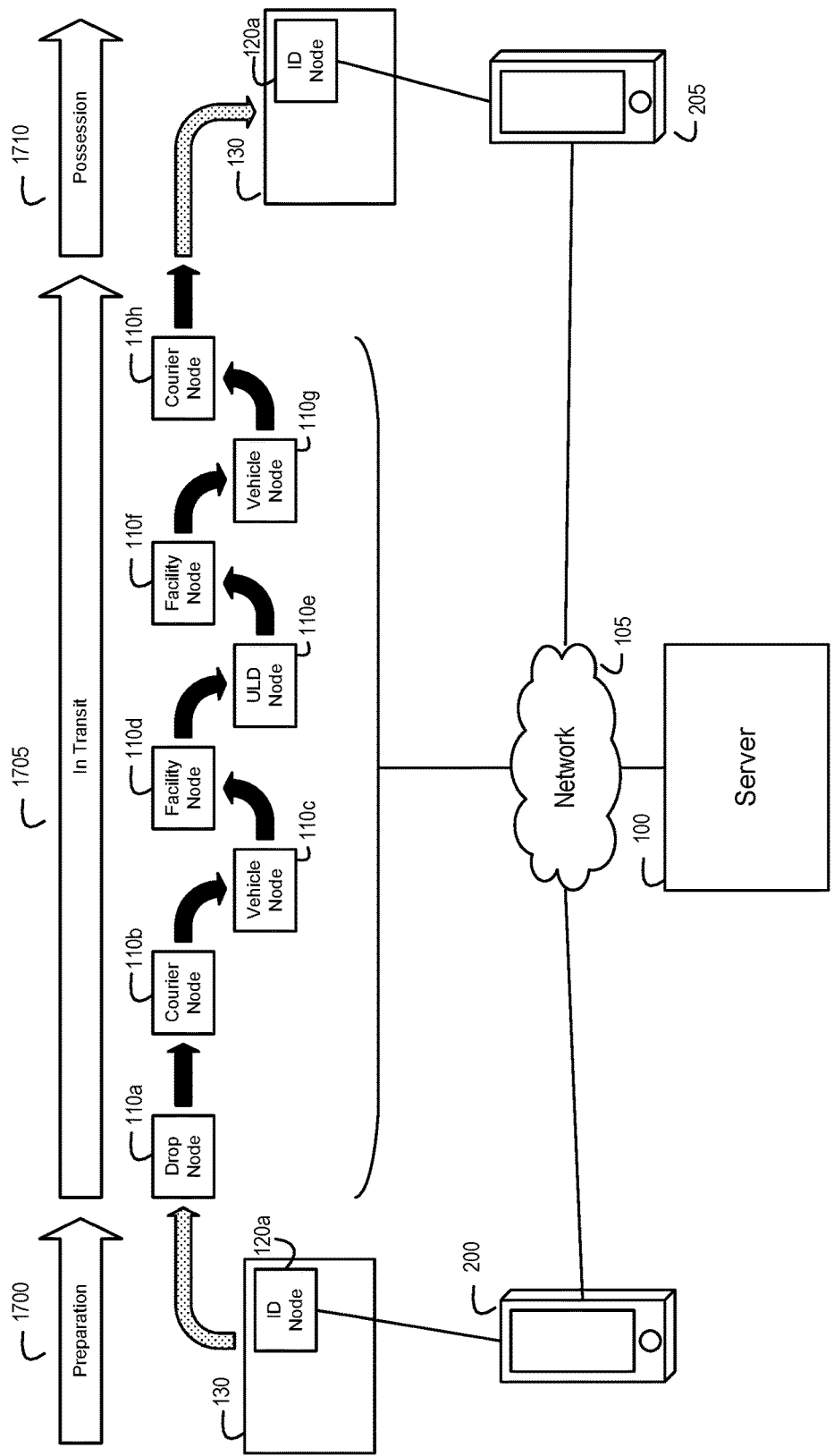
FIG. 17 is a diagram illustrating an example logistics operation using exemplary components of a wireless node network in accordance with an embodiment of the invention.

As described above, an exemplary wireless node network may be useful in a logistics application where an item is to be located. Further, such an exemplary wireless node network may also be useful in logistics applications where the item is moving between locations, and the network provides an enhanced level of visibility and management of the item within such a logistics environment. In other words, an embodiment of an exemplary wireless node network in accordance with one or more principles of the present invention helps enable enhanced logistical operations that manage information when shipping and tracking an item. FIG. 17 is a diagram illustrating an example logistics operation using exemplary components of a wireless node network in accordance with an embodiment of the invention.

Logistics Beyond Pickup and Delivery

Referring now to FIG. 17, an ID node 120a is illustrated as being deployed and associated with an item (e.g., package 130) to be shipped. As the package 130 is being prepared for shipping 1700, and is in transit as part of shipment 1705, and is in the possession of the intended recipient 1710, components of an exemplary wireless node network are deployed to manage information regarding the shipment during these three phases.

In a general example of using a wireless node network for managing logistics related to an item to be shipped, a shipping customer may initially register the item (such as package 130) with a node (such as an ID node) to be shipped from an origin location to a destination location. One or more management hand-offs of the item and node occurs as the item and the ID node collectively transit a path from the origin to the destination. Each hand-off may be based upon an awareness of the shipment path the ID node associated with package 130 will take as it is transferred through a shipping path from its origin to destination. Hand-off of the package 130 and ID node are managed and coordinated with master nodes (such as master nodes 110a-110h), which are managed by server 100, along the anticipated shipment path. During operation along the shipping path, server 100 receives information and updates from nodes, manages and authorizes hand-offs between different nodes, and tracks information related to current associations, shared data, sensor data available, locations of the nodes, and context data that helps to refine the location of nodes. Thus, with the ID node associated with package 130, the visibility of the package 130 may be extended for the customer beyond the conventional custodial control during transit 1705 as the shipping customer prepares the item for shipment 1700 prior to an initial drop-off and after delivery of the item to the recipient 1710.

In a more detailed embodiment, an exemplary method for managing logistics related to an item to be shipped using a wireless node network begins with registering a node with the item to be shipped. For example, the shipping customer may control user access device 200, and use device 200 to initially associate an ID node 120a and package 130 with a tracking number as part of preparing to ship the package 130 (a type of item). In one embodiment, device 200 may use a particular app or other program module resident and operating on device 200 to input the tracking number of the package 130. Device 200 then provides that information back to server 100 via network 105 to associate the tracking number with the package 130 and ID node 120a. Device 200, in some embodiments, may then print a label for the shipment of package 130 (and ID node 120a). In another embodiment, ID node 120a may be a pre-programmed node with pre-existing shipping and payment related information associated with it. Further details of a label-less shipping and payment in another embodiment are described below.

Concurrent with this action, the shipping customer may associate ID node 120a with package 130. For example, the shipping customer may place the ID node 120a within package 130 and, in some cases, physically attach the ID node 120a to a particular part of package 130. In another example, the shipping customer may place an exterior label on package 130 where the label itself includes ID node 120a. Other examples may effectively group ID node 120a with package 130 within a larger package, container, or pallet of items or packages that collectively travel together.

In this manner, device 200 may operate as a type of master node under control of the app or other program module, and be associated with the package 130 and ID node 120a from an association management perspective. For example, device 200 may operate via the app or other program module along with Bluetooth® hardware and software working on device 200 to communicate with ID node 120a. Other embodiments may rely on other short-range communication interfaces for device 200 to communicate with ID node 120a. And in one embodiment, device 200 may receive one or more security credentials from server 100 in order to connect and actively pair or connect with ID node 120a.

With at least the shipping information at the server 100, server 100 may determine a predicted shipping path for the package 130. In one embodiment, server 100 may have historic data indicating an optimal route for shipping an item from point A to point B that uses a particular shipping path (e.g., pick-up near A by a particular courier, transport by vehicle to a particular facility, further transport via aircraft to another facility near point B, and transport by vehicle to facilitate delivery by a courier at point B). In one example, the predicted path may only be for a portion of the route between two points, such as an origin point and a destination point.

In a further example, the predicted path (or part thereof) may be adjusted based on the contextual environment of an item being shipped. For instance, depending on context data (such as weather information, historic data on success for particular transit segments, capacity information for third party carriers, etc.), server 100 may alter the initially predicted shipping path to provide a refined predicted shipping path that is more optimized under the current conditions and context. This allows the server 100 to further anticipate which master nodes may be used along an anticipated shipping path (or refined shipping path), to help efficiently manage shipment of the package 130 to point B. Those skilled in the art will further appreciate that an embodiment may only partially identify what master nodes may be used along the anticipated shipping path (or refined shipping path), and that further master nodes may be identified as the package 130 is actively in route to point B depending on context data (e.g., master node availability, weather information, etc.).

In a more detailed example, server 100 may use sort data analytics to predict an appropriate shipping path along which the package 130 and the ID node 120a will travel, identifying predicted master nodes the ID node 120a will be within range of during its journey. In the example flow illustrated in FIG. 17, nodes 110a-110h refer to different master nodes along an exemplary predicted shipping path, which includes at least a pick-up and drop-off of ID node 120a and package 130 at an origin and destination, respectively.

In one example, the shipping customer may place package 130 and its associated ID node 120a in a drop box or repository for items to be shipped. In the illustrated example of FIG. 17, drop box is represented as drop node 110a. Essentially, drop node 110a may be implemented with a type of master node connected to or integrated into a drop box or locker unit type of logistics repository (more generally referred to herein as a node-enabled logistics receptacle). As the shipping customer physically places ID node 120a into drop node 110a, device 200 may hand-off ID node 120a to drop node 110a, update server 100 with this association information, and disassociate from ID node 120a. In this manner, the system has visibility into the status and location of an item (such as package 130) prior to pick-up from drop node 110a. Further details of an exemplary node-enabled logistics receptacle are described below.

At the drop node 110a, a courier may pick-up the package 130 and ID node 120a. The courier has a courier node 110b, which knows the tracking number and associated ID node 120a at time of pickup, or looks up the ID node 120a MAC address based on a captured tracking number (part of information broadcast or advertised by ID node 110a. Basically, the master node responsibility transfers to or is otherwise handed off to courier node 110b, which now acts as a master node actively connected and associated with ID node 120a (by virtue of communications from courier node 110b back to server that authorizes the association of ID node 110a with courier node 110b and disassociates drop node 110a with ID node 110a).

Similar handoffs occur between different master nodes and ID node 120a occur as package 130 and ID node 120a transit the anticipated shipping path in accordance with instructions sent to different master nodes by server 100. In one embodiment, associations are accomplished during such handoffs with security credentials requested, authorized, and transmitted to the appropriate master node. In another embodiment, associations are merely passive associations that do not require active and authorized pairings. Yet, the passive association still may allow the system to keep track of ID node 120a and package 130 as they transit the anticipated shipping path.

New associations (active and passive) and disassociations are updated to server 100. And server 100 may change programming in different nodes as package 130 and ID node 120a transit the shipping path—such as changing the operation of a master node (such as ULD node 110e) to shift to operating as an ID node while airborne or when GPS signals are lost. In another example, certain mobile types of node may have responsibilities changed to wired types of nodes as a way of preserving the power of a mobile type of node. If ID node 120a fails to associate for a certain interval and needs to be reacquired, ID node 120a may update its status flag to a particular Alert Stage and may attempt to communicate with an increasingly broader range of master nodes in order to be found.

During the transit, server 100 may share information with different nodes, such as context data, timer/clock data, environmental data, etc. Sensor data from the ID node 120a may be gathered via scans from a master node, and then forwarded back to server 100. And as server 100 manages the associations, handoffs, and information going to and coming from ID node 120a (via master nodes), server 100 is able to determine the location of ID node 120a using one or more of the various location determination techniques described above. As such, server 100 is able to provide information related to the ID node 120a and its related package 130 in response to requests for such information.

When package 130 and ID node 120a arrive at the destination (e.g., point B), courier node 110h may update server 100 once ID node 120*a* is placed at the destination and disassociated with courier node 110*h*. However, visibility need not end at such a drop-off event (such as arriving at the destination). The recipient customer's user access device 205 may act as another master node, and associate with ID node 120*a* after delivery. In one example, server 100 is notified by courier node 110*h* that delivery has been made. Thereafter, server 100 may notify device 205 with this information. In response, an app or other program module on device 205 may cause device 205 to operate as a node and to actively seek association with ID node 120*a*. When device 205 and ID node 120*a* connect and are given authorization by server 100 to actively associate, server 100 is notified and may provide further information to device 205 (e.g., sensor data, etc.) and may be able to determined updated location data about ID node 120*a* and package 130 after delivery has occurred. In another example, active association may not be needed between device 205 and ID node 120*a* as status information may still be gathered by device 205 via passive association, where the status information provides further visibility regarding the ID node 120 after delivery to the destination.

Figure 18:
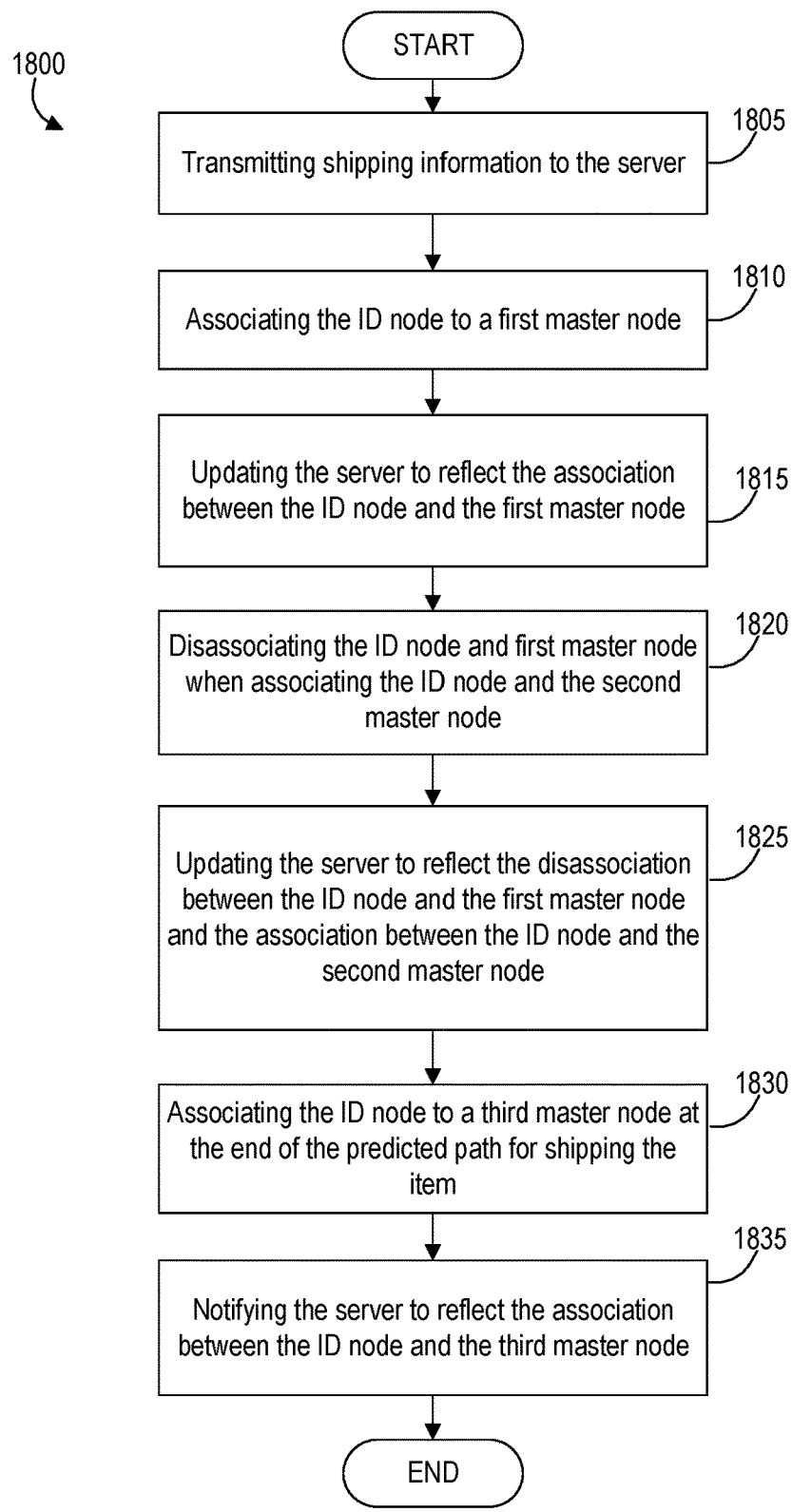
FIG. 18 is a flow diagram illustrating an example method for managing shipment of an item using a wireless node network in accordance with an embodiment of the invention.
Figure 19:
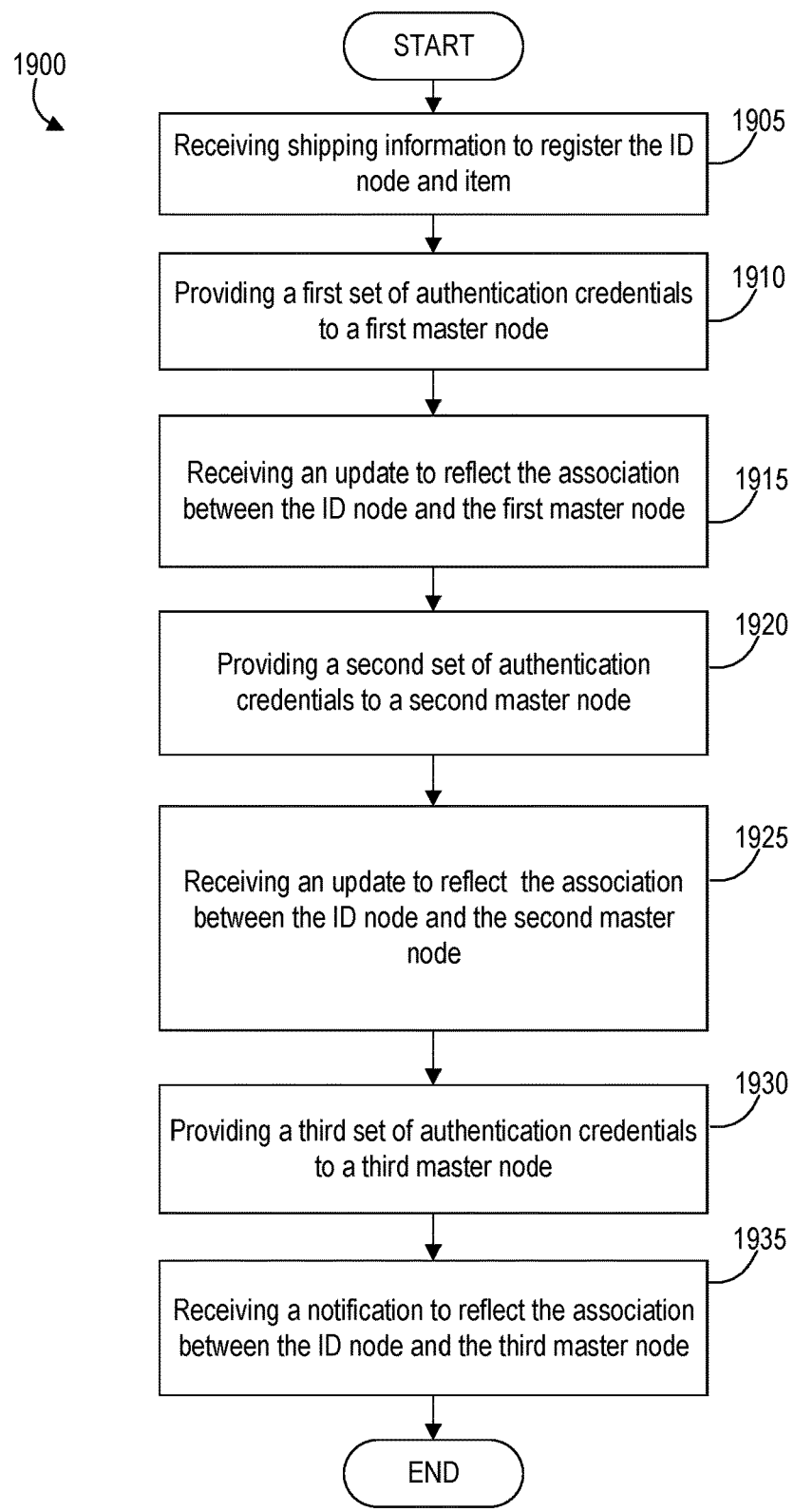
FIG. 19 is a flow diagram illustrating another example method for managing shipment of an item using a wireless node network in accordance with an embodiment of the invention.

FIGS. 18 and 19 are flow diagrams illustrating various exemplary methods for managing a shipment of an item using a wireless node network, such as that illustrated in FIG. 17. Referring now to FIG. 18, exemplary method 1800 begins by transmitting shipping information to the server to register the ID node and the item to be shipped at step 1805 and associating the ID node to a first master node related to a predicted path for shipping the item at step 1810. At step 1815, the server is updated to reflect the association between the ID node and the first master node. Typically, this may come in the form or a communication from the first master node to the server. When the first master node is a user access device (e.g., one of a laptop computer, a desktop computer, a tablet device, a personal area network device, a smartphone device, and a smart wearable device) that is operated by a shipping customer, the server may be updated to become aware that the ID node is associated with the first master node prior to a pick-up event in the predicted path.

For example, a shipping customer may use their smartphone to enter shipping information and register that the ID node and the item (such as package 130) are to be shipped from an origin point to a destination point. Prior to when the item and ID node are picked up by an initial courier (e.g., from a drop box, locker unit, or other receptacle), the shipping customer's smartphone operates as the first master node and is associated with the ID node. As such, and with an update to the server, the server now has visibility into the status and location of the ID node prior to a pick-up event in the predicted shipping path from the origin point to the destination point.

The method 1800 may continue at step 1820 by disassociating the ID node and the first master node when associating the ID node and a second master node related to the predicted path as the ID node transits the predicted path. In one example, the ID node need not disassociate with the first master node commensurate with associating with the second master node. Thus, those skilled in the art will appreciate that the ID node may be associated with one or more master nodes at a given point in time and may be selectively disassociated with certain master nodes depending on the need for the ID node to securely share data with different master nodes.

At step 1825, the server is updated to reflect the disassociation between the ID node and the first master node (if that has occurred yet) and the association between the ID node and the second master node as the ID node continues to transit the predicted path. At step 1830, the method may associate the ID node to a third master node near an end of the predicted path for shipping the item, and then at step 1835 notifies the server to reflect the association between the ID node and the third master node.

In the method 1800, associating the ID node to the third master node in step 1830 may be performed after a drop-off event in the predicted path. The method may also rely upon context data to adjust for an environmental aspect of the predicted path when associating the ID node to any of the first, second, or third master nodes.

For example, after the item and ID node are delivered to or near the destination, the recipient's smartphone may operate as the third master node associated with the ID node. Data, such as sensor data, may be shared with the recipient while the recipient's smartphone operates as the third master node associated with the ID node. As such, and with an update to the server, the server now has visibility into the status and location of the ID node after a drop-off event.

Thereafter, the recipient may unregister the ID node and item given the item is now in the recipient's possession and control. For example, the recipient may remove the ID node from the item (e.g., the package 130), deactivate the ID node to otherwise power down the device, update the server regarding the deactivated status of the ID node (and the disassociation of ID node and the third master node), and then clean up and/or recharge the ID node for future use in shipping another item.

Method 1800 may also include receiving context data related to the predicted path. In one embodiment, such context data may advantageously allow for adjustments due to one or more environmental aspects of the predicted path when associating the ID node to any of the master nodes. For example, the context data may include scan data indicating the type of material in package 130 (the item), which may cause RF shielding issues with the ID node.

Referring now to FIG. 19, exemplary method 1900 is explained from the perspective of the server, which can authorize certain types of node associations. The server may be updated, in some embodiments, with association information when an ID node and a master node are passively associated. In such a situation, the nodes have not established an authorized association where they can securely share data. However, as method 1900 explains in more detail, an embodiment may manage a shipment of an item when active associations are established.

Method 1900 begins with the server receiving shipping information to register the ID node and the item to be shipped in step 1905. The method 1900 then provides a first set of authentication credentials (e.g., security pin information) to a first master node to permit the ID node to associate with the first master node related to a predicted path for shipping the item at step 1910. In one example, the first master node may be a user access device, such as a laptop computer, a desktop computer, a tablet device, a personal area network device, a smartphone device, or a smart wearable device. And step 1920 may be performed prior to a pick-up even in the predicted path.

At step 1915, the server receives an update to reflect the association between the ID node and the first master node. The method 1900 then provides a second set of authentication credentials to a second master node to permit the ID node to associate with the second master node and disassociate the ID node from the first master node as the ID node transits the predicted path at step 1920. At step 1925, the server then receives an update to reflect the association between the ID node and the second master node as the ID node continues to transit the predicted path (or a portion of a predicted path). When the ID node and the first master node disassociate, the server may also be updated.

In some examples, the method 1900 may have the server provide a third set of authentication credentials to a third master node to permit the ID node to associate with the third master node as the ID node reaches an end of the predicted path for shipping the item at step 1930. In some examples, this step may be performed after a drop-off event in the predicted path.

Finally, at step 1935, the server receives a notification that reflects the association between the ID node and the third master node. When the ID node and the second master node disassociate, the server may also be updated.

In method 1900, another embodiment has the server providing any of the master nodes with context data related to an environmental aspect of a part of the predicted path. For example, exemplary context data may include layout data related to a facility in which the ID node is moving between master nodes. In more detail, the received context data may be relied upon to adjust for an environmental aspect of the predicted path when associating the ID node to any of the first, second, or third master nodes.

In still another embodiment, method 1900 may also determining a location of the ID node based upon association information received by the server and location information related to at least one of the first, second, or third master nodes.

As previously discussed, the server may predict a transit route from a first point to a second point along at least a portion of the predicted path for shipping the item. In one example, the first point is an origin and the second point is a destination point with both being identified in the shipping information of the item. However in other examples, the first and second point along a predicted path may merely be interim points without encompassing the originating shipment point or the ultimate destination of the item being shipped. Further, another example may adjust the predicted path as the ID node transits the path. In this way, the server may adapt based upon, for example, context data, so as to optimize or at least account for a changing contextual environment when managing the shipment of an item.

In another embodiment, a non-transitory computer-readable medium is disclosed that contains instructions, which when executed on a processor (e.g., processor 500 of server 100), performs another embodiment of a method for managing a shipment of an item using a wireless node network having at least one ID node, a plurality of master nodes, and a server. In this embodiment, the exemplary method begins with the server receiving shipping information to register the ID node and the item to be shipped. The method predicting a first portion of a transit route for the item from a first point to a second point. For example, a first point may be the origin point and the second point may be the destination point—both of which are identified in the shipping information. In another example, the first and second points are any two points along the transit route. Furthermore, the transit route may be predicted as a series of portions or segments that may use particular types of master nodes during transit (e.g., master nodes used by a particular courier for pick-up, an anticipated vehicle used by the pickup courier, one or more anticipated facilities that may be used by the vehicle, an anticipated air route (e.g., an anticipated departing airport, an anticipated aircraft, anticipated types of containers such as a type of ULD or pallet used on the aircraft, and an anticipated arriving airport), a facility near the anticipated arriving airport, a vehicle used to carry the item, and a courier that may deliver the item at the destination point). Those skilled in the art will realized that some of the potential portions of an exemplary predicted path or transit route may be relatively simple for a local delivery, or may be quite complex from an intermodal perspective when the origin point and destination points are very far away from each other.

Next, the method authorizes a first master node to associate or connect with the ID node near the origin point. This may be done prior to a pick-up event for the ID node and item being shipped. For example, when the first master node is a user access device (e.g., a laptop computer, a desktop computer, a tablet device, a personal area network device, a smartphone device, and a smart wearable device) for the shipping customer, visibility as to the status and location of the ID node may be extended to prior to a pick-up event. In one embodiment, such an authorization is performed by the server 100 when it receives information from the first master node regarding the ID node, determines that the first master node and the ID node should be actively paired and associated, and the server 100 sends the appropriate security pin information as a type of authorization credentials that permit the first master node to actively pair and connect with the ID node. After the first master node is associated with the ID node, the server receives an update reflecting the association.

Next, the server may authorize a second master node to associate with the ID node as management responsibility of the ID node is handed off from the first master node to the second master node at the second point on the predicted transit route. In one embodiment, the method may authorize the first master node to disassociate with the ID node. However, in other embodiments, the first master node may stay associated with the ID node—even after the ID node is authorized to associate with the second master node. The server then receives an update to reflect the association between the ID node and the second master node as the ID node continues on the predicted first portion of the transit route.

The method may further authorize the second master node to disassociate with the ID node and a third master node to associate with the ID node as management responsibility of the ID node is handed off from the second master node to the third master node near the destination point on the predicted transit route. This may be done prior to a pick-up event for the ID node and item being shipped. For example, when the third master node is a user access device (e.g., a laptop computer, a desktop computer, a tablet device, a personal area network device, a smartphone device, and a smart wearable device) for the recipient, visibility as to the status and location of the ID node may be extended to after a drop-off event. After the third master node is associated with the ID node, the server receives a notification to reflect the association between the ID node and the third master node.

And during the method, the server may determine a location of the ID node based upon association information received by the server and location information related to at least one of the first, second, or third master nodes. As discussed above, various techniques are available for locating a node and, in some cases, adjusting for adverse RF environmental conditions with context data to more accurately refine the location of a node. As such, the server keeps track of the location of nodes in the wireless node network, and may provide that information (as well as other types of shared or sensor information) when requested and authorized to do so.

From a system perspective of such a logistics application of a wireless node network, an exemplary system is disclosed for managing a shipment of an item using a wireless node network. With reference to FIG. 17, the exemplary system generally comprises an ID node (such as node 120a), a plurality of master nodes (such as nodes 110a-110h), and a server (such as server 100). The ID node is registered to the item (such as package 130) being shipped. Each of the master nodes are predicted to be located at a different part of an anticipated transit route for the item as the item is shipped from an origin point to a designation point of the anticipated transit route. Each of the master nodes is operative to communicate with the ID node over a short-range communication path, and operative to communicate with other master nodes and the server 100.

The server operates to track and report a location of the ID node and a location of the master nodes. As shown in FIG. 17, server 100 relies on network 105 to communicate with different master nodes (110a-110h) as well as user access devices 200, 205 that may operate and function as a master node associated with ID node 120a at certain times. As previously discussed, server 100 may employ a variety of different techniques (or a combination of different techniques) for determining the location of ID node 120a or one of the other nodes in the network.

The server is also operative to facilitate the transfer of management responsibility of the ID node between different master nodes as the ID node moves along the anticipated transit route. For example, as discussed above, nodes communicate via broadcast and scanning methods, and may be associated under control of the server 100 as part of managing the wireless node network. In this way, a first of the master nodes may be associated with the ID node prior to a pick-up event for the ID node and item to be shipped. In one example, user access device 200 may operate as a master node and be associated with ID node 120a prior to being placed into drop node 110a and picked up by a courier from the receptacle related to that drop node 110a.

Later, a second of the master nodes may be associated with the ID node after the ID node is disassociated with the first of the master nodes at an intermediate point of the anticipated transit route. And, a third of the master nodes may be associated with the ID node after a drop-off event for the ID node and item to be shipped. For example, user access device 205 may operate as a master node and be associated with ID node 120a after the ID node 120a and item are dropped off at an intended destination point (e.g., a type of drop-off event).

In an embodiment of the system, each of the master nodes may be operative to update the server upon completing a disassociation or association with the ID node. This provides the server with association information with which it can use to manage and track the nodes in the wireless node network. When associating nodes, the server may be operative to transmit a set of authorization credentials to one of the master nodes and the ID node to authorize a desired association between the master node and the ID node. The server may also be operative to determine the location of the ID node based upon context data, such as information relating to an environmental aspect of a part of the anticipated transit path (e.g., RF shielding aspects of the item being shipped with the ID node or a container holding the ID node, building layout information, etc.).

Those skilled in the art will readily appreciate that operations of such an exemplary wireless node network, as set forth herein, are not limited to tracking just a package, but may be used to manage logistics and tracking of other types of items, such as an object or a person. Indeed, some embodiments provide enhanced capabilities that facilitate better tracking of items, objects, and people as they move to a more restrictive indoor environment, by using a low power ID node in advertising mode in the presence of one or more master nodes.

Enhanced Monitoring & Network Management Based Upon Event Candidates

As described above, various elements of an exemplary wireless node network may have certain roles and responsibilities in an embodiment for intelligently monitoring and managing the nodes in the wireless node network using a context-driven, learning framework. One embodiment of such a framework may deploy a master node to listen for signals emanating from different ID nodes in a general vicinity of the master node as an exemplary element of the wireless node network that monitors the ID nodes. The master node may detect signals from a particular ID node, track a series of such signals relative to the particular ID node, compare observed parameters related to such signals (or summarized representations of the signals or statistical representations of the signals generally referred to as checkpoints) to identify a status of the ID node (more generally referred to as a node event for the ID node indicating what is going on with the ID node). If appropriate under certain event criteria, the master node may deem the identified status important enough to selectively report the identified status back up to a server, in contrast to simply providing all captured signals or all summarized or statistical representations of such signals to the server. This advantageously helps manage data communication traffic between the master node and server during monitoring operations and helps avoid overburdening the server. Upon receiving the selective report from the master node, the server may then process information related to the identified node event to determine if the reported information corresponds to known node activity (such as a known source of RF interference or entering into a known structure that attenuates RF communication signals) and, if appropriate, adapt how the server manages the network via updates to node management information (such as context data indicating the source of the RF interference) and providing management feedback delivered back to the managing node. In such a way, an embodiment may have the managing node (e.g., a master node) and a server operate as part of a monitoring and learning system that adapts to what is being experienced by a lower level node in the system in a particular manner of monitoring, selective reporting, assessing the reported information, and adapting to the reported information with updated context data and updated feedback to nodes in the system.

As noted above, a monitored or observed status related to a node may be generally referred to as a node event. A node event for a node may include, for example, a status of whether the node has been detected by the monitoring node, a status indicating how the node is communicating with the monitoring node, a status on what information the node is communicating or broadcasting, and an update on the node's status (e.g., whether the observed status has changed reflecting movement toward or away from the monitoring node) as identified by the monitoring node (typically a master node). In some of the embodiments described below, monitoring for node events may involve a variety of different types of exemplary events related to a particular ID node—e.g., a first sighting event, a sporadic event, an online event, an offline event, a checkpoint event, a benchmark checkpoint event, and a shift event. In an embodiment, such exemplary events may represent a current or updated status of a broadcasting node as observed by a master node and, in some embodiments, may involve observing particular parameters of an ID node's advertising signal as received by the master node (e.g., an observed RSSI level of a detected advertising signal that is being broadcast from an ID node over time, an observed setting or indicator as reflected in header information within a detected advertising signal) or a particular change in such an observed parameter (e.g., a significant change of observed timing, a change of observed signal strength level of the detected advertising signal, a change of data broadcast by the ID node through data in the advertising signal packet).

Those skilled in the art will appreciate that monitoring for node events may generate very large amounts of scan data over time. For example, an embodiment may have a master node in a scanning or listening mode and detect a large number of advertising signals successively broadcast over time from one or more ID nodes as the ID nodes move relative to the master node. Monitoring of nodes for node events in such an embodiment may involve comparing one or more observed parameters from different scan data detected (e.g., different detected advertising signals broadcast from one of the ID nodes). The comparison may involve comparing an observed parameter, such as observed signal strength, related to two detected advertising signals broadcast from a particular ID node while in other embodiments, the comparison may involve comparing an observed parameter related to summarized representations of groups of detected advertising signals. Such a comparison allows the monitoring node to learn of the node event related to the ID node, and when appropriate based upon certain event criteria, report such a node event back to a server as a reported event candidate, which includes event data relative to the ID node's status (e.g., the node event reflecting a changed status or simply an updated status for the particular ID node).

As noted above, in some embodiments, the monitoring node may capture and analyze the received scan data (e.g., detected advertising signals) as a series of summarized checkpoints over time. Each checkpoint may be considered a summarized representation of the detected signals over a particular time period or relative to a particular number of detected signals. In some embodiments, each checkpoint may further be considered a statistical representation (e.g., a mean, a median, an average, a moving average over a subset window of advertising signals, a moving average over a sliding time window, or a weighted average) of observations of the detected signals over the particular time period. For example, the monitoring master node may generate a checkpoint (also generally referred to as a checkpoint summary) that summarizes ten detected signals at a time. The observed parameter for the checkpoint may, for example, represent an average of the observed signal strength from each of the ten successively detected advertising signals from an ID node. As such, the master node may identify an event candidate based upon comparing the observed parameter of the signals associated with the checkpoint with the observed parameter of a prior checkpoint, rather than just comparing the observed parameter related to two or more detected signals. Comparing checkpoints (rather than comparing each detected signal) may allow the monitoring node to better accommodate noisy environments and more selectively identify a node event as an event candidate based upon adjacent checkpoints, and when appropriate, report such an event candidate back to a server with relevant event data information about the particular checkpoint where the node event was identified. Thus, a general embodiment compares an observed parameter between detected signals where other embodiments may further process the detected successive signals, as a group, to then compare the observed parameter (such as observed signal strength) of a summarized or other statistical representation of successive groups.

Figure 34:
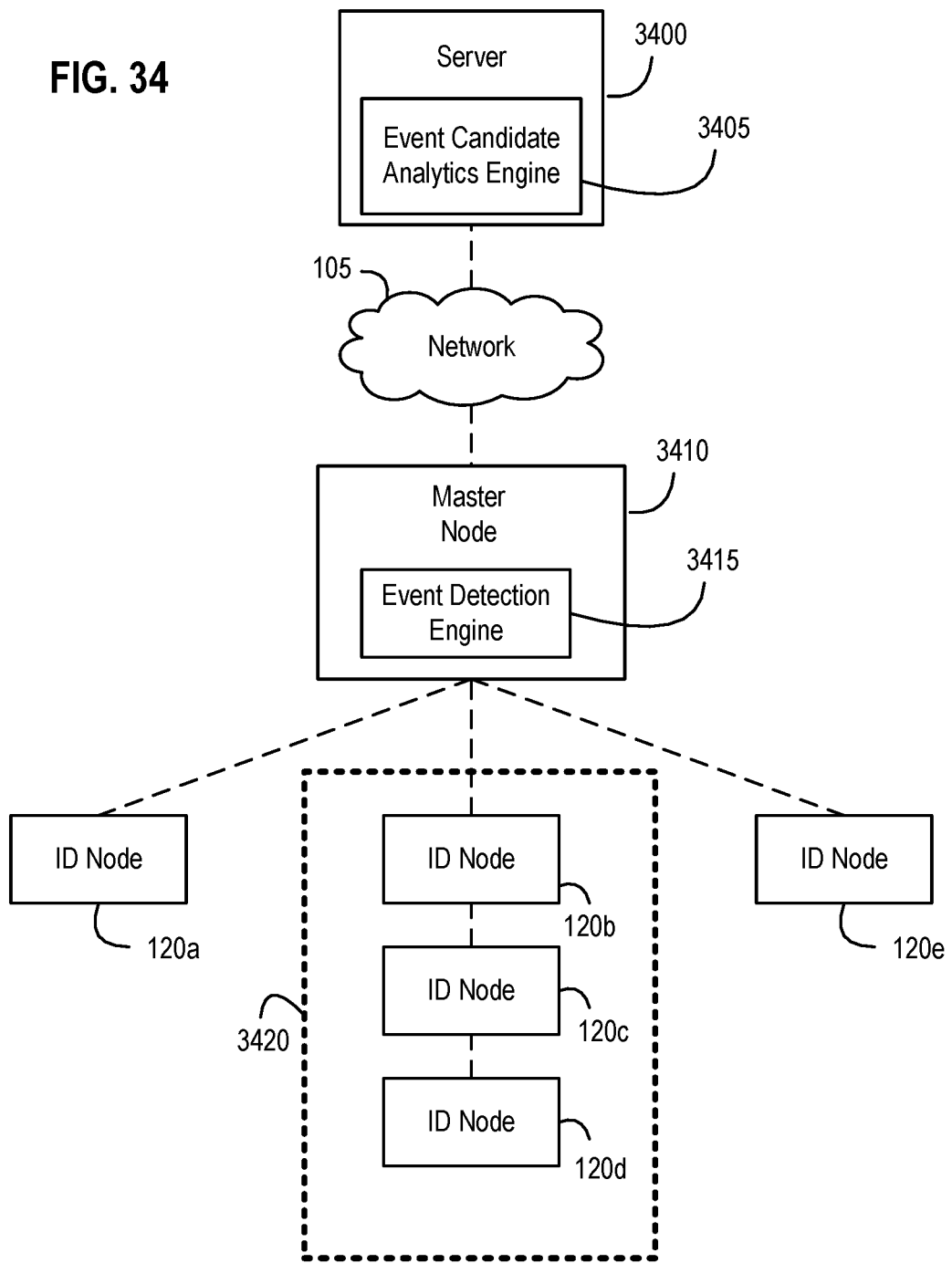
FIG. 34 is a diagram of an exemplary wireless node network that provides event detection and event candidate processing characterization in accordance with an embodiment of the invention.
Figure 35:
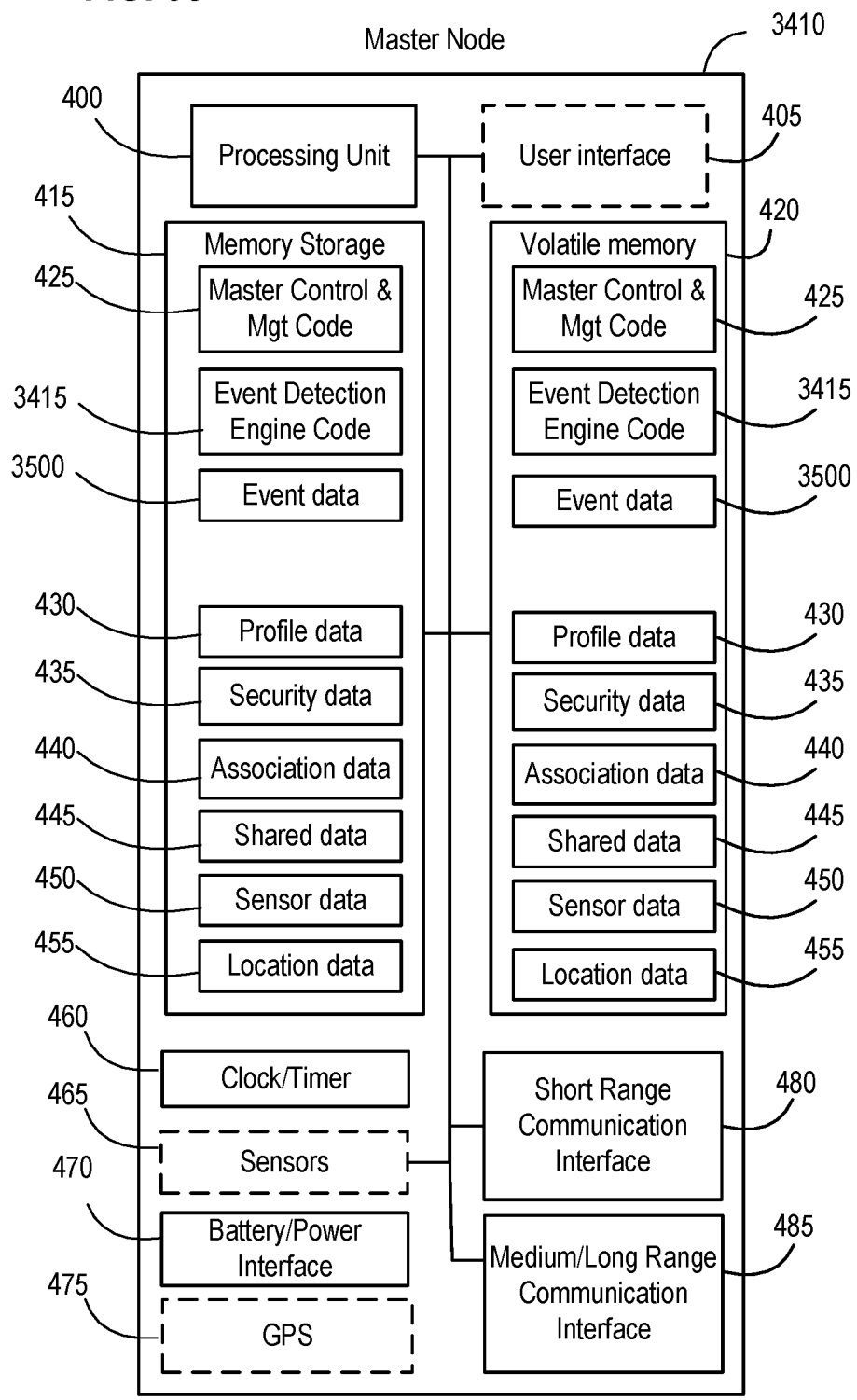
FIG. 35 is a more detailed diagram of another exemplary master node in the network illustrated in FIG. 34 that operates to monitor for an event candidate in accordance with an embodiment of the invention.

An embodiment that monitors for event candidates may use a master node (such as the master node 3410 illustrated and described with respect to FIGS. 34 and 35) to receive, monitor, detect, or otherwise observe advertising signals broadcast by various nodes (e.g., ID nodes or other master nodes) so that information related to different types of on-going node events may be captured, summarized (in some instances), assessed, and selectively reported to the backend server as an event candidates (e.g., a type of summarized data related to a node event). Those skilled in the art will appreciate that the manner in which an exemplary master node may advantageously summarize and simplify how to analyze and selectively report relevant node event information as the event candidate enables an improved efficiency of master node to server interactions related to monitoring event candidates in such a system and enhances system operations by not overloading the server via a reduced data feed from the master node while monitoring in such a manner.

Figure 36:
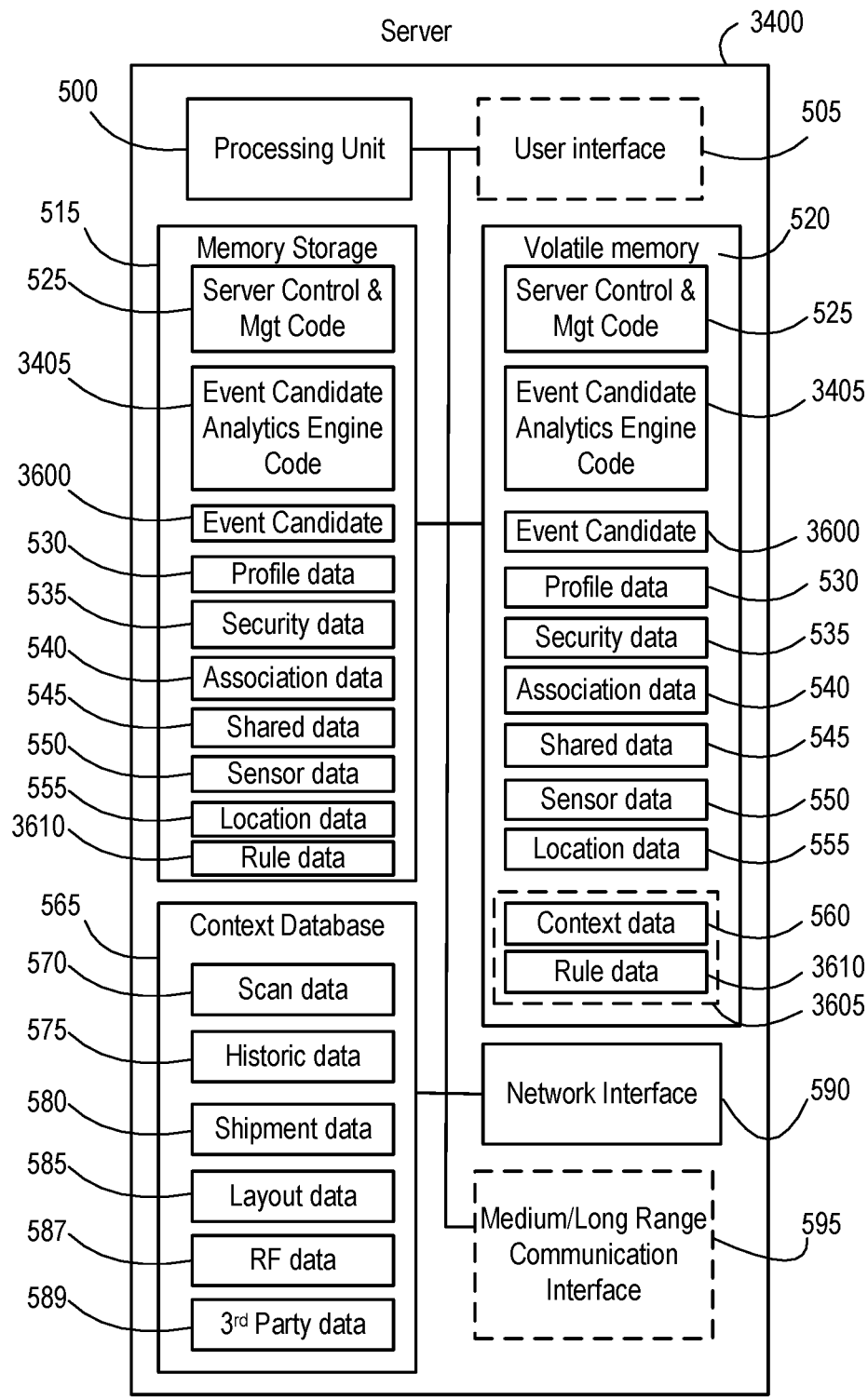
FIG. 36 is a more detailed diagram of another exemplary server in the network illustrated in FIG. 34 that operates to receive an event candidate and manage the network based upon the event candidate in accordance with an embodiment of the invention.

Additional embodiments may use the backend server (such as the server 3400 illustrated and described with respect to FIGS. 34 and 36) to apply a process that ranks or scores the received event candidate to determine how closely the event correlates with other server-accessible data representing known node relevant activity. Based on such a confidence type of ranking or scoring, the backend server may learn about what is happening to nodes and, in some cases, packages associated with nodes, and may then adjust, change or refine node management information (such as relevant node management context data and/or relevant node management rules data) used to help manage other elements of the network. For example, based upon a reported event candidate, the server may provide feedback to the master node to alter or otherwise update how the master node operates itself and/or how the master node manages one or more of the ID nodes under its control via updated context data or updated node management rules (e.g., revised operational profiles the define how a master node and/or ID node functions, operates, reports to other nodes, etc.). Such updated node management rules may also identify new node related or node relevant activity (e.g., a motor turning off near a node, a vehicle driving by a node, a node being exposed to some type of facility structure that may impair communications temporarily) for further investigation. Thus, the server may operate as the core of a type of learning system based on observations from the master node and a confidence factor determined by the server relative to whether certain observations appropriately correspond to particular node related activities so that the server can more accurately be aware of changes related to the dynamic status of nodes and respond accordingly.

In other words, embodiments may deploy a system having the master node monitoring for an event candidate related to an ID node along with a backend server that deploys analytics-based processing where event candidates may be ranked for confidence of being correlated to known or new node relevant activity as a type of input for improved server-based management of nodes in the network and enhanced quality/efficiency of how node event information may be captured and reported as a basis for wireless node network management.

A general embodiment of such an exemplary system that monitors for an event candidate (via detected signals and/or summarized representations of such signals in the form of checkpoints) and processes reported event candidates as part of managing the wireless node network is illustrated in FIG. 34. Referring now to FIG. 34, the exemplary networked system shown is similar to that shown in FIGS. 1 and 2 but with further details on how monitoring and managing may be accomplished. In particular, FIG. 34 illustrates that the network includes a server 3400 connected to a network 105, which is also operatively connected to different network components, such as a master node 3410, and connected indirectly to other network components (such as different ID nodes through master node 3410). Some of the exemplary ID nodes in communication with master node 3410 (i.e., nodes 120a and 120e) are illustrated outside of a container 3420, while the remaining ID nodes (i.e., nodes 120b-120d) are shown disposed within container 3420.

In the system embodiment shown in FIG. 34, master node 3410 is executing event detection engine code 3415 to specially adapt the master node 3410 into an enhanced apparatus (as part of the system) that monitors for event candidates related to one or more of the ID nodes (e.g., one or more of ID nodes 120a-120e) that may be in communication with master node 3410. When master node 3410 detects an advertising signal from one of the ID nodes shown in FIG. 34, master node 3410 may track timing and observed signal strength values (such as RSSI values) for this first advertising signal and any in a series of successively broadcasted advertising signals in what may be considered an observation window or event horizon related to that ID node. Master node 3410 may identify an event candidate during the event horizon (e.g., at the beginning when detecting the first advertising signal, during on-going monitoring of the successive signals, while observing significant shifts or changes in aspects or parameters related to the detected advertising signals, while no longer detecting further signals in the series, etc.). Master node 3410 may identify the event candidate during the event horizon based upon a comparison of detected advertising signals or, in some embodiments, a comparison of different checkpoint summarizations of groups of successively detected advertising signals.

Once a node event is identified to be an event candidate that should be reported back to the server, master node 3410 may report the event candidate to server 3400 in a simplified data feed to server 3400 reflecting summarized information on the status of the broadcasting ID signal (in contrast to reporting all observations on the detected advertising signals). As shown in FIG. 34, Server 3400 is executing event candidate analytics engine 3405 to specially adapt the server 3400 into an enhanced apparatus (as part of the system) that processes the reported event candidates received from master node 3410 as a part of correlating the event candidate to node relevant activity as already characterized by data maintained on the server (e.g., where a node event reflecting a shift in RSSI values can be correlated to node relevant activity of an ID node passing through a shielded tunnel).

FIG. 35 is a detailed diagram of exemplary master node 3410 as shown in the network illustrated in FIG. 34 that operates to monitor for an event candidate to be reported to a server in accordance with an embodiment of the invention. Referring now to FIG. 35, exemplary master node 3410 is illustrated at a level of detail similar to that as shown in and explained above for master node 110a in FIG. 4, and includes similar component elements as those appearing in master node 110a and explained with reference to FIG. 4 (where similarly labeled elements are generally the same). However, FIG. 35 illustrates exemplary master node 3410 as having additional software and additional types of data used in embodiments that provide enhanced monitoring for an event candidate.

In particular, exemplary master node 3410 has memory storage 415 and volatile memory 420 that includes event detection engine code 3415. In general, event detection engine code 3415 comprises a program module that may work in conjunction with portions of the master control and management code 425 executing on processing unit 400 to detect advertising signals through the short range communication interface 480 (e.g., via a code section that coordinates with the node advertise and query (scan) logic manager of code 425), identify event candidates based on particular observations of the advertising signals, and cause the medium/long range communication interface to report the identified event candidates to server 3400 (e.g., via a code section that coordinates with the information control and exchange manager of code 425).

Similar to what is explained with respect to master node 110a in FIG. 4, exemplary master node 3410 as shown in FIG. 35 may generate and use different types of data stored within memory storage 415 and volatile memory 420. In particular, when event detection engine code 3415 is running on processing unit 400, an embodiment may generate and/or rely upon types of event data 3500 when attempting to monitor for event candidates. In one embodiment, event data 3500 may generally be considered data related to observations of signals from nodes that may indicate a particular type of node event. Exemplary event data 3500 may include various types of measurement information, such as timing information and observed signal strength information, which collectively serve to characterize the status of a node from the perspective of one or more observed parameters of a detected signal from the node. For example, such measurement information may include timestamp information indicative of a time for a first sighting of an advertising signal broadcast by one of the ID nodes within range of master node 3410; timer information indicative of an elapsed time (e.g., as provided by clock/timer 460); a count of how many signals broadcast by such an ID node have been detected within a particular time frame (such as before a particular time between signals elapses beyond a predetermined gap time or over a particular event horizon of time after a first sighting or between specific types of events as determined by clock/timer 460 or processing unit 400 itself); and an observed signal strength value (e.g., an RSSI value), which may be an actual value or an average type of value, such as a moving average that helps to smooth out spurious observed signal strengths. Further embodiments of event data 3500 may also include threshold information related to the measurement type of information (e.g., counter values, time values, level values). Additionally, embodiments of event data 3500 may include a node identifier related to the ID node broadcasting the advertising signal detected as well as information originating from the identified node, such as a current battery voltage of the node (a type of sensor data), a temperature value associated with the node (another type of sensor data), and payload data provided by the node via the broadcasting signal detected by master node 3410 through short range communication interface 480. Those skilled in the art will further appreciate that such event data 3500 may also include similar types of information related to checkpoint summaries of groups or sets of detected advertising signals.

An embodiment of master node 3410 useful as a monitoring node may be implemented based upon an Intel®

Edison platform computing device. Those skilled in the art will appreciate that the Intel® Edison platform computing device includes a dual-core CPU and single core microcontroller that supports integrated wireless signal monitoring and communications having multiple communication interfaces (e.g., Wi-Fi, Bluetooth Low Energy), and data collection in a low power package having multiple multiplexed GPIO interfaces with expansion board options for desired flexibility and scalability for the particular embodiment of a master node 3410.

Based upon observations of signals received through short range communication interface 480, an embodiment of master node 3410 may report a summary of certain event data as an event candidate to server 3400. FIG. 36 is a more detailed diagram of exemplary server 3400 in the network illustrated in FIG. 34 that operates to receive an event candidate and manage the network based upon the event candidate in accordance with an embodiment of the invention. Referring now to FIG. 36, those skilled in the art will appreciate that exemplary server 3400 is illustrated at a level of detail similar to that as shown and explained above for server 100 in FIG. 5, and includes similar component elements as those appearing in server 100 and explained with reference to FIG. 5 (where similarly labeled elements are generally the same). However, FIG. 36 illustrates exemplary server 3400 (in like manner as master node 3410 shown in FIG. 35) as having additional software and additional types of data used in embodiments that provide enhanced management of the network in response to receipt of an event candidate from master node 3410.

In particular, exemplary server 3400 has memory storage 515 and volatile memory 520 that includes event candidate analytics engine code 3415. In general and as explained in further detail below, an embodiment of event candidate analytics engine code 3415 comprises a program module that may work in conjunction with portions of the server control and management code 525 executing on processing unit 500 (e.g., via a code section that coordinates with the context-based node manager of code 525) to correlate or verify the received event candidate information 3600, update appropriate node management information 3605, and generate a type of responsive feedback for master node 3410 in the form of a management message having at least some of the updated node management information 3605. In this manner, exemplary event candidate analytics engine code 3415 specially adapts the operations of server 3400 to enhance management of the network. Such enhanced management allows the server 3400 to essentially learn from the reported event candidate (based on a predictive scoring or ranking of confidence that the event candidate is actually representative of a node relevant activity), and to provide improved feedback control for particular node elements based on what is learned.

Exemplary node management information 3605 is generally node management data and/or node management rules related to one or more of the node elements in the wireless node network. For example, exemplary node management data may be implemented by context data 560 as shown in FIGS. 5 and 36 and, as explained above, may generally relate to what a similar node (master node or ID node) has experienced in a similar environment to what a given node is presently experiencing or is anticipated to experience. Exemplary node management rules may be implemented by rule data 3610, which generally defines one or more parameters of an operational profile for a node. For example, rule data 3610 may include a parameter on how long master node 3410 should stay broadcasting at a particular power level, or how master node 3410 should more quickly report event candidates, or how master node 3410 should cause ID node 120a increase its broadcast power level (e.g., a change to profile data 530 as it relates to ID node 120a). As such, node management data (such as context data 560) and node management rules (such as rule data 3610) are examples of node management information 3605 relied upon and updated by server 3400 as part of causing nodes in the network to change operation in response to reported event candidates.

Master Node Operations Related to Enhanced Monitoring for an Event Candidate

In light of the system embodiment shown in FIG. 34 and details regarding master node 3410 and server 3400, as shown in FIGS. 35 and 36, an example event horizon being monitored by master node 3410 may be explained where master node 3410 observes, for example, timing and observed signal strength parameters related to detected ID node advertising signals. In general, an embodiment of master node 3410 may enter a scanning mode where it listens for advertising signals broadcast from nearby ID nodes and then monitors for successive additional signals or summarized groups of successive additional signals during the event horizon that follows after the first signal sighting. FIGS. 37A-37M are a series of graph illustrations that show an exemplary timeline of detected signals and different types of exemplary event candidates that may be identified by a master node, such as master node 3410, over time in accordance with an embodiment of the invention.

Referring now to FIG. 37A, the graph illustrated includes a horizontal axis and a vertical axis. The horizontal axis represents points in time (e.g., $t_0$-$t_8$) progressing to the right. The vertical axis represents an exemplary observed parameter of signals detected by master node 3410 (e.g., the observed RSSI value of an advertising signal broadcast by an ID node, such as ID node 120a, and received by master node 3410). Thus, as an advertising signal from ID node 120a is detected by master node 3410 over time, the graph of FIG. 37A shows various data points representing successive detections and relevant interpretation of such detections by master node 3410.

In particular, master node 3410 detects an initial advertising signal from ID node 120a at point 3700 at time $t_0$. Master node 3410 identifies this initial detection as a first sighting event, which may be reported to the server 3400 as a type of event candidate. Thereafter, as indicated on the graph of FIG. 37A, further successive signals are detected within a gap time of each other up to point 3705. The points shown on the graph between 3700 and 3705 represent observed RSSI values for the respective ones of the successive signals as the successive signals are detected. Thus, the graph indicates types of event data 3500 and how the master node 3410 observes timing and signal level parameters related to the successively detected signals as a basis for such event data 3500.

When master node 3410 has detected a predefined sample number, n, of the successive signals, master node 3410 may generate a first moving average of the observed RSSI values within a sample window at point 3710 involving the observed RSSI values from the last n detected ones of the successive signals. At this point, master node 3410 identifies point 3710 as an online event, which may be reported to server 3400 as a type of event candidate. Point 3710 may also be considered as a beginning checkpoint type of event that represents a summary status of the observed RSSI values in the form of the first moving average (representing an initial summarized status of the ID node 120a). In some embodiments, master node 3410 may not use a moving average of the observed RSSI values and, instead, may rely upon other statistical representations of observed RSSI values for groups of detected signals.

As will be explained in more detail below, consideration and reporting of checkpoint events helps master node 3410 avoid overwhelming server 3400 with reported events and, instead, advantageously allows for tracking and reporting with summarized information to help simplify the data feed provided by master node 3410 about the status of ID node 120*a*.

In FIG. 37B, the same graph continues to reflect operations of master node 3410 that detect further successive advertising signals from ID node 120*a* and where the actual observed RSSI value and the moving average of observed RSSI values are reflected over time from point 3715. At point 3720, master node 3410 has detected a further n number of successive signals since the beginning checkpoint event at point 3710 (each detected within a time gap of each other up to point 3720). As such, master node 3410 identifies point 3720 as another checkpoint event, which may be reported to server 3400 as a type of event candidate. In other words, an embodiment may have master node 3410 utilize checkpoint events or summaries (such as this first checkpoint event also labeled the online event) as a way to periodically summarize and simplify observations by master node 3410 representing a status of node 120*a*.

Figure 37C:
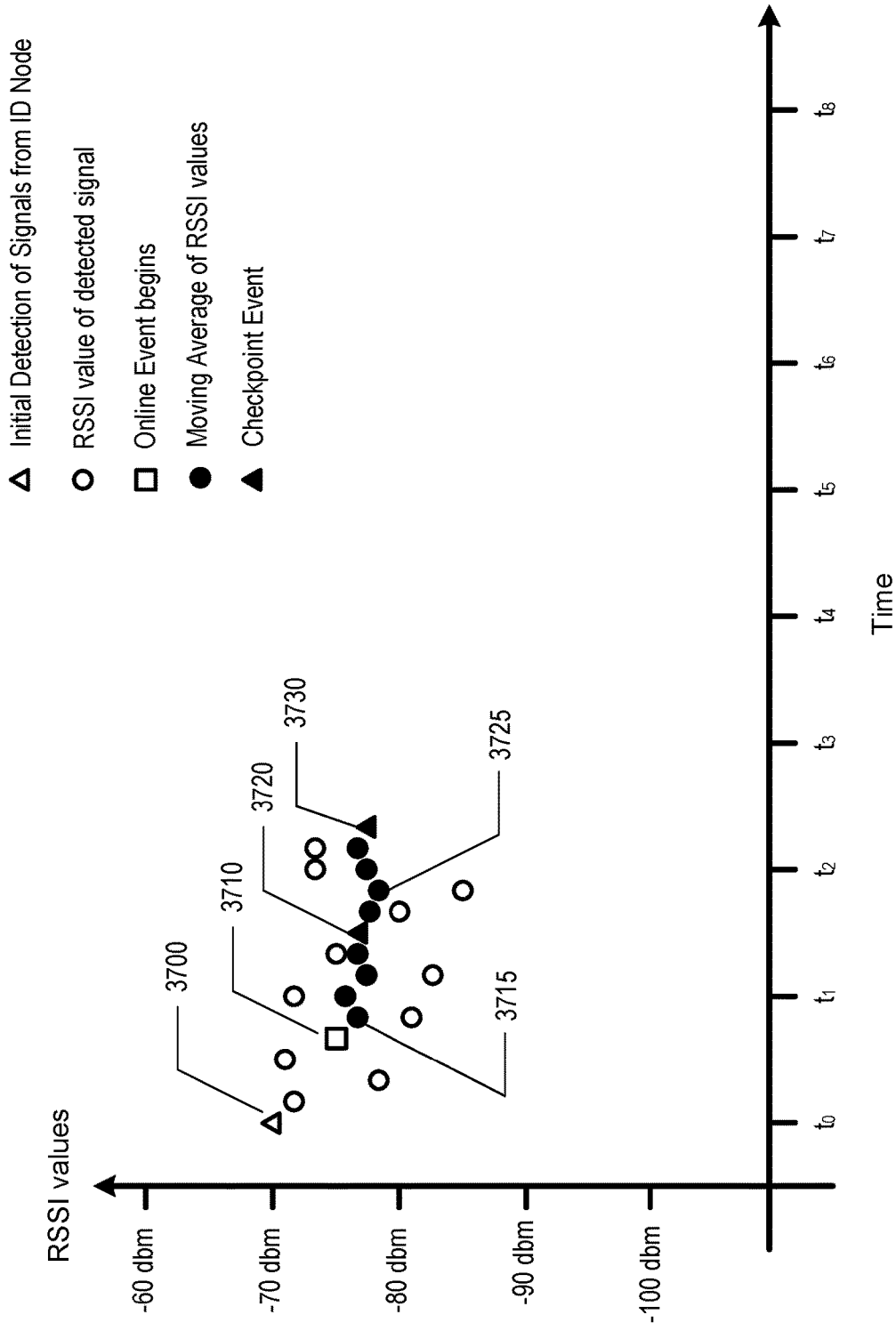

In FIG. 37C, the graph reflects operations of master node 3410 that detect still more successive advertising signals from ID node 120*a* and where the actual observed RSSI value and the moving average of observed RSSI values are reflected over time from point 3720 to point 3725 and then to point 3730. Master node 3410 identifies point 3730 as a third checkpoint event because it detects another n number of successive signals since the second checkpoint event at point 3720. As such, master node 3410 identifies point 3730 as a third checkpoint event, which may be reported to server 3400 as a type of event candidate.

Figure 37D:
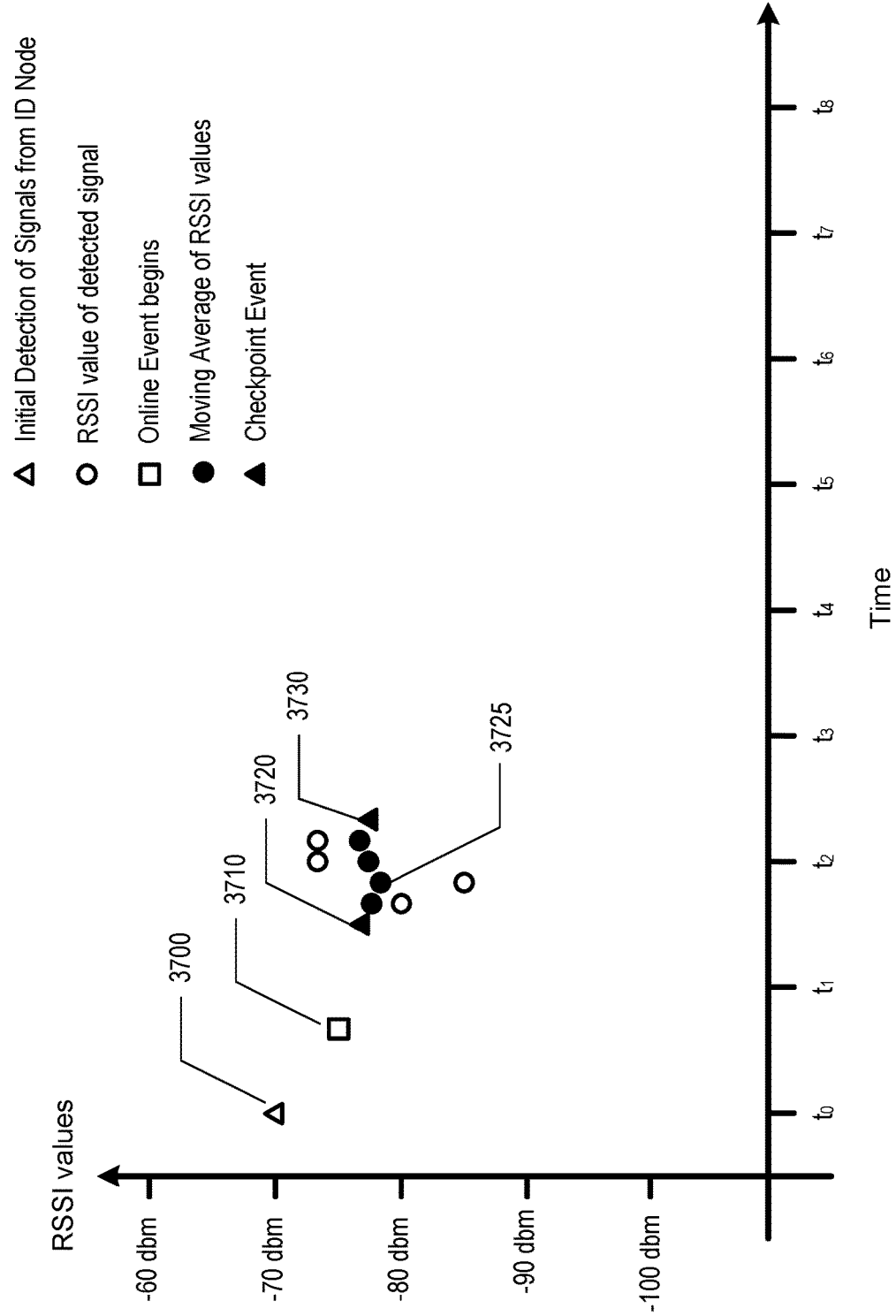

In FIG. 37D, master node 3410 may help conserve onboard memory 415/420 by deleting from the event data 3500 the intervening actual observed RSSI values and the moving averages between the prior two checkpoint events. Doing so allows the master node 3410 to more efficiently use it's onboard resources and focus on maintaining the summarized information about the observed parameter of the detected successive advertising signals (e.g., the observed RSSI values as smoothed by the moving average processing).

Figure 37F:
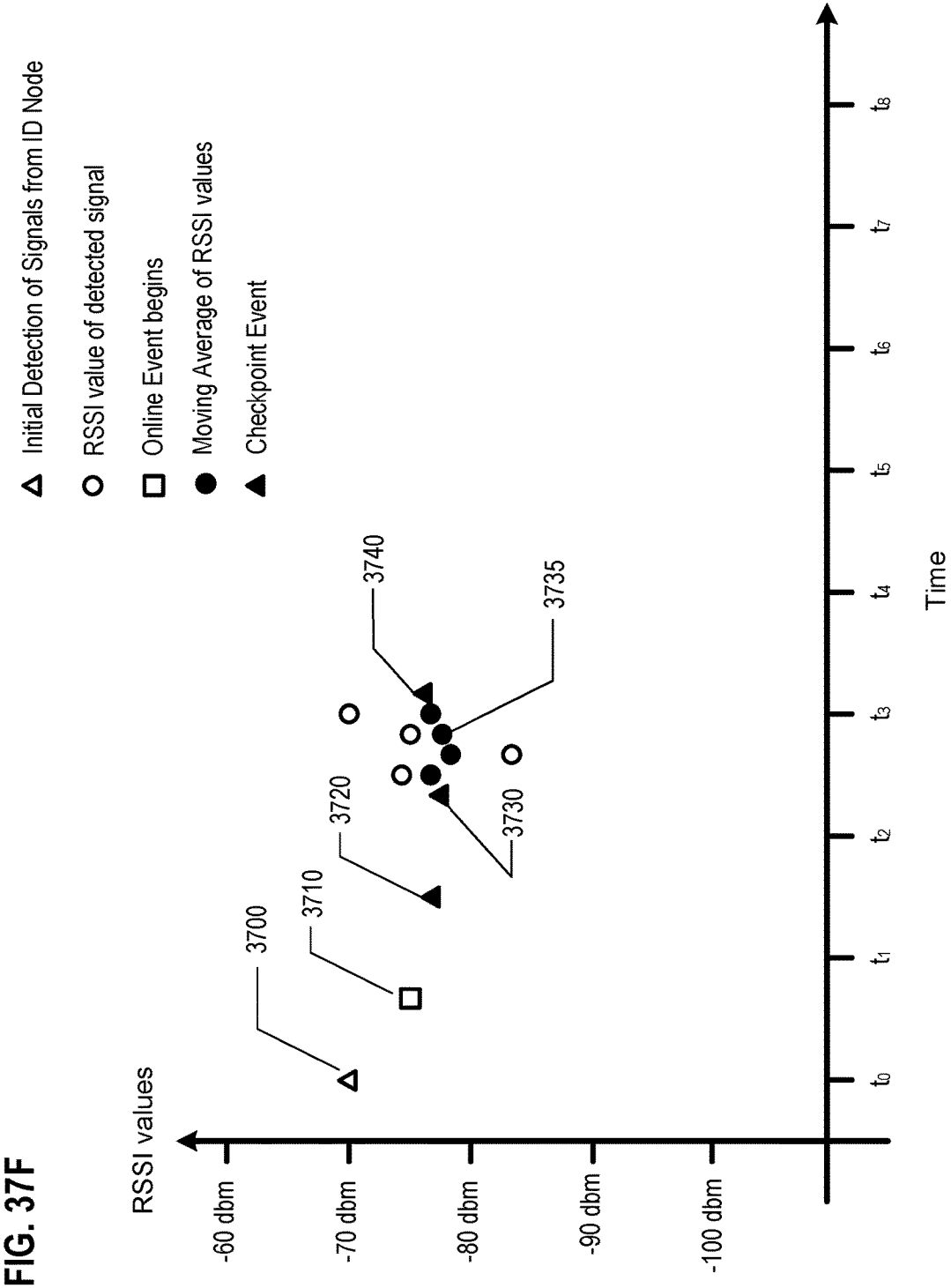

Master node 3410 may then continue to scan/monitor for more successively detected signals and identify point 3740 in FIG. 37E as a fourth checkpoint event, which may be reported to server 3400 as a type of event candidate before reducing what master node 3410 maintains in memory as event data 3500 as shown in FIG. 37F.

Figure 37G:
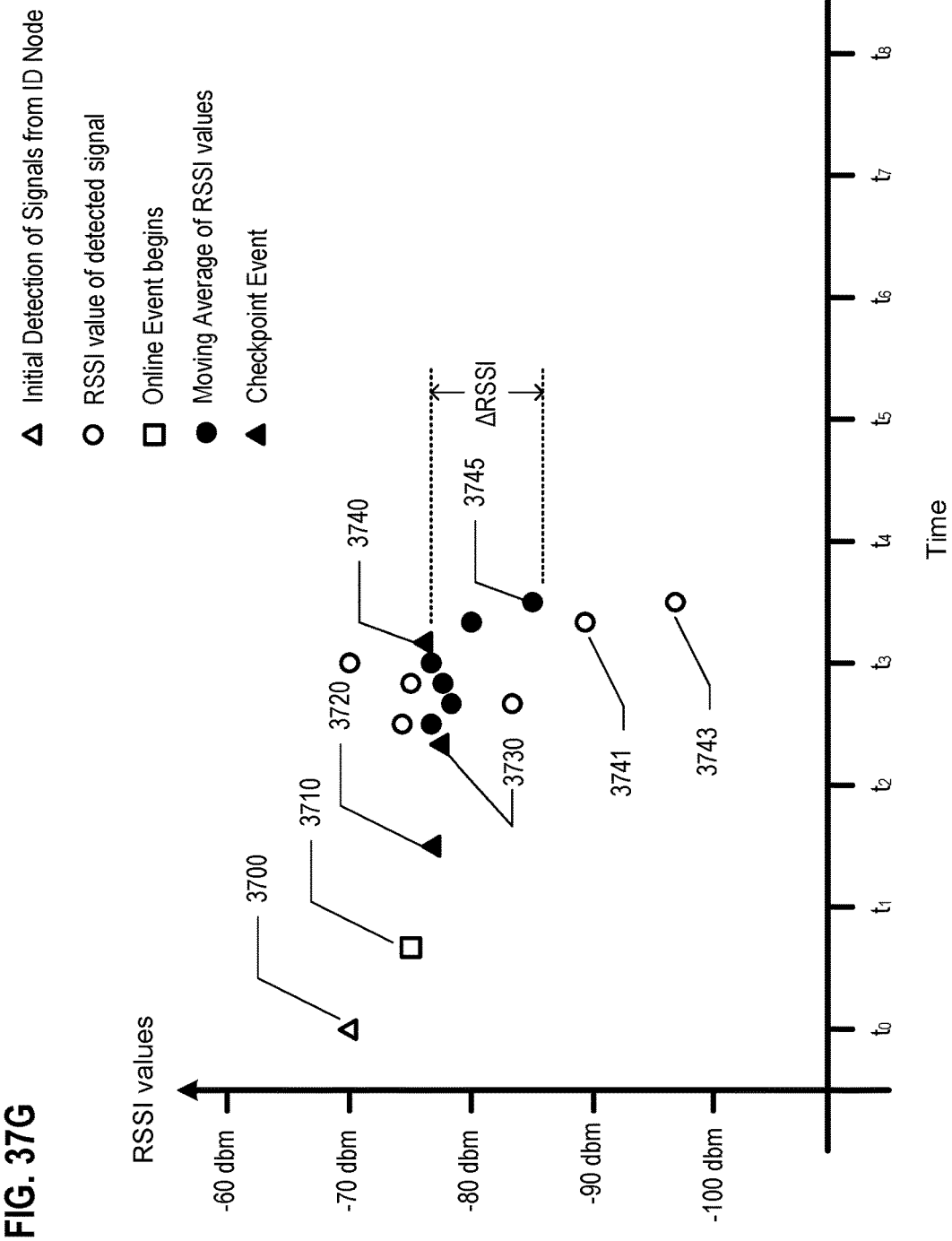
Figure 37I:
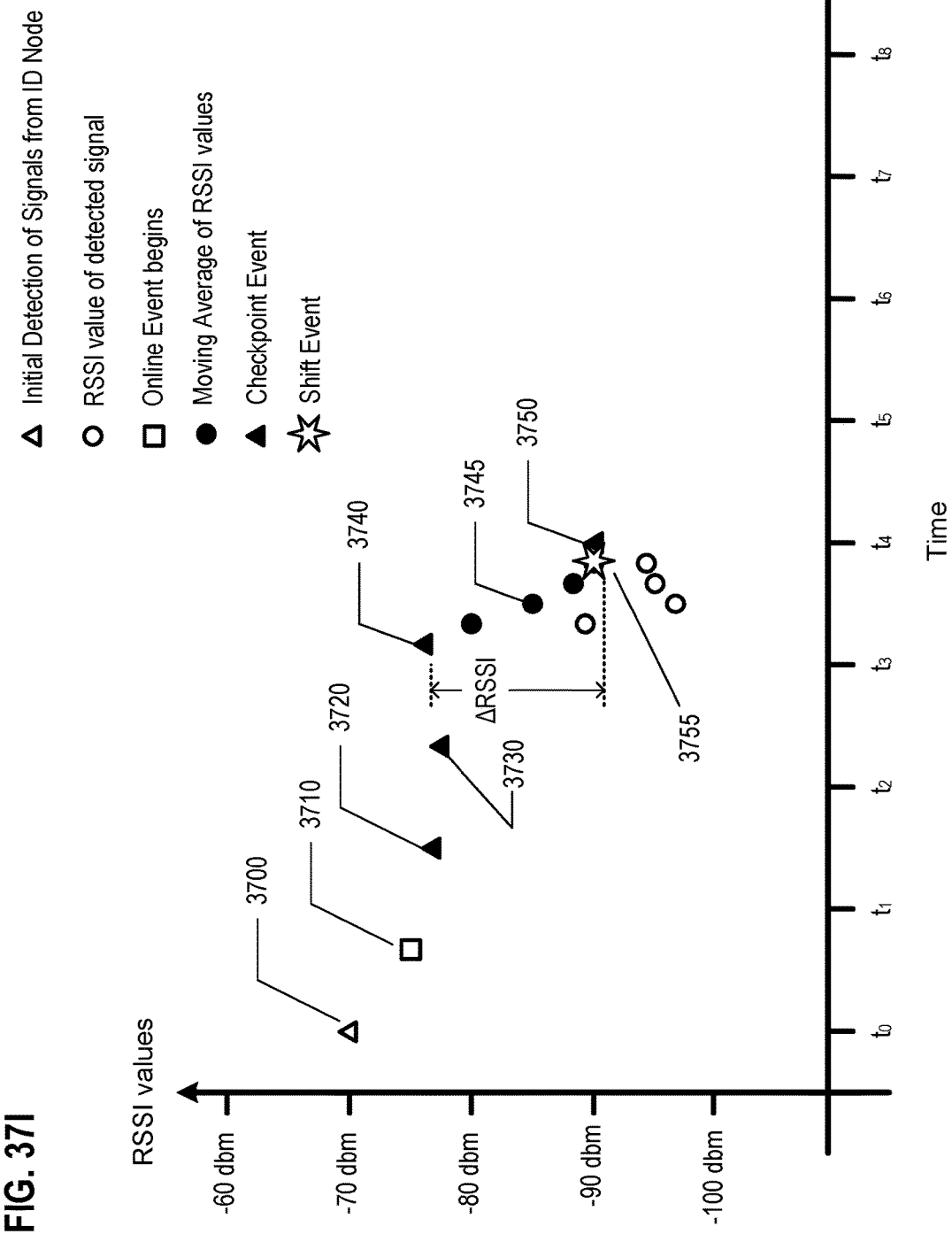
Figure 37J:
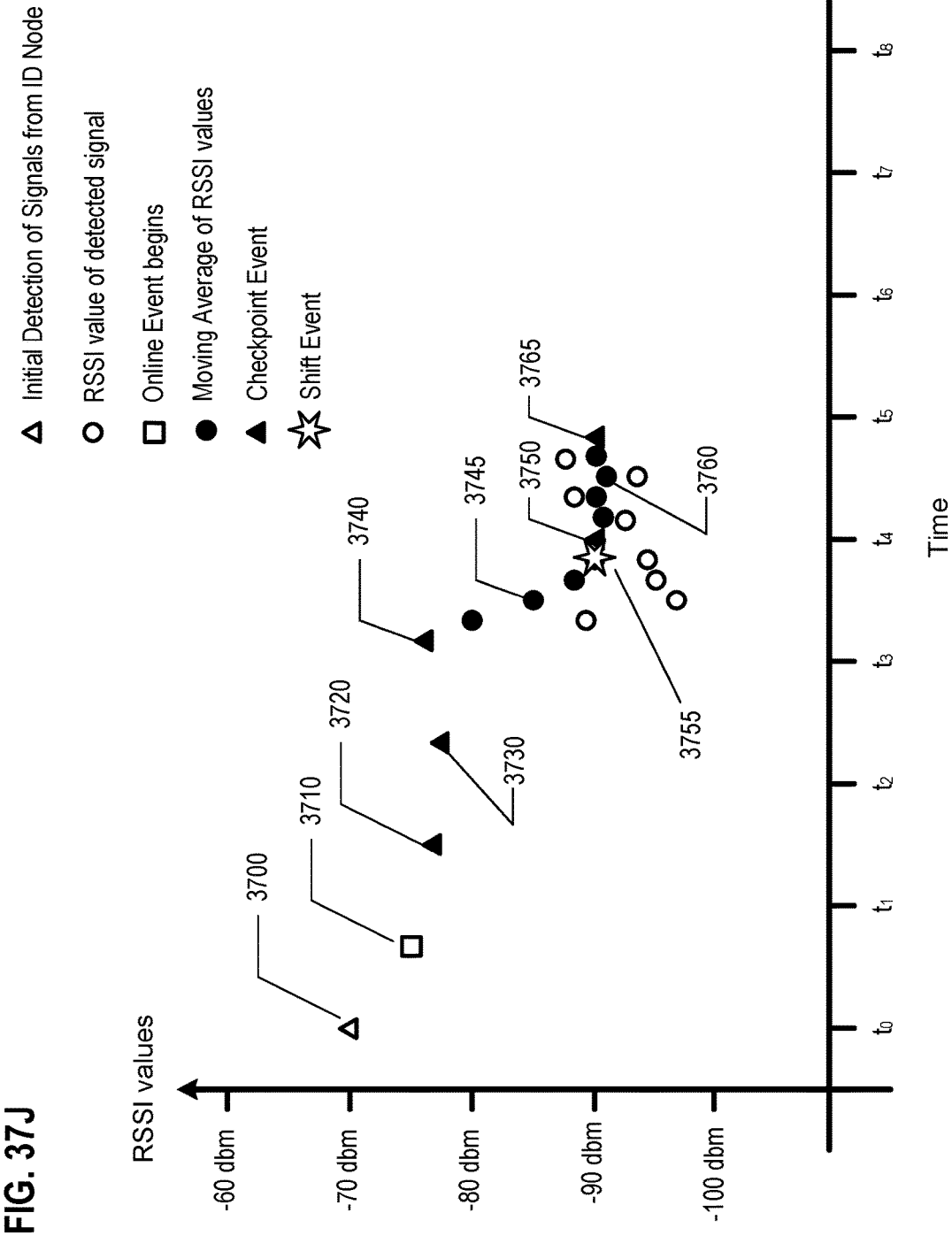

An embodiment of master node 3410 may identify a type of event candidate by, for example, identifying a pattern between the detected advertising signals. For example, master node 3410 may observe a change in the observed parameter of the advertising signals—e.g., a pattern showing that the observed RSSI values are dropping. FIG. 37G illustrates additional detections of successive signals where the pattern observed reflects shift in observed RSSI value between points 3740 to 3741 to 3743. In particular, as master node 3410 determines the moving average of the sample window as points 3741 and 3743 appear within the sample window, master node 3410 generates moving averages of the observed RSSI values reflected in points 3740 and 3745. With those moving averages that have changed over time, as shown in FIG. 37G, a detected shift between the observed moving averages between point 3740 (the most recent checkpoint) and point 3745 (the most recently determined moving average of observed RSSI values) is shown as ΔRSSI. As time proceeds and further successive advertising signals are detected by master node 3410, the detected shift between the most current average of observed RSSI values and the average for the most recent checkpoint (i.e., ΔRSSI) may be compared to a threshold value to see if the detected shift is significant enough to report to the server 3400. In other words, as shown in FIG. 37H, when ΔRSSI is greater than $RSSI_{threshold}$ at point 3755, master node 3410 identifies point 3755 as a shift event, which may be reported to server 3400 as a type of event candidate before reducing what master node 3410 maintains in memory as event data 3500 as shown in FIG. 37I.

Figure 37K:
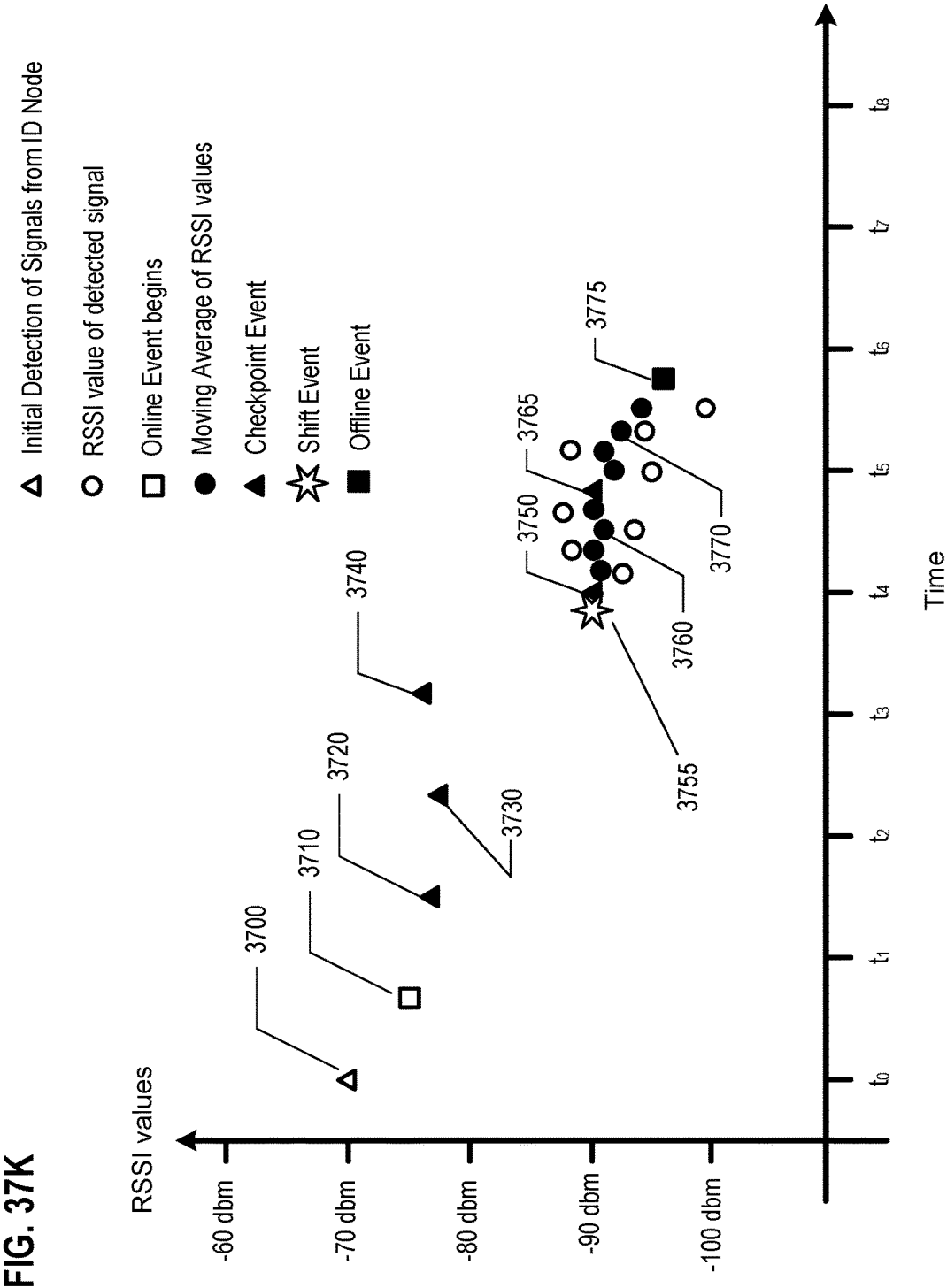
Figure 37L:
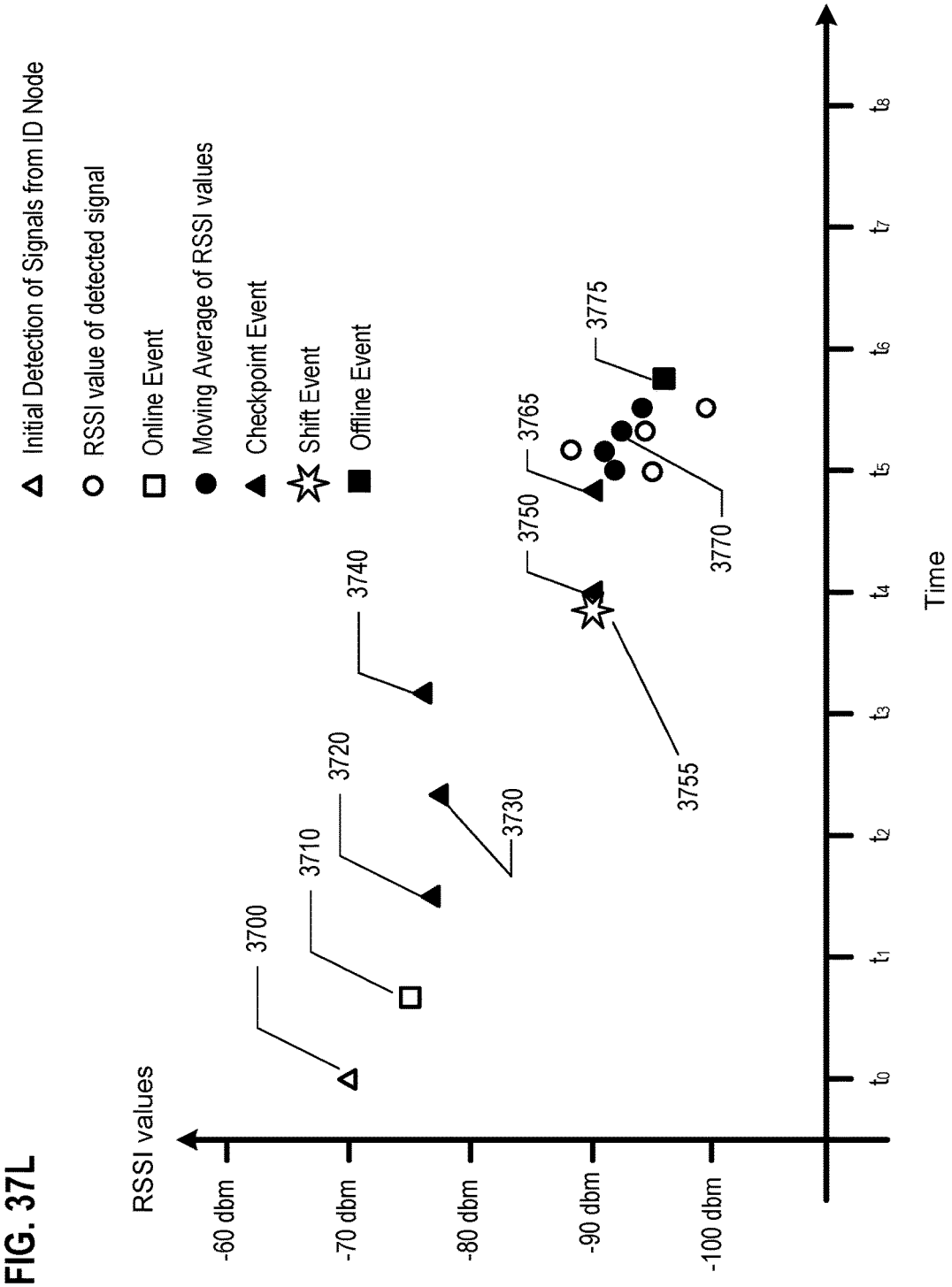
Figure 37M:
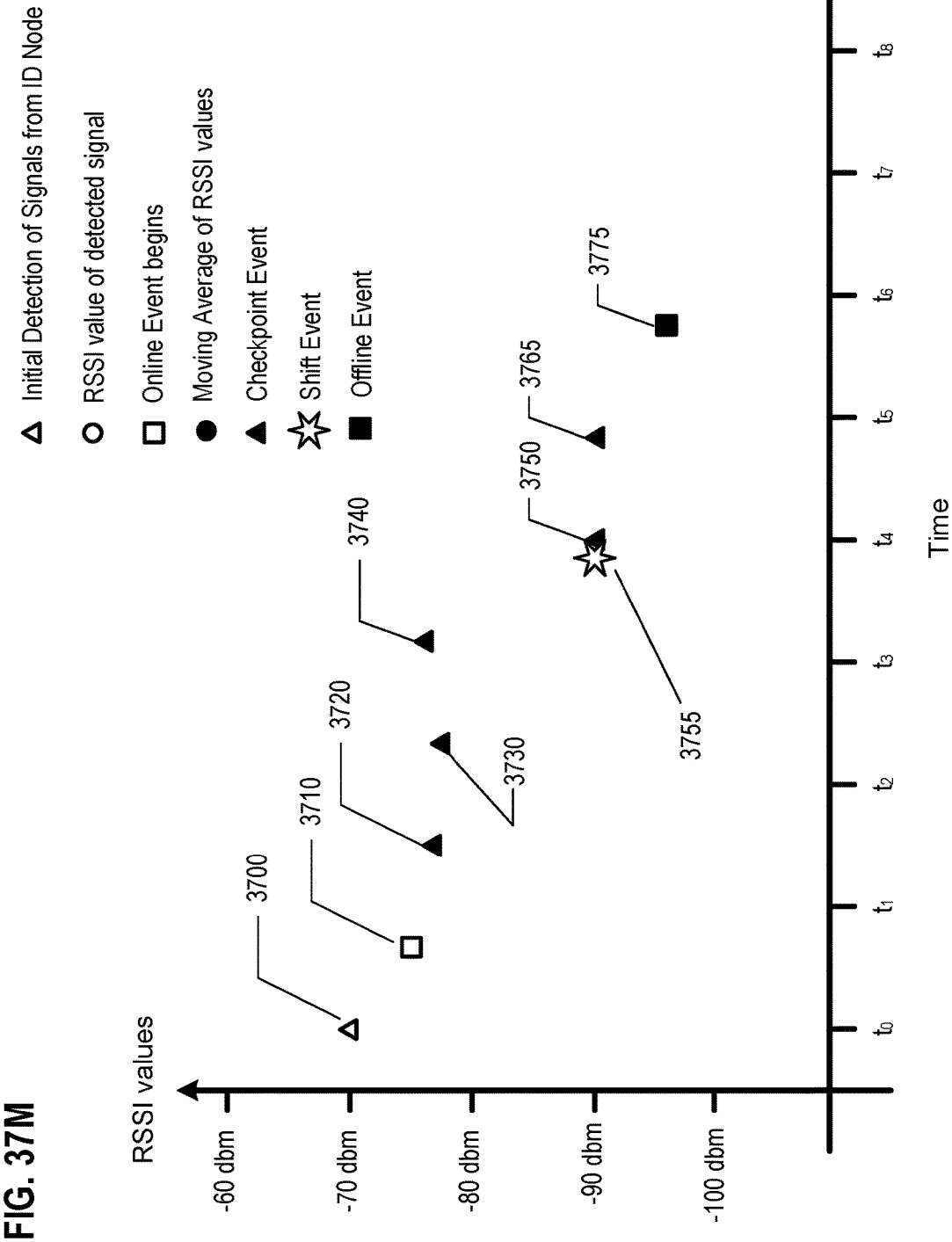

FIGS. 37J-37M illustrate further detections of successive advertising signals from ID node 120*a* as the observed RSSI values (and notably their respective moving averages) level off before dropping down to a point 3775 after which no further successive advertising signal from ID node 120*a* is detected before the gap time elapses. In other words, master node 3410 may then continue to scan/monitor for more successively detected signals as shown in FIGS. 37J-37M; identify points 3750 and 3765 in FIG. 37J as a fifth and sixth checkpoint event, respectively; may report the fifth and sixth checkpoint events in due course to server 3400 as a types of event candidate before reducing what master node 3410 maintains in memory as event data 3500 as shown in FIGS. 37K and 37L; and then identifies point 3775 as an offline event, which may be reported to server 3400 as a type of event candidate before reducing what master node 3410 maintains in memory as event data 3500 as shown in FIG. 37M.

In summary, the graphs of FIGS. 37A-37M represent embodiments of an exemplary event horizon where events related to an ID node may be detected, identified, monitored, and reported to server 3400. This particular example, the series of successively detected advertising signals are received by the master node 3410 from the first sighted advertising signal detected at point 3700 and through the last sighted advertising signal master node detected at point 3775 as long as the gap time between successive ones of the detected signals has not elapsed (I., the time between successive detected signals is less than a threshold time).

However, in some instances, the particular ID node may only briefly come within range of master node 3410, and master node 3410 may be able to detect only one or just a few successive advertising signals broadcast by the ID node, and then lose further contact with the ID node. Thus, while the example shown in FIGS. 37A-37M has master node 3410 initially detecting enough signals from the ID node over time to identify an online event, in other examples, the gap time between successive ones of the detected advertising signals may elapse prior to the online event. In such a situation, master node 3410 may identify the point of time where the gap time elapsed after the first sighting as a spurious event related to the ID node, which may then be reported to server 3400 as still another type of event candidate.

Those skilled in the art will appreciate that such a general example of an embodiment that monitors for an event candidate based at least upon a comparison of observed parameters (e.g., timing and/or observed signal strength levels) of different detected signals may be extended to monitor one or more different ID nodes and report event candidate information to server 3400 about the different monitored ID nodes in a simplified and summarized manner. Server 3400 may then be able to learn from such reported event candidates (e.g., related to just one ID node and/or from a combination of reported event candidates related to multiple ID nodes). Thus, the various different embodiments described herein are applicable to a larger scale monitoring system deployed within and as part of an exemplary wireless node network that may also have different master nodes reporting their respective event candidates to the same server rather than just a single master node and where different master nodes may report different event candidates that are related to the same ID node. In such a manner, the server 3400 may be provided with different perspectives on the observed status of one particular ID node as provided by multiple master nodes that may be within a range of the particular ID node.

Those skilled in the art will also appreciate that other examples of an embodiment may use the detected advertising signals in accumulated groups or sets that are represented internal to the master node 3410 as a checkpoint or checkpoint summary. The comparison of checkpoints may indicate a node event of such significance to warrant reporting as an event candidate to the server 3400. Thus, the insight provided by the monitoring master node 3410 may be based upon simply two detected advertising signals or, in other instances, involve generating internal representations of groups of the advertising signals so as to manage how frequently the master node 3410 compares the observed parameters (e.g., RSSI values) to identify a node event that warrants reporting to server 3400 as an event candidate.

In light of the discussion above related to the exemplary system shown in FIG. 34, the exemplary master node 3410 shown in FIG. 35, the exemplary server 3400 shown in FIG. 36, and the exemplary operational explanation provided in conjunction with FIGS. 37A-37M, what follows are descriptions of further embodiments of methods, apparatus, and systems for enhanced monitoring for an event candidate within a wireless node network.

Figure 38:
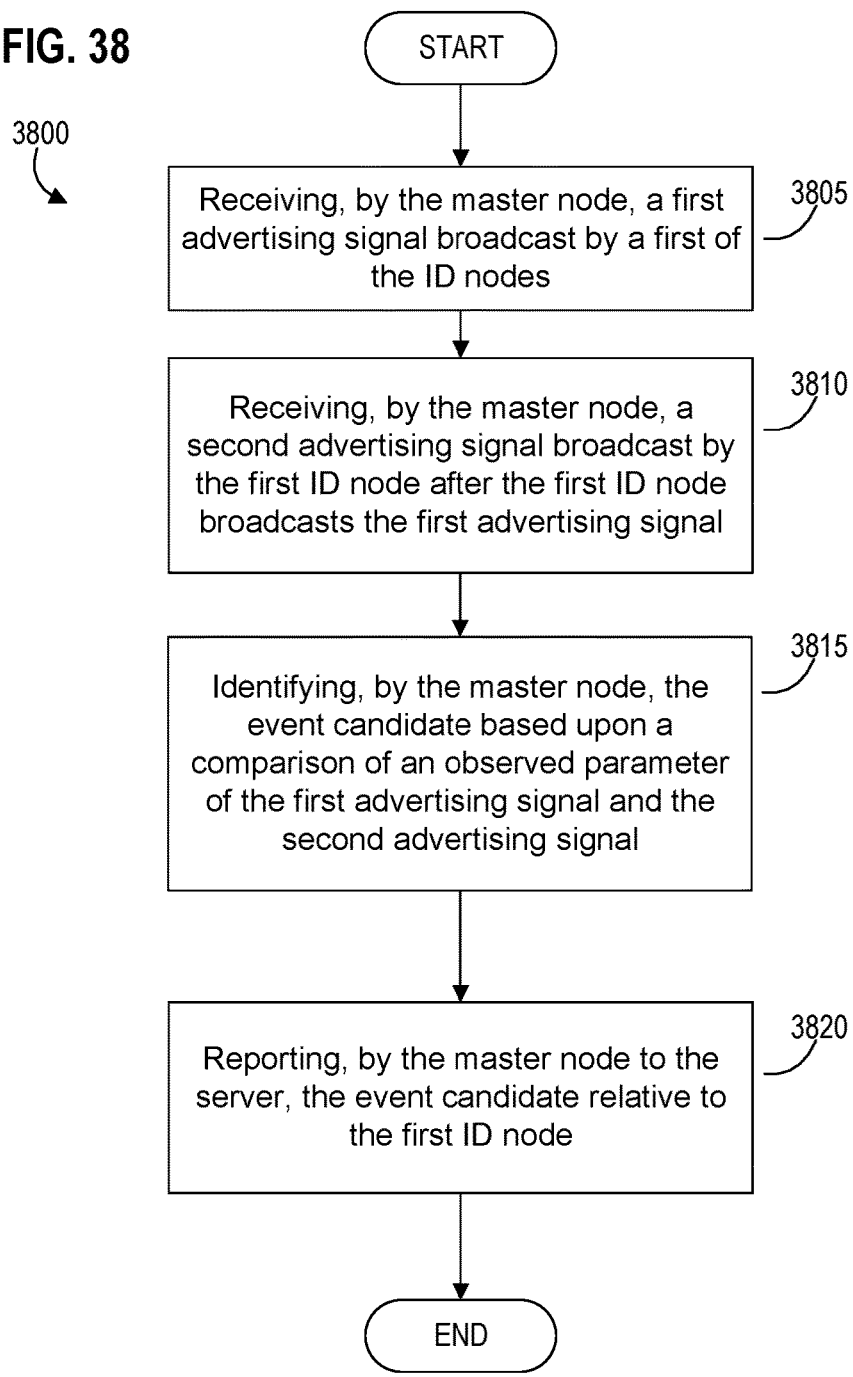
FIG. 38 is a flow diagram illustrating an exemplary method for monitoring for an event candidate within a wireless node network based upon receipt of a first and second advertising signal broadcast by an ID node in accordance with an embodiment of the invention.

In more detail, FIG. 38 is a flow diagram illustrating an exemplary method for monitoring for an event candidate within a wireless node network based upon receipt of a first and second advertising signal broadcast by an ID node in accordance with an embodiment of the invention. In this method embodiment, the wireless node network comprises at least a plurality of ID nodes, a master node in communication with the ID nodes, and a server in communication with the master node. Referring now to FIG. 38, method 3800 begins with the master node receiving a first advertising signal broadcast by a first of the ID nodes at step 3805 and then receiving a second advertising signal broadcast by the first ID node at step 3810 after the first ID node broadcasts the first advertising signal. At step 3815, method 3800 proceeds with the master node identifying the event candidate based upon a comparison of an observed parameter of the first advertising signal and the second advertising signal. Once the event candidate is identified in step 3815, method proceeds to step 3820 where the master node reports the event candidate to the server. Such reporting, in a further embodiment, may have the master node simplifying a data feed about the first ID node by sending the event candidate to the server as summary information reflecting an observed change between the first advertising signal and the second advertising signal. In other words, an embodiment of step 3820 may have the event candidate reported to the server as a way to avoid the need to update the server with information on all signals received by the master node from the first ID node.

In further embodiments of method 3800, identifying the event candidate may be accomplished with an increased level of detail. For example, in one further embodiment, identifying the event candidate at step 3815 may have the master node identifying a pattern between at least the first advertising signal and the second advertising signal based upon the observed parameter. The identified pattern, such as an identified decreasing observer signal strength level pattern (similar to that shown in FIGS. 37G and 37H), may reflect summarized information related to the first ID node as the event candidate. In more detail, identifying the event candidate at step 3815 may involve identifying an observed pattern between at least a first signal strength value of the first advertising signal and a second signal strength value of the second advertising signal, where the observed pattern reflects summarized information related to the first ID node as the event candidate.

In other embodiments of method 3800, identifying the event candidate may involve a moving average of what may be observed. In more detail, identifying the event candidate at step 3815 may have the master node comparing the observed parameter of the second advertising signal to an average of the observed parameters of a set of prior advertising signals from the first ID node including the first advertising signal. For example, as discussed above with reference to FIGS. 37A-37M, a moving average of observed RSSI values may be determined and used to identify the event candidate where the moving average spans a set of n detected advertising signals that span a sample window.

In still further embodiments of method 3800, the observed parameter that is the focus of comparing different monitored and detected ID node advertising signals in step 3815 may be further implemented in various forms and combinations as part of identifying the event candidate. In more detail, the observed parameter in one embodiment may comprise a received signal strength indicator (RSSI) reflecting a signal strength as detected by the master node. As such, the step of identifying the event candidate at step 3815 may comprise comparing a received signal strength indicator value of the second advertising signal to an average of a set of received signal strength indicator values of advertising signals from the first ID node broadcast prior to the second advertising signal. In still more detail, the averaged set of received signal strength indicator values of advertising signals from the first ID node broadcast prior to the second advertising signal in a further embodiment may comprise a moving average of the set of received signal strength indicator values of advertising signals from the first ID node broadcast within a moving window prior to the second advertising signal. For example, as described above, a moving average may involve a sample window of n detected successive advertising signals where the detected successive signals are serially detected prior to a gap time elapsing between each of the detected signals.

In more embodiments of method 3800, the observed parameter may involve detecting a shift in what is observed by the master node as the received signal strength value of the monitored advertising ID node signals. In other words, the observed parameter in one embodiment may comprise a shift in the observed signal strength value as received by the master node. As such, identifying the event candidate at step 3815 may further comprise detecting the shift in received signal strength value when comparing the first advertising signal and the second advertising signal, and identifying the event candidate as a shift event when the detected shift in received signal strength value is at least a threshold value.

In some embodiments, the master node may wait to observe a more complete shift in the observed signal strength value before reporting the relevant event candidate to the server. In particular, a further embodiment may have the observed parameter comprising an observed shift in the signal strength value as received by the master node. As such, the step of identifying the event candidate at step 3815 and reporting the event candidate to the server at step 3820 may further comprise more detailed steps in a further embodiment.

For example, such detailed steps may comprise detecting a beginning shift in received signal strength value when the observed shift in the signal strength value between the received first advertising signal compared to the received second advertising signal is at least an initiating threshold value; the master node receiving a subsequent advertising signal broadcast by the first ID node after the first ID node broadcasts the second advertising signal; detecting a continued shift in received signal strength value when the observed shift in the signal strength value between the received second advertising signal compared to the received subsequent advertising signal; and then reporting the event candidate by the master node to the server as a shift event only after detecting the beginning shift and if the detected continued shift is less than a continued event threshold value. In this way, the master node may further enhance simplification of the data feed to the server. In other words, an embodiment may have the reporting step delaying transmission of the event candidate to the server by the master node until the detected continued shift based upon the observed signal strength value of the subsequent advertising signal is less than the continued event threshold value.

In another embodiment, rather than waiting to report the shift event, the master node may first report the shift event as the event candidate after detecting the first threshold (e.g., the initiating threshold value as explained above). Thereafter, if the master node detects a further drop or change in received signal strength value beyond another threshold, the master node may report another shift event as the event candidate. Otherwise, the master node may smooth out shift events between the first and final checkpoint within a continuous multi-point shift event.

In still further embodiments, the observed parameter in method 3800 may involve timing between successive detected advertising signals. In more detail, the observed parameter in an embodiment may comprise a detected time between successive advertising signals broadcast from the first ID node and as received by the master node. As such, the step of identifying the event candidate at step 3815 may comprise detecting a time gap between the first advertising signal and the second advertising signal as the observed parameter (e.g., using the clock/timer 460 on master node 3410) and identifying the event candidate when the detected time gap is less than a threshold time gap.

Additionally, still further embodiments of method 3800 may identify the event candidate with more specificity as being a particular type of event. In more detail, in a further embodiment, identifying the event candidate at step 3815 may have the master node identifying the event candidate as an online event when the detected time gap is less than the threshold time gap and the master node receives at least one additional advertising signal broadcast by the first ID node within the threshold time gap after the second advertising signal. In still more detail, identifying the event candidate as the online event may occur when both (a) the detected time gap between the first advertising signal and the second advertising signal is less than the threshold time gap and (b) the master node has received at least a threshold number of advertising signals from the first ID node each of which are received by the master node within the threshold time gap from each other, where receipt of the first advertising signal and receipt of the second advertising signal are included in the threshold number of advertising signals received from the first ID node. For example, an online event is identified by master node 3410 with reference to point 3710 shown in FIG. 37A and timing between the successively detected signals after point 3700 (which are each within the threshold time gap which, if elapsed, would indicate the initial detection was more of a spurious or sporadic type of event).

In another further embodiment of method 3800, step 3815 may have the master node identifying the event candidate as an offline event when both (a) the detected time since the master node received the second advertising signal is greater than a threshold time gap and (b) the master node previously identified an online event related to signals from the first ID node including the first advertising signal and the second advertising signal. Such an example of identifying an offline event is reflected in the graph of FIG. 37K at point 3775 where an online event was identified by master node 3410 at 3710 and the time after the master node 3410 received the signal associated with point 3775 has elapsed past a threshold time gap as ID node 120a may no longer be broadcasting or may no longer be within range of master node 3410 and, thus, is considered offline relative to master node 3410.

In still another embodiment of method 3800, step 3815 may have the master node identifying the event candidate as a sporadic event when the master node receives at least the first advertising signal and the second advertising signal but does not receive at least a threshold number of advertising signals from the first ID node within a defined period of time from when the master node receives the first advertising signal.

Still further embodiments may have step 3815 identifying the event candidate as a checkpoint event when a periodic reporting interval ends and based upon the comparison of the observed parameter of the first advertising signal and the second advertising signal. For example, as shown in FIG. 37B, master node 3410 identifies point 3720 as being a checkpoint event after the reporting interval between point 3710 and point 3720 ends and the comparison at point 3720 involves a moving average of the observed RSSI values over the sample window.

Method 3800 may also identify other event candidates based on changes in the observed parameter of the detected signals when the observed parameter is a type of data in the detected signals. Examples of such other types of node events may include a profile change event, a transmission power change event, and an environmental change event. In more detail, an embodiment may have method 3800 further implement step 3815 with the observed parameter comprising an observed profile setting, and with the master node identifying the event candidate as a profile change event when the comparison indicates the observed profile setting of the second advertising signal is different than the observed profile setting of the first advertising signal. Such an observed profile settings may generally relate to operation of the first ID node and/or operation of the master node. A more detailed example may have an exemplary observed profile setting taking the form of an observed resource parameter (e.g., a parameter indicating current memory usage by the node, current free memory in the node, present battery life remaining for the node, and the like for onboard node resources) as indicated in a header of an advertising signals from the first node. Thus, a change to an observed resource parameters may be considered as a type of change to an observed profile setting in advertising signals over time. In summary, the observed parameters underlying identification of the event candidate may involve detected changes to how a node specifically indicates it is operating according to an operational profile for the node.

In a similar fashion, another embodiment may have method 3800 further implement step 3815 with the observed parameter comprising an output power setting for the first ID node, and with the master node identifying the event candidate as a transmission power change event when the comparison indicates the observed output power setting related to the second advertising signal is different than the observed output power setting related to the first advertising signal. Thus, those skilled in the art will appreciated that an observed parameter of an output power setting for the first ID node is a setting from the perspective of the broadcaster (e.g., first ID node), in contrast to an observed signal strength value that is a measurement of from the perspective of the receiver (e.g., the master node). In other words, while FIGS. 37A-37M are illustrated with an observed parameter of signals detected by master node 3410 to the observed RSSI value of the advertising signal, other embodiments may have the master node 3410 observing and monitoring an output power setting of the advertising signal (which is a power from the perspective of the broadcaster, in contrast to the observed RSSI value that is a power from the perspective of the receiver) to identify the event candidate as a transmission power change event.

Additionally, still another embodiment may have method 3800 further implement step 3815 with the observed parameter comprising sensor data gathered by a sensor on the first ID node, and with the master node identifying the event candidate as an environmental change event when the comparison indicates a second sensor data value included as part of the second advertising signal is different than a first sensor data value included as part of the first advertising signal. In more detail, the master node may identify the event candidate as an environmental change event when the comparison indicates a second sensor data value included as part of the second advertising signal reflects a departure from a first sensor data value included as part of the first advertising signal, where the departure is more than a threshold difference. Thus, detected changes in environmental related sensor data as included in parts of the detected advertising signals may cause the master node to identify a type of event candidate.

Further embodiments of method 3800 may include further steps that may change how quickly the master node reports event candidates to the server. For example, method 3800 may further have the master node detecting an alert flag from the first ID node, where the alert flag is part of at least one of the first advertising signal and the second advertising signal. Such an alert flag may, for example, be a part of an advertising packet signal header that indicates an alert stage status as previously explained relative to advertising data and flags (such as status flags) that may be used in advertising packets. Upon detecting the alert flag, the master node may then alter the reporting interval for how frequently the master node may send updates or report event candidates (e.g., how long before the next checkpoint event where summarized information on the node is reported to the server). For example, the periodic reporting interval may be reduced when the master node detects the alert flag. Such a reporting interval may be a an adjustable value, such as a time period adjustable by the master node or a number of signal receptions adjustable by the master node before reporting further event candidates (e.g., new checkpoint events, and the like). In such an embodiment, the master node may be able to adaptively recognize that an ID node may have an alert status that, once detected, may desirably be handled more quickly or with more frequent updates back to the server so that the server may more efficiently and effectively manage the alert status situation with management feedback to the master node and other control input.

Another embodiment may implement an alert flag as a profile identifier corresponding to one of many different types of operational profiles (such as alert profiles) used with different ID nodes. In this embodiment, upon detecting the profile identifier, the master node may then alter certain monitoring functionality given the master node has been made aware of a particular alert profile being used by the particular ID node without the need to burden the backend server for such information. The embodiment may have the monitoring master node, such as master node 3410, maintain each of the different types of alert profiles for the different types of ID nodes as part of profile data 430. With the profile identifier, the master node is able to adapt how it monitors this particular ID node. More specifically, the profile identifier informs the master node which of the alert profiles are being used and how to adapt monitoring and reporting about the particular ID node, such as via node management rules related to the time intervals and threshold values (such as a reporting interval, threshold time gaps, a threshold number of advertising signals to receive from an ID node that corresponds to an online event, and the like). This allows the ID node to autonomously or responsively change to an alert profile, generate new advertising signals where the new signals include the appropriate profile identifier within a header of the signals after the change to the alert profile, which then allows the monitoring master node to learn of this alert profile usage and adapt how the master node monitors this particular ID node and reports about the ID node accordingly. As such, the master node monitoring the particular ID node in this embodiment is spared the need to burden the backend server.

In a further embodiment, however, the backend server may initiate a change of alert profile and, in some cases, may create a new alert profile for use by certain ID nodes. For example, backend server 3400 may create the new alert profile as part of profile data 530 on server 3400 (as shown in FIG. 36). Server 3400 may then push or otherwise transmit the new alert profile to relevant managing nodes (such as master node 3410) that manage and monitor those particular ID nodes. Such managing nodes may then store the new alert profile (having new or updated management rule data) and a corresponding profile identifier in profile data 430 in memory onboard the master node. The managing node (e.g., master node 3410) may then provide the new alert profile and the corresponding profile identifier to the particular ID nodes as a type of updated node management rule to be used by the ID node. In this way, the ID node can be updated to autonomously or selectively operate in a new manner according to the new alert profile and in a way that can be efficiently recognized by the monitoring master node.

Method 3800 may also, in some embodiments, have the master node reset information collected based upon the first advertising signal and the second advertising signal after reporting the checkpoint event to the server by the master node for data reduction purposes on the master node. For example, as explained with reference to FIG. 37D, master node 3410 may help conserve onboard memory 415/420 by deleting from the event data 3500 the intervening actual observed RSSI values and the moving averages between the prior two checkpoint events. Deleting such data is a way of resetting the information collected (e.g., data on the observed values and timing related to certain of the detected advertising signals) by master node 3410. Doing so allows the master node 3410 to focus on maintaining the summarized information about the observed parameter of the detected successive advertising signals and reduce what is maintained for data reduction and simplification purposes.

Method 3800 may also, in further embodiments, have the master node receiving and reacting to server feedback related to reported event candidates. For example, another embodiment of method 3800 may also have the master node receiving an adjustment response from the server based upon the event candidate. In more detail, the adjustment response may comprise an adjusted profile for at least one of the master node and the first ID node or an adjusted profile for at least one of the other ID nodes. The adjustment response may also comprise, in some embodiments, updated context data reflecting the reported event candidate.

Another embodiment of method 3800 may extend to generating and comparing checkpoints as part of identifying the event candidate. In particular, method 3800 may also have the master node receive a third advertising signal broadcast by the first ID node after the first ID node broadcasts the second advertising signal, and then receive a fourth advertising signal broadcast by the first ID node after the first ID node broadcasts the third advertising signal. The master node may then generate a first checkpoint summary as a statistical representation of the first advertising signal and the second advertising signal (e.g., a mean, a median, an average, a moving average, or a weighted average). Similarly, the master node may generate a second checkpoint summary as a statistical representation of the third advertising signal and the fourth advertising signal. Based upon these two checkpoints that statistically summarize relevant advertising signals, the master node may identify the event candidate. In other words, the master node may identify the event candidate based upon a comparison of an observed parameter for each of the first checkpoint summary and the second checkpoint summary (such as a comparison of average observed signal strength for the first checkpoint summary and the second checkpoint summary).

Those skilled in the art will appreciate that method 3800 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 3800 as described above. Such code may be stored on a non-transitory computer-readable medium, such as memory storage 415 on master node 3410. Thus, when executing such code, the master node may be specially adapted to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 3800 and variations of that method.

Figure 39:
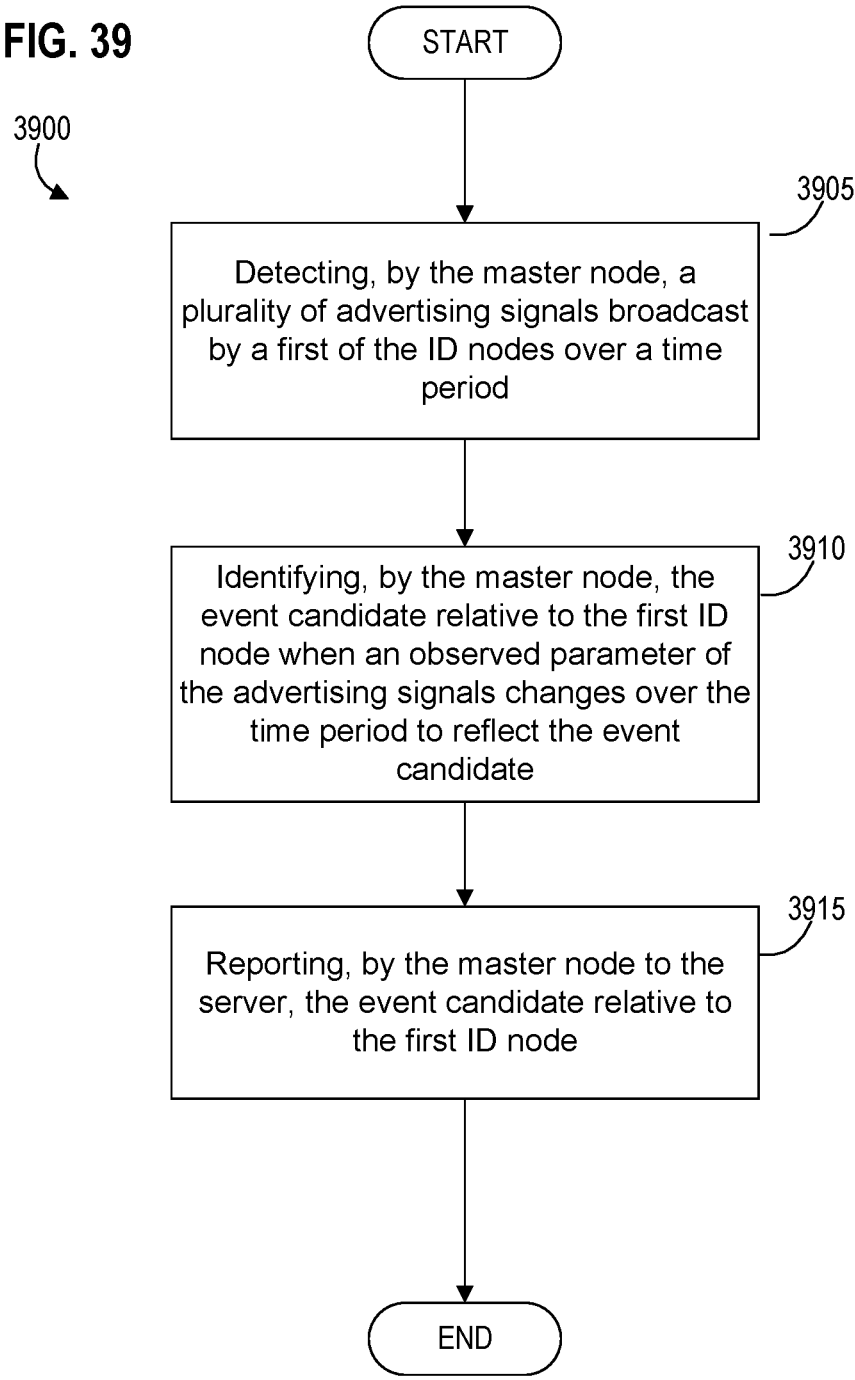
FIG. 39 is a flow diagram illustrating an exemplary method for monitoring for an event candidate within a wireless node network based upon receipt of a plurality of advertising signals broadcast by an ID node over time in accordance with an embodiment of the invention.

FIG. 39 is a flow diagram illustrating another exemplary method for monitoring for an event candidate within a wireless node network based upon detection or receipt of a plurality of advertising signals broadcast by an ID node over time in accordance with an embodiment of the invention. In this method embodiment, the wireless node network comprises network components at three different levels of the network including at least a plurality of ID nodes, a master node in communication with the ID nodes, and a server in communication with the master node. Referring now to FIG. 39, method 3900 begins at step 3905 with the master node detecting a plurality of advertising signals broadcast by a first of the ID nodes over a time period. In more detail, the plurality of advertising signals may be successively detected advertising packet signals that were broadcast over the time period by the first ID node.

At step 3910, method 3900 proceeds with the master node identifying the event candidate relative to the first ID node when an observed parameter of the advertising signals changes over the time period to reflect the event candidate. As with method 3800, various further embodiments of method 3900 may implement step 3910 with an increased level of detail, as discussed further below. At step 3915, method 3900 concludes with the master node reporting the event candidate to the server. In more detail, an embodiment may have the master node reducing data obtained by the master node about the first ID node (e.g., through observed parameters of detected advertising signals broadcast by the first ID node) by sending the event candidate to the server as summary information reflecting an observed change between advertising signals.

As noted above, further embodiments of method 3900 may have the master node identifying the event candidate with more details steps. For example, in one further embodiment, identifying the event candidate at step 3910 may have the master node identifying the event candidate based on an observed parameter that comprises a summarized observed pattern between the advertising signals. For example, the observed parameter may comprise an observed signal strength value (such as a received RSSI value) as detected by the master node. In such an embodiment, reporting the event candidate to the server may avoid the need to update the server with too much information about the signal strength value of each of the advertising signals received by the master node from the first ID node.

In other embodiments of method 3900, identifying the event candidate may involve a moving average of what may be observed by the master node. In more detail, identifying the event candidate at step 3910 may have the master node comparing the observed parameter of a most recently detected one of the advertising signals to a moving average of the observed parameter of the previously detected ones of the advertising signals to identify the event candidate.

As with method 3800, further embodiments of method 3900 use a more specific type of observed parameter in step 3910 when identifying the event candidate. In one embodiment where the observed parameter comprises a received signal strength indicator (RSSI) reflecting a signal strength as detected by the master node, step 3910 of method 3900 may have the master node comparing a received signal strength indicator value of a most recently detected one of the advertising signals to a moving average of the received signal strength indicator values of the prior advertising signals within a prior moving window to identify the event candidate.

In another embodiment of method 3900, the observed parameter may involve detecting a shift in what is observed by the master node as the received signal strength value of the advertising ID node signals. In other words, the observed parameter in one embodiment may comprise a shift in signal strength as detected by the master node. As such, the step of identifying the event candidate may have the master node identifying the event candidate as a shift event when the detected shift in the signal strength value for each of the advertising signals exceeds a threshold value.

In a more detailed embodiment where the observed parameter comprises an observed shift in the signal strength value as received by the master node, the master node may implement steps 3910 and 3915 by detecting a beginning shift in received signal strength value when the observed shift in the signal strength value between the plurality of advertising signals is at least an initiating threshold value; having the master node receive at least one subsequent advertising signal broadcast by the first ID node after the first ID node broadcasts the plurality of advertising signals; detecting a continued shift in received signal strength value when the observed shift in the signal strength value between a last of the received plurality of advertising signals compared to the received subsequent advertising signal; and having the master node reporting the event candidate to the server as a shift event only after detecting the beginning shift and if the detected continued shift is less than a continued event threshold value.

Additional embodiments may identify the event candidate as other types of events. For example, in one embodiment of method 3900, the master node may identify the event candidate as an online event in step 3910 when the master node has received at least a threshold number of the advertising signals from the first ID node within a threshold time gap between successive ones of the advertising signals. In another embodiment, the master node may identify the event candidate as an offline event in step 3910 when (a) an elapsed time since the master node received a last of the advertising signals is greater than a threshold time gap and (b) the master node previously identified an online event related to at least a portion of the advertising signals from the first ID node. In a further embodiment, the master node may identify the event candidate as a sporadic event in step 3910 when the master node has received at least a first of the advertising signals but not a threshold number of successive ones of the advertising signals within a defined period of time from when the master node receives the first advertising signal. In still another embodiment, the master node may identify the event candidate as a checkpoint event in step 3910 when the time period ends and the master node detects at least one additional advertising signals broadcast by the first ID node.

Method 3900 may also identify event candidates based on changes in the observed parameter of the detected signals when the observed parameter is a type of data in the detected signals. For example, in a further embodiment of method 3900, the observed parameter may comprise an observed profile setting associated with a node. As such, the step of identifying the event candidate in step 3910 may further involve identifying the event candidate as a profile change event when the observed profile setting of the advertising signals changes from a first setting to a second setting over the time period. Such an observed profile setting may relate to operation of the first ID node and/or the operation of the master node. In another example, the step of identifying the event candidate in step 3910 may further involve identifying the event candidate as a transmission power change event when the observed parameter comprises an observed output power setting for the first ID node. In still another example, the step of identifying the event candidate in step 3910 may further involve identifying the event candidate as an environmental change event when the observed parameter comprises sensor data gathered by a sensor on the first ID node.

Further embodiments of method 3900 may include more steps that may change how quickly the master node reports event candidates to the server. For example, method 3900 may further have the master node detecting an alert flag from the first ID node, where the alert flag is part of at least one of the plurality of advertising signals. Once the master node detects the alert flag from at least one of the advertising signals (e.g., from header information in one or more of the advertising signals), the master node may reduce the time period after which the master node identifies and reports the event candidate to the server.

Another embodiment of method 3900 may implement the alert flag as a profile identifier corresponding to one of many different types of operational profiles (such as alert profiles) used with different ID nodes as explained above. In more detail, the profile identifier indicates a particular alert profile being used by the first ID node. Such an alert profile may be one of a plurality of operational profiles that govern advertising signal broadcasting operations by the first ID node.

In a further embodiment, however, the backend server may initiate a change of alert profile and, in some cases, may create a new alert profile for use by certain ID nodes. For example, backend server 3400 may create the new alert profile as part of profile data 530 on server 3400 (as shown in FIG. 36). Server 3400 may then push or otherwise transmit the new alert profile to relevant managing nodes (such as master node 3410) that manage and monitor those particular ID nodes. Thus, an extension of method 3900 may have the master node receiving a new alert profile and storing the new alert profile (having new or updated management rule data) and a corresponding profile identifier in profile data 430 in memory onboard the master node. The master node may then provide the new alert profile and the corresponding profile identifier to the first ID node, for example, as a type of updated node management rule to be used by the first ID node. In this way, the ID node can be updated to autonomously or selectively operate in a new manner according to the new alert profile and in a way that can be efficiently recognized by the monitoring master node.

An additional embodiment of method 3900 may also have the master node resetting information collected by the master node based upon the advertising signals after reporting the checkpoint event as the event candidate to the server to conserve use of memory on the master node. This is a way to simplify the data feed between the master node and server as it relates to monitoring for event candidates and the server stay abreast of the status of nodes within the network.

Method 3900 may also, in further embodiments, have the master node receiving and reacting to server feedback related to reported event candidates. For example, another embodiment of method 3900 may also have the master node receiving an adjustment response from the server based upon the event candidate, where the adjustment response may comprise an adjusted profile for at least one of the master node and the first ID node. In a further embodiment, the adjustment response may comprise an adjusted profile for at least one of the other ID nodes and may comprise updated context data reflecting the reported event candidate.

Another embodiment of method 3900 may extend to generating and comparing checkpoints as part of identifying the event candidate. In particular, method 3900 may have the master node detecting a first set of advertising signals broadcast by the first ID node and a second set of advertising signals broadcast by the first ID node after the first set of advertising signals, where the first set of advertising signals and the second set of advertising signals are part of the plurality of advertising signals detected in step 3905. This further embodiment of method 3900 proceeds by having the master node generating a first checkpoint summary as a statistical representation of the first set of advertising signals and, similarly, generating a second checkpoint summary as a statistical representation of the second set of advertising signals. Based upon these two checkpoints that statistically summarize relevant sets or groups of successive advertising signals, the master node may identify the event candidate. In other words, the master node may identify the event candidate based upon a comparison of an observed parameter for each of the first checkpoint summary and the second checkpoint summary (such as a comparison of average observed signal strength for the first checkpoint summary and the second checkpoint summary).

Those skilled in the art will appreciate that method 3900 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 3900 as described above. Such code may be stored on a non-transitory computer-readable medium, such as memory storage 415 on master node 3410. Thus, when executing such code, the master node may be specially adapted to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 3900 and variations of that method.

Figure 40:
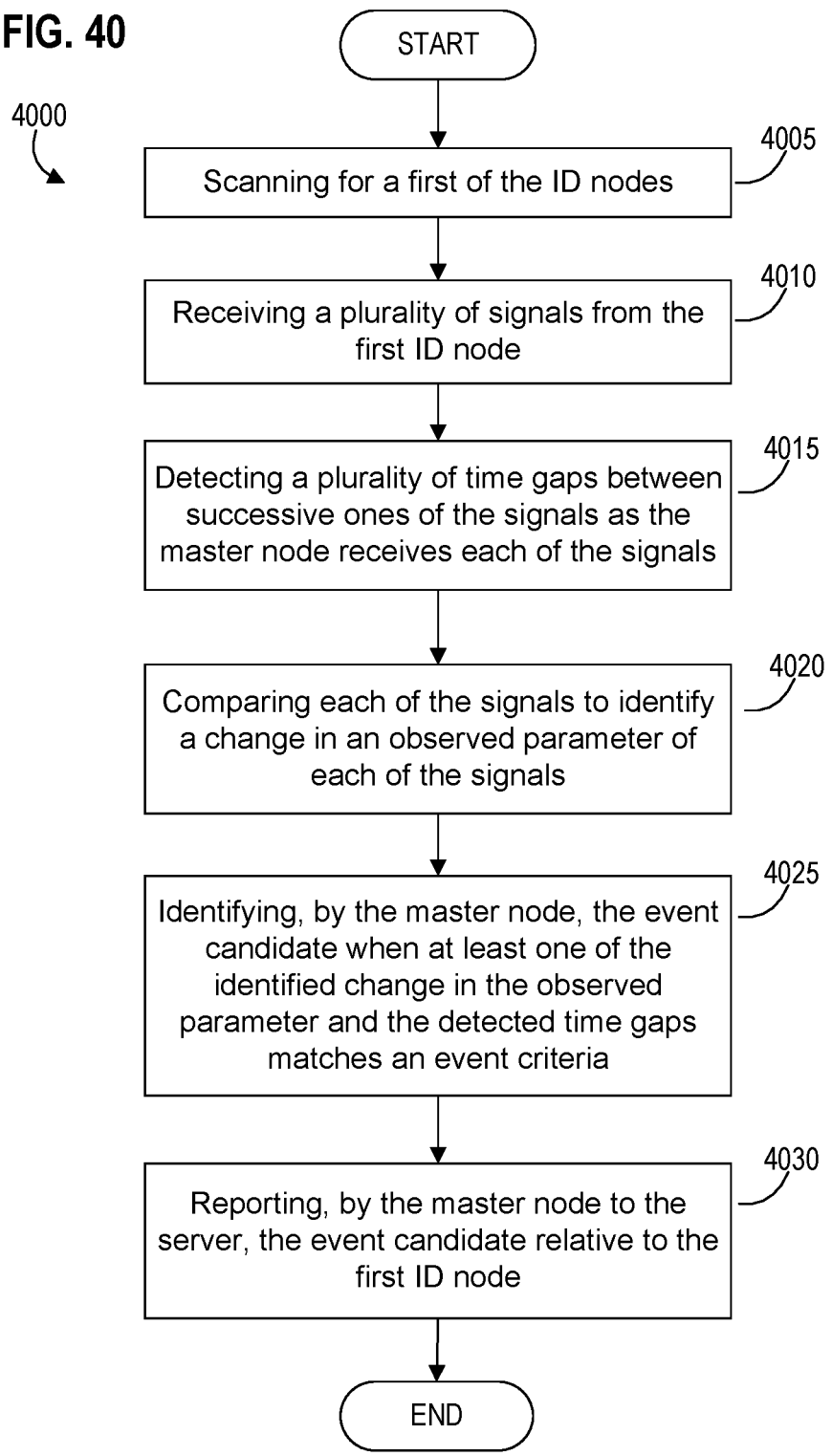
FIG. 40 is a flow diagram illustrating an exemplary method for enhanced monitoring for an event candidate within a wireless node network based upon receipt of a plurality of signals from an ID node and detecting a plurality of time gaps between suggestive ones of the signals in accordance with an embodiment of the invention.

FIG. 40 is a flow diagram illustrating an exemplary method for enhanced monitoring for an event candidate within a wireless node network based upon receipt of a plurality of signals from an ID node and detecting a plurality of time gaps between suggestive ones of the signals in accordance with an embodiment of the invention. In this method embodiment, the wireless node network comprises at least a plurality of ID nodes, a master node in communication with the ID nodes, and a server in communication with the master node. Referring now to FIG. 40, method 4000 begins at step 4005 with the master node scanning for a first of the ID nodes. For example, an embodiment may have master node 3410 using a Bluetooth® radio transceiver as part of short range communication interface 480 in a scanning mode to listen for Bluetooth® formatted advertising packet signals being broadcast by nearby ID nodes. Method 4000 has the master node receiving a plurality of signals from the first ID node as part of step 4010 and detecting a plurality of time gaps between successive ones of the signals as the master node receives each of the signals as part of step 4015.

The observed signal levels of the detected signals and the detected time gaps are exemplary types of observed parameters used by method 4000 when identifying an event candidate. In particular, at step 4020, method 4000 proceeds with the master node comparing each of the signals to identify a change in an observed parameter of each of the signals. In more detail, the identified change in the observed parameter of the signals may comprise a detected shift between the signals based upon the observed parameter over time. For example, such a shift may be when the observed parameter is an observed signal strength value as detected by the master node and the observed signal strength value over time indicates a meaningful shift (such as when the detected shift exceeds a threshold difference in observed signal strength value as shown in the example of FIG. 37H).

In still more detail, when a further embodiments has the observed parameter be a received signal strength indicator (RSSI) reflecting a signal strength as detected by the master node; and the comparing step of step 4020 may comprise comparing a received signal strength indicator value of a most recently received one of the signals to a moving average of the received signal strength indicator values of a rolling window of the previously received ones of the signals to identify the event candidate.

At step 4025, method 4000 proceeds with the master node identifying the event candidate when at least one of the identified change in the observed parameter and the detected time gaps matches event criteria associated with a particular type of node status or event to be reported to the server. In a further embodiment of step 4025, the identified event candidate may be considered a shift event when the event criteria comprises a condition met when (a) the master node identifies the change in the observed parameter of the signals over time as reflecting a shift in the observed signal strength value for the signals over time and (b) the shift exceeds a threshold value. In another embodiment where the observed parameter may be an observed shift in the signal strength value as received by the master node, the master node may identify the event candidate and may report the event candidate to the server by detecting a beginning shift in received signal strength value when the observed shift in the signal strength value between the received plurality of signals is at least an initiating threshold value; receiving at least one subsequent signal broadcast by the first ID node after the first ID node broadcasts the received plurality of signals; detecting a continued shift in received signal strength value when the observed shift in the signal strength value between a last of the received plurality of signals compared to the received subsequent signal; and having the master node report the event candidate to the server as a shift event only after detecting the beginning shift and if the detected continued shift is less than a continued event threshold value.

In another embodiment of step 4025, the event candidate may be considered an online event when the event criteria comprises a condition met when (a) the master node has received at least a threshold number of successive ones of the signals from the first node and (b) the detected time gaps between the successive ones of the signals do not exceed a threshold time gap.

In an additional embodiment of step 4025, the event candidate may be considered an offline event when the event criteria comprises a condition met when (a) an elapsed time since the master node received a last of the signals is greater than a threshold time gap and (b) the master node previously identified an online event related to the rest of the signals received by the master node from the first ID node.

In a further embodiment of step 4025, the event candidate may be considered a sporadic event when the event criteria comprises a condition met when the master node has received at least a first of the signals but not a threshold number of successive ones of the signals within a defined period of time from when the master node detects the first signal.

In still another embodiment of step 4025, the event candidate may be considered a checkpoint event when the event criteria comprises a condition met when a periodic reporting interval ends and the master node detects at least one additional signal broadcast by the first ID node.

Finally, at step 4030, method 4000 proceeds with the master node reporting the event candidate to the server. In more detail, the reporting in step 4030 may comprise reducing, by the master node, data obtained by the master node about the first ID node from the plurality of signals by sending the event candidate to the server as only summary information reflecting the change in the parameter of the signals over time (rather than all information gathered by the master node relative to the signals received over time). In other words, reporting the event candidate to the server may help avoid the need to update the server with information about the signal strength value of each of the signals received by the master node from the first ID node.

In further embodiments, method 4000 may also identify further types of event candidates related to a profile change event, a transmission power change event, or an environmental change event. In particular, method 4000 may also comprise identifying a profile change event when the master node detects a changed profile setting of the signals over time, and having the master node report the profile change event to the server. Likewise, method 4000 may have the master node identifying a transmission power change event when the master node detects a changed transmission power setting of the signals over time, and then reporting the transmission power change event relative to the server. Method 4000 may also have the master node identifying an environmental change event when the master node detects a change in sensor data gathered from the first ID node via the signals over time, and then reporting the environmental change event to the server.

A further embodiment of method 4000 may also change the interval of reporting event candidates to the server to, for example, keep the server more abreast of relevant node events observed by the master node. In more detail, an embodiment of method 4000 may have the master node detecting an alert flag reflecting a status of the first ID node (where the alert flag is part of at least one of the received plurality of signals) and then reducing the periodic reporting interval after detecting the alert flag. The periodic reporting interval may, for example, comprise a time period adjustable by the master node or a number of signal receptions adjustable by the master node or a combination of both adjustable aspects that impact and adaptively change the periodic reporting interval under the alert flag conditions.

Another embodiment of method 4000 may implement an alert flag as a profile identifier corresponding to one of many different types of operational profiles (such as alert profiles) used with different ID nodes as explained above. In more detail, such a profile identifier may indicate an alert profile being used by the first ID node. Such an alert profile may be one of a plurality of operational profiles that govern advertising signal broadcasting operations by the first ID node.

In another embodiment, method 4000 may also comprise the step of resetting information collected by the master node based upon the signals after reporting a checkpoint event as the event candidate to the server to conserve use of memory on the master node. In such an embodiment (similar to that shown in FIGS. 37E and 37F), some of the data collected by master node 3410 prior to a checkpoint event may be reset so that the memory space can be reused (i.e., is no longer filled with information to be retained).

In still another embodiment, method 4000 may have the master node receiving feedback from the server based upon the reported event candidate and generating an appropriate master node response. In more detail, method 4000 may further comprise the step of receiving an adjustment response from the server based upon the event candidate. Such an adjustment response may comprise an adjusted profile for at least one of the master node and the first ID node, or an adjusted profile for at least one of the other ID nodes, or a combination of such adjusted profiles. Such an adjustment response, in another example, may comprise updated context data reflecting the reported event candidate where the server has "learned" more about the contextual environment of the nodes based on the reported event candidate and provides the updated context data so that the master node can enhanced and improve management of itself and/or the ID nodes within its control with the updated context data.

Another embodiment of method 4000 may extend to generating and comparing checkpoints (based on the advertising signals) as part of identifying the event candidate. In particular, method 4000 may also have the master node receiving a first set of advertising signals broadcast by the first ID node and a second set of advertising signals broadcast by the first ID node after the first set of advertising signals, where the first set of advertising signals and the second set of advertising signals are part of the plurality of signals received by the master node from the first ID node. Method 4000 may then have the master node generate a first checkpoint summary as a statistical representation of the first set of advertising signals, and similarly generate a second checkpoint summary as a statistical representation of the second set of advertising signals. As such, the comparing step 4020 may be modified to comprise comparing an observed parameter for each of the first checkpoint summary and the second checkpoint summary to identify the change.

Those skilled in the art will appreciate that method 4000 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 4000 as described above. Such code may be stored on a non-transitory computer-readable medium, such as memory storage 415 on master node 3410. Thus, when executing such code, the master node may be specially adapted to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 4000 and variations of that method.

A further embodiment of an exemplary master node apparatus for enhanced monitoring for an event candidate within a wireless node network having a plurality of ID nodes and a server is described below that operates similar to that described above with reference to FIG. 40 and the embodiments of method 4000. In this embodiment, the master node apparatus generally comprises a node processing unit and a memory storage coupled to and used by the node processing unit (e.g., a node volatile memory 420 and a node memory storage 415). The memory storage maintains at least an embodiment of event detection engine code (such as event detection engine code 3415). The node processing unit is also coupled to and used with the first communication interface and the second communication interface. In particular, the first communication interface (e.g., short range communication interface 480 on exemplary master node 3410) is operative to communicate with at least a first of the ID nodes over a first communication path. In contrast, the second communication interface (e.g., medium/long range communication interface 485 on exemplary master node 3410) is operative to communicate with the server over a second communication path. In some embodiments, the first and second communication paths may be the same but in other embodiments the first and second communication paths may be distinct.

The node processing unit (e.g., processing unit 400 of master node 3410), when executing the event detection engine code maintained on the memory storage, is operative to perform specific functions or steps that adapt the master node apparatus via specialized and novel functionality. In particular, the node processing unit, as adapted by such code, is operative to detect, via the first communication interface, a first advertising signal broadcast by the first ID node over the first communication path; detect, via the first communication interface, a second advertising signal broadcast by the first ID node over the first communication path after the first ID node broadcasts the first advertising signal; compare an observed parameter of each of the first advertising signal and the second advertising signal; identify the event candidate based upon the comparison of the observed parameter of each of the first advertising signal and the second advertising signal; and cause the second communication interface to report the identified event candidate to the server over the second communication path.

In a further embodiment of this master node apparatus, the second communication interface may transmit a message to the server when reporting the identified event candidate where the message reflects the identified event candidate as reduced monitoring overhead for the first ID node on the second communication path. More specifically, the message reflecting the identified event candidate may include summary information reflecting an observed change between the first advertising signal and the second advertising signal, in contrast to all observations made by the master node apparatus. In more detail, where the observed parameter may be a signal strength value as detected by the node processing unit via the first communication interface, the observed change may be a shift in observed signal strength value between at least a first signal strength value of the first advertising signal and a second signal strength value of the second advertising signal. As such, the observed change may reflect summarized information related to the first ID node as the event candidate.

A further embodiment of this master node apparatus may have the node processing unit being operative to compare the observed parameter of the second advertising signal to an average of the observed parameters of a set of prior advertising signals from the first ID node including the first advertising signal. Stated another way, in an embodiment where the observed parameter comprises a received signal strength indicator as detected by the node processing unit, the node processing unit may compare the observed parameter of each of the first advertising signal and the second advertising signal by being further operative to compare a received signal strength indicator value of the second advertising signal to an average of a set of received signal strength indicator values of prior advertising signals from the first ID node including the first advertising signal. In still another embodiment, the averaged set of received signal strength indicator values of advertising signals from the first ID node broadcast prior to the second advertising signal may be implemented as a moving average of the set of received signal strength indicator values of advertising signals from the first ID node broadcast within a window prior to the second advertising signal.

In another embodiment of this master node apparatus, the node processing unit may be operative to identify the event candidate by being further operative to detect a shift in received signal strength value when comparing the signal strength value of first advertising signal and the signal strength value of the second advertising signal, and then identify the event candidate as a shift event when the detected shift in received signal strength value is at least a threshold value. A further detailed embodiment may have the observed parameter being an observed shift in the signal strength value as detected by the node processing unit. As such, the node processing unit may be operative to identify the event candidate and cause the second communication interface to report the event candidate to the server by being further operative to (a) detect a beginning shift in received signal strength value when the observed shift in the signal strength value between the plurality of advertising signals is at least an initiating threshold value; (b) detect, via the first communication interface, at least one subsequent advertising signal broadcast by the first ID node after the first ID node broadcasts the second advertising signal; (c) detect, via the first communication interface, a continued shift in received signal strength value when the observed shift in the signal strength value between the second advertising signal compared to the received subsequent advertising signal; and (d) cause the second communication interface to report the event candidate to the server as a shift event only after detecting the beginning shift and if the detected continued shift is less than a continued event threshold value.

In still other embodiments, the observed parameter may comprise a time between successive advertising signals broadcast from the first ID node and as detected by the node processing unit via the first communication interface. As such, the node processing unit may be operative to identify the event candidate by being further operative to detect a time gap between the first advertising signal and the second advertising signal and identify the event candidate when the detected time gap is less than a threshold time gap.

Various further embodiments of this master node apparatus may be described with more details on identifying the event candidate as a particular type of node event. For example, in one embodiment, the node processing unit may be operative to identify the event candidate as an online event when the detected time gap is less than the threshold time gap and the first communication interface detects at least one additional advertising signal broadcast by the first ID node within the threshold time gap after the second advertising signal. In more detail, the node processing unit may be operative to identify the event candidate as the online event when (a) the detected time gap between the first advertising signal and the second advertising signal is less than the threshold time gap and (b) the first communication interface has detected at least a threshold number of advertising signals from the first ID node each of which are detected by the first communication interface within the threshold time gap from each other, where detection of the first advertising signal and detection of the second advertising signal are included in the threshold number of advertising signals from the first ID node.

In another embodiment, the node processing unit may be operative to identify the event candidate as an offline event when (a) the detected time since the first communication interface detected the second advertising signal is greater than a threshold time gap and (b) the node processing unit previously identified an online event related to signals from the first ID node including the first advertising signal and the second advertising signal.

In still a different embodiment, the node processing unit may be operative to identify the event candidate as a sporadic event when the first communication interface detects at least the first advertising signal and the second advertising signal but does not detect at least a threshold number of advertising signals from the first ID node within a defined period of time from when the first communication interface detects the first advertising signal.

In yet another embodiment, the node processing unit may be operative to identify the event candidate as a checkpoint event when a periodic reporting interval ends and based upon the comparison of the observed parameter of the first advertising signal and the second advertising signal.

When the observed parameter comprises an observed profile setting, the node processing unit may operative to identify the event candidate as a profile change event when the comparison indicates the observed profile setting of the second advertising signal is different than the observed profile setting of the first advertising signal. In a similar manner, when the observed parameter comprises an observed output power setting for the first ID node, the node processing unit may be operative to identify the event candidate as a transmission power change event when the comparison by the node processing unit indicates the observed output power setting related to the second advertising signal is different than the observed output power setting related to the first advertising signal. And finally, when the observed parameter comprises sensor data gathered by a sensor on the first ID node, the node processing unit may be operative to identify the event candidate as an environmental change event when the comparison by the node processing unit indicates a second sensor data value included as part of the second advertising signal differs more than a threshold amount when compared to a first sensor data value included as part of the first advertising signal.

An embodiment of this master node apparatus may allow for adaptive changing the interval of reporting an event candidate to the server in order to respond, for example, to an alert situation. For instance, the node processing unit may be further operative to detect an alert flag from the first ID node and reduce the periodic reporting interval upon detecting the alert flag. The alert flag may be part of a header for at least one of the first advertising signal and the second advertising signal. And the periodic reporting interval may be a time period adjustable by the node processing unit or a number of signal receptions adjustable by the node processing unit.

A further embodiment of the master node apparatus may implement such an alert flag as a profile identifier corresponding to one of many different types of operational profiles (such as alert profiles) used with different ID nodes as previously explained. As such, the alert flag may comprise a profile identifier indicating an alert profile being used by the first ID node, where the alert profile is one of a plurality of operational profiles that governs advertising signal broadcasting operations by the first ID node.

The node processing unit may also be operative to delete certain of the gathered signal information (e.g., observed signal strength values and timing information collected from at least the first advertising signal and from the second advertising signal) stored on the memory storage after causing the second communication interface to report the checkpoint event to the server as part of reducing data that may be kept when monitoring for further event candidates.

As for responsive action that may be taken after reporting the event candidate, the node processing unit may be further operative to receive, via the second communication interface, an adjustment response from the server based upon the event candidate reported. The adjustment response may comprise an adjusted profile for at least one of the master node apparatus and the first ID node or an adjusted profile for at least one of the other ID nodes. In another embodiment, the adjustment response may include updated context data reflecting the reported event candidate, where such updated context data may be used by the node processing unit when managing the ID nodes.

Another embodiment of this master node apparatus may identify the event candidate from a checkpoint summary perspective of monitoring advertising signals. In particular, such an embodiment may have the node processing unit of the master node apparatus being operative to detect, via the first communication interface, a third advertising signal broadcast by the first ID node over the first communication path after the first ID node broadcasts the second advertising signal and then detect, via the first communication interface, a fourth advertising signal broadcast by the first ID node over the first communication path after the first ID node broadcasts the third advertising signal. The node processing unit may also be operative to generate a first checkpoint summary as a statistical representation of the first advertising signal and the second advertising signal, and also generate a second checkpoint summary as a statistical representation of the third advertising signal and the fourth advertising signal. The node processing unit may further be operative to compare the observed parameter for each of the first checkpoint summary and the second checkpoint summary, and then identify the event candidate based upon the comparison of the observed parameter for each of the first checkpoint summary and the second checkpoint summary.

As generally explained with reference to FIG. 34, still another embodiment may include a monitoring system that identifies an event candidate within a wireless node network. The monitoring system comprises at least a server, an ID node broadcasting advertising signals, and a master node disposed within the wireless node network. The master node in this exemplary monitoring system may be implemented with embodiments of the master node apparatus as set forth above.

Figure 41:
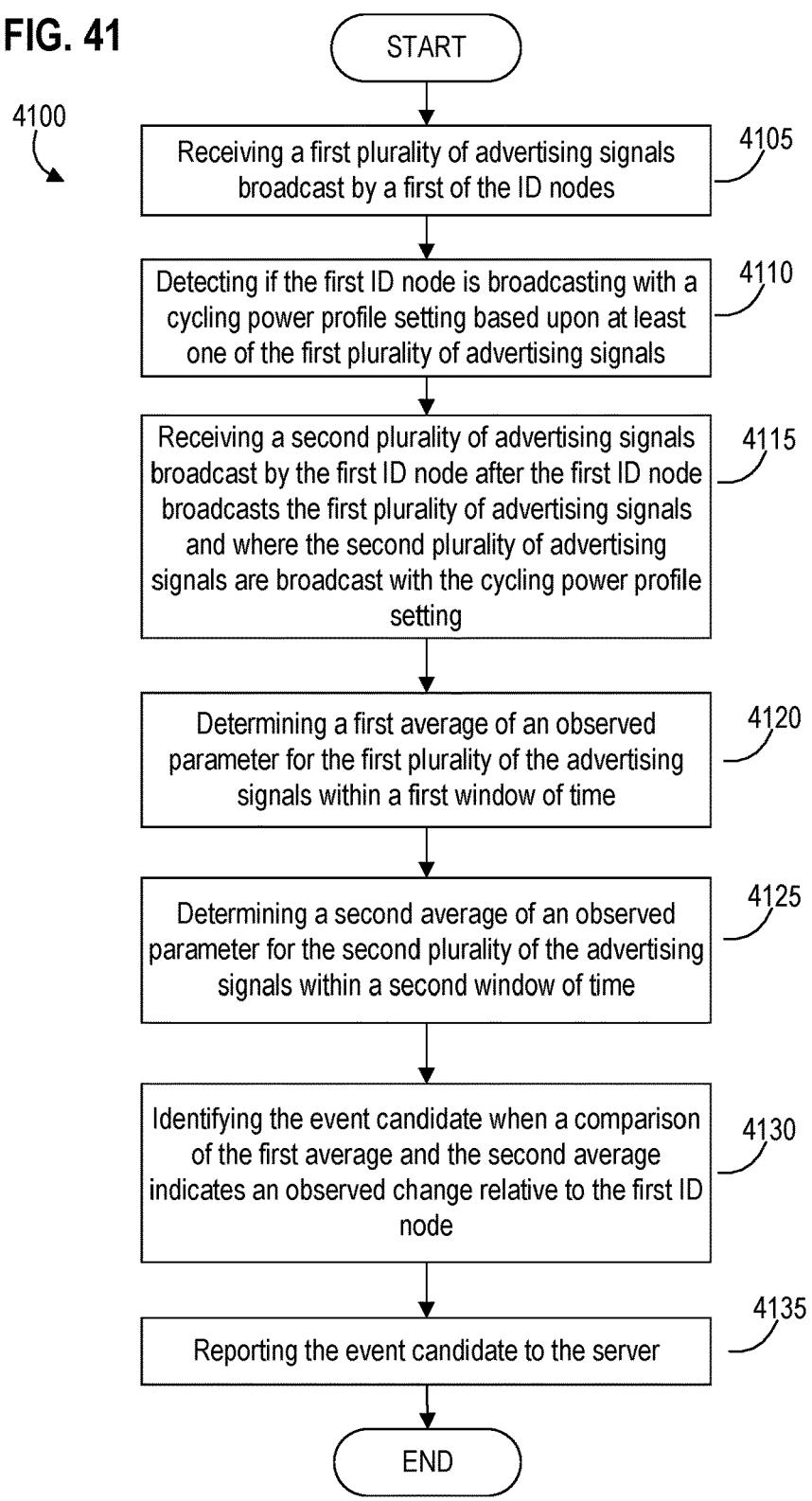
FIG. 41 is a flow diagram illustrating an exemplary method for enhanced monitoring for an event candidate within a wireless node network based upon receipt of a plurality of signals from an ID node and detecting if the ID node is broadcasting with a cycling broadcast RF power profile setting in accordance with an embodiment of the invention.

In some situations, an exemplary ID node may be operating under a profile that has it cycling power in accordance with rules defined in the profile. As such, a master node observing the cycling ID node may use an altered method for monitoring for an event candidate given the ID node is known or detected to be broadcasting with a cycling broadcast RF power profile setting. FIG. 41 is a flow diagram illustrating an exemplary method for enhanced monitoring for an event candidate within a wireless node network based upon receipt of a plurality of signals from an ID node and detecting if the ID node is broadcasting with a cycling broadcast RF power profile setting in accordance with an embodiment of the invention. Referring now to FIG. 41, method 4100 begins with the wireless node network having a plurality of ID nodes, a master node in communication with the ID nodes, and a server in communication with the master node. At step 4105, the master node receives a first plurality of advertising signals broadcast by a first of the ID nodes. Method 4100 then proceeds to step 4110 where the master node detects if the first ID node is broadcasting with a cycling broadcast RF power profile setting based upon at least one of the first plurality of advertising signals. For example, the master node may look to a particular part of a header of the advertising signal data packet being broadcast by the first ID node to find a power profile. The power profile may indicate that the first ID node is currently operating in a mode under a cycling broadcast RF power profile setting that periodically has the ID node changing its broadcast power. If so, monitoring for an event candidate by the master node may involve particular steps that may differ from monitoring for an event candidate with ID nodes not operating under a cycling broadcast RF power profile setting.

At step 4115, method 4100 proceeds with the master node receiving a second plurality of advertising signals broadcast by the first ID node after the first ID node broadcasts the first plurality of advertising signals. Such a second plurality of advertising signals is broadcast with the cycling broadcast RF power profile setting (e.g., cycling from a low-power level, to a mid-power level, to a high power level). The cycling broadcast RF power profile setting defines a cycle period over which the first ID node alters how it broadcasts at different power levels.

At step 4120, the master node determines a first average of an observed parameter for the first plurality of advertising signals within a first window of time commensurate with the cycle period and then, at step 4125, determines a second average of the observed parameter for the second plurality of advertising signals within a second window of time commensurate with the cycle period. Determining such averages for the raw observed parameters (e.g., an observed signal strength value or RSSI value) over such a cycle period advantageously allows for a more meaningful comparison in step 4130. In particular, step 4130 has the master node identifying the event candidate when a comparison of the first average and the second average indicates an observed change relative to the first ID node (such as when the second average observed signal strength is more than a threshold less than or more than the first average observed signal strength). Thereafter, step 4135 has the master node reporting the event candidate to the server.

Those skilled in the art will appreciate that method 4100 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 4100 as described above. Such code may be stored on a non-transitory computer-readable medium, such as memory storage 415 on master node 3410. Thus, when executing such code, the master node may be specially adapted to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 4100 and variations of that method.

More detailed embodiments that monitor for an event candidate may involve further enhancements related to use of benchmark checkpoints and specific types of event data generated that are provided as part of the reported event candidate to the server. A benchmark checkpoint event is generally a periodic point during an event horizon (should monitoring arrive upon at least an online event type of event candidate) that summarizes a number of observations of the master node (whether the raw observations or a statistical representation of the observations (like a moving average)) since a prior benchmark checkpoint event. For example, a moving average of observed parameters (e.g., RSSI values as shown in FIGS. 37A-M) for detected advertising signals may rely upon a number, n, of successive advertising signals that define a window for the moving average. As such, the window essentially has of sample width n points in time where advertising signals are detected and from which to compute the moving average. As time proceeds and further successive advertising signals are detected, the moving average window of width n essentially slides forward in time to then only cover the last n advertising signal observations. Thus, a first checkpoint event may be identified when the master node has received a sufficient number of successive advertising signals from an ID node to fill the moving average window. Such a first checkpoint event based on the first moving average calculated in an ID node's monitored event horizon may be considered a first benchmark checkpoint event, which may be later used as a point of reference for comparisons (such as when identifying whether a shift event has occurred). And as time proceeds and further successive advertising signals from the ID node are detected, the master node may periodically update the benchmark checkpoint event used for such comparisons. Further, the master node may also only periodically report new checkmark events to the server as new summary checkpoint events. In other words, the master node may rely on benchmark checkpoint events as a type of baseline, identify new checkpoint events used to compare to the current baseline benchmark checkpoint event, update the benchmark checkpoint event with the new checkpoint event, and then only periodically report new checkpoint events to the server as a new summary checkpoint event. In summary, further embodiments may use benchmark checkpoint events as part of enhanced processing and monitoring for event candidates that further improves and simplifies management of the wireless node network.

FIGS. 42A-42D are detailed flow diagrams illustrating parts of an exemplary method for enhanced monitoring for an event candidate within a wireless node network having a plurality of ID nodes, a master node in communication with the ID nodes, and a server in communication with the master node in accordance with an embodiment of the invention. In general, FIGS. 42A-42D describe exemplary steps performed by an exemplary master node when monitoring for an event candidate. As will be seen, such steps have the master node essentially scanning for advertising signals and, once detecting a first signal from one of the ID nodes, the master begins monitoring an event horizon related to that particular ID node in order to identify relevant node events and report the identified node events back to the server as event candidates having particular types of relevant event data. In general, such relevant event data for an event associated with an ID node may include timing information and observed signal strength information related to detected advertising signals, as well as information originally provided by the ID node to the master node (e.g., sensor data such as a current battery voltage and/or a temperature value associated with the first ID node, and payload data provided by the first ID node). Those skilled in the art will appreciate that while the exemplary embodiment explained in FIGS. 42A-42D may involve determining a moving average as a way to help avoid noise issues with advertising signal detections over time, other embodiments with similar steps may deploy other types of statistical representations of the detected advertising signals when monitoring for an event candidate.

Figure 42A:
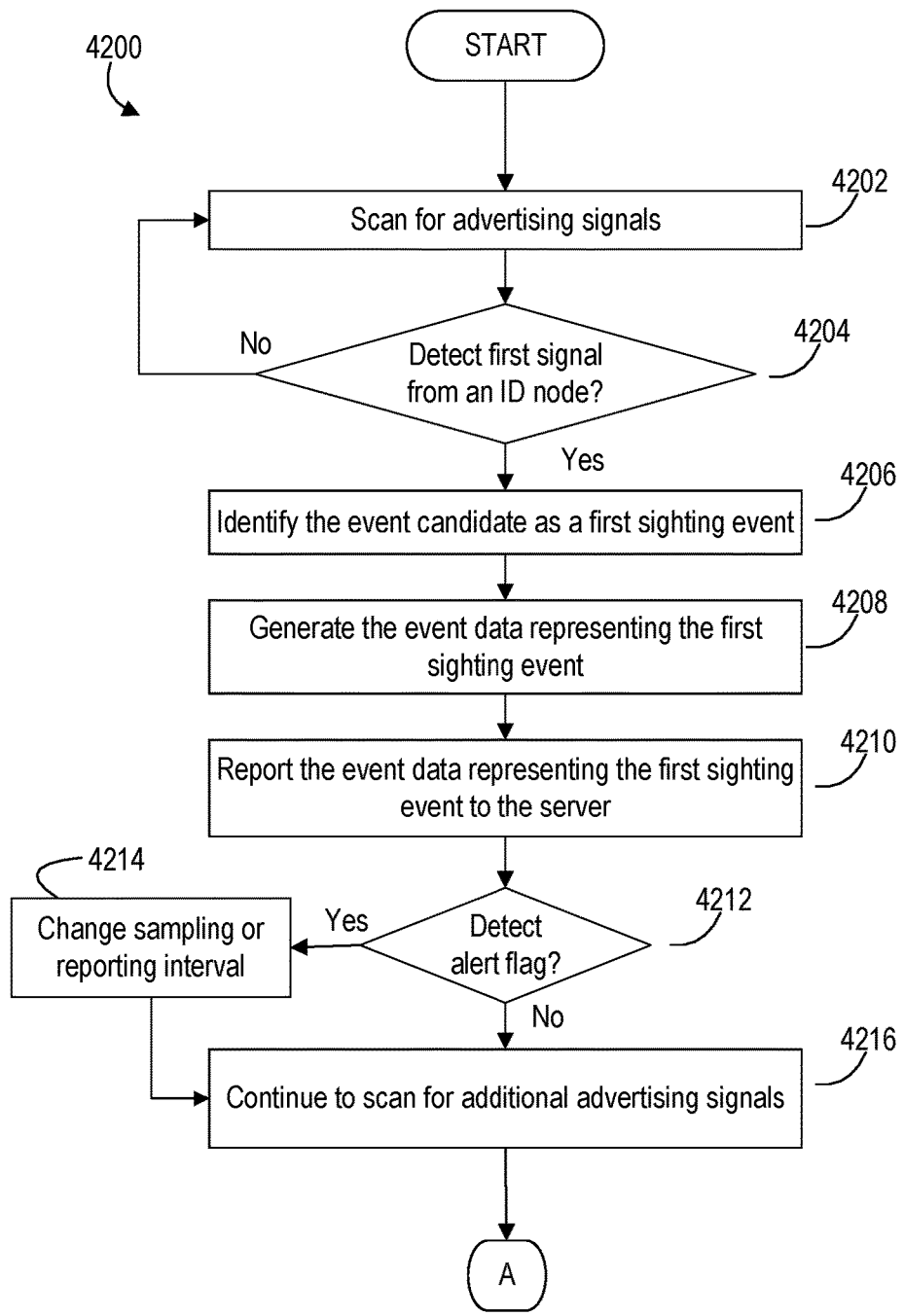

In more detail and referring now to FIG. 42A, method 4200 begins at step 4202 with the master node scanning for advertising signals broadcast from one or more of the ID nodes. If the master node detects a first signal broadcast by a first of the ID nodes at step 4204, method 4200 proceeds to step 4206. However, if the master node has not yet detected a signal, method 4200 proceeds back to step 4202 to remain scanning for advertising signals. At step 4206, the master node identifies the event candidate as a first sighting event related to the first ID node. In response at step 4208, the master node generates event data representing the first sighting event once the master node identifies the first sighting event. Basically, the event data generated in step 4208 represents the first sighting event and includes at least an identifier of the first ID node (e.g., a unique identifier related to the ID node, such as a media access control (MAC) address), and at least timing information and observed signal strength information characterizing the first sighting event. In more detail, such timing information and observed signal strength information characterizing the first sighting event may include a timestamp identifying when the master node detected the first signal and the observed signal strength value for the first signal (such as an observed or received RSSI value). At step 4210, the master node reports the event data representing the first sighting event to the server upon generating the event data representing the first sighting event.

At step 4212, the master node may detect an alert flag reflecting a status of the first ID node. For example, the alert flag may be part of the detected first advertising signal (e.g., a status in a portion of the signal's header) that indicates an alert stage for the ID node. In some embodiments, the alert flag in the advertising signal header may be implemented as a profile identifier that corresponds to one of several different operational profiles that may be used by the ID node.

If the alert flag is detected in step 4212, method 4200 may then proceed to step 4214. Otherwise, step 4212 proceeds directly to step 4216. At step 4214, the master node may change a sampling/reporting interval relative to this first ID node as a way to more frequently monitor and possibly update the server about this first ID node. For example, the master node may increase how frequently the master node updates the server with reported event candidates and the related event data on the first ID node if the master node detects the alert flag is set. In another example, the master node may decrease how many detected signals from the first ID node may be needed to qualify as a checkpoint event if the master node detects the alert flag is set. Thereafter, step 4214 proceeds to step 4216 where the method 4200 has the master node continuing to scan for additional advertising signals.

Figure 42B:
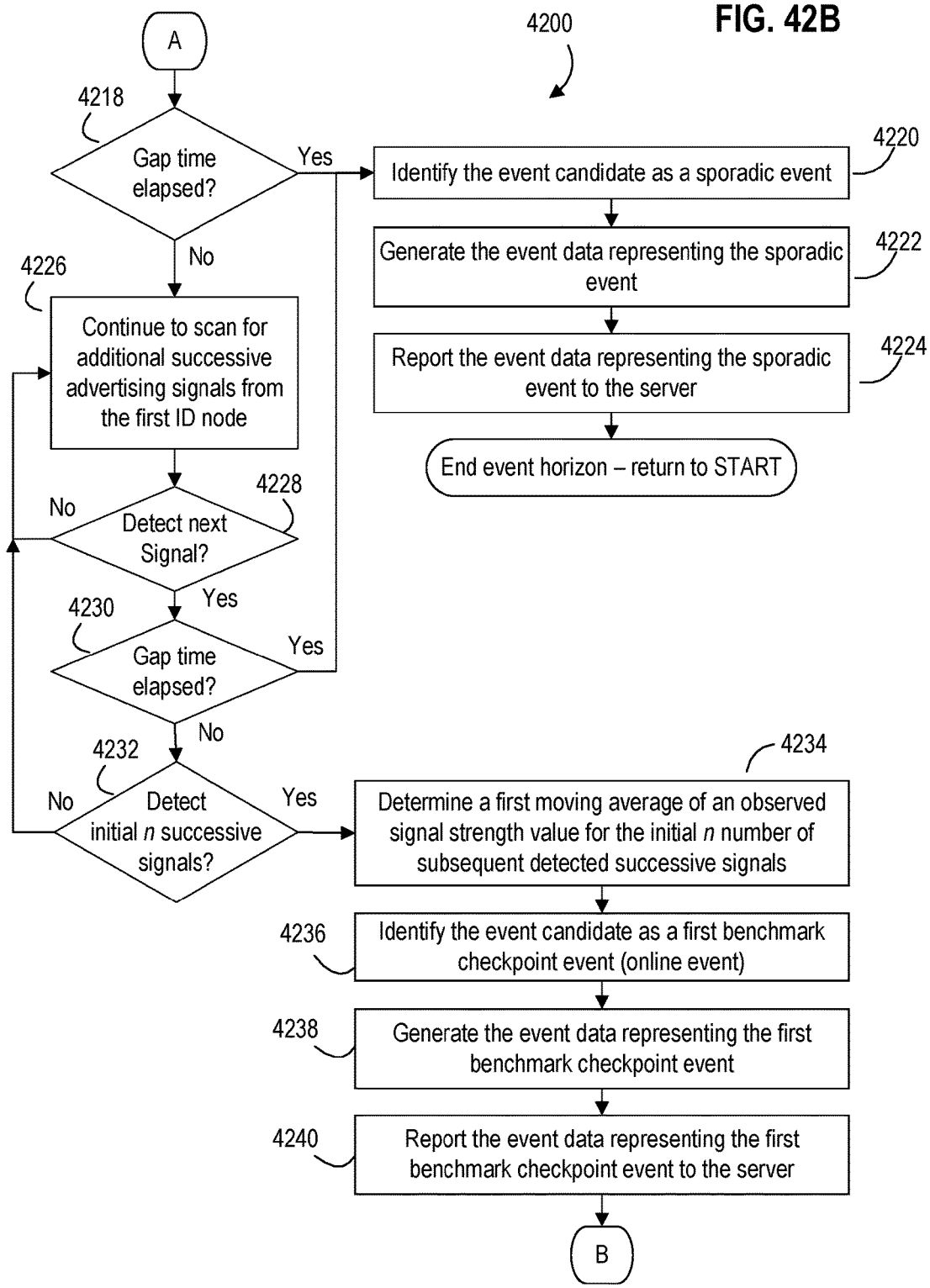

After step 4216 shown in FIG. 42A, method 4200 proceeds through transition (A) to FIG. 42B, where method 4200 continues at step 4218 where the master node determines if a gap time has elapsed before receiving the next successive advertising signal from the first ID node. If so, then step 4218 proceeds to step 4220 as the master node will have identified the event candidate as a sporadic event. In other words, the master node identifies the event candidate as a sporadic event when (1) the master node has not identified a first benchmark checkpoint event related to the first ID node and (2) the master node has not detected a subsequent signal broadcast by the first ID node within a gap time period from when the master node detected a most recent signal from the first ID node (e.g., the gap time has elapsed before a subsequent signal was detected if any subsequent signal is detected at all).

At step 4222, the master node generates the event data representing the sporadic event, such as at least timing information and observed signal strength information characterizing the sporadic event. In more detail, a further embodiment of method 4200 may have the timing information and observed signal strength information characterizing the sporadic event comprising one or more of a timestamp on when the master node identified the sporadic event, an average of observed signal strength value for any signals broadcast by the first ID node and detected by the master node from the first signal and before the gap time period elapsed, and a count of the signals broadcast by the first ID node and detected by the master node from the first signal and before the gap time period elapsed. Thereafter, at step 4224, the master node reports the event data representing the sporadic event to the server and then method 4200 proceeds back to the beginning of method 4200 where the master node begins to scan for advertising signals again.

However, if the master node at step 4218 determines that the gap time has not elapsed before receiving the next successive advertising signal from the first ID node, then step 4218 of method 4200 proceeds to step 4226 where the master node continues to scan for additional successive advertising signals from the first ID node. At step 4228, if the master node detects the next signal, method 4200 proceeds to step 4230 but otherwise goes back to step 4226 to continue scanning. At step 4230, the master node determines if the gap time has elapsed before receiving another successive advertising signal from the first ID node. If the gap time has elapsed, the master node proceeds to step 4220 related to identifying the event candidate as a sporadic event. However, if the master node determines the gap time has not elapsed at step 4230 due to receipt of another successive advertising signal from the first ID node, method 4200 proceeds to step 4232 where the master node further determines if it has detected/received an initial number of subsequent successive signals broadcast from the first ID node. If not, the master node is essentially still building up enough advertising signal detections for a moving average window, and step 4232 proceeds back to 4226 to continue scanning for more advertising signals from the first ID node. However, if the master node has detected the initial number of subsequent successive signals broadcast from the first ID node in step 4232, method 4200 proceeds to step 4234.

At step 4234, the master node determines a statistical representation of the initial number of subsequent successive signals (such as a first moving average of an observed signal strength value for the initial number of subsequent successive signals broadcast from the first ID node (including the first signal)) given that the elapsed time between each of the initial number of subsequent successive signals is less than the gap time (which would have otherwise identified a sporadic type of event). Instead being considered a sporadic type of event under this type of event criteria, method 4200 proceeds to step 4236 where the master node identifies the event candidate as a first benchmark checkpoint event based upon the first moving average of observed signal strength value determined in step 4234. The first benchmark checkpoint event represents a detected online state of the first ID node by the master node, also referred to as an "online event" type of event candidate indicating the first ID node is essentially "online" with the master node such that the master node is consistently receiving advertising signals from the first ID node and observing parameters related to those signals as part of monitoring for other event candidates during the event horizon related to the first ID node. At step 4238, method 4200 has the master node generating the event data representing the first benchmark checkpoint event once the master node identifies the first benchmark checkpoint event in step 4236. Such event data representing the first benchmark checkpoint event comprises at least timing information and observed signal strength information characterizing the first benchmark checkpoint event. In more detail, a further embodiment of method 4200 may have the timing information and observed signal strength information characterizing the first benchmark checkpoint event as an online event comprising one or more of a timestamp on when the master node identified the first benchmark checkpoint event, the moving average of observed signal strength value at the first benchmark checkpoint event, and a count of the signals broadcast by the first ID node and detected by the master node between the identified first sighting event and the identified first benchmark checkpoint event. Thereafter, method 4200 proceeds to step 4240 where the master node reports the event data representing the first benchmark checkpoint event to the server before proceeding through transition (B) to step 4242 shown in FIG. 42C.

Referring now to FIG. 42C, the master node is again scanning for successive advertising signals after identifying the first benchmark checkpoint event and reporting it to the server and determines if the gap time between the reception of the next successive advertising signals and the prior detected signal has elapsed at step 4242. If so, method 4200 may proceed to step 4244 where the master node identifies the event candidate as an offline event related to the first ID node because (1) the master node previously identified the first benchmark checkpoint event related to the first ID node at step 4236 and (2) the master node fails to detect a subsequent signal broadcast by the first ID node within the gap time period from when the master node detected a most recent of the subsequent successive signals from the first ID node as determined in step 4242. As such, method 4200 proceeds to step 4246 where the master node generates event data representing the offline event comprising at least timing information and observed signal strength information characterizing the offline event. In more detail, a further embodiment of method 4200 may have the timing information and observed signal strength information characterizing the offline event comprising one or more of a timestamp on when the master node identified the offline event, the moving average of observed signal strength value between a most recent benchmark checkpoint event and when the master node identified the offline event, and a count of the signals broadcast by the first ID node and detected by the master node between the most recent benchmark checkpoint event and when the master node identified the offline event. Thereafter, at step 4248, the master node reports the event data representing the offline event to the server and then method 4200 proceeds back to the beginning of method 4200 where the master node begins to scan for advertising signals again.

However, if method 4200 determines the gap time elapsed before receipt of another successive advertising signal at step 4242, method 4200 proceeds to step 4250 where the master node continues to scan for additional successive advertising signals from the first ID node. If the master node detects another advertising signal in step 4252 and the gap time has not elapsed, the method 4200 then moves to step 4256 where the master node determines a next moving average of observed parameters (such as observed RSSI values) that includes this newly detected signal. Those skilled in the art will appreciate for embodiments that may summarize the detected advertising signals using a statistical representation other than a moving average (such as a median or simply an average over a set number of detected signals), step 4256 may be optional given determining or generating such an alternative statistical representation may take place after receiving or detecting the next set of successive advertising signals (such as in step 4260).

However, if no new signal is detected in step 4252, method 4200 returns to scanning in step 4250. And if the gap time has elapsed, then step 4254 proceed to step 4244 so the master node can identify the event candidate as an offline event as described above.

Once the master node has determined the next moving average in step 4256, the master node determines whether it has detected a subsequent threshold number of advertising signals (and determined their respective moving averages) after most recent benchmark checkpoint event (e.g., the first benchmark checkpoint event from step 4236). If not, the master node in method 4200 needs to continue scanning for additional successive advertising signals back in step 4250. But if so, method 4200 proceeds to step 4260 where the master node identifies a new checkpoint event and then proceeds through transition (C) to step 4262 on FIG. 42D.

Figure 42D:
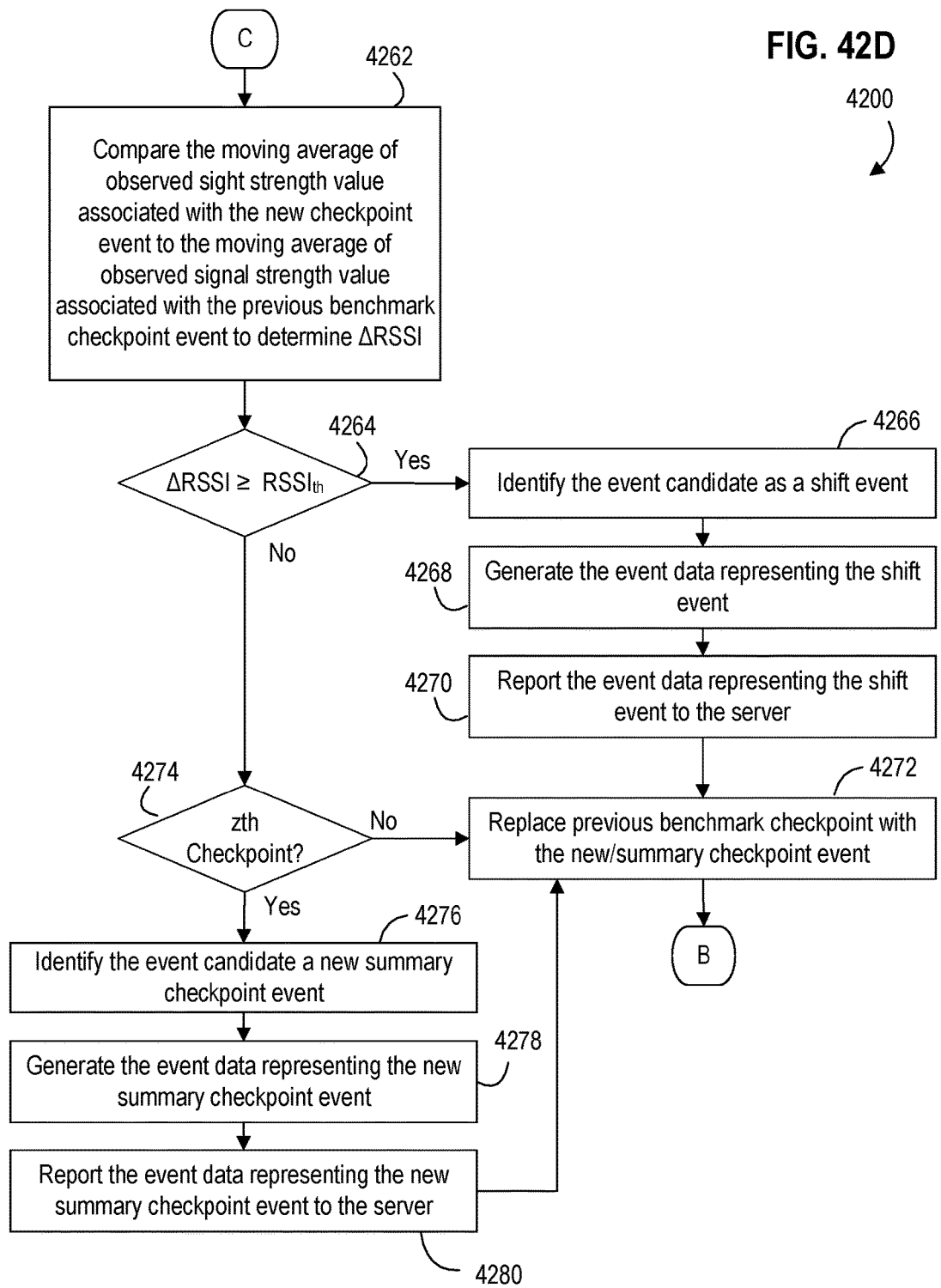

Referring now to FIG. 42D, the master node has now identified a new checkpoint event (and determined a new moving average of observed signal strength value for that point) and can perform additional analysis to see if it can identify a shift event. In more detail, method 4200 continues at step 4262 by comparing the moving average of the observed signal strength value associated with the new checkpoint event and the moving average of the observed signal strength value associated with a previous benchmark checkpoint event in order to determine a difference between these moving averages (i.e., $\Delta RSSI$). Again, those skilled in the art will appreciate that other embodiments of method 4200 may use a different type of statistical representation associated with the benchmark checkpoint comparison in step 4262 (such as comparing respective averages of the observed signal strength values of the detected advertising signals represented by the previous checkpoint event and the new checkpoint event).

From step 4262, method 4200 proceeds to step 4264 where the master node detects if a difference between the moving average of the observed signal strength value associated with the new checkpoint event and the moving average of the observed signal strength value associated with a previous benchmark checkpoint event at or above a threshold observed signal strength difference value (i.e., whether $\Delta RSSI \geq RSSI_{th}$). If so, step 4264 proceeds to step 4266. If not, step 4264 proceeds to step 4274.

At step 4266, the master node identifies the event candidate as a shift event related to the first ID node given the detected difference in step 4264 is at or above the threshold observed signal strength difference value (i.e., $RSSI_{th}$). Method 4200 then proceeds to step 4268 where the master node generates event data representing the shift event that comprises at least timing information and observed signal strength information characterizing the shift event. In more detail, a further embodiment of method 4200 may have the timing information and observed signal strength information characterizing the shift event comprising one or more of a timestamp on when the master node identified the shift event, the moving average of observed signal strength value between a most recent benchmark checkpoint event and when the master node identified the shift event, and a count of the signals broadcast by the first ID node and detected by the master node between the most recent benchmark checkpoint event and when the master node identified the shift event. Still further embodiments may have exemplary event data related to a shift event including slope information on whether the observed signal strength is increasing or decreasing, and in some examples a relative value of such a slope. Thereafter, the master node reports the event data representing the shift event to the server at step 4270. After step 4270, method proceeds to step 4272.

When step 4264 proceeds directly to step 4274 because the difference in the moving averages is not yet at or above the threshold observed signal strength difference value, step 4274 then has the master node determining whether, upon identifying the new checkpoint event, the master node as successfully identified a threshold number, z, of successive new checkpoint events since the last benchmark checkpoint event. If not, step 4274 proceeds directly to step 4272. However, if the master node has successfully identified a threshold number, z, of successive new checkpoint events since the last benchmark checkpoint event (including the most recent new checkpoint event identified in step 4260), the master node identifies the event candidate as a new summary checkpoint event in step 4276, generates event data representing the new summary checkpoint event (including at least timing information and observed signal strength information characterizing the new summary checkpoint event) in step 4278. In more detail, a further embodiment of method 4200 may have the timing information and observed signal strength information characterizing the new summary checkpoint event comprising one or more of a timestamp on when the master node identified the new summary checkpoint event, the moving average of observed signal strength value between a most recent benchmark checkpoint event and when the master node identified the new summary checkpoint event, and a count of the signals broadcast by the first ID node and detected by the master node between the most recent benchmark checkpoint event and when the master node identified the new summary checkpoint event. Thereafter, the master node reports the event data representing the new summary checkpoint event to the server in step 4280. After step 4280, method 4200 proceeds to step 4272.

At step 4272, method 4200 has the master node replace event data representing the previous benchmark checkpoint event with event data representing the new checkpoint event as identified in step 4260 or new summary checkpoint event as identified in step 4276. Thereafter, method 4200 proceeds back through transition (B) to step 4242 to continue scanning for further successive advertising signals.

In still another embodiment, method 4200 may proceed further and have the master node identifying the event candidate as a profile change event under particular conditions. In one example, the master node may identify the event candidate as a profile change event related to the first ID node when the master node observes an altered profile setting of the first ID node as reflected in the subsequent successive signals broadcast from the first ID node. Thereafter, the master node may generate event data representing the profile change event (comprising at least timing information and observed profile setting information characterizing the profile change event) and report the event data representing the profile change event to the server upon generating the event data representing the profile change event.

In another example, the master node may identify the event candidate as a profile change event related to the master node when the master node alters a profile setting of master node. Thereafter, the master node may generate event data representing the profile change event (comprising at least timing information and observed profile setting information characterizing the profile change event) and report the event data representing the profile change event to the server upon generating the event data representing the profile change event.

Those skilled in the art will appreciate that method 4200 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 4200 as described above. Such code may be stored on a non-transitory computer-readable medium, such as memory storage 415 on master node 3410. Thus, when executing such code, the master node may be specially adapted to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 4200 and variations of that method.

In still another embodiment, a further exemplary master node apparatus for enhanced monitoring for an event candidate within a wireless node network may be described as follows. The network may include a plurality of ID nodes at the low level of the network and a server at the top level of the network. The master node apparatus in this embodiment, which fits in as a middle level element of the network, comprises a node processing unit, a memory storage, a timer, a first communication interface, and a second communication interface (e.g., such as exemplary master node 3410 and the internal exemplary circuit components as shown and described with respect to FIGS. 4 and 35). Each of the memory storage, timer, and communication interfaces are respectively coupled to the node processing unit of the master node apparatus. The memory storage maintains at least an event detection engine code program module or application for execution by the node processing unit. The timer coupled to the node processing unit is operative to track an elapsed time after an initiating event (such as after detecting an advertising signal that is broadcast from one of the ID nodes). The first communication interface coupled to the node processing unit is operative to communicate with at least a first of the ID nodes over a first communication path (such as a signal path that supports low energy Bluetooth® signals). The second communication interface coupled to the node processing unit is operative to communicate with the server over a second communication path (such as a cellular, LAN, or Wi-Fi signal path). When executing the event detection engine code maintained on the memory storage, the node processing unit in the master node apparatus becomes specially adapted and, thus, operative to interact with other elements of the wireless node network while monitoring for an event candidate.

In particular, the node processing unit, as adapted under the executing code stored in the memory storage, is operative to detect, via the first communication interface, a first signal broadcast by a first of the ID nodes over the first communication path; identify the event candidate as a first sighting event related to the first ID node when the master node detects the first signal; generate event data representing the first sighting event after identifying the first sighting event, where the event data representing the first sighting event comprises an identifier of the first ID node and further comprises at least timing information and observed signal strength information characterizing the first sighting event; and cause the second communication interface to provide the event data representing the first sighting event to the server.

The node processing unit is further operative to monitor, via the first communication interface, for any in a series of successive signals broadcast by the first ID node within an event horizon for the first ID node after detecting the first signal; track, via coordination with the timer, the elapsed time between successive ones of the first signal and any in the series of successive signals broadcast by the first ID node; and track a received signal strength indicator value for the first signal and any in the series of successive signals broadcast by the first ID node. As such, the node processing unit is also operative to identify the event candidate as a subsequent event related to the first node and within the event horizon beginning with the first sighting event, where the subsequent event is identified based upon timing information related to the elapsed time tracked by the timer and based upon observed signal strength information as indicated by the received signal strength indicator value; generate event data representing the subsequent event as including at least the timing information related to the elapsed time tracked by the timer and based upon observed signal strength information as indicated by the received signal strength indicator value; and cause the second communication interface to provide the event data representing the subsequent event to the server.

In a further embodiment of this master node apparatus, the subsequent event may comprise a sporadic event, a first benchmark checkpoint event (also considered as an online event), an offline event, a shift event, and a new checkpoint event. In more detail, an embodiment may have the subsequent event being a sporadic event when (1) the node processing unit has not identified a previous event within the event horizon to be a first benchmark checkpoint event representing detection of a threshold number of the signals within the series of successive signals broadcast by the first ID node; and (2) the node processing unit has not detected, via the first communication interface, a subsequent signal broadcast by the first ID node before the elapsed time exceeds a gap time period when tracked by the time from when the master node detected a most recent in the series of successive signals from the first ID node.

In another embodiment of this master node apparatus, the subsequent event may comprise a first benchmark checkpoint event representing a detected online state of the first ID node when the node processing unit detects, via the first communication interface, a threshold number of the signals within the series of successive signals broadcast by the first ID node and without the elapsed time between each of the threshold number of detected signals does not exceed a gap time period.

In still another embodiment of this master node apparatus, the subsequent event may comprise an offline event when (1) the node processing unit identified a previous event within the event horizon to be a first benchmark checkpoint event representing detection of a threshold number of the signals within the series of successive signals broadcast by the first ID node; and (2) the node processing unit has not detected a subsequent signal broadcast by the first ID node when the elapsed time from when a most recent of the signals in the series of successive signals from the first ID node exceeds a gap time period.

In yet another embodiment of this master node apparatus, the subsequent event may comprise a new checkpoint event when (1) the node processing unit has identified a previous event within the event horizon to be a first benchmark checkpoint event, wherein the first benchmark checkpoint event representing detection of an earlier threshold number of the signals within the series of successive signals broadcast by the first ID node; and (2) the node processing unit detects a subsequent threshold number of the signals in the series of successive signals from the first ID node after identifying the first benchmark checkpoint event. In even more detail, an embodiment may have the node processing unit being further operative to generate the event data representing the subsequent event and cause the second communication interface to provide the event data representing the subsequent event to the server by being further operative to (1) generate the event data representing the new checkpoint event upon identifying a threshold number of previous checkpoint events; and (2) cause the second communication interface to provide the event data representing the new checkpoint event to the server after identifying the threshold number of previous checkpoint events.

In a further embodiment of this master node apparatus, the subsequent event may comprise a shift event when the node processing unit is further operative to detect at least a threshold difference between the received signal strength indicator value for the new checkpoint event and the received signal strength indicator value for a previous benchmark checkpoint event.

As noted in the above-described embodiments, enhanced monitoring for node events to report as event candidates may involve comparing an observed parameter of different detected advertising signals, which in some instances may also involve checkpoints that rely on the different detected advertising signals. A further embodiment makes such a comparison specifically based upon checkpoint summaries of the detected advertising signals. As such, the monitoring node (such as master node 3410) may detect the different advertising signals but analyze and identify potential event candidates based upon summarized groups or sets of such detected signals as checkpoints (also referred to as a checkpoint summary) successively generated internal to the monitoring node.

In a general example, each group of 30 successively detected advertising signals from a broadcasting low level ID node maybe recorded and tracked by a monitoring master node as a checkpoint—a summarized representation of that group of signals. Each checkpoint summary has an observable parameter (such as an average RSSI value for the summarized group of signals) that can be compared against a similar observable parameter of a previous checkpoint. If such a comparison reveals less than a threshold or relevant change compared to various event criteria, the checkpoint summary may not be reported as representing a relevant event candidate. However, if the comparison lines up with event criteria to identify a relevant node event for the ID node from the monitored change based on the checkpoints, the monitoring master node may report the node event as an event candidate to the server. Thus, an embodiment of the monitoring master node (or a system that uses such a monitoring master node) may operate more efficiently in some deployments by identifying the event candidate based on successive checkpoints that provide statistically relevant observations of a lower level ID node.

Figure 45:
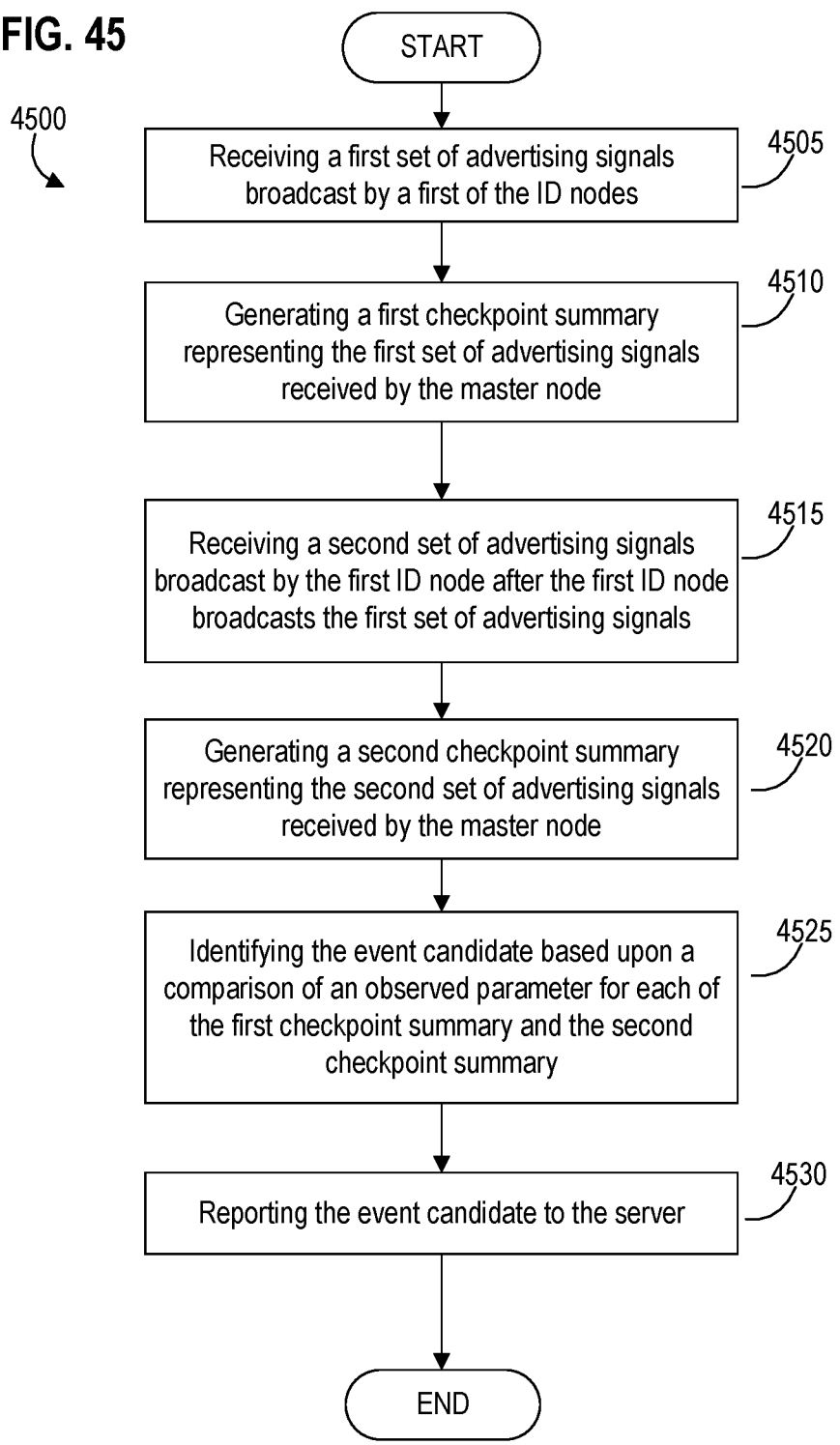
FIG. 45 is a flow diagram illustrating an exemplary method for enhanced monitoring for an event candidate within a wireless node network based upon checkpoint summary points representing groups or sets of detected signals in accordance with an embodiment of the invention.

FIG. 45 is a flow diagram illustrating an exemplary method for enhanced monitoring for an event candidate within a wireless node network based upon checkpoint summary points representing groups or sets of detected advertising signals in accordance with an embodiment of the invention. Referring now to FIG. 45, method 4500 is described where the wireless node network includes a plurality of ID nodes at a low level of the network, a master node at a middle level in communication with the ID nodes, and a server at a top level in communication with the master node—similar to that illustrated in FIG. 34. Method 4500 begins at step 4505 where the master node receives a first set of advertising signals broadcast by a first of the ID nodes and then, at step 4510, generates a first checkpoint summary representing the first set of advertising signals received by the master node. For example, if the first set of advertising signals detected included 10 signals, the first checkpoint summary may represent those 10 detected signals with a summarized representation (e.g., an average of the observed signal strength values for each of the 10 detected signals).

At step 4515, method 4500 continues with the master node receiving a second set of advertising signals broadcast by the first ID node after the first ID node broadcasts the first set of advertising signals, and then at step 4520, generating a second checkpoint summary representing the second set of advertising signals received by the master node. Thus, in the above example, the second set of advertising signals would include the next set of 10 successively detected advertising signals from the ID node. As such, the second checkpoint summary may represent this next set of 10 detected signals and record an observed parameter relative to this next set (such as an average of the observed signal strength values for each of these next 10 detected signals).

At step 4525, method 4500 continues with the master node identifying the event candidate based upon a comparison of an observed parameter for each of the first checkpoint summary and the second checkpoint summary. In more detail, such an observed parameter for the checkpoint summaries may be a statistical representation of the observed signal strength values for the relevant set of advertising signals, such as a mean, a median, an average, a moving average over a subset window of advertising signals, a moving average over a sliding time window, or a weighted average that represents the relevant set of advertising signals. Again, in the above described example, the master node (such as master node 3410 as shown in FIGS. 34 and 35) may compare the average of the observed signal strength values (such as a received signal strength indicator (RSSI) value reflecting the observed signal strength) for the first 10 detected signals to the average of the observed signal strength values for the next 10 detected signals as part of identifying the event candidate.

In more detail, further embodiments of method 4500 may identify the event candidate in more detail relative to specific event criteria and the results of the comparison. For example, the step of identifying the event candidate in step 4525 may further comprise the master node identifying the event candidate as an online event for the first ID node when (a) a detected time gap between successive ones of the first set of advertising signals and the second set of advertising signals is less than the threshold time gap and (b) the master node has received at least a threshold number of advertising signals from the first ID node in the first set and the second set.

In another embodiment, the step of identifying the event candidate in step 4525 may further comprise the master node identifying the event candidate as a shift event for the first ID node when a difference between the observed parameter for the first checkpoint summary and the observed parameter for the second checkpoint summary is at least a threshold value.

In still another embodiment, the step of identifying the event candidate in step 4525 may further comprise the master node identifying the event candidate as an offline event when a detected time gap between any successive ones of the second set of advertising signals (after detecting the first set of advertising signals) is greater than the threshold time gap during an event horizon for the first ID node as monitored by the master node.

Further still, another embodiment may have step 4525 comprise the master node identifying the event candidate as a sporadic event when the master node receives at least one advertising signal from the first ID node but does not receive at least a threshold number of advertising signals from the first ID node within a defined period of time from when the master node receives the at least one advertising signal. For example, the master node may only detect 8 successively broadcast advertising signals from the first ID node but then fail to detect the requisite 10 signals that would sufficiently make up the next set of signals for a checkpoint summary. Thus, in this example, the master node may identify what is to be reported as an event candidate to be a sporadic event.

In yet another detailed embodiment, the step of identifying the event candidate in step 4525 may further comprise the master node identifying the event candidate as a checkpoint event when a periodic reporting interval ends and based upon the comparison of the observed parameter for the first checkpoint summary and the observed parameter for the second checkpoint summary. For example, the periodic reporting interval used by the master node may comprise a threshold time period, which upon expiration of this time period the master node then knows to report the second checkpoint summary as the checkpoint event (i.e., a type of event candidate reported to the server). In another example, the periodic reporting interval used by the master node may comprise a threshold number of advertising signals received or detected or a threshold number of checkpoint summaries generated since the last reported checkpoint event. Upon meeting that threshold number, the master node is then poised to subsequently report the second checkpoint summary as the checkpoint event (i.e., a type of event candidate reported to the server).

In still another embodiment of method 4500, step 4520 may have the master node identifying the event candidate as a profile change event when the comparison of the observed parameter for each of the first checkpoint summary and the second checkpoint summary indicates a first observed profile setting reflected in the first set of advertising signals is different than a second observed profile setting reflected in the second set of advertising signals. The first observed profile setting and the second observed profile setting may, in some implementations of method 4500, relate to operation of the first ID node, while they may relate to operation of the master node in other implementations of method 4500.

Further still, step 4520 may have the master node implementing the step of identifying the event candidate by having the master node identify the event candidate as a transmission power change event when the comparison of the observed parameter for each of the first checkpoint summary and the second checkpoint summary indicates a first observed output power setting reflected in the first set of advertising signals is different than a second observed output power setting reflected in the second set of advertising signals.

In one alternative embodiment, the step of identifying the event candidate in step 4525 may further comprise the master node identifying the event candidate as an environmental change event when the comparison of the observed parameter for each of the first checkpoint summary and the second checkpoint summary indicates a second sensor data value associated with the second set of advertising signals is different than a first sensor data value associated with the first set of advertising signals. Sensor data values may be included in a header, for example, of one or more of the advertising signals within a respective set. Thus, the master node may learn of environmental changes happening relative to the first ID node through observed sensor data associated with each of the checkpoint summaries.

In another alternative embodiment, the step of identifying the event candidate in step 4525 may further comprise the master node identifying the event candidate as an environmental change event when the comparison of the observed parameter for each of the first checkpoint summary and the second checkpoint summary indicates a second sensor data value associated with the second set of advertising signals reflects a departure from a first sensor data value associated with the first set of advertising signals, where the departure is more than a threshold difference.

At step 4530, method 4500 continues with the master node having identified a relevant event candidate and then reporting the event candidate to the server. As this step is selectively performed only when identifying an event candidate, such a reporting step may have the master node simplifying a data feed about the first ID node by sending the event candidate to the server as summary information reflecting an observed change between the first set of advertising signals represented by the first checkpoint summary and the second set of advertising signals represented by the second checkpoint summary.

Additional embodiments of method 4500 may also include further algorithmic steps. For example, another embodiment of method 4500 may have the master node also detecting a profile identifier from the first ID node. Such a profile identifier may be part of at least one of the advertising signals in the first or second set of advertising signals. In response to detecting the profile identifier (e.g., a flag or other data included as part of an advertising signal's header), the master node may then alter the periodic reporting interval based upon an alert profile corresponding to the profile identifier. Such an alert profile may include one or more different node management rules related to monitoring the first ID node and reporting to the server.

Additionally, the periodic reporting interval may be based on a time factor, such as a threshold time period adjustable by the master node. As such, the master node may adjust this reporting interval to more frequently report checkpoint events as an identified event candidate, thereby updating the server more frequently. Alternatively, the periodic reporting interval may be based upon a threshold number of signal receptions adjustable by the master node in similar fashion to increase or decrease how frequently the monitoring master node provides updates to the server in the form of an identified event candidate.

A further embodiment of method 4500 may also have the master node resetting information collected based upon at least the first set of advertising signals and the second set of advertising signals after reporting the checkpoint event to the server. This reset or clearing of collected information stored by the master node implements a type of data reduction that facilitates efficient use of the master node's onboard resources.

Still another embodiment of method 4500 involves feedback from the server after reporting the event candidate. In more detail, such a further embodiment may have the master node receiving an adjustment response from the server based upon the reported event candidate. The adjustment response generated by the server based upon being notified about the relevant event candidate may comprise an adjusted profile for at least one of the master node and the first ID node (e.g., changes to one or more node management rules maintained as part of an operational profile that governs how a particular wireless node in the network will function and communicate). Further still, the adjustment response may comprise an adjusted profile for at least one of the other ID nodes, such as when a reported event candidate relative to the first ID node has the server changing how other ID nodes managed and monitored by the master node will operate given the reported event candidate. Alternatively, the adjustment response may comprise updated context data reflecting the reported event candidate, such as updated context data reflecting a newly discovered source of RF interference in an anticipated proximate environment of the master node or the ID nodes in the wireless node network.

Those skilled in the art will appreciate that method 4500 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 4500 as described above. Such code may be stored on a non-transitory computer-readable medium, such as memory storage 415 on master node 3410. Thus, when executing such code, the master node may be specially adapted beyond that of a generic computer to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 4500 and variations of that method.

In more detail, an embodiment of a master node apparatus for enhanced monitoring for an event candidate based upon checkpoint summaries is described as follows. The exemplary master node apparatus is deployed as a middle level wireless node element within a wireless node network having a plurality of ID nodes at a low level and a server at a higher level within the network. In more detail, the exemplary master node apparatus in this embodiment generally comprises a node processing unit, a memory storage, a first communication interface, and a second communication interface. The first communication interface is coupled to the node processing unit and operative to communicate with at least a first of the ID nodes over a first communication path (e.g., a short range wireless communication path, such as a Bluetooth® or NFC formatted short range wireless data communications path). The second communication interface is coupled to the node processing unit and operative to communicate with the server over a second communication path (e.g., a longer range wireless communication path, such as a Wi-Fi or cellular longer range wireless data communications path). The memory storage (e.g., memory storage 415 of master node 3410 shown in FIG. 35) is also coupled to the node processing unit (e.g., processing unit 400) and maintains event detection engine code (e.g., code 3415) for execution by the node processing unit.

In operation when executing the event detection engine code maintained on the memory storage, the node processing unit executes the algorithmic instructions of the code to perform particular and specially programmed functional steps as part of enhancing and improving how the master node apparatus interactively operates to monitor for an event candidate based upon checkpoint summaries. In particular, the node processing unit becomes operative, when executing the event detection engine code, to detect, via the first communication interface, a first set of advertising signals broadcast by a first of the ID nodes. Once the first set of advertising signals has been detected, the node processing unit is then operative to generate a first checkpoint summary representing the first set of advertising signals detected by the first communication interface. Similarly, the node processing unit is operative to detect, via the first communication interface, a second set of advertising signals broadcast by the first ID node after the first ID node broadcasts the first set of advertising signals and then generate a second checkpoint summary representing the second set of advertising signals detected by the first communication interface. The node processing unit is then operative to compare an observed parameter (such as observed signal strength value or RSSI as detected by the first communication interface) for each of the first checkpoint summary and the second checkpoint summary. This observed parameter, in more detail, may be a statistical representation of the respective advertising signals represented by the checkpoint summary, such as an average observed signal strength for each of the advertising signals associated with the particular checkpoint summary. Other examples of relevant statistical representations of the observed signal strength value may include a mean, a median, a moving average (relative to a time window or a window based on a number of detections), or a weighted average.

The node processing unit is then operative to identify the event candidate based upon the comparison of the observed parameter for each of the first checkpoint summary and the second checkpoint summary, and cause the second communication interface to report the identified event candidate to the server over the second communication path. In more detail, the second communication interface may transmit a message to the server when reporting the identified event candidate, where the message comprises a reduced monitoring data feed about the first ID node that at least includes summary information indicating an observed change between the first set of advertising signals represented by the first checkpoint summary and the second set of advertising signals represented by the second checkpoint summary.

As part of identifying the event candidate, further embodiments of the master node apparatus may have the node processing unit being operative to identify the event candidate based on the comparison relative to particular event criteria. For example, an embodiment of the master node apparatus may have the node processing unit being operative to identify the event candidate as a sporadic event when the first communication interface detects at least one advertising signal from the first ID node but does not detect at least a threshold number of advertising signals from the first ID node (a type of observed parameter) within a defined period of time from when the first communication interface detects the at least one advertising signal.

Another embodiment of the master node apparatus may have the node processing unit being operative to identify the event candidate as an online event for the first ID node when (a) a detected time gap (a type of observed parameter) between successive ones of the first set of advertising signals and the second set of advertising signals is less than the threshold time gap and (b) the first communication interface has received at least a threshold number of advertising signals from the first ID node (another type of observation relative to the advertising signals) in the first set and the second set.

A further embodiment of the master node apparatus may have the node processing unit being operative to identify the event candidate as a shift event for the first ID node when a difference between the observed parameter for the first checkpoint summary and the observed parameter for the second checkpoint summary is at least a threshold value, such as when the average observed signal strength for the second checkpoint summary drops beyond a threshold level compared to the average observed signal strength for the first checkpoint summary.

Still another embodiment of the master node apparatus may have the node processing unit being operative to identify the event candidate as an offline event when a detected time gap (a type of observed parameter) between any successive ones of the second set of advertising signals after detecting the first set of advertising signals is greater than a threshold time gap during an event horizon for the first ID node.

Another embodiment of the master node apparatus may have the node processing unit being operative to identify the event candidate as a checkpoint event when a periodic reporting interval ends (whether the interval is based on a time criteria or a number of detected signals criteria) and based upon the comparison of the observed parameter for the first checkpoint summary and the observed parameter for the second checkpoint summary.

An additional embodiment may have the node processing unit being further operative to identify a profile identifier from the first ID node, such as from a header part of at least one of the advertising signals in either of the first set of advertising signals and the second set of advertising signals. Based upon the identified profile identifier, the master node apparatus learns which alert profile is being used by the first ID node, and can then have the node processing unit alter the periodic reporting interval based upon that alert profile corresponding to the profile identifier. As previously explained, the alert profile may be one of a group of node management rules related to monitoring the first ID node and reporting to the server. In more detail, the periodic reporting interval may comprise a threshold time period adjustable by the node processing unit in response to identifying the profile identifier or, alternatively, may comprise a threshold number of signal receptions adjustable by the node processing unit in response to identifying the profile identifier.

Embodiments of the master node apparatus that monitors for an event candidate based on checkpoint summaries may also identify the event candidate as a type of change event. For example, the node processing unit may be operative to identify the event candidate as a profile change event when the comparison of the observed parameter for each of the first checkpoint summary and the second checkpoint summary indicates a first observed profile setting reflected in the first set of advertising signals is different than a second observed profile setting reflected in the second set of advertising signals. Such observed profile settings may relate to operation of the first ID node, the master node, or both.

In another example, the node processing unit may be operative to identify the event candidate as a transmission power change event when the comparison of the observed parameter for each of the first checkpoint summary and the second checkpoint summary indicates a first observed output power setting reflected in the first set of advertising signals is different than a second observed output power setting reflected in the second set of advertising signals. The output power setting for the ID node generating the advertising signal may appear as part of the advertising signal itself (e.g., as part of the header information, such as the "TX Power Level" information included in example advertising packet 700 shown in FIG. 7).

In still another example, the node processing unit may be operative to identify the event candidate as an environmental change event when the comparison of the observed parameter for each of the first checkpoint summary and the second checkpoint summary indicates a second sensor data value associated with the second set of advertising signals is different than a first sensor data value associated with the first set of advertising signals or the comparison reflects a departure between sensor data values that is more than a threshold difference. In more detail, an exemplary sensor on the ID node may provide changing sensor data over time and, as successive advertising signals are broadcast from the ID node, sensor data values are provided as part of the successively broadcasted advertising signals. Thus, the node processing unit of the master node apparatus may compare such observed sensor data over time to identify an environmental change event (e.g., a package associated with the ID node is experiencing a rapid increase in temperature, which may be due to where it has been placed (next to a heat source or in the sun) or due to the contents of the package creating heat (such as from an undesired chemical reaction or from internal burning of the contents).

Further embodiments of the master node apparatus that monitors for an event candidate based on checkpoint summaries may also involve receiving and responding to server feedback based on the reported event candidate. For example, the node processing unit may be further operative to receive, via the second communication interface, an adjustment response from the server based upon the event candidate. Such an adjustment response received over the second communication interface may be a message from the server that may include an adjusted profile for the master node apparatus, the first ID node, or one of the other ID nodes being managed by the master node apparatus. Such an adjusted profile may be one or more revised or new node management rules that govern and define how the particular wireless node element operates—such as a power level to use, a frequency of broadcasting advertising signals, etc. Likewise, the adjustment response may be a message with updated context data reflecting the reported event candidate.

Those skilled in the art will understand that the above described different embodiments of the master node apparatus that monitors for an event candidate based on checkpoint summaries as described above (consistent with the description above related to method 4500 and its variations), may also be deployed as part of a larger monitoring system that identifies an event candidate based on checkpoint summaries within a wireless node network. Such a monitoring system may include a server disposed at a top level of the network, an ID node disposed at a lower level of the network that is broadcasting advertising signals, and a master node disposed at a middle level of the network. The ID node may be associated with a package being shipped and tracked, while the master node takes the role of monitoring signals from the ID node as the ID node comes within a communication range of the master node. The master node, as particularly described in the embodiments above, operates to detect advertising signals, generate successive checkpoint summaries, compare an observed parameter for each of the successive checkpoint summaries to identify the event candidate, and cause the second communication interface on the master node to report the identified event candidate to the server. The server, as part of the monitoring system, is operative to receive the identified event candidate from the master node and transmit a responsive adjustment response to the master node based upon the identified event candidate. Such a responsive adjustment response provided as feedback to the master node comprises at least one of an adjusted profile for the master node, an adjusted profile for the ID node, and updated context data reflecting the identified event candidate.

As noted in some of the above-described embodiments, enhanced monitoring for node events to report as event candidates may involve generating a checkpoint summary (also referred to generally as a checkpoint) that essentially summarizes and represents a set or group of advertising signals broadcast by lower level ID nodes. In a further embodiment, reporting each generated checkpoint to the server as a type of event candidate to be processed by the server may still provide a degree of system-level improvement that lessens the monitoring and reporting burden placed on the monitoring master node. In other words, deploying use of checkpoints as a monitoring and tracking mechanism carried out by the master node at an intermediate level of the wireless node network (as an apparatus itself or as an apparatus element of a system) may effectively reduce the master node monitoring data feed to the backend managing server of such a system when compared to simply sending the raw data of each advertising signals detected by the master node to the server.

In a general example, each group of 30 successively detected advertising signals from a broadcasting low level ID node may be recorded and tracked by a monitoring master node as a checkpoint—a summarized representation of that group of signals. Each checkpoint summary has an observable parameter (such as an average RSSI value for the summarized group of signals) that, in a basic exemplary embodiment, can be reported to the server by the monitoring master node as a way of monitoring for an event candidate. In this basic example, the summarized representation of that group of signals (e.g., the average RSSI value for the group of 30 detected advertising signals) may be reported as an event candidate relative to the broadcasting and monitored ID node. Such a reported event candidate (via the reported checkpoint) has the monitoring master node informing the server that the broadcasting ID node is "still here"—useful information in and of itself to the server when managing elements of the wireless node network.

Furthermore, embodiments of methods, apparatus, and systems that monitor for node events to report as event candidates may extend how a monitoring master node uses a checkpoint so that not all checkpoints may be reported, but only certain of the summarized checkpoints. For example, a further embodiment involving checkpoints may have the monitoring master node generating successive checkpoint summaries over time (each being based on different groups or sets of detected advertising signals from an ID node) and then comparing an observed parameter of different checkpoint summaries. In more detail, the observable parameter (such as average RSSI value) for a currently generated checkpoint can be compared against a similar observable parameter of a previous checkpoint. If such a comparison reveals less than a threshold or relevant change compared to various event criteria, the checkpoint summary may not be reported as representing a relevant event candidate. However, if the comparison lines up with event criteria to identify a relevant node event for the ID node from the monitored change based on the checkpoints, the monitoring master node may report the node event as an event candidate to the server.

As such, the monitoring node (such as master node 3410) may detect each of the different advertising signals but analyze and identify potential event candidates based upon the checkpoints successively generated internal to the monitoring node. In some cases, the monitoring master node analyzes and identifies potential event candidates based upon a comparison of different checkpoint summaries. In this way, what may be reported to the server may advantageously be refined or intelligently distilled node event information on what is happening with a particular ID node. Thus, various embodiments of the monitoring master node (or a system that uses such a monitoring master node) may operate more efficiently in some deployments by identifying the event candidate based on one or more successive checkpoints that provide statistically relevant observations of a lower level ID node indicative of a status of the relevant ID node.

FIG. 46 is a flow diagram illustrating another exemplary method for enhanced monitoring for an event candidate within a wireless node network based upon a checkpoint summary in accordance with an embodiment of the invention. The exemplary wireless node network has a plurality of lower level ID nodes, a master node at a middle level in communication with the ID nodes, and a server at a top level in communication with the master node. Referring now to FIG. 46, exemplary method 4600 begins at step 4605 with the master node activating a monitoring mode of operation that listens for one or more broadcast signals emitted from any of the ID nodes without prompting the ID nodes for transmission of the one or more broadcast signals from the ID nodes. For example, in contrast to conventional RFID tag responses, which must be prompted by an RFID tag reader, the master node may activate a monitoring mode that does not require prompting the ID nodes to broadcast but, instead, listens for wireless ID nodes that may be broadcasting short-range advertising packet signals.

At step 4610, if the master node receives a first advertising signal broadcast by a first of the ID nodes in the wireless node network, method 4600 proceeds from step 4610 directly to step 4615. Otherwise, step 4610 remains in the activated monitoring mode awaiting receipt of a signal.

At step 4615, method 4600 proceeds with the master node recording an observed parameter related to the received first advertising signal broadcast by the first ID node. Such an observed parameter may, for example, be an observed signal strength level for the signal or observed information within a part (e.g., a header) of the detected advertising signal. The observed parameter may be recorded into volatile and/or non-volatile memory depending on the deployment, memory writing speed available with accessible memory on the master node, and a need or desire to avoid loss of data due to unintentional power loss.

With the first advertising signal received by the master node at step 4610 and the observed parameter for that signal recorded at step 4615, method 4600 proceeds to step 4620 to detect successive advertising signals broadcast by the first ID node. Thus, as a next advertising signal broadcast from the first ID node is received at step 4620, step 4620 directly proceeds to step 4625. Otherwise, step 4620 remains in the activated monitoring mode awaiting receipt of more advertising signals from the first ID node.

At step 4625, method 4600 proceeds with the master node recording the observed parameter related to the next successively received advertising signal broadcast by the first ID node. In more detail, such an observed parameter of the received advertising signals may, for example, be a received signal strength indicator (RSSI) value reflecting a signal strength as detected by the master node. In another example, the observed parameter may be sensor data provided by the first ID node and captured by the master node related to the first ID node. For instance, the advertising signals broadcast by the first ID node may include sensor data within the advertising signals' header portion. Such sensor data may be observed by the master node through the detected advertising signals, and indicate low level ID node activity or status (e.g., a temperature condition sensed by the ID node or humidity condition sensed by the ID node).

At step 4630, the master node determines if the received signals (i.e., those advertising signals received in step 4610 and in 4620) amount to a sufficient number of received signals that corresponds to a predetermined group of advertising signals that include the first advertising signal and a subsequent group of successively received advertising signals. If not, step 4630 returns to step 4620 and awaits receipt of further advertising signals. However, if so, step 4630 proceeds to step 4635.

In some embodiments, the number of signals that make up the predetermined group may be defined by the server. For example, the server may provide the master node with node management information in the form of a particular number of advertising signals deemed to make up the predetermined group for purposes of monitoring and reporting as explained with reference to embodiments of method 4600. In other embodiments, this number may be dynamically altered by the master node and/or the server as monitoring continues. For example, the master node may detect the broadcasting ID node has raised an alert (e.g., an increased alert status, a change in profile status, a change in environmental status based on sensor data, and the like) where the master node then is able to self-adapt its monitoring by changing the number of signals in the predetermined group or, in other instances, report the alert to the server so the server may dictate a change in the number of signals in the predetermined group and refine the monitoring process from the server level of the network via a node management message sent to the master node with the changed number of signals in the group for monitoring purposes.

At step 4635, method 4600 proceeds to generate a checkpoint summary based on the received advertising signals. More specifically, the master node generates a first checkpoint summary representing a first set of advertising signals comprising the received first advertising signal (the signal received in step 4610) and the successively received subsequent group of advertising signals (the signals that were successively received at step 4630). The first checkpoint summary is a transformative data representation of the first set of advertising signals and includes a summary observed parameter generated based upon the recorded observed parameter related to the received first advertising signal broadcast (as recorded in step 4615) and the recorded observed parameter related to each of the successively received subsequent group of advertising signals (as recorded in step 4625). In more detail, the summary observed parameter for the first checkpoint summary may be implemented as a statistical representation of the observed signal strength values for the first set of advertising signals. Such a statistical representation of the observed signal strength values may be implemented using a mean, a median, an average, a moving average over a subset window of advertising signals, a moving average over a sliding time window, or a weighted average related to the observed signal strength values (or captured sensor data) from the first set of advertising signals.

At step 4640, method 4600 proceeds with the master node transmitting the first checkpoint summary to the server as the event candidate relative to the first ID node. More specifically, step 4640 may have the master node simplifying a data feed for the server related to a status of the first ID node by sending the event candidate to the server indicating a summarized monitored status of the first node based upon the summary observed parameter of the first checkpoint summary. Thus, transmitting as performed in step 4640 enhances the monitoring master node to server reporting overhead and improves the overall efficiency of informing the system's server about an event candidate via the reported first checkpoint summary.

While step 4640 explained above has the first checkpoint summary reported as the event candidate, in further embodiments of method 4600, the transmitting in step 4640 may occur based upon a periodic reporting interval criteria. In particular, a further embodiment may implement step 4640 with the master node transmitting the first checkpoint summary to the server as the event candidate relative to the first ID node when the first checkpoint summary meets a periodic reporting interval criteria relative to one or more prior checkpoint summaries generated by the master node, such as transmitting only every $5^{th}$ checkpoint summary while the other prior checkpoint summaries remain internal to the monitoring master node.

In a more detailed embodiment, transmitting in step 4640 may further comprise having the master node incrementing a checkpoint count in memory of the master node upon generating the first checkpoint summary; having the master node compare the incremented checkpoint count to the periodic reporting interval criteria relative to one or more prior checkpoint summaries generated by the master node; and using the master node to report the first checkpoint summary to the server as the event candidate when the incremented checkpoint count matches the periodic reporting interval criteria (e.g., when the first checkpoint summary is a $5^{th}$ checkpoint summary relative to the last reported checkpoint summary). The periodic reporting interval criteria may identify a threshold number of generated checkpoint summaries as a reporting condition for reporting the first checkpoint summary to the server as the event candidate. Such a threshold number may be predetermined in some embodiments (e.g., report only every $5^{th}$ checkpoint summary) while other embodiments may have the master node adjust such a threshold number.

In more detail relative to adjusting the periodic reporting interval criteria, a further embodiment of method 4600 may further have the master node detect a profile identifier from the first ID node. The profile identifier may, for example, be part of at least one of the received first advertising signal and the successively received subsequent group of advertising signals (such as information in a header of one of the broadcasted advertising signals). The master node may then respond to this detected profile identifier, and alter the periodic reporting interval criteria based upon an alert profile corresponding to the profile identifier. The alert profile includes node management rules related to monitoring the first ID node and reporting to the server. Thus, the alert profile for the first ID node (as indicated by the profile identifier) may reflect that the ID node needs quick attention, warranting the monitoring master node to change how frequently it may report checkpoint summaries to the server. For example, the first ID node may autonomously switch to using the alert profile as it may have entered a particular Alert Stage (as previously described), and the monitoring master node may then advantageously adapt to how that particular ID node is monitored by adjusting the periodic reporting interval criteria so that event candidate information on the ID node is more frequently transmitted to the server within the system.

In another further embodiment, method 4600 may also have the master node adjusting the summary observed parameter to be reported. In particular, the master node may adjust the summary observed parameter so that it statistically summarizes the first checkpoint summary with at least one previous checkpoint summary generated by the master node and not reported to the server. For example, the master node may adjust the summary observed parameter to be reported to the server to be an average of the current (first) checkpoint summary and four previously unreported summary observed parameters for previous checkpoint summaries not reported. In this manner, the adjusted summary observed parameters provide a statistical representation of the ID node's status since the last checkpoint summary was reported as an event candidate.

In a more detailed embodiment, method 4600 may have the master node reporting the event candidate to the server based upon a comparison of the current (first) checkpoint summary to a prior checkpoint. For example, this embodiment of method 4600 may also include having the master node comparing a previous summary observed parameter for a previous checkpoint summary to the summary observed parameter for the first checkpoint summary to identify a change in a status of the first ID node. As such, the master node may then transmit the first checkpoint summary to the server as the event candidate when the comparison identifies the change in the status of the first ID node. Such a change in the first ID node's status may, for example, be when the previous summary observed parameter for the previous checkpoint summary is different than the summary observed parameter for the first checkpoint summary by more than a threshold level. More specifically, an exemplary change in the first ID node's status identified from the comparison may be a node event, such as a sporadic event indicating an abbreviated event horizon for the first ID node; an online event indicating a beginning of a monitored event horizon for the first ID node; a shift event indicating at least a threshold difference between the previous summary observed parameter for the previous checkpoint summary and the summary observed parameter for the first checkpoint summary; and an offline event indicating an end of the monitored event horizon for the first ID node. Further still, an exemplary change in the first ID node's status identified from the comparison may be a node event such as a profile change event indicating the first ID node changed a profile setting during a monitored event horizon for the first ID node; a transmission power change event indicating the first ID node changed an output power setting during the monitored event horizon; and an environmental change event indicating a change in sensor data captured by the first ID node during the monitored event horizon.

Those skilled in the art will appreciate that method 4600 as disclosed and explained above in various embodiments may be implemented on an exemplary master node (e.g., exemplary master node 3410 in FIG. 35) running one or more parts of the master control and management code 425 in conjunction with event detection engine code 3415 to perform steps of method 4600 as described above. Such code may be stored on a non-transitory computer-readable medium, such as memory storage 415 on master node 3410. Thus, when executing such code, the master node may be specially adapted beyond that of a generic computer to interact with other network devices (such as one or more ID nodes as shown in FIG. 34 and server 3400 as shown in FIG. 34) as the master node's processing unit 400 is specially adapted to be operative to perform algorithmic operations or steps from the exemplary methods disclosed above, including method 4600 and variations of that method.

Further still, those skilled in the art will appreciate that such an exemplary master node adapted to perform algorithmic operations or steps from the exemplary methods disclosed above, including method 4600 and variations of that method, may be deployed as part of a node monitoring system embodiment that identifies an event candidate within a wireless node network. Such an exemplary monitoring system comprises a server disposed at a top level of the network, an ID node disposed at a lower level of the network that is broadcasting advertising signals, and a master node disposed at a middle level of the network. The ID node may be associated with a package being shipped and tracked, while the master node takes the role of monitoring broadcasted advertising signals from the ID node as the ID node comes within a communication range of the master node. The master node further comprises a master node processing unit, a memory storage, and first and second communication interfaces. The master node's memory storage is coupled to the master node processing unit maintains event detection engine code for execution by the master node processing unit (e.g., memory storage 415 maintaining event detection engine code 3415 for execution by processing unit 400 as shown and explained with reference to FIG. 35). The first communication interface is coupled to the master node processing unit and operative to communicate with the ID node over a first communication path, while the second communication interface is also coupled to the master node processing unit and operative to communicate with the server over a second communication path. As such, the first communication path is different from the second communication path similar to that shown in FIG. 34 where the first communication path from the master node 3410 to the ID nodes 120*a-e* is distinct and separate from the communication path from master node 3410 to server 3400 via network 105.

As a monitoring and reporting elements within the monitoring system, the master node, when executing the event detection engine code on the master node processing unit, is operative to cause the first communication interface to listen for one or more broadcast signals emitted from the ID node without prompting the ID node for transmission of the one or more broadcast signals from the ID node. The master node (via its master node processing unit and other elements) is then further operative to detect, via the first communication interface, a first advertising signal broadcast by the ID node and record a first observed parameter in the memory storage based upon the detected first advertising signal broadcast by the ID node. The master node is then operative to successively detect, via the first communication interface, a subsequent group of advertising signals broadcast by the ID node, and record a subsequent group of observed parameters where each are based upon a respective one of the successively received subsequent group of advertising signals broadcast by the ID node.

In more detail, each of the first observed parameter and the subsequent group of observed parameters may be a received signal strength indicator (RSSI) value reflecting a signal strength as detected by the master node. As such, the master node monitors for the ID node advertising signals and, in particular, observes the RSSI value for such signals. However, in another more detailed system embodiment, each of the first observed parameter and the subsequent group of observed parameters may be one of a plurality of sensor data captured by the master node related to the ID node. As such, the master node monitors for the ID node advertising signals and, in particular, observes sensor data within such advertising signals (such as environmental sensor data, package monitoring sensor data, or other sensor data generated by the ID node and included within advertising signals broadcast from that ID node) as the observed parameters.

With the detected advertising signals and observed parameters for each of such signals, the system's master node is then operative to generate a first checkpoint summary representing a first set of advertising signals comprising the detected first advertising signal and the successively detected subsequent group of advertising signals. More specifically, the generated first checkpoint summary comprises a summary observed parameter generated based upon the recorded observed parameter based upon the detected first advertising signal broadcast and each of the recorded observed parameters respectively based upon the successively detected subsequent group of advertising signals. The system's master node then is operative to cause the second communication interface to report the first checkpoint summary over the second communication path to the server as the event candidate relative to the ID node.

The system's server (such as server 3400 depicted in FIGS. 34 and 36) is operative to receive the event candidate from the master node and transmit a responsive adjustment response to the master node based upon the event candidate. Such a responsive adjustment response generated and transmitted by the system's server (e.g., server 3400) comprising at least one of an adjusted profile for the master node, an adjusted profile for the ID node, and updated context data reflecting the identified event candidate.

In more detail, such a system embodiment may have the system's master node processing unit being further operative to generate the summary observed parameter for the first checkpoint summary as a statistical representation of the observed signal strength values for the first set of advertising signals broadcast by the ID node. Such a statistical representation of the observed signal strength values may be implemented as a mean, a median, an average, a moving average over a subset window of advertising signals, a moving average over a sliding time window, or a weighted average of the observed signal strength values.

In a further system embodiment, reporting of the checkpoint as the event candidate may be more periodic than done for each checkpoint. For example, the master node processing unit may be operative to cause the second communication interface to report the first checkpoint summary to the server by being further operative to determine if the first checkpoint summary meets a periodic reporting interval criteria relative to one or more prior checkpoint summaries generated by the master node and stored within the memory storage of the master node. The master node may then be operative to cause the second communication interface to transmit the first checkpoint summary to the server as the event candidate only when the first checkpoint summary meets the periodic reporting interval criteria (such as when such criteria is defined as reporting every over checkpoint or every 5$^{th}$ checkpoint). The master node's processing unit, under such a periodic reporting regimen, may be further operative to adjust the summary observed parameter to statistically summarize the first checkpoint summary with at least one previous checkpoint summary generated by the master node and not reported to the server.

Further still, the master node processing unit may be operative to cause the second communication interface to report the first checkpoint summary to the server by being further operative to increment a checkpoint count upon generating the first checkpoint summary. The checkpoint count may be a data structure (e.g., event data 3500) generated and maintained within memory of the master node. The processing unit is then operative to compare the incremented checkpoint count to a periodic reporting interval criteria relative to one or more prior checkpoint summaries generated by the master node, and cause the second communication interface to transmit the first checkpoint summary to the server as the event candidate only when the incremented checkpoint count matches the periodic reporting interval criteria. Such a periodic reporting interval criteria may, in some embodiments, identify a threshold number of generated checkpoint summaries as a reporting condition for reporting the first checkpoint summary to the server as the event candidate.

In still another system embodiment, the master node processing unit may be operative to detect, via the first communication interface, a profile identifier from the ID node. Such a profile identifier may be part of at least one of the detected first advertising signal and the successively detected subsequent group of advertising signals (e.g., a portion of the advertising signal's header that includes relevant profile identifier data). Based upon an alert profile corresponding to the profile identifier, the master node processing unit may then be operative to alter the periodic reporting interval criteria, where the alert profile may include a plurality of node management rules related to monitoring the ID node and reporting to the server.

Similar to the variations to exemplary method 4600 as described above, the above-described system embodiment may be extended to involve comparing prior checkpoints. For example, in a further system embodiment, the system's master node processing unit may be further operative to access the memory storage for a previous summary observed parameter for a previous checkpoint summary and then compare the previous summary observed parameter to the summary observed parameter for the first checkpoint summary to identify a change in a status of the ID node. Accordingly, the second communication interface of the system's master node may transmit the first checkpoint summary to the server as the event candidate if the master node processing unit identifies the change in the status of the ID node by comparing the previous summary observed parameter to the summary observed parameter for the first checkpoint summary. Such a change in the status of the system's ID node may comprise a monitored node condition when the previous summary observed parameter for the previous checkpoint summary is different than the summary observed parameter for the first checkpoint summary by more than a threshold level. In a more detailed system embodiment, the change in the status of the ID node may identify the first checkpoint summary as a particular node event, such as a sporadic event indicating an abbreviated event horizon for the ID node; an online event indicating a beginning of a monitored event horizon for the ID node; a shift event indicating at least a threshold difference between the previous summary observed parameter for the previous checkpoint summary and the summary observed parameter for the first checkpoint summary; and an offline event indicating an end of the monitored event horizon for the ID node. Further still, another embodiment may have the change in the status of the ID node identifying the first checkpoint summary as a particular node event, such as a profile change event indicating the ID node changed a profile setting during a monitored event horizon for the ID node; a transmission power change event indicating the ID node changed an output power setting during the monitored event horizon; and an environmental change event indicating a change in sensor data captured by the ID node during the monitored event horizon.

In summary, various embodiments of methods, apparatus, and systems involve operation of an exemplary master node (as an interactive monitoring device or as part of a system) that provides the enhanced ability to monitor elements of a wireless node network for event candidates related to a variety of different type of node events and report them in an intelligent and efficient manner to a higher level server in the network. Such enhanced monitoring for event candidates provides a foundation for improved operations of a wireless node network (such as a network of node elements used in logistics tracking and logistics management of items being shipped as they are respectively associated with different low level ID nodes).

Server Operations Related to Enhanced Management via Event Candidate Processing

While the exemplary master node described above provides for enhanced monitoring of an event candidate and reporting of the event candidate to the server, further embodiments may focus on the server (such as the server 3400 illustrated and described above with respect to FIGS. 34 and 36) and how it may be specially adapted to apply an analytics type of process to rank or score the received event candidate as part of "learning" from the reported information—e.g., determining how closely the event correlates with other server-accessible data representing known node relevant activity and adjusting management operations accordingly. Those skilled in the art will appreciate that such embodiments may apply feature extraction functionality using a statistical measure, and the classification of features into correct categories based on their characteristics (such as whether an event candidate is a type of node event that can be confidently attributed to known node relevant activity). In doing so, embodiments operate on data that is transformational in nature. For example and as concretely applied in embodiments described herein, the event data sent as part of the event candidate is representative of node events and may be transformed by the server into updated node management information.

The updated, adjusted, changed or refined node management information (such as relevant node management context data and/or relevant node management rules data) may be used by the server to help manage other elements of the network (such as a master node or ID nodes in the network). For example, based upon a reported event candidate, the server may provide feedback to the master node to alter or otherwise update how the master node operates itself and/or how the master node manages one or more of the ID nodes under its control via updated context data or updated node management rules (e.g., revised operational profiles the define how a master node or ID node functions, operates, reports to other nodes, etc.). In other words, embodiments may deploy a system having the master node monitoring for one or more event candidates integrated with backend server analytics-type processing where event candidates may be ranked for confidence of being correlated to known or new node relevant activity as a type of input for improved management of nodes in the network and enhanced quality/efficiency of how node event information may be captured and reported as a basis for wireless node network management.

As explained above, FIG. 36 is a more detailed diagram of exemplary server 3400 in the network illustrated in FIG. 34 that operates to receive an event candidate and manage the network based upon the event candidate in accordance with an embodiment of the invention. Exemplary server 3400, as shown and described relative to FIG. 36, may be deployed as part of the methods described below with respect to FIGS. 43 and 44. In more detail, FIG. 43 is a flow diagram illustrating an exemplary method for enhanced management of a wireless node network based upon receipt of and processing of an event candidate in accordance with an embodiment of the invention. Referring now to FIG. 43, method 4300 begins at step 4305 with the server receiving an event candidate identified by the master node.

In one embodiment of method 4300, the event candidate is related to a first of the ID nodes and represents an updated status related to the first ID node. In another embodiment, the updated status related to the first ID node may comprise a shift in signal strength in what is broadcast by the first ID node (such as when the master node observed a significant decrease in RSSI values for advertising signals from the first ID node as identified when the event candidate is a shift event). In more detail, the updated status may comprise a changed status of the first ID node, an unchanged status of the first ID node, or a summarized checkpoint status of the first ID node (such as reflected by a first benchmark checkpoint event or a new summary checkpoint event.

Further still, another embodiment of method 4300 may have the event candidate be related to a subset of the ID nodes including the first ID node. For example, the event candidate reported may reflect an identified shift event for each of the subset of ID nodes.

At step 4310, method 4300 proceeds with the server generating a predictive score for the event candidate based upon context data maintained by the server and related to the first ID node, where the predictive score focuses on whether the event candidate corresponds to a node related activity. More particularly, the predictive score may comprise a confidence factor related to whether the event candidate corresponds to the node related activity. In one example, the node related activity may be a detectable physical activity (e.g., a vehicle driving in close proximity to the node or the node moving on a particular conveyance device or system) and a detectable electromagnetic activity (e.g., RF noise generated by a motor or other engine nearby a node). In another example, the node related activity may comprise an anticipated activity characterized by at least a portion of the context data related to the first ID node (e.g., an anticipated movement through a tunnel that may shield the node from receiving communications from other nodes). Further still, the node related activity may comprise a new physical or electromagnetic node related activity not already characterized by the context data related to the first ID node. Additional examples of the node related activity may include movement of at least one of the first ID node, the master node, and an object near the master node; exposure to a source of RF interference; and placement of the first ID node within a container (such as a shipping container, ULD container, a vehicle that operates as a type of container (e.g., delivery van, tractor trailer, and the like)).

In more detail, generating the predictive score for the event candidate in step 4310 may be based upon an evaluation of the event candidate against at least a portion of the context data related to the first ID node (such as context data 560 and that maintained in context database 565). In further embodiments, exemplary context data that may be part of this portion used when generating the predictive score may come in a variety of forms, such as one or more of scan data related to the first ID node, scan data related to the master node, scan data related to a second master node in the wireless node network, scan data related to a second of the ID nodes, historic data related to the first ID node, historic data related to the master node, historic data related to a second master node in the wireless node network, historic data related to a second of the ID nodes, shipment data related to an item being shipped with the first ID node, layout data related to an anticipated environment for the first ID node, RF data related to an anticipated signal path environment for the first ID node, and third party data originating from outside the wireless node network and relating to an anticipated physical condition to be faced by the first ID node.

In a further embodiment, method 4300 may have step 4310 generating the predictive score for the event candidate by having the server identify a pattern match between the event candidate and at least a portion of the context data related to the first ID node, and then assigning a rating as the predictive score for the event candidate based upon the extent the server identifies the pattern match between the event candidate and the portion of the context data related to the first ID node.

In still another embodiment, method 4300 may have step 4310 generating the predictive score for the event candidate by having the server compare the event candidate to at least a portion of the context data related to the first ID node, and then determine a probability rank as the predictive score for the event candidate based upon the comparison between the event candidate and the portion of the context data related to the first ID node.

At step 4315, method 4300 proceeds with the server updating node management information based upon a type of the event candidate and the predictive score for the event candidate. As previously noted, exemplary node management information may be generally implemented as node management data (e.g., context data 560) and/or node management rules (e.g., rule data 3610) related to one or more of the node elements in the wireless node network. Thus, in a particular embodiment of method 4300, the node management information may comprise node management data maintained by the server where the node management data relates to one or more ID nodes within the wireless node network and includes context data (such as data 560 or data within databased 565) maintained by the server. Further embodiments may have the node management information comprising node management data maintained by the server and relating to the master node; a node management rule maintained by the server and defining one or more parameters of an operational profile for one or more ID nodes within the wireless node network; a node management rule maintained by the server and defining one or more parameters of an operational profile for the master node; a node management rule defining one or more parameters on how the master node identifies the event candidate; and a node management rule defining one or more parameters on how the master node simplifies a data feed between the master node and the server.

In still another embodiment of step 4315, method 4300 may implement the updating step with the server transforming the node management information to further indicate a correspondence between the node relevant activity and the updated status related to the first ID node. Such a transformation may be based upon the type of the event candidate and the predictive score for the event candidate. Stated another way, the transformed node management information may be updated, revised, changed, or otherwise altered to better account for the reported event candidate as measured with the predictive score or confidence ranking.

At step 4320, method 4300 proceeds with the server transmitting a management message to the master node where the management message provides at least a portion of the updated node management information to the master node as feedback to the master node. Such feedback is then used for enhanced management of one or more elements of the wireless node network. In a further embodiment of method 4300, the transmitting step may involve the server providing the portion of the updated node management information to the master node as management control input for the master node that alters how the master node operates or alters how the master node manages at least one of the ID nodes. In more detail, the portion of the updated node management information provided as the control input may include an updated node management rule refining how the master node identifies the event candidate, which may refine how the master node simplifies a data feed between the master node and the server (as previously discussed).

Those skilled in the art will appreciate that method 4300 as disclosed and explained above in various embodiments may be implemented on an exemplary master node (e.g., exemplary server 3400 in FIGS. 34 and 36) running one or more parts of the server control and management code 525 in conjunction with event candidate analytics engine code 3405 to perform steps of method 4300 as described above. Such code may be stored on a non-transitory computer-readable medium, such as memory storage 515 on server 3400. Thus, when executing such code, the server may be specially adapted to interact with other network devices (such as directly with master node 3410 as shown in FIG. 34 and indirectly with one or more ID nodes as shown in FIG. 34 via messages, commands, and instructions issued directly to master node 3410 as shown in FIG. 34) as the server's processing unit 500 is specially adapted to be operative to perform algorithmic operations or steps from the exemplary methods disclosed above, including method 4300 and variations of that method.

Figure 44:
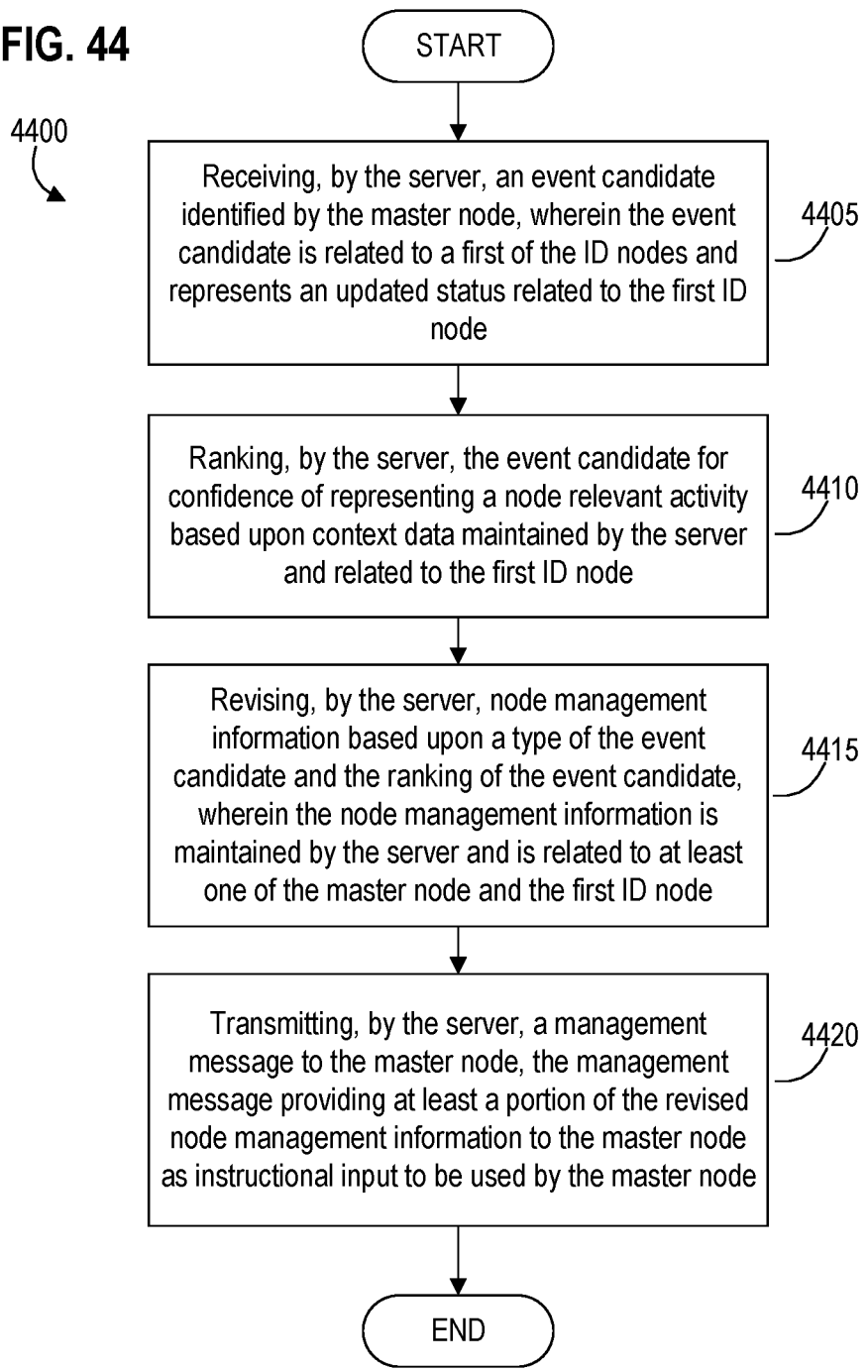
FIG. 44 is a flow diagram illustrating another exemplary method for enhanced management of a wireless node network based upon receipt of and processing of an event candidate in accordance with an embodiment of the invention.

FIG. 44 is a flow diagram illustrating another exemplary method for enhanced management of a wireless node network based upon receipt of and processing of an event candidate in accordance with another embodiment of the invention. Referring now to FIG. 44, method 4400 begins at step 4405 where the server receives an event candidate identified by the master node. The event candidate is related to a first of the ID nodes and represents an updated status related to the first ID node. Such an updated status may comprise a changed status of the first ID node, an unchanged status of the first ID node, or a summarized checkpoint status of the first ID node in further embodiments of method 4400.

At step 4410, method 4400 proceeds with the server ranking the event candidate for confidence of representing a node relevant activity based upon context data maintained by the server and related to the first ID node. In more detail, the step of ranking the event candidate may involve generating a predictive score based upon an evaluation of the event candidate against at least a portion of the context data related to the first ID node for confidence of representing the node relevant activity. Generally, node relevant activity may be activity having an impact on or relevant to node operations. For example, the node relevant activity may be an anticipated activity characterized by at least a portion of the context data related to the first ID node. In another example, the node relevant activity may be a new activity not presently characterized by a current state of the context data identified to be related to the first ID node.

At step 4415, method 4400 proceeds with the server revising node management information based upon a type of the event candidate and the ranking of the event candidate. Such node management information is maintained by the server and is related to at least one of the master node and the first ID node. More specifically, exemplary node management information may comprise at least one of (a) node management data maintained by the server that is related to one or more ID nodes within the wireless node network and where the node management data includes the context data maintained by the server and related to the first ID node; (b) node management data maintained by the server and related to the master node; (c) a node management rule maintained by the server and defining one or more parameters of an operational profile for one or more ID nodes within the wireless node network; (d) a node management rule maintained by the server and defining one or more parameters of an operational profile for the master node; (e) a node management rule defining one or more parameters on how the master node identifies the event candidate; and (f) a node management rule defining one or more parameters on how the master node simplifies a data feed between the master node and the server.

In a further embodiment of method 4400, the revising step may further comprise having the server transform the node management information to further indicate a correspondence between the node relevant activity and the updated status related to the first ID node. Such a transformation is based upon the type of the event candidate and the ranking of the event candidate. Examples of such node relevant activity may further include at least one of movement of at least one of the first ID node, the master node, and an object near the master node; exposure to a source of shielding that inhibits communication between the first ID node and the master node; exposure to a source of RF interference; and placement of the first ID node within a container.

At step 4420, method 4400 proceeds with the server transmitting a management message to the master node. The management message provides at least a portion of the revised node management information to the master node as instructional input to be used by the master node. Such instructional input may be used by the master node to control an operation of the master node or alter how the master node operates. In other examples, the instructional input may be used by the master node to cause at least one of the ID nodes to alter operation or alters how the master node manages at least one of the ID nodes. In more detail, the instructional input may include an updated node management rule defining how the master node identifies the event candidate or refining how the master node simplifies a data feed between the master node and the server.

Those skilled in the art will appreciate that method 4300 as disclosed and explained above in various embodiments may be implemented on an exemplary master node (e.g., exemplary server 3400 in FIGS. 34 and 36) running one or more parts of the server control and management code 525 in conjunction with event candidate analytics engine code 3405 to perform steps of method 4300 as described above. Such code may be stored on a non-transitory computer-readable medium, such as memory storage 515 on server 3400. Thus, when executing such code, the server may be specially adapted to interact with other network devices (such as directly with master node 3410 as shown in FIG. 34 and indirectly with one or more ID nodes as shown in FIG. 34 via messages, commands, and instructions issued directly to master node 3410 as shown in FIG. 34) as the server's processing unit 500 is specially adapted to be operative to perform algorithmic operations or steps from the exemplary methods disclosed above, including method 4300 and variations of that method.

In another apparatus embodiment, a further exemplary server apparatus for enhanced management of a wireless node network is described as follows. The network has at least a plurality of ID nodes and a master node in communication with the ID nodes. The server node apparatus in this embodiment generally comprises a server processing unit, a memory storage, a timer, and a network communication interface (e.g., such as exemplary server 3400 and the internal exemplary circuit components of this server apparatus as shown and described with respect to FIGS. 5 and 36). In more detail, the memory storage is coupled to the server processing unit and maintains at least event candidate analytics engine code, and node management information used to control one or more of the ID nodes and the master node as part of managing the wireless node network. The node management information stored on the memory storage includes at least context data describing a contextual environment of the ID nodes and rule data used for node control operations. The node management information stored on the memory storage includes at least context data describing a contextual environment of the ID nodes or master node (e.g., sources of anticipated RF interference or noise in an anticipated physical environment to be encountered by the ID nodes or the master node) and rule data used for node control operations. For example, the rule data may define at least one parameter of an operational profile (e.g., a power profile, alert profile, etc.) for one or more ID nodes within the wireless node network; may define one or more parameters on how the master node identifies the event candidate; or may define one or more parameters on how the master node simplifies a data feed coupling the master node and network interface of the server apparatus.

The network interface, like the memory storage, is coupled to the server processing unit, such as shown and described relative to FIGS. 5 and 36 relative to exemplary network interface 590. The network interface is operative to communicate with the master node over a network communication path, which allows the server to directly interact with the master node but does not allow the server to directly interact with the ID nodes. Instead, the server is able to indirectly interact with the ID nodes through the master node (acting as an intermediary that may pass along information or control input to one or more of the ID nodes).

When executing the event candidate analytics engine code maintained on the memory storage, the server processing unit in the server apparatus becomes the core of a specially adapted device and, thus, operative to interact with other elements of the wireless node network in novel and unconventional ways while providing enhanced management of the network in response to receiving an event candidate. In particular, the server processing unit, as adapted under the executing code stored in the memory storage, is operative to receive, via the network interface, an event candidate from the master node where the event candidate is identified by the master node as representing an updated status related to the first ID node. The updated status may comprise, in some further embodiments, a changed status of the first ID node, an unchanged status of the first ID node, or a summarized checkpoint status of the first ID node.

The server processing unit is then operative to generate a confidence rating for the event candidate based upon an evaluation of the event candidate against at least a portion of the context data (where the confidence rating indicates a degree to which the event candidate represents a node relevant activity). Such node relevant activity may be an anticipated activity characterized by at least a portion of the context data related to the first ID node or a new activity not characterized by a current state of the context data identified to be related to the first ID node. The node relevant activity may also comprise at least one of a detectable physical activity and a detectable electromagnetic activity. Further examples of node relevant activity may include movement of at least one of the first ID node, the master node, and an object near the master node; exposure to a source of shielding that inhibits communication between the first ID node and the master node; exposure to a source of RF interference; and placement of the first ID node within a container.

The server processing unit is also operative to update the node management information stored on the memory storage based upon a type of the event candidate and the confidence rating for the event candidate. To update the node management information, the server may, in a more detailed embodiment, be operative to transform the node management information to further indicate a correspondence between the node relevant activity and the updated status related to the first ID node. More specifically, the server processing unit may be operative to transform the node management information based upon the type of the event candidate and the confidence rating of the event candidate.

The server processing unit is also operative to cause the network interface to transmit a management message to the master node where the management message provides at least a portion of the updated node management information to the master node as instructional input to be used by the master node. In a further embodiment, the instructional input is used by the master node to cause at least one of the ID nodes to alter operation. In another embodiment, the instructional input may used by the master node to control an operation of the master node, alter how the master node operates, or alter how the master node manages at least one of the ID nodes. In other embodiments, the instructional input may comprise updated rule data defining how the master node identifies the event candidate or refine how the master node simplifies a data fee between the master node and the server.

Other embodiments may further leverage such an exemplary server apparatus as part of a system embodiment. For example, an embodiment of an enhanced node management system for a wireless node network having a plurality of ID nodes is described as follows. The system generally comprises a master node and a server in communication with the master node as part of the wireless node network. The master node is disposed as an element within the wireless node network that executes an event detection engine code to become operative to generate a report message. The report message transmits information regarding an event candidate representing an updated status related to a first of the ID nodes (such as a changed status of the first ID node, an unchanged status of the first ID node, or a summarized checkpoint status of the first ID node). The master node is also operated as part of the system to receive a management message from the server as a type of feedback in response to the generated report message. Such a management message, as described below, may include instructional or control input for the master node as the server learns and adaptively issues instructional feedback in response to the generated report message in order to enhance and improve how the system manages the network.

The server communicates with the master node over a first communication path, such as a network 105 as shown in FIG. 34. The server maintains node management information used to control one or more of the ID nodes and the master node as part of managing the wireless node network. Such node management information generally includes at least context data describing a contextual operating environment of the ID nodes and rule data used for node control operations of the ID nodes and the master node. In more detail, the rule data (also logically referred to as one or more node management rules) may define at least one parameter of an operational profile for one or more ID nodes and/or at least one parameter of an operational profile for the master node.

As the server executes an event candidate analytics engine code maintained on the server, the server becomes specially adapted to provide novel and unconventional operations as part of the system embodiment relative to how the system provides enhanced management of elements in the wireless node network. More specifically, when executing the event candidate analytics engine code, the server is operative to first receive the report message from the master node and extract the event candidate from the report message. The event candidate in the report message has been previously identified by the master node as representing the updated status related to the first ID node.

The server is further operative, as part of this system embodiment, to generate a confidence rating for the event candidate based upon an evaluation of the event candidate compared to at least a portion of the context data maintained by the server. The confidence rating indicates a degree to which the event candidate represents a node relevant activity. As previously noted, exemplary node relevant activity may comprise at least one of a detectable physical activity and a detectable electromagnetic activity. In another embodiment, the node relevant activity may be an anticipated activity characterized by at least a portion of the context data that is related to the first ID node. Further still, the node relevant activity may a new activity not characterized by the context data identified as related to the first ID node (such as when the confidence rating is below minimal point indicating the event candidate represents new node relevant activity previously uncharacterized by the system). In still more detail, exemplary node relevant activity may comprise node related movement (such as movement the first ID node, the master node, and/or an object near the master node); exposure to a source of shielding that inhibits communication between the first ID node and the master node (such as the node being placed next to structure that shields or otherwise reduces electromagnetic communications with the node); exposure to a source of RF interference (such as the node being near a motor that emits undesired electromagnetic interference to hinders or impairs communications with the node); and placement of the first ID node within a container (such as placement of an ID node within a metal ULD that no longer permits the ID node to communicate directly with an external master node).

The server is also operative, as part of this system embodiment, to update the node management information based upon a type of the event candidate and the confidence rating for the event candidate. As such, the server is the component of the system that essentially "learns" from the reported event candidate so that the server can provide quicker and more efficient management of components within the wireless node network. In a further embodiment, the server may update the node management information by transforming the node management information to further indicate a correspondence between the node relevant activity and the updated status related to the first ID node. In more detail, the server may transform the node management information based upon the type of the event candidate and the confidence rating of the event candidate.

The server in this system embodiment is further operative to transmit the management message to the master node (which is received by the master node in the system as discussed above). The management message provides at least a portion of the updated node management information to the master node as instructional input to be used by the master node. In a more detailed embodiment, the instructional input may used by the master node to control an operation of the master node, such as causing the master node to alter how the master node operates. In another embodiment, the instructional input from the server to the master node may have the master node cause at least one of the ID nodes to alter operation or, in even more detail, to cause the master node to send a second management message to at least one of the ID nodes where the second management message causes the one of the ID nodes to alter how the one of the ID nodes operates. For example, the portion of the revised node management information provided as the instructional input may comprise updated rule data (such as a new or revised node management rule or profile used by a node during operation).

A more detailed system embodiment for enhanced management of a wireless node network having a plurality of ID nodes is described as follows where the system handles multiple event candidates. The system generally comprises a server and a master node disposed within the wireless node network. The master node (such as master node 3410) is in communication with the server (such as server 3400) over a first communication path (such as network 105) in communication with the ID nodes (such as ID nodes 120a-120e) over a second communication path distinct from the first communication path.

The master node maintains first engine code (such as event detection engine code 3415) that may be executed on the master node to specially adapt the master node so that the master node becomes operative to provide, in conjunction with certain functionality of the server, novel and unconventional operations as part of this collective system embodiment. In particular, when the master node executes the first engine code, the master node becomes operative to detect a first updated status related to a first of the ID nodes (where the detected first status is represented by a first event candidate); detect a second updated status related to a second of the ID nodes (where the detected second status is represented by a second event candidate); transmit the first event candidate and the second event candidate to the server over the first communication path; and receive a management message in response after transmitting the first event candidate and the second event candidate to the server.

In this particular systems embodiment, the server maintains node management information used to control one or more of the ID nodes and the master node as part of managing the wireless node network. Such node management information comprises at least context data describing a contextual operating environment of the ID nodes and rule data used for node control operations of the ID nodes and the master node.

The server also maintains second engine code (such as event candidate analytics engine code 3400) that may be executed on the server so that the server becomes specially adapted and operative to provide, in conjunction with the above described functionality of the master node in this embodiment, novel and unconventional operations as part of this collective system embodiment. In more detail, when the server executes the second engine code, the server becomes operative to first receive the first event candidate and the second event candidate from the master node. The server is further operative to generate a first confidence rating for the first event candidate based upon an evaluation of the first event candidate compared to at least a first portion of the context data maintained by the server. The first confidence rating indicates a degree to which the first event candidate represents a node relevant activity. The server is also operative to generate a second confidence rating for the second event candidate based upon an evaluation of the second event candidate compared to at least a second portion of the context data maintained by the server, where the second confidence rating indicates a degree to which the second event candidate represents the node relevant activity.

The server is further operative to compare the first confidence rating and the second confidence rating to determine a combined confidence rating reflecting a degree to which the detected first change and the detected second change represent a pattern corresponding to the same node relevant activity; update the node management information based upon a type of the first event candidate, a type of the second event candidate, and the combined confidence rating; and then transmit the management message to the master node. Such a management message provides at least a portion of the updated node management information to the master node as instructional input to be used by the master node (e.g., updated context data describing a contextual operating environment of the ID nodes and/or updated rule data used for node control operations of the ID nodes and the master node).

Further Particular Embodiments

What follows below is a listing of exemplary sets of particular embodiments focusing on one or more aspects of the different embodiments described above. Each of the different sets for their respective particular embodiments effect improvements to the technology of improved and enhanced monitoring for node-specific event candidates related to elements of a wireless node network and managing components within the network based upon reported event candidates. These help improve overall operation of the network from improving the efficiency of how to monitor the wireless node network and how to responsively and actively manage different elements of the network in a learning mode. As such, within each further embodiment heading are numbered aspects describing a specific technological application of one or more nodes in such a wireless node network that improve or otherwise enhance these technical fields, as explicitly explained and supported by the disclosure above. Each numbered aspect appearing below a particular heading may make reference to other numbered aspects that appear below that particular heading in a dependent relationship.

Further Embodiment A—Systems, Apparatus, and Methods of Event Monitoring for an Event Candidate Related to an ID Node within a Wireless Node Network 1. A method for enhanced monitoring for an event candidate within a wireless node network having a plurality of ID nodes, a master node in communication with the ID nodes, and a server in communication with the master node, comprising the steps of: receiving, by the master node, a first advertising signal broadcast by a first of the ID nodes; receiving, by the master node, a second advertising signal broadcast by the first ID node after the first ID node broadcasts the first advertising signal; identifying, by the master node, the event candidate based upon a comparison of an observed parameter of the first advertising signal and the second advertising signal; and reporting, by the master node to the server, the event candidate relative to the first ID node.

2. The method of embodiment 1, wherein the reporting step further comprises simplifying, by the master node, a data feed about the first ID node by sending the event candidate to the server as summary information reflecting an observed change between the first advertising signal and the second advertising signal.

3. The method of embodiment 1, wherein the identifying step further comprises identifying, by the master node, a pattern between at least the first advertising signal and the second advertising signal based upon the observed parameter, wherein the pattern reflecting summarized information related to the first ID node as the event candidate.

4. The method of embodiment 1, wherein the observed parameter comprises an observed signal strength value as detected by the master node.

5. The method of embodiment 1, wherein the identifying step further comprises identifying, by the master node, an observed pattern between at least a first signal strength value of the first advertising signal and a second signal strength value of the second advertising signal, wherein the observed pattern reflecting summarized information related to the first ID node as the event candidate.

6. The method of embodiment 5, wherein the event candidate reported to the server avoids the need to update the server with information on all signals received by the master node from the first ID node.

7. The method of embodiment 1, wherein the step of identifying the event candidate comprises comparing the observed parameter of the second advertising signal to an average of the observed parameters of a set of prior advertising signals from the first ID node including the first advertising signal.

8. The method of embodiment 1, wherein the observed parameter comprises a received signal strength indicator (RSSI) reflecting a signal strength as detected by the master node; and wherein the step of identifying the event candidate comprises comparing a received signal strength indicator value of the second advertising signal to an average of a set of received signal strength indicator values of advertising signals from the first ID node broadcast prior to the second advertising signal.

9. The method of embodiment 8, wherein the averaged set of received signal strength indicator values of advertising signals from the first ID node broadcast prior to the second advertising signal comprises a moving average of the set of received signal strength indicator values of advertising signals from the first ID node broadcast within a moving window prior to the second advertising signal.

10. The method of embodiment 4, wherein the observed parameter comprises a shift in the observed signal strength value as received by the master node; and wherein the step of identifying the event candidate further comprises: detecting the shift in received signal strength value when comparing the first advertising signal and the second advertising signal; and identifying the event candidate as a shift event when the detected shift in received signal strength value is at least a threshold value.

11. The method of embodiment 4, wherein the observed parameter comprises an observed shift in the signal strength value as received by the master node; and wherein the step of identifying the event candidate and reporting the event candidate to the server further comprises: detecting a beginning shift in received signal strength value when the observed shift in the signal strength value between the received first advertising signal compared to the received second advertising signal is at least an initiating threshold value; receiving, by the master node, a subsequent advertising signal broadcast by the first ID node after the first ID node broadcasts the second advertising signal; detecting a continued shift in received signal strength value when the observed shift in the signal strength value between the received second advertising signal compared to the received subsequent advertising signal; and reporting, by the master node to the server, the event candidate as a shift event only after detecting the beginning shift and if the detected continued shift is less than a continued event threshold value.

12. The method of embodiment 11, wherein the reporting step comprises delaying transmission of the event candidate to the server by the master node until the detected continued shift based upon the observed signal strength value of the subsequent advertising signal is less than the continued event threshold value.

13. The method of embodiment 1, wherein the observed parameter comprises a detected time between successive advertising signals broadcast from the first ID node and as received by the master node.

14. The method of embodiment 13, wherein the step of identifying the event candidate comprises: detecting a time gap between the first advertising signal and the second advertising signal as the observed parameter; and identifying the event candidate when the detected time gap is less than a threshold time gap.

15. The method of embodiment 14, wherein the step of identifying the event candidate further comprises identifying the event candidate as an online event when the detected time gap is less than the threshold time gap and the master node receives at least one additional advertising signal broadcast by the first ID node within the threshold time gap after the second advertising signal.

16. The method of embodiment 15, wherein the step of identifying the event candidate as the online event occurs when (a) the detected time gap between the first advertising signal and the second advertising signal is less than the threshold time gap and (b) the master node has received at least a threshold number of advertising signals from the first ID node each of which are received by the master node within the threshold time gap from each other, wherein receipt of the first advertising signal and receipt of the second advertising signal are included in the threshold number of advertising signals received from the first ID node.

17. The method of embodiment 13, wherein the step of identifying the event candidate comprises identifying the event candidate as an offline event when (a) the detected time since the master node received the second advertising signal is greater than a threshold time gap and (b) the master node previously identified an online event related to signals from the first ID node including the first advertising signal and the second advertising signal.

18. The method of embodiment 1, wherein the step of identifying the event candidate further comprises identifying the event candidate as a sporadic event when the master node receives at least the first advertising signal and the second advertising signal but does not receive at least a threshold number of advertising signals from the first ID node within a defined period of time from when the master node receives the first advertising signal.

19. The method of embodiment 1, wherein the step of identifying the event candidate further comprises identifying the event candidate as a checkpoint event when a periodic reporting interval ends and based upon the comparison of the observed parameter of the first advertising signal and the second advertising signal.

20. The method of embodiment 19 further comprising: detecting, by the master node, an alert flag from the first ID node, the alert flag being part of at least one of the first advertising signal and the second advertising signal; and reducing the periodic reporting interval when the master node detects the alert flag.

21. The method of embodiment 20, wherein periodic reporting interval comprises a time period adjustable by the master node.

22. The method of embodiment 20, wherein periodic reporting interval comprises a number of signal receptions adjustable by the master node.

23. The method of embodiment 20, wherein the alert flag comprises a profile identifier indicating an alert profile being used by the first ID node, the alert profile for the first ID node being one of a plurality of operational profiles that govern advertising signal broadcasting operations by the first ID node.

24. The method of embodiment 19 further comprising resetting information collected based upon the first advertising signal and the second advertising signal after reporting the checkpoint event to the server by the master node for data reduction purposes on the master node.

25. The method of embodiment 1, wherein the observed parameter comprises an observed profile setting; and wherein the step of identifying the event candidate further comprises identifying the event candidate as a profile change event when the comparison indicates the observed profile setting of the second advertising signal is different than the observed profile setting of the first advertising signal.

26. The method of embodiment 25, wherein the observed profile setting relates to operation of the first ID node.

27. The method of embodiment 25, wherein the observed profile setting relates to operation of the master node.

28. The method of embodiment 1, wherein the observed parameter comprises an observed output power setting for the first ID node; and wherein the step of identifying the event candidate further comprises identifying the event candidate as a transmission power change event when the comparison indicates the observed output power setting related to the second advertising signal is different than the observed output power setting related to the first advertising signal.

29. The method of embodiment 1, wherein the observed parameter comprises sensor data gathered by a sensor on the first ID node; and wherein the step of identifying the event candidate further comprises identifying the event candidate as an environmental change event when the comparison indicates a second sensor data value included as part of the second advertising signal is different than a first sensor data value included as part of the first advertising signal.

30. The method of embodiment 1, wherein the observed parameter comprises sensor data gathered by at least one sensor on the first ID node; and wherein the step of identifying the event candidate further comprises identifying the event candidate as an environmental change event when the comparison indicates a second sensor data value included as part of the second advertising signal reflects a departure from a first sensor data value included as part of the first advertising signal, wherein the departure is more than a threshold difference.

31. The method of embodiment 1 further comprising receiving, by the master node, an adjustment response from the server based upon the event candidate.

32. The method of embodiment 31, wherein the adjustment response comprises an adjusted profile for at least one of the master node and the first ID node.

33. The method of embodiment 32, wherein the adjustment response comprises an adjusted profile for at least one of the other ID nodes.

34. The method of embodiment 31, wherein the adjustment response comprises updated context data reflecting the reported event candidate.

35. The method of embodiment 1 further comprising the steps of: receiving, by the master node, a third advertising signal broadcast by the first ID node after the first ID node broadcasts the second advertising signal; receiving, by the master node, a fourth advertising signal broadcast by the first ID node after the first ID node broadcasts the third advertising signal; generating, by the master node, a first checkpoint summary as a statistical representation of the first advertising signal and the second advertising signal; generating, by the master node, a second checkpoint summary as a statistical representation of the third advertising signal and the fourth advertising signal; and wherein the step of identifying the event candidate comprises identifying, by the master node, the event candidate based upon a comparison of an observed parameter for each of the first checkpoint summary and the second checkpoint summary.

36. A method for enhanced monitoring for an event candidate within a wireless node network having a plurality of ID nodes, a master node in communication with the ID nodes, and a server in communication with the master node, comprising the steps of: detecting, by the master node, a plurality of advertising signals broadcast by a first of the ID nodes over a time period; identifying, by the master node, the event candidate relative to the first ID node when an observed parameter of the advertising signals changes over the time period to reflect the event candidate; and reporting, by the master node to the server, the event candidate relative to the first ID node.

37. The method of embodiment 36, wherein the reporting step further comprises reducing, by the master node, data obtained by the master node about the first ID node by sending the event candidate to the server as summary information reflecting an observed change between the advertising signals.

38. The method of embodiment 36, wherein the observed parameter of the advertising signals comprises a summarized observed pattern between the advertising signals.

39. The method of embodiment 36, wherein the observed parameter comprises an observed signal strength value as detected by the master node.

40. The method of embodiment 39, wherein the event candidate reported to the server avoids the need to update the server with information about the signal strength value of each of the advertising signals received by the master node from the first ID node.

41. The method of embodiment 36, wherein the step of identifying the event candidate comprises comparing the observed parameter of a most recently detected one of the advertising signals to a moving average of the observed parameter of the previously detected ones of the advertising signals to identify the event candidate.

42. The method of embodiment 36, wherein the observed parameter comprises a received signal strength indicator (RSSI) reflecting a signal strength as detected by the master node; and wherein the step of identifying the event candidate comprises comparing a received signal strength indicator value of a most recently detected one of the advertising signals to a moving average of the received signal strength indicator values of the prior advertising signals within a prior moving window to identify the event candidate.

43. The method of embodiment 39, wherein the observed parameter comprises a shift in signal strength as detected by the master node; and wherein the step of identifying the event candidate further comprises identifying the event candidate as a shift event when the detected shift in the signal strength value for each of the advertising signals exceeds a threshold value.

44. The method of embodiment 39, wherein the observed parameter comprises an observed shift in the signal strength value as received by the master node; and wherein the step of identifying the event candidate and reporting the event candidate to the server further comprises: detecting a beginning shift in received signal strength value when the observed shift in the signal strength value between the plurality of advertising signals is at least an initiating threshold value; receiving, by the master node, at least one subsequent advertising signal broadcast by the first ID node after the first ID node broadcasts the plurality of advertising signals; detecting a continued shift in received signal strength value when the observed shift in the signal strength value between a last of the received plurality of advertising signals compared to the received subsequent advertising signal; and reporting, by the master node to the server, the event candidate as a shift event only after detecting the beginning shift and if the detected continued shift is less than a continued event threshold value.

45. The method of embodiment 36, wherein the step of identifying the event candidate further comprises identifying the event candidate as an online event when the master node has received at least a threshold number of the advertising signals from the first ID node within a threshold time gap between successive ones of the advertising signals.

46. The method of embodiment 36, wherein the step of identifying the event candidate further comprises identifying the event candidate as an offline event when (a) an elapsed time since the master node received a last of the advertising signals is greater than a threshold time gap and (b) the master node previously identified an online event related to at least a portion of the advertising signals from the first ID node.

47. The method of embodiment 36, wherein the step of identifying the event candidate further comprises identifying the event candidate as an offline event when the master node has received at least a first of the advertising signals but not a threshold number of successive ones of the advertising signals within a defined period of time from when the master node receives the first advertising signal.

48. The method of embodiment 36, wherein the step of identifying the event candidate further comprises identifying the event candidate as a checkpoint event when the time period ends and the master node detects at least one additional advertising signals broadcast by the first ID node.

49. The method of embodiment 48 further comprising: detecting, by the master node, an alert flag from the first ID node, the alert flag being part of at least one of the plurality of advertising signals; and reducing the time period when the master node detects the alert flag.

50. The method of embodiment 49, wherein the alert flag comprises a profile identifier indicating an alert profile being used by the first ID node, the alert profile for the first ID node being one of a plurality of operational profiles that govern advertising signal broadcasting operations by the first ID node.

51. The method of embodiment 36, wherein the observed parameter comprises an observed profile setting; and wherein the step of identifying the event candidate further comprises identifying the event candidate as a profile change event when the observed profile setting of the advertising signals changes from a first setting to a second setting over the time period.

52. The method of embodiment 51, wherein the observed profile setting relates to operation of the first ID node.

53. The method of embodiment 51, wherein the observed profile setting relates to operation of the master node.

54. The method of embodiment 36, wherein the step of identifying the event candidate further comprises identifying the event candidate as a transmission power change event when the observed parameter comprises an observed output power setting for the first ID node.

55. The method of embodiment 36, wherein the step of identifying the event candidate further comprises identifying the event candidate as an environmental change event when the observed parameter comprises sensor data gathered by a sensor on the first ID node.

56. The method of embodiment 36 further comprising receiving, by the master node, an adjustment response from the server based upon the event candidate.

57. The method of embodiment 56, wherein the adjustment response comprises an adjusted profile for at least one of the master node and the first ID node.

58. The method of embodiment 57, wherein the adjustment response comprises an adjusted profile for at least one of the other ID nodes.

59. The method of embodiment 56, wherein the adjustment response comprises updated context data reflecting the reported event candidate.

60. The method of embodiment 36, wherein the detecting step comprises detecting, by the master node, a first set of advertising signals broadcast by the first ID node and a second set of advertising signals broadcast by the first ID node after the first set of advertising signals, the first set of advertising signals and the second set of advertising signals being part of the plurality of advertising signals; and wherein the identifying step comprises: generating, by the master node, a first checkpoint summary as a statistical representation of the first set of advertising signals; generating, by the master node, a second checkpoint summary as a statistical representation of the second set of advertising signals; and identifying, by the master node, the event candidate based upon a comparison of an observed parameter for each of the first checkpoint summary and the second checkpoint summary.

86. A master node apparatus for enhanced monitoring for an event candidate within a wireless node network having a plurality of ID nodes and a server, the master node apparatus comprising: a node processing unit; a memory storage coupled to the node processing unit, the memory storage maintaining event detection engine code for execution by the node processing unit; a first communication interface coupled to the node processing unit and operative to communicate with at least a first of the ID nodes over a first communication path; a second communication interface coupled to the node processing unit and operative to communicate with the server over a second communication path; and wherein the node processing unit, when executing the event detection engine code maintained on the memory storage, is operative to: detect, via the first communication interface, a first advertising signal broadcast by the first ID node over the first communication path, detect, via the first communication interface, a second advertising signal broadcast by the first ID node over the first communication path after the first ID node broadcasts the first advertising signal, compare an observed parameter of each of the first advertising signal and the second advertising signal, identify the event candidate based upon the comparison of the observed parameter of each of the first advertising signal and the second advertising signal, and cause the second communication interface to report the identified event candidate to the server over the second communication path.

87. The master node apparatus of embodiment 86, wherein the second communication interface is operative to transmit a message to the server when reporting the identified event candidate, the message reflecting the identified event candidate as reduced monitoring overhead for the first ID node on the second communication path.

88. The master node apparatus of embodiment 87, wherein the message reflecting the identified event candidate comprises summary information reflecting an observed change between the first advertising signal and the second advertising signal.

89. The master node apparatus of embodiment 86, wherein the observed parameter comprises a signal strength value as detected by the node processing unit via the first communication interface.

90. The master node apparatus of embodiment 88, wherein the observed change comprises a shift in observed signal strength value between at least a first signal strength value of the first advertising signal and a second signal strength value of the second advertising signal, wherein the change reflecting summarized information related to the first ID node as the event candidate.

91. The master node apparatus of embodiment 86, wherein the node processing unit is operative to compare the observed parameter of each of the first advertising signal and the second advertising signal by being further operative to compare the observed parameter of the second advertising signal to an average of the observed parameters of a set of prior advertising signals from the first ID node including the first advertising signal.

92. The master node apparatus of embodiment 86, wherein the observed parameter comprises a received signal strength indicator as detected by the node processing unit; and wherein the node processing unit is operative to compare the observed parameter of each of the first advertising signal and the second advertising signal by being further operative to compare a received signal strength indicator value of the second advertising signal to an average of a set of received signal strength indicator values of prior advertising signals from the first ID node including the first advertising signal.

93. The master node apparatus of embodiment 92, wherein the averaged set of received signal strength indicator values of advertising signals from the first ID node broadcast prior to the second advertising signal comprises a moving average of the set of received signal strength indicator values of advertising signals from the first ID node broadcast within a window prior to the second advertising signal.

94. The master node apparatus of embodiment 89, wherein the node processing unit is operative to identify the event candidate by being further operative to: detect a shift in received signal strength value when comparing the signal strength value of first advertising signal and the signal strength value of the second advertising signal; and identify the event candidate as a shift event when the detected shift in received signal strength value is at least a threshold value.

95. The master node apparatus of embodiment 89, wherein the observed parameter comprises an observed shift in the signal strength value as detected by the node processing unit; and wherein the node processing unit is operative to identify the event candidate and cause the second communication interface to report the event candidate to the server by being further operative to: detect a beginning shift in received signal strength value when the observed shift in the signal strength value between the plurality of advertising signals is at least an initiating threshold value; detect, via the first communication interface, at least one subsequent advertising signal broadcast by the first ID node after the first ID node broadcasts the second advertising signal; detect, via the first communication interface, a continued shift in received signal strength value when the observed shift in the signal strength value between the second advertising signal compared to the received subsequent advertising signal; and cause the second communication interface to report the event candidate to the server as a shift event only after detecting the beginning shift and if the detected continued shift is less than a continued event threshold value.

96. The master node apparatus of embodiment 86, wherein the observed parameter comprises a time between successive advertising signals broadcast from the first ID node and as detected by the node processing unit via the first communication interface.

97. The master node apparatus of embodiment 96, wherein the node processing unit is operative to identify the event candidate by being further operative to detect a time gap between the first advertising signal and the second advertising signal and identify the event candidate when the detected time gap is less than a threshold time gap.

98. The master node apparatus of embodiment 97, wherein the node processing unit is operative to identify the event candidate as an online event when the detected time gap is less than the threshold time gap and the first communication interface detects at least one additional advertising signal broadcast by the first ID node within the threshold time gap after the second advertising signal.

99. The master node apparatus of embodiment 98, wherein the node processing unit is operative to identify the event candidate as the online event when (a) the detected time gap between the first advertising signal and the second advertising signal is less than the threshold time gap and (b) the first communication interface has detected at least a threshold number of advertising signals from the first ID node each of which are detected by the first communication interface within the threshold time gap from each other, wherein detection of the first advertising signal and detection of the second advertising signal are included in the threshold number of advertising signals from the first ID node.

100. The master node apparatus of embodiment 86, wherein the node processing unit is operative to identify the event candidate as an offline event when (a) the detected time since the first communication interface detected the second advertising signal is greater than a threshold time gap and (b) the node processing unit previously identified an online event related to signals from the first ID node including the first advertising signal and the second advertising signal.

101. The master node apparatus of embodiment 86, wherein the node processing unit is operative to identify the event candidate as a sporadic event when the first communication interface detects at least the first advertising signal and the second advertising signal but does not detect at least a threshold number of advertising signals from the first ID node within a defined period of time from when the first communication interface detects the first advertising signal.

102. The master node apparatus of embodiment 86, wherein the node processing unit is operative to identify the event candidate as a checkpoint event when a periodic reporting interval ends and based upon the comparison of the observed parameter of the first advertising signal and the second advertising signal.

103. The master node apparatus of embodiment 102, wherein the node processing unit is further operative to: detect an alert flag from the first ID node, the alert flag being part of a header for at least one of the first advertising signal and the second advertising signal; and reduce the periodic reporting interval upon detecting the alert flag.

104. The master node apparatus of embodiment 103, wherein periodic reporting interval comprises a time period adjustable by the node processing unit.

105. The master node apparatus of embodiment 103, wherein periodic reporting interval comprises a number of signal receptions adjustable by the node processing unit.

106. The master node apparatus of embodiment 103, wherein the alert flag comprises a profile identifier indicating an alert profile being used by the first ID node, the alert profile for the first ID node being one of a plurality of operational profiles that govern advertising signal broadcasting operations by the first ID node.

107. The master node apparatus of embodiment 86, wherein the node processing unit is further operative to delete gathered signal information stored on the memory storage after causing the second communication interface to report the checkpoint event to the server, the gathered signal information having been collected from the first advertising signal and from the second advertising signal and previously stored on the memory storage after detection.

108. The master node apparatus of embodiment 86, wherein the observed parameter comprises an observed profile setting; and wherein the node processing unit is operative to identify the event candidate as a profile change event when the comparison indicates the observed profile setting of the second advertising signal is different than the observed profile setting of the first advertising signal.

109. The master node apparatus of embodiment 86, wherein the observed parameter comprises an observed output power setting for the first ID node; and wherein the node processing unit is operative to identify the event candidate as a transmission power change event when the comparison by the node processing unit indicates the observed output power setting related to the second advertising signal is different than the observed output power setting related to the first advertising signal.

110. The master node apparatus of embodiment 86, wherein the observed parameter comprises sensor data gathered by a sensor on the first ID node; and wherein the node processing unit is operative to identify the event candidate as an environmental change event when the comparison by the node processing unit indicates a second sensor data value included as part of the second advertising signal differs more than a threshold amount when compared to a first sensor data value included as part of the first advertising signal.

111. The master node apparatus of embodiment 86, wherein the node processing unit is further operative to receive, via the second communication interface, an adjustment response from the server based upon the event candidate.

112. The master node apparatus of embodiment 111, wherein the adjustment response comprises an adjusted profile for at least one of the master node apparatus and the first ID node.

113. The master node apparatus of embodiment 112, wherein the adjustment response comprises an adjusted profile for at least one of the other ID nodes.

114. The master node apparatus of embodiment 111, wherein the adjustment response comprises updated context data reflecting the reported event candidate, wherein the updated context data is used by the node processing unit when managing the ID nodes.

115. The master node apparatus of embodiment 86, wherein the node processing unit is further operative to: detect, via the first communication interface, a third advertising signal broadcast by the first ID node over the first communication path after the first ID node broadcasts the second advertising signal; detect, via the first communication interface, a fourth advertising signal broadcast by the first ID node over the first communication path after the first ID node broadcasts the third advertising signal; generate a first checkpoint summary as a statistical representation of the first advertising signal and the second advertising signal; generate a second checkpoint summary as a statistical representation of the third advertising signal and the fourth advertising signal; compare the observed parameter for each of the first checkpoint summary and the second checkpoint summary; and wherein the node processing unit is operative to identify the event candidate based upon the comparison of the observed parameter for each of the first checkpoint summary and the second checkpoint summary.

116. A monitoring system that identifies an event candidate within a wireless node network, the system comprising: a server disposed at a top level within the wireless node network; an ID node disposed at a low level within the wireless node network; a master node disposed at a middle level within the wireless node network, wherein the master node further comprises a master node processing unit, a second memory storage coupled to the master node processing unit, the memory storage maintaining event detection engine code for execution by the master node processing unit, a first communication interface coupled to the master node processing unit and operative to communicate with the ID node over a first communication path, and a second communication interface coupled to the master node processing unit and operative to communicate with the server over a second communication path, wherein the first communication path is different from the second communication path; wherein the master node, when executing the event detection engine code on the master node processing unit, is operative to detect, with the first communication interface, a first advertising signal broadcast by the ID node over the first communication path, detect, with the first communication interface, a second advertising signal broadcast by the ID node over the first communication path after the ID node broadcasts the first advertising signal, compare an observed parameter of each of the first advertising signal and the second advertising signal, identify the event candidate based upon the comparison of the observed parameter of each of the first advertising signal and the second advertising signal, and cause the second communication interface to report the identified event candidate to the server over the second communication path.

117. The system of embodiment 116, wherein the second communication interface of the master node is operative to transmit a message to the server when reporting the identified event candidate, the message comprising summary information reflecting a monitored change relative to the ID node.

118. The system of embodiment 116, wherein the observed parameter comprises a signal strength value as detected by the master node via the first communication interface.

119. The system of embodiment 116, wherein the observed parameter comprises a signal strength value as detected by the master node via the first communication interface; and wherein the monitored change comprises a shift in signal strength value between at least a first signal strength value of the first advertising signal and a second signal strength value of the second advertising signal.

120. The system of embodiment 116, wherein the master node processing unit is operative to compare the observed parameter of each of the first advertising signal and the second advertising signal by being further operative to compare the observed parameter of the second advertising signal to an average of the observed parameters of a set of prior advertising signals from the ID node including the first advertising signal.

121. The system of embodiment 116, wherein the observed parameter comprises a received signal strength indicator (RSSI) reflecting a signal strength as detected by the master node; and wherein the master node processing unit is operative to compare the parameter of each of the first advertising signal and the second advertising signal by being further operative to compare a received signal strength indicator value of the second advertising signal to an average of a set of received signal strength indicator values of prior advertising signals from the ID node including the first advertising signal.

122. The system of embodiment 121, wherein the averaged set of received signal strength indicator values of advertising signals from the ID node broadcast prior to the second advertising signal comprises a moving average of the set of received signal strength indicator values of advertising signals from the ID node broadcast within a moving window prior to the second advertising signal.

123. The system of embodiment 118, wherein the observed parameter comprises a shift in the received signal strength value as detected by the master node; and wherein the master node processing unit is operative to identify the event candidate by being further operative to: detect the shift in received signal strength value when comparing the signal strength value of first advertising signal and the signal strength value of the second advertising signal; and identify the event candidate as a shift event when the detected shift in received signal strength value is at least a threshold value.

124. The system of embodiment 118, wherein the observed parameter comprises an observed shift in the signal strength value as detected by the master node; and wherein the master node is operative to identify the event candidate and cause reporting of the event candidate to the server by being further operative to: detect a beginning shift in received signal strength value when the observed shift in the signal strength value between the detected first advertising signal compared to the detected second advertising signal is at least an initiating threshold value; detect a subsequent advertising signal broadcast by the first ID node after the first ID node broadcasts the second advertising signal; identify a continued shift in received signal strength value when the observed shift in the signal strength value between the received second advertising signal compared to the received subsequent advertising signal; and cause the second communication interface to report the event candidate to the server as a shift event only after detecting the beginning shift and if the identified continued shift is less than a continued event threshold value.

125. The system of embodiment 116, wherein the observed parameter comprises a detected time between successive advertising signals broadcast from the ID node and as detected by the master node.

126. The system of embodiment 125, wherein the master node processing unit is operative to identify the event candidate by being further operative to detect a time gap between the first advertising signal and the second advertising signal as the observed parameter; and identify the event candidate when the detected time gap is less than a threshold time gap.

127. The system of embodiment 126, wherein the master node processing unit is operative to identify the event candidate as an online event when the detected time gap is less than the threshold time gap and the first communication interface of the master node detects at least one additional advertising signal broadcast by the ID node within the threshold time gap after the second advertising signal.

128. The system of embodiment 127, wherein the master node processing unit is operative to identify the event candidate as the online event when (a) the detected time gap between the first advertising signal and the second advertising signal is less than the threshold time gap and (b) the first communication interface of the master node has detected at least a threshold number of advertising signals from the ID node each of which are received by the master node within the threshold time gap from each other, wherein detection of the first advertising signal and detection of the second advertising signal are included in the threshold number of advertising signals from the ID node.

129. The system of embodiment 125, wherein the master node processing unit is operative to identify the event candidate as an offline event when (a) the detected time since the first communication interface detected the second advertising signal is greater than a threshold time gap and (b) the master node processing unit previously identified an online event related to signals from the ID node including the first advertising signal and the second advertising signal.

130. The system of embodiment 116, wherein the master node processing unit is operative to identify the event candidate as a sporadic event when the first communication interface detects at least the first advertising signal and the second advertising signal but does not detect at least a threshold number of advertising signals from the ID node within a defined period of time from when the master node detects the first advertising signal.

131. The system of embodiment 116, wherein the master node processing unit is operative to identify the event candidate as a checkpoint event when a periodic reporting interval ends and based upon the comparison of the observed parameter of the first advertising signal and the second advertising signal.

132. The system of embodiment 131, wherein the master node is further operative to: detect an alert flag from the first ID node, the alert flag being part of at least one of the detected first advertising signal and the detected second advertising signal; and reduce the periodic reporting interval when the master node detects the alert flag.

133. The system of embodiment 132, wherein periodic reporting interval comprises a time period adjustable by the master node.

134. The system of embodiment 132, wherein periodic reporting interval comprises a number of signal receptions adjustable by the master node.

135. The system of embodiment 132, wherein the alert flag comprises a profile identifier indicating an alert profile being used by the first ID node, the alert profile for the first ID node being one of a plurality of operational profiles that govern advertising signal broadcasting operations by the first ID node.

136. The system of embodiment 131, wherein the master node processing unit is further operative to delete gathered signal information stored on the memory storage after causing the second communication interface to report the checkpoint event to the server as the identified event candidate, the gathered signal information having been collected from the first advertising signal and from the second advertising signal and previously stored on the memory storage after detection.

137. The system of embodiment 116, wherein the observed parameter comprises an observed profile setting; and wherein the master node processing unit is operative to identify the event candidate as a profile change event when the comparison indicates the observed profile setting of the second advertising signal is different than the observed profile setting of the first advertising signal.

138. The system of embodiment 116, wherein the observed parameter comprises an observed output power setting for the first ID node; and wherein the master node processing unit is operative to identify the event candidate as a transmission power change event when the comparison by the node processing unit indicates the observed output power setting related to the second advertising signal is different than the observed output power setting related to the first advertising signal.

139. The system of embodiment 116, wherein the ID node further comprises a sensor operative to sense environmental data relative to a vicinity of the ID node and provide the environmental data to the master node as sensor data relative to the ID node, the sensor data collected over time being included in the first advertising signal and the second advertising signal; wherein the observed parameter comprises the sensor data collected by the sensor on the first ID node; and wherein the master node processing unit is operative to identify the event candidate as an environmental change event when the comparison by the master node processing unit indicates a second value of the sensor data included as part of the second advertising signal differs more than a threshold amount when compared to a first value of the sensor data included as part of the first advertising signal.

140. The system of embodiment 116, wherein the server is further operative to receive the event candidate from the master node, adjust node management information resident on the server based upon the event candidate, generate an adjustment response consistent with the adjusted node management information, and transmit the adjustment response to the master node.

141. The system of embodiment 140, wherein the master node processing unit is further operative to receive, via the second communication interface, the adjustment response from the server.

142. The system of embodiment 141, wherein the adjustment response comprises an adjusted profile for at least one of the master node apparatus and the ID node.

143. The system of embodiment 142, wherein the adjustment response comprises an adjusted profile for a second ID node operative to communicate with the master node.

144. The system of embodiment 141, wherein the adjustment response comprises updated context data reflecting the reported event candidate, wherein the updated context data is used by the master node processing unit when managing the ID node.

145. The system of embodiment 116, wherein the master node is further operative to: detect, with the first communication interface, a third advertising signal broadcast by the ID node over the first communication path after the ID node broadcasts the second advertising signal; detect, with the first communication interface, a fourth advertising signal broadcast by the ID node over the first communication path after the ID node broadcasts the third advertising signal; generate a first checkpoint summary as a statistical representation of the first advertising signal and the second advertising signal; generate a second checkpoint summary as a statistical representation of the third advertising signal and the fourth advertising signal; compare the observed parameter for each of the first checkpoint summary and the second checkpoint summary; and wherein the master node is further operative to identify the event candidate based upon the comparison of the observed parameter for each of the first checkpoint summary and the second checkpoint summary.

Further Embodiment B—Systems, Apparatus, and Methods of Event Monitoring for an Event Candidate within a Wireless Node Network Based Upon Sighting Events, Sporadic Events, and Benchmark Checkpoint Events 147. A method for enhanced monitoring for an event candidate within a wireless node network having a plurality of ID nodes, a master node in communication with the ID nodes, and a server in communication with the master node, comprising the steps of: (a) detecting, by the master node, a first signal broadcast by a first of the ID nodes; (b) identifying, by the master node, the event candidate as a first sighting event related to the first ID node when the master node detects the first signal; (c) generating, by the master node, event data representing the first sighting event once the master node identifies the first sighting event, wherein the event data representing the first sighting event comprises an identifier of the first ID node and further comprises at least timing information and observed signal strength information characterizing the first sighting event; (d) reporting, by the master node, the event data representing the first sighting event to the server upon generating the event data representing the first sighting event; (e) identifying, by the master node, the event candidate as a sporadic event related to the first ID node when (1) the master node has not identified a first benchmark checkpoint event related to the first ID node and (2) the master node has not detected a subsequent signal broadcast by the first ID node within a gap time period from when the master node detected a most recent signal from the first ID node; (f) generating, by the master node, event data representing the sporadic event if the master node identifies the sporadic event, wherein the event data representing the sporadic event comprises at least timing information and observed signal strength information characterizing the sporadic event; (g) reporting, by the master node, the event data representing the sporadic event to the server upon generating the event data representing the sporadic event; (h) determining, by the master node, a first average of an observed signal strength value for an initial number of subsequent successive signals broadcast from the first ID node and detected by the master node including the first signal as long as an elapsed time between each of the initial number of subsequent successive signals is less than the gap time; (i) identifying, by the master node, the event candidate as a first benchmark checkpoint event based upon the first average of observed signal strength value, the first benchmark checkpoint event representing a detected online state of the first ID node by the master node; (j) generating, by the master node, event data representing the first benchmark checkpoint event once the master node identifies the first benchmark checkpoint event, wherein the event data representing the first benchmark checkpoint event comprises at least timing information and observed signal strength information characterizing the first benchmark checkpoint event; and (k) reporting, by the master node, the event data representing the first benchmark checkpoint event to the server upon generating the event data representing the first benchmark checkpoint event.

148. The method of embodiment 147 further comprising the steps of: (1) identifying, by the master node, the event candidate as an offline event related to the first ID node when (1) the master node previously identified the first benchmark checkpoint event related to the first ID node and (2) the master node fails to detect a subsequent signal broadcast by the first ID node within the gap time period from when the master node detected a most recent of the subsequent successive signals from the first ID node; (m) generating, by the master node, event data representing the offline event once the master node identifies the offline event, wherein the event data representing the offline event comprises at least timing information and observed signal strength information characterizing the offline event; (n) reporting, by the master node, the event data representing the offline event to the server upon generating the event data representing the offline event.

149. The method of embodiment 147 further comprising the steps of: (o) identifying, by the master node, a new checkpoint event related to the first ID node when the master node determines a subsequent threshold number of moving averages of the observed signal strength value after the first benchmark checkpoint event; (p) detecting, by the master node, if a difference between the moving average of the observed signal strength value associated with the new checkpoint event and the moving average of the observed signal strength value associated with a previous benchmark checkpoint event at or above a threshold observed signal strength difference value; (q) identifying, by the master node, the event candidate as a shift event related to the first ID node when the detected difference in step (p) is at or above the threshold observed signal strength difference value; (r) generating, by the master node, event data representing the shift event related to the first ID node once the master node identifies the shift event, wherein the event data representing the shift event comprises at least timing information and observed signal strength information characterizing the shift event; and (s) reporting, by the master node, the event data representing the shift event to the server upon generating the event data representing the shift event.

150. The method of embodiment 147 further comprising the steps of: (t) identifying, by the master node, the event candidate as a new summary checkpoint event when the master node has successfully identified a threshold number of successive new checkpoint events; (u) generating, by the master node, event data representing the new summary checkpoint event after the master node successfully identified the threshold number of successive new checkpoint events, wherein the event data representing the new summary checkpoint event comprises at least timing information and observed signal strength information characterizing the new summary checkpoint event; and (v) reporting, by the master node, the event data representing the new summary checkpoint event to the server upon generating the event data representing the new summary checkpoint event.

151. The method of embodiment 147 further comprising the step of replacing event data representing the previous benchmark checkpoint event with the event data representing the new checkpoint event subsequent to step (p).

152. The method of embodiment 150 further comprising the step of replacing event data representing the previous benchmark checkpoint event with the event data representing the new summary checkpoint event subsequent to step (v).

153. The method of embodiment 147, wherein the event data for an event associated with the first ID node comprises information originally provided by the first ID node to the master node, the information further comprising at least a current battery voltage of the first ID node, a temperature value associated with the first ID node, and payload data provided by the first ID node.

154. The method of embodiment 147, wherein the timing information and observed signal strength information characterizing the first sighting event further comprises one or more from the group comprising a timestamp identifying when the master node detected the first signal and the observed signal strength value for the first signal.

155. The method of embodiment 147, wherein the timing information and observed signal strength information characterizing the sporadic event comprises one or more from the group comprising a timestamp on when the master node identified the sporadic event, an average of observed signal strength value for any signals broadcast by the first ID node and detected by the master node from the first signal and before the gap time period elapsed, and a count of the signals broadcast by the first ID node and detected by the master node from the first signal and before the gap time period elapsed.

156. The method of embodiment 147, wherein the timing information and observed signal strength information characterizing the first benchmark checkpoint event as an online event comprises one or more from the group comprising a timestamp on when the master node identified the first benchmark checkpoint event, the moving average of observed signal strength value at the first benchmark checkpoint event, and a count of the signals broadcast by the first ID node and detected by the master node between the identified first sighting event and the identified first benchmark checkpoint event.

157. The method of embodiment 148, wherein the timing information and observed signal strength information characterizing the offline event comprises one or more from the group comprising a timestamp on when the master node identified the offline event, the moving average of observed signal strength value between a most recent benchmark checkpoint event and when the master node identified the offline event, and a count of the signals broadcast by the first ID node and detected by the master node between the most recent benchmark checkpoint event and when the master node identified the offline event.

158. The method of embodiment 149, wherein the timing information and observed signal strength information characterizing the shift event comprises one or more from the group comprising a timestamp on when the master node identified the shift event, the moving average of observed signal strength value between a most recent benchmark checkpoint event and when the master node identified the shift event, and a count of the signals broadcast by the first ID node and detected by the master node between the most recent benchmark checkpoint event and when the master node identified the shift event.

159. The method of embodiment 150, wherein the timing information and observed signal strength information characterizing the new summary checkpoint event comprises a timestamp on when the master node identified the new summary checkpoint event, the moving average of observed signal strength value between a most recent benchmark checkpoint event and when the master node identified the new summary checkpoint event, and a count of the signals broadcast by the first ID node and detected by the master node between the most recent benchmark checkpoint event and when the master node identified the new summary checkpoint event.

160. The method of embodiment 147 further comprising: detecting, by the master node, an alert flag reflecting a status of the first ID node, the alert flag being part of the first signal; and increasing how frequently the master node updates the server with reports related to the first ID node if the master node detects the alert flag is set.

161. The method of embodiment 160, wherein the increasing step comprises decreasing, by the master node, the threshold number of detected signals from the first ID node needed to qualify as a checkpoint event if the master node detects the alert flag is set.

162. The method of embodiment 160, wherein the increasing step comprises decreasing, by the master node, the threshold number of previous checkpoint events needed for the master node to report the event data representing the new checkpoint event if the master node detects the alert flag is set.

163. The method of embodiment 160, wherein the alert flag comprises a profile identifier indicating an alert profile being used by the first ID node, the alert profile for the first ID node being one of a plurality of operational profiles that govern advertising signal broadcasting operations by the first ID node.

164. The method of embodiment 147 further comprising the steps of: identifying, by the master node, the event candidate as a profile change event related to the first ID node when the master node observes an altered profile setting of the first ID node as reflected in the subsequent successive signals broadcast from the first ID node; generating, by the master node, event data representing the profile change event once the master node identifies the profile change event, wherein the event data representing the profile change event comprises at least timing information and observed profile setting information characterizing the profile change event; and reporting, by the master node, the event data representing the profile change event to the server upon generating the event data representing the profile change event.

165. The method of embodiment 147 further comprising the steps of: identifying, by the master node, the event candidate as a profile change event related to the master node when the master node alters a profile setting of master node; generating, by the master node, event data representing the profile change event once the master node identifies the profile change event, wherein the event data representing the profile change event comprises at least timing information and observed profile setting information characterizing the profile change event; and reporting, by the master node, the event data representing the profile change event to the server upon generating the event data representing the profile change event.

166. A master node apparatus for enhanced monitoring for an event candidate within a wireless node network having a plurality of ID nodes and a server, the master node apparatus comprising: a node processing unit; a memory storage coupled to the node processing unit, the memory storage maintaining event detection engine code for execution by the node processing unit; a timer coupled to the node processing unit and operative to track an elapsed time after an initiating event; a first communication interface coupled to the node processing unit and operative to communicate with at least a first of the ID nodes over a first communication path; a second communication interface coupled to the node processing unit and operative to communicate with the server over a second communication path; and wherein the node processing unit, when executing the event detection engine code maintained on the memory storage, is operative to detect, via the first communication interface, a first signal broadcast by a first of the ID nodes over the first communication path, identify the event candidate as a first sighting event related to the first ID node when the master node detects the first signal, generate event data representing the first sighting event after identifying the first sighting event, wherein the event data representing the first sighting event comprises an identifier of the first ID node and further comprises at least timing information and observed signal strength information characterizing the first sighting event, cause the second communication interface to provide the event data representing the first sighting event to the server, monitor, via the first communication interface, for any in a series of successive signals broadcast by the first ID node within an event horizon for the first ID node after detecting the first signal, track, via the timer, the elapsed time between successive ones of the first signal and any in the series of successive signals broadcast by the first ID node, track a received signal strength indicator value for the first signal and any in the series of successive signals broadcast by the first ID node, identify the event candidate as a subsequent event related to the first node and within the event horizon beginning with the first sighting event, the subsequent event being identified based upon timing information related to the elapsed time tracked by the timer and based upon observed signal strength information as indicated by the received signal strength indicator value, generate event data representing the subsequent event as including at least the timing information related to the elapsed time tracked by the timer and based upon observed signal strength information as indicated by the received signal strength indicator value, and cause the second communication interface to provide the event data representing the subsequent event to the server.

167. The master node apparatus of embodiment 166, wherein the subsequent event comprises a sporadic event when: (1) the node processing unit has not identified a previous event within the event horizon to be a first benchmark checkpoint event representing detection of a threshold number of the signals within the series of successive signals broadcast by the first ID node; and (2) the node processing unit has not detected, via the first communication interface, a subsequent signal broadcast by the first ID node before the elapsed time exceeds a gap time period when tracked by the time from when the master node detected a most recent in the series of successive signals from the first ID node.

168. The master node apparatus of embodiment 166, wherein the subsequent event comprises a first benchmark checkpoint event representing a detected online state of the first ID node when the node processing unit detects, via the first communication interface, a threshold number of the signals within the series of successive signals broadcast by the first ID node and without the elapsed time between each of the threshold number of detected signals does not exceed a gap time period.

169. The master node apparatus of embodiment 166, wherein the subsequent event comprises an offline event when: (1) the node processing unit identified a previous event within the event horizon to be a first benchmark checkpoint event representing detection of a threshold number of the signals within the series of successive signals broadcast by the first ID node; and (2) the node processing unit has not detected a subsequent signal broadcast by the first ID node when the elapsed time from when a most recent of the signals in the series of successive signals from the first ID node exceeds a gap time period.

170. The master node apparatus of embodiment 166, wherein the subsequent event comprises a new checkpoint event when: (1) the node processing unit has identified a previous event within the event horizon to be a first benchmark checkpoint event, wherein the first benchmark checkpoint event representing detection of an earlier threshold number of the signals within the series of successive signals broadcast by the first ID node; and (2) the node processing unit detects a subsequent threshold number of the signals in the series of successive signals from the first ID node after identifying the first benchmark checkpoint event.

171. The master node apparatus of embodiment 170, wherein the node processing unit is further operative to generate the event data representing the subsequent event and cause the second communication interface to provide the event data representing the subsequent event to the server by being further operative to: generate the event data representing the new checkpoint event upon identifying a threshold number of previous checkpoint events; and cause the second communication interface to provide the event data representing the new checkpoint event to the server after identifying the threshold number of previous checkpoint events.

172. The master node apparatus of embodiment 166, wherein the subsequent event comprises a shift event when the node processing unit is further operative to detect at least a threshold difference between the received signal strength indicator value for the new checkpoint event and the received signal strength indicator value for a previous benchmark checkpoint event.

Further Embodiment C—Systems, Apparatus, and Methods of Time Gap Related Monitoring for an Event Candidate Related to an ID Node within a Wireless Node Network 61. A method for enhanced monitoring for an event candidate within a wireless node network having a plurality of ID nodes, a master node in communication with the ID nodes, and a server in communication with the master node, comprising the steps of: scanning, by the master node, for a first of the ID nodes; receiving, by the master node, a plurality of signals from the first ID node; detecting a plurality of time gaps between successive ones of the signals as the master node receives each of the signals; comparing each of the signals to identify a change in an observed parameter of each of the signals; identifying, by the master node, the event candidate when at least one of the identified change in the observed parameter and the detected time gaps matches an event criteria; and reporting, by the master node to the server, the event candidate relative to the first ID node.

62. The method of embodiment 61, wherein the reporting step further comprises reducing, by the master node, data obtained by the master node about the first ID node from the plurality of signals by sending the event candidate to the server as summary information reflecting the change in the parameter of the signals over time.

63. The method of embodiment 61, wherein the change in the observed parameter of the signals comprises a detected shift between the signals based upon the observed parameter over time.

64. The method of embodiment 63, wherein the observed parameter comprises an observed signal strength value as detected by the master node.

65. The method of embodiment 64, wherein the event candidate reported to the server avoids the need to update the server with information about the signal strength value of each of the signals received by the master node from the first ID node.

66. The method of embodiment 61, wherein the observed parameter comprises a received signal strength indicator (RSSI) reflecting a signal strength as detected by the master node; and wherein the comparing step comprises comparing a received signal strength indicator value of a most recently received one of the signals to a moving average of the received signal strength indicator values of a rolling window of the previously received ones of the signals to identify the event candidate.

67. The method of embodiment 64, wherein the event candidate comprises a shift event when the event criteria comprises a condition met when (a) the master node identifies the change in the observed parameter of the signals over time as reflecting a shift in the observed signal strength value for the signals over time and (b) the shift exceeds a threshold value.

68. The method of embodiment 64, wherein the observed parameter comprises an observed shift in the signal strength value as received by the master node; and wherein the step of identifying the event candidate and reporting the event candidate to the server further comprises: detecting a beginning shift in received signal strength value when the observed shift in the signal strength value between the received plurality of signals is at least an initiating threshold value; receiving, by the master node, at least one subsequent signal broadcast by the first ID node after the first ID node broadcasts the received plurality of signals; detecting a continued shift in received signal strength value when the observed shift in the signal strength value between a last of the received plurality of signals compared to the received subsequent signal; and reporting, by the master node to the server, the event candidate as a shift event only after detecting the beginning shift and if the detected continued shift is less than a continued event threshold value.

69. The method of embodiment 61, wherein the event candidate comprises an online event when the event criteria comprises a condition met when (a) the master node has received at least a threshold number of successive ones of the signals from the first node and (b) the detected time gaps between the successive ones of the signals do not exceed a threshold time gap.

70. The method of embodiment 61, wherein the event candidate comprises an offline event when the event criteria comprises a condition met when (a) an elapsed time since the master node received a last of the signals is greater than a threshold time gap and (b) the master node previously identified an online event related to the rest of the signals received by the master node from the first ID node.

71. The method of embodiment 61, wherein the event candidate comprises a sporadic event when the event criteria comprises a condition met when the master node has received at least a first of the signals but not a threshold number of successive ones of the signals within a defined period of time from when the master node detects the first signal.

72. The method of embodiment 61, wherein the event candidate comprises a checkpoint event when the event criteria comprises a condition met when a periodic reporting interval ends and the master node detects at least one additional signal broadcast by the first ID node.

73. The method of embodiment 72 further comprising: detecting, by the master node, an alert flag reflecting a status of the first ID node, the alert flag being part of at least one of the received plurality of signals; and reducing the periodic reporting interval when the master node detects the alert flag.

74. The method of embodiment 73, wherein periodic reporting interval comprises a time period adjustable by the master node.

75. The method of embodiment 73, wherein periodic reporting interval comprises a number of signal receptions adjustable by the master node.

76. The method of embodiment 73, wherein the alert flag comprises a profile identifier indicating an alert profile being used by the first ID node, the alert profile for the first ID node being one of a plurality of operational profiles that govern advertising signal broadcasting operations by the first ID node.

77. The method of embodiment 72 further comprising resetting information collected by the master node based upon the signals after reporting the checkpoint event as the event candidate to the server to conserve use of memory on the master node.

78. The method of embodiment 61 further comprising: identifying a profile change event when the master node detects a changed profile setting of the signals over time; and reporting, by the master node to the server, the profile change event relative to the first ID node.

79. The method of embodiment 61 further comprising identifying a transmission power change event when the master node detects a changed transmission power setting of the signals over time; and reporting, by the master node to the server, the transmission power change event relative to the first ID node.

80. The method of embodiment 61 further comprising: identifying an environmental change event when the master node detects a change in sensor data gathered from the first ID node via the signals over time; and reporting, by the master node to the server, the environmental change event relative to the first ID node.

81. The method of embodiment 61 further comprising receiving, by the master node, an adjustment response from the server based upon the event candidate.

82. The method of embodiment 81, wherein the adjustment response comprises an adjusted profile for at least one of the master node and the first ID node.

83. The method of embodiment 82, wherein the adjustment response comprises an adjusted profile for at least one of the other ID nodes.

84. The method of embodiment 81, wherein the adjustment response comprises updated context data reflecting the reported event candidate.

85. The method of embodiment 61, wherein the receiving step comprises receiving, by the master node, a first set of advertising signals broadcast by the first ID node and a second set of advertising signals broadcast by the first ID node after the first set of advertising signals, the first set of advertising signals and the second set of advertising signals being part of the plurality of signals received by the master node from the first ID node; further comprising the steps of: generating, by the master node, a first checkpoint summary as a statistical representation of the first set of advertising signals; generating, by the master node, a second checkpoint summary as a statistical representation of the second set of advertising signals; and wherein the comparing step comprises comparing an observed parameter for each of the first checkpoint summary and the second checkpoint summary to identify the change.

Further Embodiment D—Systems, Apparatus, and Methods of Enhanced Monitoring for an Event Candidate Associated with Cycling Power of an ID Node within a Wireless Node Network 146. A method for enhanced monitoring for an event candidate within a wireless node network having a plurality of ID nodes, a master node in communication with the ID nodes, and a server in communication with the master node, comprising the steps of: receiving, by the master node, a first plurality of advertising signals broadcast by a first of the ID nodes; detecting, by the master node, if the first ID node is broadcasting with a cycling broadcast RF power profile setting based upon at least one of the first plurality of advertising signals, the cycling broadcast RF power profile setting defining a cycle period over which the first ID node alters how it broadcasts at different RF power levels; receiving, by the master node, a second plurality of advertising signals broadcast by the first ID node after the first ID node broadcasts the first plurality of advertising signals, wherein the second plurality of advertising signals are broadcast with the cycling broadcast RF power profile setting; determining, by the master node, a first average of an observed parameter for the first plurality of advertising signals within a first window of time commensurate with the cycle period; determining, by the master node, a second average of the observed parameter for the second plurality of advertising signals within a second window of time commensurate with the cycle period; identifying, by the master node, the event candidate when a comparison of the first average and the second average indicates an observed change relative to the first ID node; and reporting, by the master node to the server, the event candidate relative to the first ID node.

Additional embodiments may include a master node programmed to be operative or configured to perform the steps from embodiment 146 recited above. Additionally, a system embodiment may include such a programmed master node and the first ID node as described above. Still further, another system may include a server, the programmed master node, and the first ID node described in the embodiment of 146 as interacting in a manner that provide for monitoring with respect to the cycling broadcast RF power profile setting for the ID node.

Further Embodiment E—Systems, Apparatus, and Methods of Enhanced Checkpoint Summary Based Monitoring for an Event Candidate Related to an ID Node within a Wireless Node Network 239. A method for enhanced monitoring for an event candidate within a wireless node network having a plurality of ID nodes, a master node in communication with the ID nodes, and a server in communication with the master node, comprising the steps of: activating, by the master node, a monitoring mode of operation that listens for one or more broadcast signals emitted from any of the ID nodes without prompting the ID nodes for transmission of the one or more broadcast signals from the ID nodes; receiving, by the master node, a first advertising signal broadcast by a first of the ID nodes; recording, by the master node, an observed parameter related to the received first advertising signal broadcast by the first ID node; successively receiving, by the master node, a subsequent group of advertising signals broadcast by the first ID node; recording, by the master node, the observed parameter related to each of the successively received subsequent group of advertising signals broadcast by the first ID node; generating, by the master node, a first checkpoint summary representing a first set of advertising signals comprising the received first advertising signal and the successively received subsequent group of advertising signals, the first checkpoint summary comprising a summary observed parameter generated based upon the recorded observed parameter related to the received first advertising signal broadcast and the recorded observed parameter related to each of the successively received subsequent group of advertising signals; and transmitting, by the master node, the first checkpoint summary to the server as the event candidate relative to the first ID node.

240. The method of embodiment 239, wherein the transmitting step further comprises simplifying, by the master node, a data feed for the server related to a status of the first ID node by sending the event candidate to the server indicating a summarized monitored status of the first node based upon the summary observed parameter of the first checkpoint summary.

241. The method of embodiment 239, wherein the summary observed parameter for the first checkpoint summary comprises a statistical representation of the observed signal strength values for the first set of advertising signals.

242. The method of embodiment 241, wherein the statistical representation of the observed signal strength values comprises one from a group consisting of a mean, a median, an average, a moving average over a subset window of advertising signals, a moving average over a sliding time window, or a weighted average.

243. The method of embodiment 239, wherein each of the observed parameter related to the received first advertising signal and the observed parameter related to each of the successively received subsequent group of advertising signals comprises a received signal strength indicator (RSSI) value reflecting a signal strength as detected by the master node.

244. The method of embodiment 239, wherein each of the observed parameter related to the received first advertising signal and the observed parameter related to each of the successively received subsequent group of advertising signals comprises one of a plurality of sensor data captured by the master node related to the first ID node.

245. The method of embodiment 239, wherein the transmitting step further comprises transmitting, by the master node, the first checkpoint summary to the server as the event candidate relative to the first ID node when the first checkpoint summary meets a periodic reporting interval criteria relative to one or more prior checkpoint summaries generated by the master node.

246. The method of embodiment 245, wherein the transmitting step further comprises: incrementing, by the master node, a checkpoint count in memory of the master node upon generating the first checkpoint summary; comparing, by the master node, the incremented checkpoint count to the periodic reporting interval criteria relative to one or more prior checkpoint summaries generated by the master node; and reporting, by the master node, the first checkpoint summary to the server as the event candidate when the incremented checkpoint count matches the periodic reporting interval criteria.

247. The method of embodiment 246, wherein the periodic reporting interval criteria identifies a threshold number of generated checkpoint summaries as a reporting condition for reporting the first checkpoint summary to the server as the event candidate.

248. The method of embodiment 245 further comprising: detecting, by the master node, a profile identifier from the first ID node, the profile identifier being part of at least one of the received first advertising signal and the successively received subsequent group of advertising signals; and altering, by the master node, the periodic reporting interval criteria based upon an alert profile corresponding to the profile identifier, the alert profile comprising a plurality of node management rules related to monitoring the first ID node and reporting to the server.

249. The method of embodiment 246 further comprising adjusting, by the master node, the summary observed parameter reported to the server as part of the event candidate to statistically summarize the first checkpoint summary with at least one previous checkpoint summary generated by the master node and not reported to the server.

250. The method of embodiment 239 further comprising comparing a previous summary observed parameter for a previous checkpoint summary to the summary observed parameter for the first checkpoint summary to identify a change in a status of the first ID node; and transmitting the first checkpoint summary to the server as the event candidate when the comparison identifies the change in the status of the first ID node.

251. The method of embodiment 250, wherein the change in the status of the first ID node comprises when the previous summary observed parameter for the previous checkpoint summary is different than the summary observed parameter for the first checkpoint summary by more than a threshold level.

252. The method of embodiment 250, wherein the change in the status of the first ID node identifies the first checkpoint summary as at least one node event from the group consisting of a sporadic event indicating an abbreviated event horizon for the first ID node, an online event indicating a beginning of a monitored event horizon for the first ID node, a shift event indicating at least a threshold difference between the previous summary observed parameter for the previous checkpoint summary and the summary observed parameter for the first checkpoint summary, and an offline event indicating an end of the monitored event horizon for the first ID node.

253. The method of embodiment 250, wherein the change in the status of the first ID node identifies the first checkpoint summary as at least one node event from the group consisting of a profile change event indicating the first ID node changed a profile setting during a monitored event horizon for the first ID node, a transmission power change event indicating the first ID node changed an output power setting during the monitored event horizon, and an environmental change event indicating a change in sensor data captured by the first ID node during the monitored event horizon.

254. A monitoring system that identifies an event candidate within a wireless node network, the system comprising: a server disposed at a top level of the wireless node network; an ID node disposed at a low level of the wireless node network; a master node disposed at a middle level of the wireless node network, wherein the master node further comprises a master node processing unit, a memory storage coupled to the master node processing unit, the memory storage maintaining event detection engine code for execution by the master node processing unit, a first communication interface coupled to the master node processing unit and operative to communicate with the ID node over a first communication path, and a second communication interface coupled to the master node processing unit and operative to communicate with the server over a second communication path, wherein the first communication path is different from the second communication path;

wherein the master node, when executing the event detection engine code on the master node processing unit, is operative to cause the first communication interface to listen for one or more broadcast signals emitted from the ID node without prompting the ID node for transmission of the one or more broadcast signals from the ID node, detect, via the first communication interface, a first advertising signal broadcast by the ID node, record a first observed parameter in the memory storage based upon the detected first advertising signal broadcast by the ID node, successively detect, via the first communication interface, a subsequent group of advertising signals broadcast by the ID node, record a subsequent group of observed parameters where each are based upon a respective one of the successively received subsequent group of advertising signals broadcast by the ID node, generate a first checkpoint summary representing a first set of advertising signals comprising the detected first advertising signal and the successively detected subsequent group of advertising signals, the first checkpoint summary comprising a summary observed parameter generated based upon the recorded observed parameter based upon the detected first advertising signal broadcast and each of the recorded observed parameters respectively based upon the successively detected subsequent group of advertising signals; and cause the second communication interface to report the first checkpoint summary over the second communication path to the server as the event candidate relative to the ID node.

255. The system of embodiment 254, wherein the master node processing unit is further operative to generate the summary observed parameter for the first checkpoint summary as a statistical representation of the observed signal strength values for the first set of advertising signals broadcast by the ID node.

256. The system of embodiment 255, wherein the statistical representation of the observed signal strength values comprises one from a group consisting of a mean, a median, an average, a moving average over a subset window of advertising signals, a moving average over a sliding time window, or a weighted average.

257. The system of embodiment 254, wherein each of the first observed parameter and the subsequent group of observed parameters comprises a received signal strength indicator (RSSI) value reflecting a signal strength as detected by the master node.

258. The system of embodiment 254, wherein each of the first observed parameter and the subsequent group of observed parameters comprises one of a plurality of sensor data captured by the master node related to the ID node.

259. The system of embodiment 254, wherein the master node processing unit is operative to cause the second communication interface to report the first checkpoint summary to the server by being further operative to: determine if the first checkpoint summary meets a periodic reporting interval criteria relative to one or more prior checkpoint summaries generated by the master node and stored within the memory storage of the master node; and cause the second communication interface to transmit the first checkpoint summary to the server as the event candidate only when the first checkpoint summary meets the periodic reporting interval criteria.

260. The system of embodiment 254, wherein the master node processing unit is operative to cause the second communication interface to report the first checkpoint summary to the server by being further operative to: increment a checkpoint count upon generating the first checkpoint summary; compare the incremented checkpoint count to a periodic reporting interval criteria relative to one or more prior checkpoint summaries generated by the master node; and cause the second communication interface to transmit the first checkpoint summary to the server as the event candidate only when the incremented checkpoint count matches the periodic reporting interval criteria.

261. The system of embodiment 260, wherein the periodic reporting interval criteria identifies a threshold number of generated checkpoint summaries as a reporting condition for reporting the first checkpoint summary to the server as the event candidate.

262. The system of embodiment 260, wherein the master node processing unit is further operative to: detect, via the first communication interface, a profile identifier from the ID node, the profile identifier being part of at least one of the detected first advertising signal and the successively detected subsequent group of advertising signals; and alter the periodic reporting interval criteria based upon an alert profile corresponding to the profile identifier, the alert profile comprising a plurality of node management rules related to monitoring the ID node and reporting to the server.

263. The system of embodiment 254, wherein the master node processing unit is further operative to adjust the summary observed parameter to statistically summarize the first checkpoint summary with at least one previous checkpoint summary generated by the master node and not reported to the server.

264. The system of embodiment 254, wherein the master node processing unit is further operative to: access the memory storage for a previous summary observed parameter for a previous checkpoint summary; compare the previous summary observed parameter to the summary observed parameter for the first checkpoint summary to identify a change in a status of the ID node; and wherein the second communication interface transmits the first checkpoint summary to the server as the event candidate if the master node processing unit identifies the change in the status of the ID node by comparing the previous summary observed parameter to the summary observed parameter for the first checkpoint summary.

265. The system of embodiment 264, wherein the change in the status of the ID node comprises a monitored node condition when the previous summary observed parameter for the previous checkpoint summary is different than the summary observed parameter for the first checkpoint summary by more than a threshold level.

266. The system of embodiment 264, wherein the change in the status of the ID node identifies the first checkpoint summary as at least one node event from the group consisting of a sporadic event indicating an abbreviated event horizon for the ID node, an online event indicating a beginning of a monitored event horizon for the ID node, a shift event indicating at least a threshold difference between the previous summary observed parameter for the previous checkpoint summary and the summary observed parameter for the first checkpoint summary, and an offline event indicating an end of the monitored event horizon for the ID node.

267. The system of embodiment 264, wherein the change in the status of the ID node identifies the first checkpoint summary as at least one node event from the group consisting of a profile change event indicating the ID node changed a profile setting during a monitored event horizon for the ID node, a transmission power change event indicating the ID node changed an output power setting during the monitored event horizon, and an environmental change event indicating a change in sensor data captured by the ID node during the monitored event horizon.

268. The system of embodiment 254, wherein the server is operative to receive the event candidate from the master node and transmit a responsive adjustment response to the master node based upon the event candidate, the responsive adjustment response comprising at least one of an adjusted profile for the master node, an adjusted profile for the ID node, and updated context data reflecting the identified event candidate.

Further Embodiment F—Systems, Apparatus, and Methods of Enhanced Management of a Wireless Node Network Based Upon an Event Candidate Related to Elements of the Wireless Node Network 1. A method for enhanced management of a wireless node network having a plurality of ID nodes, a master node in communication with the ID nodes, and a server in communication with the master node, the method comprising: receiving, by the server, an event candidate identified by the master node, wherein the event candidate is related to a first of the ID nodes and represents an updated status related to the first ID node; generating, by the server, a predictive score for the event candidate based upon context data maintained by the server and related to the first ID node, wherein the predictive score focuses on whether the event candidate corresponds to a node related activity; updating, by the server, node management information based upon a type of the event candidate and the predictive score for the event candidate; and transmitting, by the server, a management message to the master node, the management message providing at least a portion of the updated node management information to the master node as feedback to the master node used for enhanced management of one or more elements of the wireless node network.

2. The method of embodiment 1, wherein the event candidate is related to a subset of the ID nodes including the first ID node.

3. The method of embodiment 1, wherein the updated status related to the first ID node comprises a shift in signal strength in what is broadcast by the first ID node.

4. The method of embodiment 1, wherein the step of generating the predictive score for the event candidate further comprises generating the predictive score based upon an evaluation of the event candidate against at least a portion of the context data related to the first ID node.

5. The method of embodiment 4, wherein the portion of the context data related to the first ID node comprises scan data related to the first ID node.

6. The method of embodiment 4, wherein the portion of the context data related to the first ID node comprises scan data related to the master node.

7. The method of embodiment 4, wherein the portion of the context data related to the first ID node comprises scan data related to a second master node in the wireless node network.

8. The method of embodiment 4, wherein the portion of the context data related to the first ID node comprises scan data related to a second of the ID nodes.

9. The method of embodiment 4, wherein the portion of the context data related to the first ID node comprises historic data related to the first ID node.

10. The method of embodiment 4, wherein the portion of the context data related to the first ID node comprises historic data related to the master node.

11. The method of embodiment 4, wherein the portion of the context data related to the first ID node comprises historic data related to a second master node in the wireless node network.

12. The method of embodiment 4, wherein the portion of the context data related to the first ID node comprises historic data related to a second of the ID nodes.

13. The method of embodiment 4, wherein the portion of the context data related to the first ID node comprises shipment data related to an item being shipped with the first ID node.

14. The method of embodiment 4, wherein the portion of the context data related to the first ID node comprises layout data related to an anticipated environment for the first ID node.

15. The method of embodiment 4, wherein the portion of the context data related to the first ID node comprises RF data related to an anticipated signal path environment for the first ID node.

16. The method of embodiment 4, wherein the portion of the context data related to the first ID node comprises third party data originating from outside the wireless node network and relating to an anticipated physical condition to be faced by the first ID node.

17. The method of embodiment 1, wherein the step of generating the predictive score for the event candidate further comprises: identifying, by the server, a pattern match between the event candidate and at least a portion of the context data related to the first ID node; and assigning, by the server, a rating as the predictive score for the event candidate based upon the extent the server identifies the pattern match between the event candidate and the portion of the context data related to the first ID node.

18. The method of embodiment 1, wherein the step of generating the predictive score for the event candidate further comprises: comparing, by the server, the event candidate to at least a portion of the context data related to the first ID node; and determining, by the server, a probability rank as the predictive score for the event candidate based upon the comparison between the event candidate and the portion of the context data related to the first ID node.

19. The method of embodiment 1, wherein the predictive score comprises a confidence factor related to whether the event candidate corresponds to the node relevant activity.

20. The method of embodiment 1, wherein the node relevant activity comprises at least one of a detectable physical activity and a detectable electromagnetic activity.

21. The method of embodiment 1, wherein the node relevant activity comprises an anticipated activity characterized by at least a portion of the context data related to the first ID node.

22. The method of embodiment 1, wherein the node relevant activity comprises a new activity not already characterized by the context data related to the first ID node.

23. The method of embodiment 1, wherein the node management information comprises node management data maintained by the server, the node management data relating to one or more ID nodes within the wireless node network, the node management data including the context data maintained by the server and related to the first ID node.

24. The method of embodiment 1, wherein the node management information comprises node management data maintained by the server, the node management data relating to the master node.

25. The method of embodiment 1, wherein the node management information comprises a node management rule maintained by the server, the node management rule defining one or more parameters of an operational profile for one or more ID nodes within the wireless node network.

26. The method of embodiment 1, wherein the node management information comprises a node management rule maintained by the server, the node management rule defining one or more parameters of an operational profile for the master node.

27. The method of embodiment 1, wherein the node management information comprises a node management rule defining one or more parameters on how the master node identifies the event candidate.

28. The method of embodiment 1, wherein the node management information comprises a node management rule defining one or more parameters on how the master node simplifies a data feed between the master node and the server.

29. The method of embodiment 1, wherein the updating step further comprises transforming, by the server, the node management information to further indicate a correspondence between the node related activity and the updated status related to the first ID node, the transformation being based upon the type of the event candidate and the predictive score for the event candidate.

30. The method of embodiment 1, wherein the node related activity comprises movement of at least one of the first ID node, the master node, and an object near the master node.

31. The method of embodiment 1, wherein the node related activity comprises exposure to a source of RF interference.

32. The method of embodiment 1, wherein the node related activity comprises placement of the first ID node within a container.

33. The method of embodiment 1, wherein the transmitting step further comprises providing, by the server, the portion of the updated node management information to the master node as management control input for the master node, wherein the control input alters how the master node operates.

34. The method of embodiment 1, wherein the transmitting step further comprises providing, by the server, the portion of the updated node management information to the master node as management control input for the master node, wherein the control input alters how the master node manages at least one of the ID nodes.

35. The method of embodiment 33, wherein the portion of the updated node management information provided as the management control input comprises an updated node management rule refining how the master node identifies the event candidate.

36. The method of embodiment 33, wherein the portion of the updated node management information provided as the management control input comprises an updated node management rule refining how the master node simplifies a data feed between the master node and the server.

37. The method of embodiment 1, wherein the updated status comprises a changed status of the first ID node.

38. The method of embodiment 1, wherein the updated status comprises an unchanged status of the first ID node.

39. The method of embodiment 1, wherein the updated status comprises a summarized checkpoint status of the first ID node.

40. A method for enhanced management of a wireless node network having a plurality of ID nodes, a master node in communication with the ID nodes, and a server in communication with the master node, the method comprising: receiving, by the server, an event candidate identified by the master node, wherein the event candidate is related to a first of the ID nodes and represents an updated status related to the first ID node; ranking, by the server, the event candidate for confidence of representing a node relevant activity based upon context data maintained by the server and related to the first ID node; revising, by the server, node management information based upon a type of the event candidate and the ranking of the event candidate, wherein the node management information is maintained by the server and is related to at least one of the master node and the first ID node; and transmitting, by the server, a management message to the master node, the management message providing at least a portion of the revised node management information to the master node as instructional input to be used by the master node.

41. The method of embodiment 40, wherein the step of ranking the event candidate further comprises generating a predictive score based upon an evaluation of the event candidate against at least a portion of the context data related to the first ID node for confidence of representing the node relevant activity.

42. The method of embodiment 40, wherein the node relevant activity is an anticipated activity characterized by at least a portion of the context data related to the first ID node.

43. The method of embodiment 40, wherein the node relevant activity is a new activity not characterized by a current state of the context data identified to be related to the first ID node.

44. The method of embodiment 40, wherein the node management information comprises node management data maintained by the server, the node management data relating to one or more ID nodes within the wireless node network, the node management data including the context data maintained by the server and related to the first ID node.

45. The method of embodiment 40, wherein the node management information comprises node management data maintained by the server, the node management data relating to the master node.

46. The method of embodiment 40, wherein the node management information comprises a node management rule maintained by the server, the node management rule defining one or more parameters of an operational profile for one or more ID nodes within the wireless node network.

47. The method of embodiment 40, wherein the node management information comprises a node management rule maintained by the server, the node management rule defining one or more parameters of an operational profile for the master node.

48. The method of embodiment 40, wherein the node management information comprises a node management rule defining one or more parameters on how the master node identifies the event candidate.

49. The method of embodiment 40, wherein the node management information comprises a node management rule defining one or more parameters on how the master node simplifies a data feed between the master node and the server.

50. The method of embodiment 40, wherein the revising step further comprises transforming, by the server, the node management information to further indicate a correspondence between the node relevant activity and the updated status related to the first ID node, the transformation being based upon the type of the event candidate and the ranking of the event candidate.

51. The method of embodiment 50, wherein the node relevant activity comprises movement of at least one of the first ID node, the master node, and an object near the master node.

52. The method of embodiment 50, wherein the node relevant activity comprises exposure to a source of shielding that inhibits communication between the first ID node and the master node.

53. The method of embodiment 50, wherein the node relevant activity comprises exposure to a source of RF interference.

54. The method of embodiment 50, wherein the node relevant activity comprises placement of the first ID node within a container.

55. The method of embodiment 40, wherein the instructional input alters how the master node operates.

56. The method of embodiment 40, wherein the instructional input is used by the master node to control an operation of the master node.

57. The method of embodiment 40, wherein the instructional input alters how the master node manages at least one of the ID nodes.

58. The method of embodiment 40, wherein the instructional input is used by the master node to cause at least one of the ID nodes to alter operation.

59. The method of embodiment 55, wherein the instructional input comprises an updated node management rule defining how the master node identifies the event candidate.

60. The method of embodiment 55, wherein the instructional input comprises an updated node management rule refining how the master node simplifies a data feed between the master node and the server.

61. The method of embodiment 40, wherein the updated status comprises a changed status of the first ID node.

62. The method of embodiment 40, wherein the updated status comprises an unchanged status of the first ID node.

63. The method of embodiment 40, wherein the updated status comprises a summarized checkpoint status of the first ID node.

64. A server apparatus for enhanced management of a wireless node network having a plurality of ID nodes and a master node in communication with the ID nodes, the apparatus comprising: a server processing unit; a memory storage coupled to the server processing unit, the memory storage maintaining event candidate analytics engine code for execution by the server processing unit, the memory storage further maintaining node management information used to control one or more of the ID nodes and the master node as part of managing the wireless node network, wherein the node management information comprises at least context data describing a contextual environment of the ID nodes and rule data used for node control operations; a network interface coupled to the server processing unit and operative to communicate with the master node over a network communication path, wherein the network communication path allows the server to directly interact with the master node but does not allow the server to directly interact with the ID nodes; and wherein the server processing unit, when executing the event candidate analytics engine code maintained on the memory storage and having access to the node management information, is operative to receive, via the network interface, an event candidate from the master node, the event candidate being identified by the master node as representing an updated status related to the first ID node, generate a confidence rating for the event candidate based upon an evaluation of the event candidate against at least a portion of the context data, the confidence rating indicating a degree to which the event candidate represents a node relevant activity, update the node management information stored on the memory storage based upon a type of the event candidate and the confidence rating for the event candidate, and cause the network interface to transmit a management message to the master node, the management message providing at least a portion of the updated node management information to the master node as instructional input to be used by the master node.

65. The server apparatus of embodiment 64, wherein the instructional input is used by the master node to control an operation of the master node.

66. The server apparatus of embodiment 64, wherein the instructional input is used by the master node to cause at least one of the ID nodes to alter operation.

67. The server apparatus of embodiment 64, wherein the node relevant activity is an anticipated activity characterized by at least a portion of the context data related to the first ID node.

68. The server apparatus of embodiment 64, wherein the node relevant activity is a new activity not characterized by a current state of the context data identified to be related to the first ID node.

69. The server apparatus of embodiment 64, wherein the rule data defines at least one parameter of an operational profile for one or more ID nodes within the wireless node network.

70. The server apparatus of embodiment 64, wherein the rule data defines at least one parameter of an operational profile for the master node within the wireless node network.

71. The server apparatus of embodiment 64, wherein the rule data defines one or more parameters on how the master node identifies the event candidate.

72. The server apparatus of embodiment 64, wherein the rule data defines one or more parameters on how the master node simplifies a data feed coupling the master node and network interface of the server apparatus.

73. The server apparatus of embodiment 64, wherein the node management information comprises further context data relating to the master node.

74. The server apparatus of embodiment 64, wherein the server processing unit is operative to update the node management information stored on the memory storage by being further operative to transform the node management information to further indicate a correspondence between the node relevant activity and the updated status related to the first ID node.

75. The server apparatus of embodiment 74, wherein the node relevant activity comprises at least one of a detectable physical activity and a detectable electromagnetic activity.

76. The server apparatus of embodiment 74, wherein the server processing unit is operative to transform the node management information based upon the type of the event candidate and the confidence rating of the event candidate.

77. The server apparatus of embodiment 74, wherein the node relevant activity comprises movement of at least one of the first ID node, the master node, and an object near the master node.

78. The server apparatus of embodiment 74, wherein the node relevant activity comprises exposure to a source of shielding that inhibits communication between the first ID node and the master node.

79. The server apparatus of embodiment 74, wherein the node relevant activity comprises exposure to a source of RF interference.

80. The server apparatus of embodiment 74, wherein the node relevant activity comprises placement of the first ID node within a container.

81. The server apparatus of embodiment 64, wherein the instructional input alters how the master node operates.

82. The server apparatus of embodiment 64, wherein the instructional input alters how the master node manages at least one of the ID nodes.

83. The server apparatus of embodiment 81, wherein the instructional input comprises updated rule data defining how the master node identifies the event candidate.

84. The server apparatus of embodiment 81, wherein the instructional input comprises updated rule data refining how the master node simplifies a data fee between the master node and the server.

85. The server apparatus of embodiment 64, wherein the updated status comprises a changed status of the first ID node.

86. The server apparatus of embodiment 64, wherein the updated status comprises an unchanged status of the first ID node.

87. The server apparatus of embodiment 64, wherein the updated status comprises a summarized checkpoint status of the first ID node.

88. An enhanced node management system for a wireless node network having a plurality of ID nodes, the system comprising: a master node disposed within the wireless node network that executes an event detection engine code to become operative to generate a report message regarding an event candidate representing an updated status related to a first of the ID nodes, and receive a management message in response to the generated report message; and a server in communication with the master node over a first communication path, the server maintaining node management information used to control one or more of the ID nodes and the master node as part of managing the wireless node network, wherein the node management information comprises at least context data describing a contextual operating environment of the ID nodes and rule data used for node control operations of the ID nodes and the master node, wherein when the server executes an event candidate analytics engine code maintained on the server, the server becomes operative to: receive the report message from the master node, extract the event candidate from the report message, the event candidate being identified by the master node as representing the updated status related to the first ID node, generate a confidence rating for the event candidate based upon an evaluation of the event candidate compared to at least a portion of the context data maintained by the server, the confidence rating indicating a degree to which the event candidate represents a node relevant activity, update the node management information based upon a type of the event candidate and the confidence rating for the event candidate, and transmit the management message to the master node, the management message providing at least a portion of the updated node management information to the master node as instructional input to be used by the master node.

89. The system of embodiment 88, wherein the instructional input is used by the master node to control an operation of the master node.

90. The system of embodiment 88, wherein the instructional input is used by the master node to cause at least one of the ID nodes to alter operation.

91. The system of embodiment 88, wherein the node relevant activity comprises at least one of a detectable physical activity and a detectable electromagnetic activity.

92. The system of embodiment 88, wherein the node relevant activity is an anticipated activity characterized by at least a portion of the context data that is related to the first ID node.

93. The system of embodiment 88, wherein the node relevant activity is a new activity not characterized by the context data identified as related to the first ID node.

94. The system of embodiment 88, wherein the rule data defines at least one parameter of an operational profile for one or more ID nodes.

95. The system of embodiment 88, wherein the rule data defines at least one parameter of an operational profile for the master node.

96. The system of embodiment 88, wherein the server updates the node management information by transforming the node management information to further indicate a correspondence between the node relevant activity and the updated status related to the first ID node.

97. The system of embodiment 96, wherein the server transforms the node management information based upon the type of the event candidate and the confidence rating of the event candidate.

98. The system of embodiment 96, wherein the node relevant activity comprises movement of at least one of the first ID node, the master node, and an object near the master node.

99. The system of embodiment 96, wherein the node relevant activity comprises exposure to a source of shielding that inhibits communication between the first ID node and the master node.

100. The system of embodiment 96, wherein the node relevant activity comprises exposure to a source of RF interference.

101. The system of embodiment 96, wherein the node relevant activity comprises placement of the first ID node within a container.

102. The system of embodiment 88, wherein the server is operative to transmit the management message to cause the master node to alter how the master node operates.

103. The system of embodiment 88, wherein the server is operative to transmit the management message to cause the master node to send a second management message to at least one of the ID nodes, the second management message causing the one of the ID nodes to alter how the one of the ID nodes operates.

104. The system of embodiment 88, wherein the portion of the revised node management information provided as the instructional input comprises updated rule data.

105. The system of embodiment 88, wherein the updated status comprises a changed status of the first ID node.

106. The system of embodiment 88, wherein the updated status comprises an unchanged status of the first ID node.

107. The system of embodiment 88, wherein the updated status comprises a summarized checkpoint status of the first ID node.

108. An enhanced node management system for a wireless node network having a plurality of ID nodes, the system comprising: a server; a master node disposed within the wireless node network in communication with the server over a first communication path and in communication with the ID nodes over a second communication path distinct from the first communication path, wherein when the master node executes a first engine code, the master node becomes operative to: detect a first updated status related to a first of the ID nodes, wherein the detected first status is represented by a first event candidate, detect a second updated status related to a second of the ID nodes, wherein the detected second status is represented by a second event candidate, transmit the first event candidate and the second event candidate by the master node to the server over the first communication path, and receive a management message in response to the transmitting the first event candidate and the second event candidate; wherein the server maintains node management information used to control one or more of the ID nodes and the master node as part of managing the wireless node network, wherein the node management information comprises at least context data describing a contextual operating environment of the ID nodes and rule data used for node control operations of the ID nodes and the master node; and wherein when the server executes a second engine code maintained on the server, the server becomes operative to: receive the first event candidate and the second event candidate from the master node, generate a first confidence rating for the first event candidate based upon an evaluation of the first event candidate compared to at least a first portion of the context data maintained by the server, the first confidence rating indicating a degree to which the first event candidate represents a node relevant activity, generate a second confidence rating for the second event candidate based upon an evaluation of the second event candidate compared to at least a second portion of the context data maintained by the server, the second confidence rating indicating a degree to which the second event candidate represents the node relevant activity, compare the first confidence rating and the second confidence rating to determine a combined confidence rating reflecting a degree to which the detected first change and the detected second change represent a pattern corresponding to the node relevant activity, update the node management information based upon a type of the first event candidate, a type of the second event candidate, and the combined confidence rating, and transmit the management message to the master node, the management message providing at least a portion of the updated node management information to the master node as instructional input to be used by the master node.

It should be emphasized that the sequence of operations to perform any of the methods and variations of the methods described in the embodiments herein are merely exemplary, and that a variety of sequences of operations may be followed while still being true and in accordance with the principles of the present invention.

At least some portions of exemplary embodiments outlined above may be used in association with portions of other exemplary embodiments to better manage and locate nodes in a wireless node network or use such nodes and network elements as part of a hierarchical node network. Moreover, at least some of the exemplary embodiments disclosed herein may be used independently from one another and/or in combination with one another and may have applications to devices and methods not disclosed herein.

Those skilled in the art will appreciate that embodiments may provide one or more advantages, and not all embodiments necessarily provide all or more than one particular advantage as set forth here. Additionally, it will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. A monitoring system that identifies an event candidate within a wireless node network, the system comprising:
    a server disposed at a top level of the wireless node network;
    an ID node disposed at a low level of the wireless node network;
    a master node disposed at a middle level of the wireless node network, wherein the master node further comprises
        a master node processing unit,
        a memory storage coupled to the master node processing unit, the memory storage maintaining event detection engine code for execution by the master node processing unit,
        a first communication interface coupled to the master node processing unit and operative to communicate with the ID node over a first communication path, and
        a second communication interface coupled to the master node processing unit and operative to communicate with the server over a second communication path, wherein the first communication path is different from the second communication path;

wherein the master node, when executing the event detection engine code on the master node processing unit, is operative to detect, via the first communication interface, a first set of advertising signals broadcast by a first of the ID nodes over the first communication path, generate a first checkpoint summary representing the first set of advertising signals detected by the first communication interface, detect, via the first communication interface, a second set of advertising signals broadcast by the first ID node over the first communication path after the first ID node broadcasts the first set of advertising signals, generate a second checkpoint summary representing the second set of advertising signals detected by the first communication interface, compare an observed parameter for each of the first checkpoint summary and the second checkpoint summary, identify the event candidate based upon the comparison of the observed parameter for each of the first checkpoint summary and the second checkpoint summary, and cause the second communication interface to report the identified event candidate to the server over the second communication path; and wherein the server is operative to receive the identified event candidate from the master node and transmit a responsive adjustment response to the master node based upon the identified event candidate, the responsive adjustment response comprising at least one of an adjusted profile for the master node, an adjusted profile for the ID node, and updated context data reflecting the identified event candidate.

2. The system of claim 1, wherein the second communication interface of the master node is operative to transmit a message to the server when reporting the identified event candidate, the message comprising a reduced monitoring data feed about the ID node that at least includes summary information indicating an observed change between the first set of advertising signals represented by the first checkpoint summary and the second set of advertising signals represented by the second checkpoint summary.

3. The system of claim 1, wherein the observed parameter for the first checkpoint summary comprises a statistical representation of the observed signal strength values for the first set of advertising signals; and wherein the observed parameter for the second checkpoint summary comprises the statistical representation of the observed signal strength values for the second set of advertising signals.

4. The system of claim 3, wherein the statistical representation of the observed signal strength values comprises one from a group consisting of a mean, a median, an average, a moving average over a subset window of advertising signals, a moving average over a sliding time window, or a weighted average.

5. The system of claim 3, wherein the observed signal strength value comprises a received signal strength indicator (RSSI) reflecting a signal strength as detected by the first communication interface.

6. The system of claim 3, wherein the master node is operative to identify the event candidate by being further operative to identify the event candidate as an online event for the ID node when (a) a detected time gap between successive ones of the first set of advertising signals and the second set of advertising signals is less than the threshold time gap and (b) the master node has received at least a threshold number of advertising signals from the ID node in the first set and the second set.

7. The system of claim 3, wherein the master node is operative to identify the event candidate by being further operative to identify the event candidate as a shift event for the ID node when a difference between the observed parameter for the first checkpoint summary and the observed parameter for the second checkpoint summary is at least a threshold value.

8. The system of claim 1, wherein the master node is operative to identify the event candidate by being further operative to identify the event candidate as an offline event when a detected time gap between any successive ones of the second set of advertising signals after detecting the first set of advertising signals is greater than the threshold time gap during an event horizon for the ID node.

9. The system of claim 1, wherein the master node is operative to identify the event candidate by being further operative to identify the event candidate as a sporadic event when the first communication interface detects at least one advertising signal from the ID node but does not detect at least a threshold number of advertising signals from the ID node within a defined period of time from when the first communication interface detects the at least one advertising signal.

10. The system of claim 1, wherein the master node is operative to identify the event candidate by being further operative to identify the event candidate as a checkpoint event when a periodic reporting interval ends and based upon the comparison of the observed parameter for the first checkpoint summary and the observed parameter for the second checkpoint summary.

11. The system of claim 10, wherein the master node is further operative to identify a profile identifier from the ID node, the profile identifier being part of at least one of the advertising signals in either of the first set of advertising signals and the second set of advertising signals; and alter the periodic reporting interval based upon an alert profile corresponding to the profile identifier, the alert profile comprising a plurality of node management rules related to monitoring the ID node and reporting to the server.

12. The system of claim 11, wherein periodic reporting interval comprises a threshold time period adjustable by the node processing unit in response to identifying the profile identifier.

13. The system of claim 11, wherein periodic reporting interval comprises a threshold number of signal receptions adjustable by the node processing unit in response to identifying the profile identifier.

14. The system of claim 1, wherein the master node is operative to identify the event candidate by being further operative to identify the event candidate as a profile change event when the comparison of the observed parameter for each of the first checkpoint summary and the second checkpoint summary indicates a first observed profile setting reflected in the first set of advertising signals is different than a second observed profile setting reflected in the second set of advertising signals.

15. The system of claim 14, wherein the first observed profile setting and second observed profile setting relate to operation of the ID node.

16. The system of claim 14, wherein the first observed profile setting and second observed profile setting relate to operation of the master node.

17. The system of claim 1, wherein the master node is operative to identify the event candidate by being further operative to identify the event candidate as a transmission power change event when the comparison of the observed parameter for each of the first checkpoint summary and the second checkpoint summary indicates a first observed output power setting reflected in the first set of advertising signals is different than a second observed output power setting reflected in the second set of advertising signals.

18. The system of claim 1, wherein the master node is operative to identify the event candidate by being further operative to identify the event candidate as an environmental change event when the comparison of the observed parameter for each of the first checkpoint summary and the second checkpoint summary indicates a second sensor data value associated with the second set of advertising signals is different than a first sensor data value associated with the first set of advertising signals.

19. The system of claim 1, wherein the master node is operative to identify the event candidate by being further operative to identify the event candidate as an environmental change event when the comparison of the observed parameter for each of the first checkpoint summary and the second checkpoint summary indicates a second sensor data value associated with the second set of advertising signals reflects a departure from a first sensor data value associated with the first set of advertising signals, wherein the departure is more than a threshold difference.

20. A master node apparatus for enhanced monitoring for an event candidate within a wireless node network having a plurality of ID nodes and a server, the master node apparatus comprising:
 a node processing unit;
 a memory storage coupled to the node processing unit, the memory storage maintaining event detection engine code for execution by the node processing unit;
 a first communication interface coupled to the node processing unit and operative to communicate with at least a first of the ID nodes over a first communication path;
 a second communication interface coupled to the node processing unit and operative to communicate with the server over a second communication path; and
 wherein the node processing unit, when executing the event detection engine code maintained on the memory storage, is operative to
  detect, via the first communication interface, a first set of advertising signals broadcast by a first of the ID nodes,
  generate a first checkpoint summary representing the first set of advertising signals detected by the first communication interface,
  detect, via the first communication interface, a second set of advertising signals broadcast by the first ID node after the first ID node broadcasts the first set of advertising signals,
  generate a second checkpoint summary representing the second set of advertising signals detected by the first communication interface,
  compare an observed parameter for each of the first checkpoint summary and the second checkpoint summary,
  identify the event candidate based upon the comparison of the observed parameter for each of the first checkpoint summary and the second checkpoint summary, and
  cause the second communication interface to report the identified event candidate to the server over the second communication path.

21. The master node apparatus of claim 20, wherein the second communication interface is operative to transmit a message to the server when reporting the identified event candidate, the message comprising a reduced monitoring data feed about the first ID node that at least includes summary information indicating an observed change between the first set of advertising signals represented by the first checkpoint summary and the second set of advertising signals represented by the second checkpoint summary.

22. The master node apparatus of claim 20, wherein the observed parameter for the first checkpoint summary comprises a statistical representation of the observed signal strength values for the first set of advertising signals; and
 wherein the observed parameter for the second checkpoint summary comprises the statistical representation of the observed signal strength values for the second set of advertising signals.

23. The master node apparatus of claim 22, wherein the statistical representation of the observed signal strength values comprises one from a group consisting of a mean, a median, an average, a moving average over a subset window of advertising signals, a moving average over a sliding time window, or a weighted average.

24. The master node apparatus of claim 22, wherein the observed signal strength value comprises a received signal strength indicator (RSSI) reflecting a signal strength as detected by the first communication interface.

25. The master node apparatus of claim 22, wherein the node processing unit is operative to identify the event candidate by being further operative to identify the event candidate as an online event for the first ID node when (a) a detected time gap between successive ones of the first set of advertising signals and the second set of advertising signals is less than the threshold time gap and (b) the first communication interface has received at least a threshold number of advertising signals from the first ID node in the first set and the second set.

26. The master node apparatus of claim 22, wherein the node processing unit is operative to identify the event candidate by being further operative to identify the event candidate as a shift event for the first ID node when a difference between the observed parameter for the first checkpoint summary and the observed parameter for the second checkpoint summary is at least a threshold value.

27. The master node apparatus of claim 22, wherein the node processing unit is operative to identify the event candidate by being further operative to identify the event candidate as an offline event when a detected time gap between any successive ones of the second set of advertising signals after detecting the first set of advertising signals is greater than the threshold time gap during an event horizon for the first ID node.

28. The master node apparatus of claim 20, wherein the node processing unit is operative to identify the event candidate by being further operative to identify the event candidate as a sporadic event when the first communication interface detects at least one advertising signal from the first ID node but does not detect at least a threshold number of advertising signals from the first ID node within a defined period of time from when the first communication interface detects the at least one advertising signal.

29. The master node apparatus of claim 20, wherein the node processing unit is operative to identify the event candidate by being further operative to identify the event candidate as a checkpoint event when a periodic reporting interval ends and based upon the comparison of the observed parameter for the first checkpoint summary and the observed parameter for the second checkpoint summary.

30. The master node apparatus of claim 29, wherein the node processing unit is further operative to
identify a profile identifier from the first ID node, the profile identifier being part of at least one of the advertising signals in either of the first set of advertising signals and the second set of advertising signals; and
alter the periodic reporting interval based upon an alert profile corresponding to the profile identifier, the alert profile comprising a plurality of node management rules related to monitoring the first ID node and reporting to the server.

31. The master node apparatus of claim 30, wherein periodic reporting interval comprises a threshold time period adjustable by the node processing unit in response to identifying the profile identifier.

32. The master node apparatus of claim 30, wherein periodic reporting interval comprises a threshold number of signal receptions adjustable by the node processing unit in response to identifying the profile identifier.

33. The master node apparatus of claim 20, wherein the node processing unit is operative to identify the event candidate by being further operative to identify the event candidate as a profile change event when the comparison of the observed parameter for each of the first checkpoint summary and the second checkpoint summary indicates a first observed profile setting reflected in the first set of advertising signals is different than a second observed profile setting reflected in the second set of advertising signals.

34. The master node apparatus of claim 33, wherein the first observed profile setting and second observed profile setting relate to operation of the first ID node.

35. The master node apparatus of claim 33, wherein the first observed profile setting and second observed profile setting relate to operation of the master node.

36. The master node apparatus of claim 20, wherein the node processing unit is operative to identify the event candidate by being further operative to identify the event candidate as a transmission power change event when the comparison of the observed parameter for each of the first checkpoint summary and the second checkpoint summary indicates a first observed output power setting reflected in the first set of advertising signals is different than a second observed output power setting reflected in the second set of advertising signals.

37. The master node apparatus of claim 20, wherein the node processing unit is operative to identify the event candidate by being further operative to identify the event candidate as an environmental change event when the comparison of the observed parameter for each of the first checkpoint summary and the second checkpoint summary indicates a second sensor data value associated with the second set of advertising signals is different than a first sensor data value associated with the first set of advertising signals.

38. The master node apparatus of claim 20, wherein the node processing unit is operative to identify the event candidate by being further operative to identify the event candidate as an environmental change event when the comparison of the observed parameter for each of the first checkpoint summary and the second checkpoint summary indicates a second sensor data value associated with the second set of advertising signals reflects a departure from a first sensor data value associated with the first set of advertising signals, wherein the departure is more than a threshold difference.

39. The master node apparatus of claim 20, wherein the node processing unit is further operative to receive, via the second communication interface, an adjustment response from the server based upon the event candidate.

40. The master node apparatus of claim 39, wherein the adjustment response comprises an adjusted profile for at least one of the master node and the first ID node.

41. The master node apparatus of claim 40, wherein the adjustment response comprises an adjusted profile for at least one of the other ID nodes.

42. The master node apparatus of claim 39, wherein the adjustment response comprises updated context data reflecting the reported event candidate.

43. A method for enhanced monitoring for an event candidate within a wireless node network having a plurality of ID nodes, a master node in communication with the ID nodes, and a server in communication with the master node, comprising the steps of:
receiving, by the master node, a first set of advertising signals broadcast by a first of the ID nodes;
generating, by the master node, a first checkpoint summary representing the first set of advertising signals received by the master node;
receiving, by the master node, a second set of advertising signals broadcast by the first ID node after the first ID node broadcasts the first set of advertising signals;
generating, by the master node, a second checkpoint summary representing the second set of advertising signals received by the master node;
identifying, by the master node, the event candidate based upon a comparison of an observed parameter for each of the first checkpoint summary and the second checkpoint summary; and
reporting, by the master node to the server, the event candidate relative to the first ID node.

44. The method of claim 43, wherein the reporting step further comprises simplifying, by the master node, a data feed about the first ID node by sending the event candidate to the server as summary information reflecting an observed change between the first set of advertising signals represented by the first checkpoint summary and the second set of advertising signals represented by the second checkpoint summary.

45. The method of claim 43, wherein the observed parameter for the first checkpoint summary comprises a statistical representation of the observed signal strength values for the first set of advertising signals; and
wherein the observed parameter for the second checkpoint summary comprises the statistical representation of the observed signal strength values for the second set of advertising signals.

46. The method of claim 45, wherein the statistical representation of the observed signal strength values comprises one from a group consisting of a mean, a median, an average, a moving average over a subset window of advertising signals, a moving average over a sliding time window, or a weighted average.

47. The method of claim 43, wherein each of the observed signal strength values comprises a received signal strength indicator (RSSI) reflecting a signal strength as detected by the master node.

48. The method of claim 43, wherein the step of identifying the event candidate further comprises identifying, by the master node, the event candidate as an online event for the first ID node when (a) a detected time gap between successive ones of the first set of advertising signals and the second set of advertising signals is less than the threshold time gap and (b) the master node has received at least a threshold number of advertising signals from the first ID node in the first set and the second set.

49. The method of claim 43, wherein the step of identifying the event candidate further comprises identifying, by the master node, the event candidate as a shift event for the first ID node when a difference between the observed parameter for the first checkpoint summary and the observed parameter for the second checkpoint summary is at least a threshold value.

50. The method of claim 43, wherein the step of identifying the event candidate further comprises identifying, by the master node, the event candidate as an offline event when a detected time gap between any successive ones of the second set of advertising signals after detecting the first set of advertising signals is greater than the threshold time gap during an event horizon for the first ID node as monitored by the master node.

51. The method of claim 43, wherein the step of identifying the event candidate further comprises identifying, by the master node, the event candidate as a sporadic event when the master node receives at least one advertising signal from the first ID node but does not receive at least a threshold number of advertising signals from the first ID node within a defined period of time from when the master node receives the at least one advertising signal.

52. The method of claim 43, wherein the step of identifying the event candidate further comprises identifying, by the master node, the event candidate as a checkpoint event when a periodic reporting interval ends and based upon the comparison of the observed parameter for the first checkpoint summary and the observed parameter for the second checkpoint summary.

53. The method of claim 52 further comprising:
  detecting, by the master node, a profile identifier from the first ID node, the profile identifier being part of at least one of the advertising signals in the first set of advertising signals and the second set of advertising signals; and
  altering, by the master node, the periodic reporting interval based upon an alert profile corresponding to the profile identifier, the alert profile comprising a plurality of node management rules related to monitoring the first ID node and reporting to the server.

54. The method of claim 53, wherein the periodic reporting interval comprises a threshold time period adjustable by the master node.

55. The method of claim 53, wherein the periodic reporting interval comprises a threshold number of signal receptions adjustable by the master node.

56. The method of claim 52 further comprising resetting information collected based upon at least the first set of advertising signals and the second set of advertising signals after reporting the checkpoint event to the server by the master node for data reduction purposes on the master node.

57. The method of claim 43, wherein the step of identifying the event candidate further comprises identifying, by the master node, the event candidate as a profile change event when the comparison of the observed parameter for each of the first checkpoint summary and the second checkpoint summary indicates a first observed profile setting reflected in the first set of advertising signals is different than a second observed profile setting reflected in the second set of advertising signals.

58. The method of claim 57, wherein the first observed profile setting and second observed profile setting relate to operation of the first ID node.

59. The method of claim 57, wherein the first observed profile setting and second observed profile setting relate to operation of the master node.

60. The method of claim 43, wherein the step of identifying the event candidate further comprises identifying, by the master node, the event candidate as a transmission power change event when the comparison of the observed parameter for each of the first checkpoint summary and the second checkpoint summary indicates a first observed output power setting reflected in the first set of advertising signals is different than a second observed output power setting reflected in the second set of advertising signals.

61. The method of claim 43, wherein the step of identifying the event candidate further comprises identifying, by the master node, the event candidate as an environmental change event when the comparison of the observed parameter for each of the first checkpoint summary and the second checkpoint summary indicates a second sensor data value associated with the second set of advertising signals is different than a first sensor data value associated with the first set of advertising signals.

62. The method of claim 43, wherein the step of identifying the event candidate further comprises identifying, by the master node, the event candidate as an environmental change event when the comparison of the observed parameter for each of the first checkpoint summary and the second checkpoint summary indicates a second sensor data value associated with the second set of advertising signals reflects a departure from a first sensor data value associated with the first set of advertising signals, wherein the departure is more than a threshold difference.

63. The method of claim 43 further comprising receiving, by the master node, an adjustment response from the server based upon the event candidate.

64. The method of claim 63, wherein the adjustment response comprises an adjusted profile for at least one of the master node and the first ID node.

65. The method of claim 64, wherein the adjustment response comprises an adjusted profile for at least one of the other ID nodes.

66. The method of claim 63, wherein the adjustment response comprises updated context data reflecting the reported event candidate.

* * * * *